(12) United States Patent
Israr et al.

(10) Patent No.: US 10,388,186 B2
(45) Date of Patent: Aug. 20, 2019

(54) CUTANEOUS ACTUATORS WITH DAMPENING LAYERS AND END EFFECTORS TO INCREASE PERCEPTIBILITY OF HAPTIC SIGNALS

(71) Applicant: Facebook, Inc., Menlo Park, CA (US)

(72) Inventors: Ali Israr, Fremont, CA (US); Pablo Castillo Canales, Union City, CA (US); Frances Wing Yee Lau, San Jose, CA (US); Robert Turcott, Woodside, CA (US); Freddy Abnousi, San Carlos, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/949,465

(22) Filed: Apr. 10, 2018

(65) Prior Publication Data

US 2018/0300998 A1    Oct. 18, 2018

Related U.S. Application Data

(60) Provisional application No. 62/486,337, filed on Apr. 17, 2017, provisional application No. 62/574,389, (Continued)

(51) Int. Cl.
*H04B 3/36* (2006.01)
*G09B 21/00* (2006.01)
(Continued)

(52) U.S. Cl.
CPC .......... *G09B 21/003* (2013.01); *G01L 5/0028* (2013.01); *G06F 3/011* (2013.01);
(Continued)

(58) Field of Classification Search
None
See application file for complete search history.

(56) References Cited

U.S. PATENT DOCUMENTS

| 4,139,742 A | 2/1979 | Walker |
| 4,581,491 A | 4/1986 | Boothroyd |
| (Continued) | | |

FOREIGN PATENT DOCUMENTS

| KR | 10-2006-0028024 A | 3/2006 |
| KR | 10-2013-0086610 A | 8/2013 |

OTHER PUBLICATIONS

Drullman, R. et al., "Effect of reducing slow temporal modulations on speech reception," *J. Acoust. Soc. Am.*, May 1994, pp. 2670-2680, vol. 95, No. 5.
(Continued)

*Primary Examiner* — Julie B Lieu
(74) *Attorney, Agent, or Firm* — Fenwick & West LLP

(57) ABSTRACT

A haptic communication device includes one or more cutaneous actuators to generate haptic vibrations corresponding to actuator signals received by the one or more cutaneous actuators. A dampening member, proximate to a body of a user wearing the haptic communication device, focuses the haptic vibrations at one or more distinct locations on the body. The dampening member has one or more first openings, wherein the one or more cutaneous actuators transmit the haptic vibrations to the one or more distinct locations through the one or more first openings. A spacing member contacts the dampening member and is separated from the body by the dampening member. The spacing member has one or more second openings dimensioned to receive and secure the one or more cutaneous actuators.

35 Claims, 88 Drawing Sheets

Related U.S. Application Data filed on Oct. 19, 2017, provisional application No. 62/552,791, filed on Aug. 31, 2017, provisional application No. 62/621,977, filed on Jan. 25, 2018.

(51) Int. Cl.

| | |
|---|---|
| G01L 5/00 | (2006.01) |
| G06N 20/00 | (2019.01) |
| G08B 6/00 | (2006.01) |
| G09B 21/04 | (2006.01) |
| G10L 15/02 | (2006.01) |
| G10L 15/22 | (2006.01) |
| G10L 13/04 | (2013.01) |
| G10L 21/02 | (2013.01) |
| G10L 21/0272 | (2013.01) |
| G06F 3/01 | (2006.01) |
| G06F 3/16 | (2006.01) |
| G10L 25/18 | (2013.01) |
| G10L 25/48 | (2013.01) |
| G06N 3/04 | (2006.01) |
| G06N 3/08 | (2006.01) |
| G10L 19/00 | (2013.01) |
| G10L 15/16 | (2006.01) |
| G10L 21/06 | (2013.01) |

(52) U.S. Cl.
CPC ............. *G06F 3/016* (2013.01); *G06F 3/167* (2013.01); *G06N 3/0445* (2013.01); *G06N 3/0454* (2013.01); *G06N 3/084* (2013.01); *G06N 20/00* (2019.01); *G08B 6/00* (2013.01); *G09B 21/004* (2013.01); *G09B 21/04* (2013.01); *G10L 13/043* (2013.01); *G10L 15/02* (2013.01); *G10L 15/22* (2013.01); *G10L 21/0202* (2013.01); *G10L 21/0272* (2013.01); *G10L 25/18* (2013.01); *G10L 25/48* (2013.01); *G10L 15/16* (2013.01); *G10L 19/0018* (2013.01); *G10L 21/06* (2013.01); *G10L 2015/025* (2013.01); *G10L 2021/065* (2013.01)

(56) References Cited

U.S. PATENT DOCUMENTS

| | | | |
|---|---|---|---|
| 4,813,419 | A | 3/1989 | McConnell |
| 6,628,195 | B1 | 9/2003 | Coudon |
| 7,536,020 | B2 | 5/2009 | Fukumoto et al. |
| 8,207,832 | B2 | 6/2012 | Yun et al. |
| 8,493,354 | B1 | 7/2013 | Birnbaum et al. |
| 8,552,847 | B1 | 10/2013 | Hill |
| 9,690,382 | B1 | 6/2017 | Moussette et al. |
| 9,829,981 | B1 | 11/2017 | Ji |
| 2001/0027391 | A1 | 10/2001 | Yasunaga et al. |
| 2002/0069380 | A1 | 6/2002 | Ei-Maleh et al. |
| 2004/0145600 | A1 | 7/2004 | Cruz-Hernandez et al. |
| 2004/0173220 | A1 | 9/2004 | Harry et al. |
| 2005/0152325 | A1 | 7/2005 | Gonzales |
| 2007/0265077 | A1 | 11/2007 | Tom et al. |
| 2009/0027233 | A1 | 1/2009 | Li |
| 2009/0073807 | A1 | 3/2009 | Sitton et al. |
| 2010/0160016 | A1 | 6/2010 | Shimabukuro et al. |
| 2012/0019373 | A1 | 1/2012 | Kruse et al. |
| 2012/0104901 | A1 | 5/2012 | Jiang et al. |
| 2012/0218090 | A1 | 8/2012 | Rothschild |
| 2013/0141225 | A1 | 6/2013 | Son et al. |
| 2014/0266570 | A1 | 9/2014 | Sharma et al. |
| 2015/0046828 | A1 | 2/2015 | Desai et al. |
| 2015/0097707 | A1 | 4/2015 | Nelson et al. |
| 2015/0123775 | A1 | 5/2015 | Kerdemelidis |
| 2015/0277565 | A1 | 10/2015 | Harris |
| 2016/0019817 | A1 | 1/2016 | Deokar et al. |
| 2016/0147304 | A1 | 5/2016 | Lund et al. |
| 2016/0195928 | A1 | 7/2016 | Wagner et al. |
| 2016/0258758 | A1 | 9/2016 | Houston et al. |
| 2016/0313801 | A1 | 10/2016 | Wagner et al. |
| 2016/0317383 | A1 | 11/2016 | Stanfield et al. |
| 2016/0321881 | A1 | 11/2016 | Hill |
| 2017/0024978 | A1 | 1/2017 | Gulrez et al. |
| 2017/0111734 | A1 | 4/2017 | Macours |
| 2017/0221336 | A1 | 8/2017 | Ogaz |
| 2017/0256181 | A1 | 9/2017 | Chen |
| 2017/0277330 | A1 | 9/2017 | Bae et al. |
| 2017/0294086 | A1 | 10/2017 | Kerdemelidis |
| 2018/0061743 | A1 | 3/2018 | Hsu et al. |
| 2018/0129394 | A1 | 5/2018 | Lee et al. |
| 2018/0135986 | A1 | 5/2018 | Dayal et al. |
| 2018/0165925 | A1 | 6/2018 | Israr et al. |
| 2018/0184907 | A1 | 7/2018 | Tran |
| 2018/0204426 | A1 | 7/2018 | Nagisetty et al. |

OTHER PUBLICATIONS

Israr, A. et al., "Tactile Brush: Drawing on Skin with Tactile Grid Display," *Disney Research*, May 9, 2011, two pages. [Online} [Retrieved Oct. 13, 2017] Retrieved from the Internet <URL:https://www.disneyresearch.com/publication/tactile-brush-drawing-on-skin-with-tactile-grid-display/.>.

Kubanek, J. et al., "The Tracking of Speech Envelope in the Human Cortex," *PLOS One*, Jan. 2013, vol. 8, Issue 1, nine pages.

McMaster-Carr, "Resilient Polyurethane Foam Sheets and Strips," date unknown, two pages. [Online] [Retrieved Feb. 7, 2018] Retrieved from the Internet <URL: https://www.mcmaster.com/#quick-recovery-foam/=1bgenqk.>.

Nourski, K.V. et al., "Temporal Envelope of Time-Compressed Speech Represented in the Human Auditory Cortex," *The Journal of Neuroscience*, Dec. 9, 2009, pp. 15564-15574, vol. 29, No. 49.

O'Neal, Jacob, "Magnets," *Animagraffs*, date unknown, one page. [Online] [Retrieved Feb. 7, 2018] Retrieved from the Internet <URL: http://www.audiopolitan.com/wp-content/uploads/2014/12/How-Speaker-Magnets-Work-Animagraff-Audiopolitan.gif.>.

Parts Express Auto Components & Solutions, "Tectonic Elements TEAX13C02-8/RH 13mm Exciter 8 Ohms," date unknown, seven pages. [Online] [Retrieved Feb. 7, 2018] Retrieved from the Internet <URL: https://www.parts-express.com/tectonic-elements-teax13c02-8-rh-13mm-exciter-8-ohms--297-214.>.

Shannon, Robert V. et al., "Speech Recognition with Primarily Temporal Cues," Oct. 13, 1995, *Science*, pp. 303-304, vol. 270.

Smith, Z.M. et al., "Chimaeric sounds reveal dichotomies in auditory perception," *Nature*, Mar. 2002, vol. 416, pp. 87-90.

PCT International Search Report and Written Opinion, PCT Application No. PCT/US2018/026934, dated Jul. 30, 2018, twelve pages.

Zhao, S. et al., "Coding Tactile Symbols for Phonemic Communication," *2018 Conference on Human Factors in Computing Systems*, Apr. 21-26, 2018, thirteen pages, Montreal, Canada.

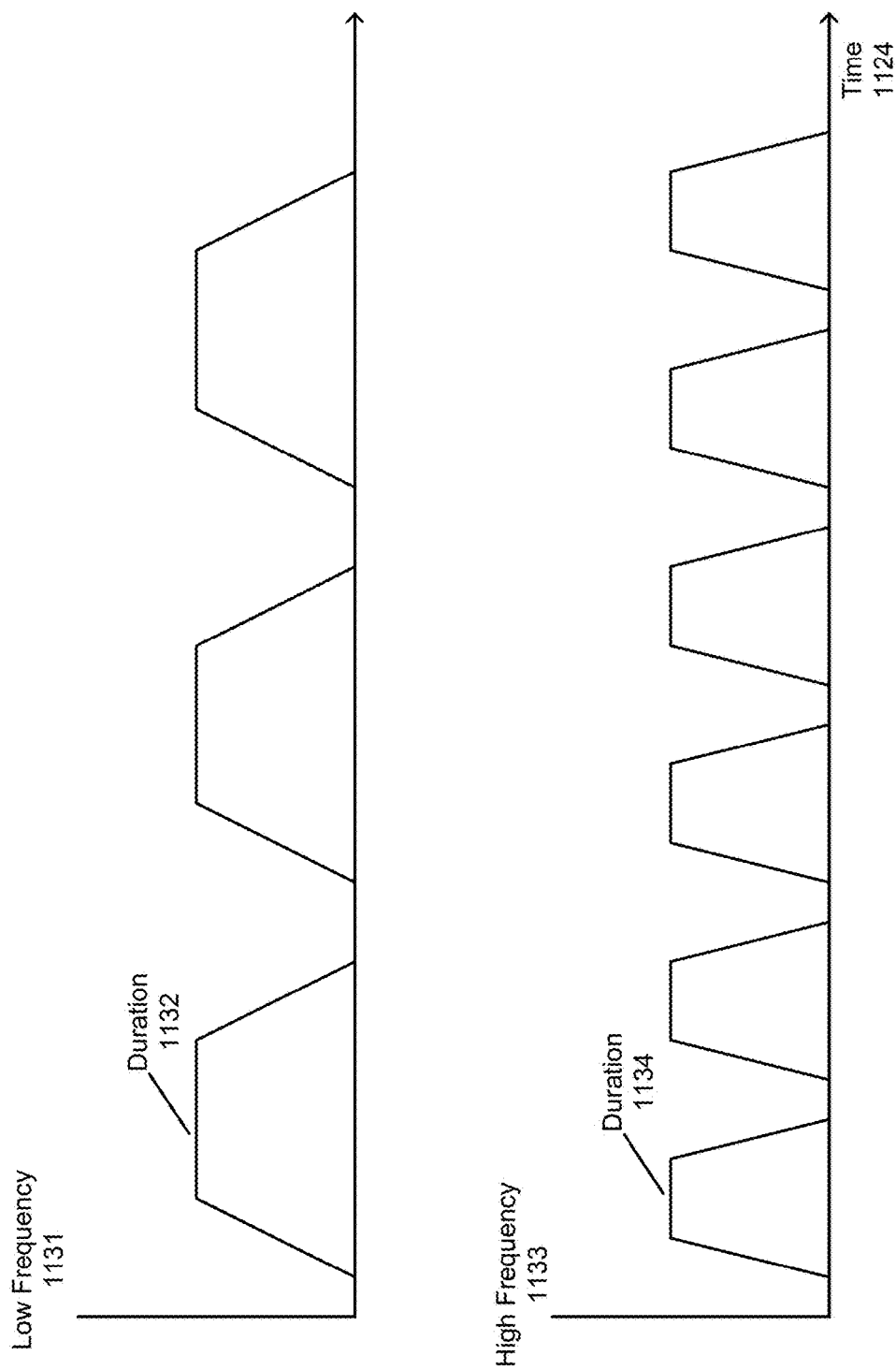

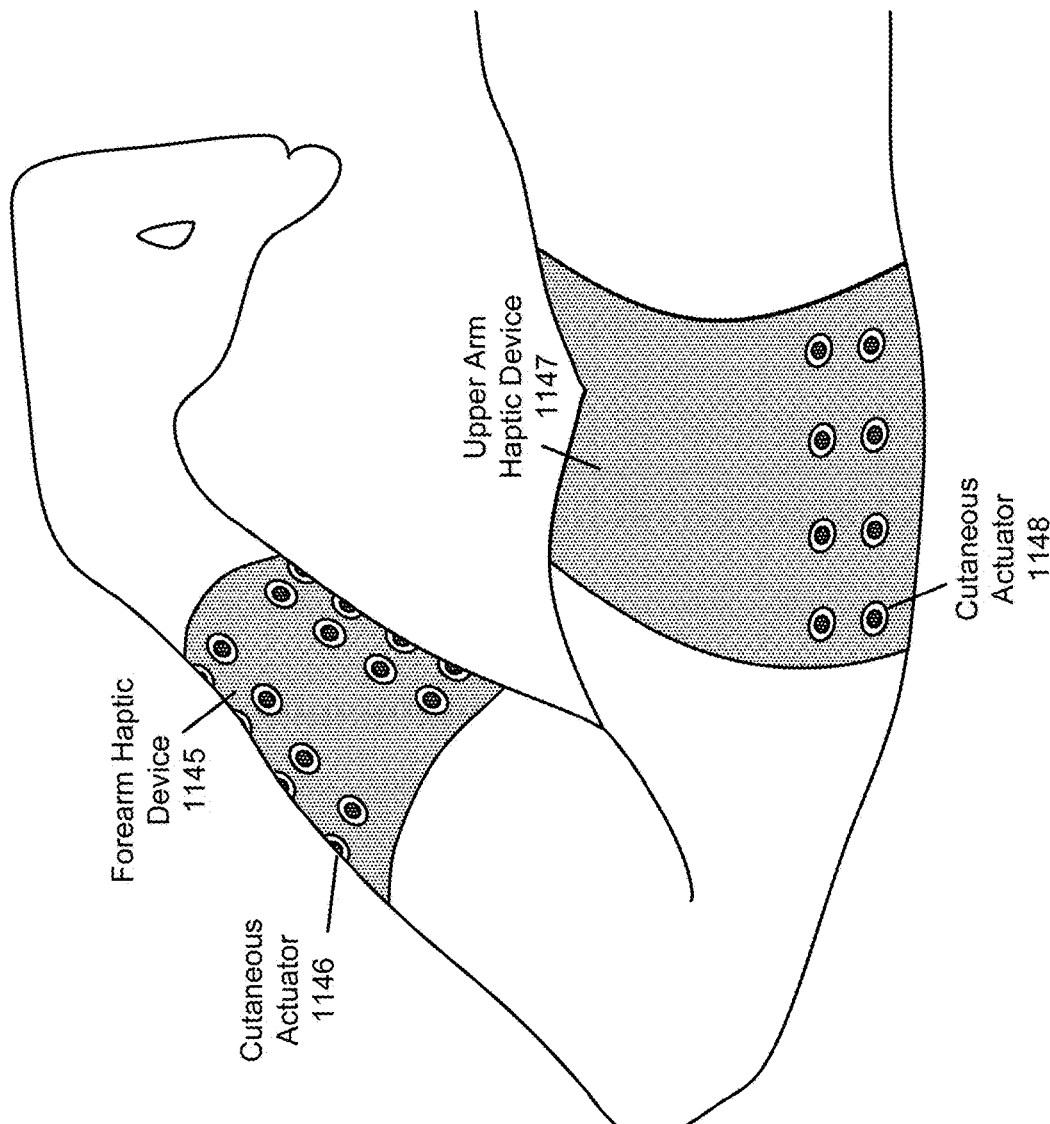

Classification of NAE Consonant Phonemes

| Manner of Articulation | Place of Articulation | | | | | | |
|---|---|---|---|---|---|---|---|
| | Bilabial | Labiodental | Dental | Alveolar | Palatal | Velar | Glottal |
| Stop Voiceless | Pay | | | Tea | | Cake | |
| Voiced | Bee | | | Day | | Go | |
| Fricative Voiceless | | Fee | THeta | See | SHe | | He |
| Voiced | | Victor | THee | Zee | seiZure | | |
| Affricate Voiceless | | | | | CHeese | | |
| Voiced | | | | | Gym | | |
| Nasal Voiced | My | | | Name | | piNG | |
| Liquid Voiced | | | | Lee | Read | | |
| Glide Voiced | We | | | | Yield | | |

FIG. 11R

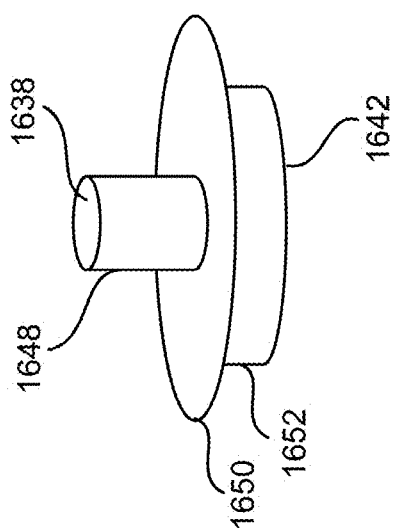

CUTANEOUS ACTUATORS WITH DAMPENING LAYERS AND END EFFECTORS TO INCREASE PERCEPTIBILITY OF HAPTIC SIGNALS

CROSS REFERENCE TO RELATED APPLICATIONS

This application claims priority under 35 U.S.C. § 119(e) to U.S. Provisional Application No. 62/486,337, filed Apr. 17, 2017; U.S. Provisional Application No. 62/552,791, filed Aug. 31, 2017; U.S. Provisional Application No. 62/574,389, filed Oct. 19, 2017; and U.S. Provisional Application No. 62/621,977, filed Jan. 25, 2018, all of which are incorporated by reference herein in their entirety.

BACKGROUND

Field of the Disclosure

The present disclosure generally relates to haptic communication, and specifically to a haptic communication system using cutaneous actuators.

Description of the Related Arts

Haptic, kinesthetic, and cutaneous communication refers to the ways in which humans communicate and interact via the sense of touch, and measure information arising from physical interaction with their environment. Haptic sense and touch includes information about surfaces and textures, and is a component of communication that is nonverbal and nonvisual. However, haptic communication between users often depends on whether the users are present in the same location. Haptic communication between users at different locations is often not feasible. Moreover, users having dual-sensory (deaf-blind) impairment may have difficulty in communication through audio and/or visual means. For example, deaf-blind people may miss out on certain information, thereby increasing their reliance on friends, family or interpreting services if these are available. Deaf-blind persons may also find it difficult to use a social networking system that relies on visual and audio cues.

SUMMARY

Embodiments relate to haptic communication and generating the sense of touch by transmitting haptic signals to generate haptic forces, vibrations, or motions at actuators attached to a user. In embodiments, mechanical stimulation may be used to assist in the creation of communication messages that correspond to a touch lexicon. The haptic communication may incorporate cutaneous actuators to transmit the communication to a user.

Embodiments also relate to operating cutaneous actuators to produce sensation of actions or motions within a part of a user's body by sending a first and second actuator signals. The first actuator signal is sent to a first cutaneous actuator on a first patch of the user's skin at a first time to cause the first cutaneous actuator to produce haptic outputs on the first patch of the skin. The second actuator signal is sent to a second cutaneous actuator on a second patch of the user's skin at a second time subsequent to the first time to cause haptic outputs on the second patch of the skin.

Embodiments also relate to operating cutaneous actuators to enhance haptic communication through a path of a receiving user's skin by using constructive or destructive interference between haptic outputs. Characteristics of actuator signals are determined and corresponding the actuator signals are generated according to the determined characteristics by signal processing. The generated actuators signals are sent to the cutaneous actuators. The cutaneous actuators, spaced apart from each other on a patch of skin, generates haptic outputs by the cutaneous actuators such that the generated haptic outputs constructively or destructively interfere on the patch of skin.

Embodiments also relate to encoding a speech signal for haptic communication using frequency decomposition. A digitized version of the speech signal is processed. Dominant frequencies in the processed speech signal are detected to generate dominant frequency information. The detected dominant frequencies are sent for generating actuator signals.

Embodiments also relate to a haptic device that comprises a signal generator that is configured to receive an input word that is a unit of a language. The signal generator converts the input word into one or more phonemes of the input word. The signal generator further converts the one or more phonemes into a sequence of actuator signals. The sequence of actuator signals is formed from a concatenation of sub-sequences of actuator signals. Each phoneme corresponds to a unique sub-sequence of actuator signals. The haptic device further comprises a two dimensional array of cutaneous actuators configured to receive the sequence of actuator signals from the signal generator, each of the actuator signals mapped to a cutaneous actuator of the two dimensional array of cutaneous actuators.

Embodiments also relate to a haptic calibration device that comprises a subjective magnitude input device configured to receive a subjective force value indicating a value of a subjective force from a user and a force location indicating where the subjective force was experienced by the user. The haptic calibration device further comprises a plurality of haptic sensors located on an area of a surface of a user's body, the haptic sensors configured to detect a force and to output a sensor voltage value corresponding to the force. The haptic calibration device comprises a signal generator configured to receive the subjective force value and the force location from the subjective magnitude input device. The signal generator also receives from at least one of a plurality of haptic sensors a sensor voltage value, with the at least one of the plurality of haptic sensors corresponding to the force location. The signal generator stores the subjective force value and the corresponding sensor voltage value in a data store. The signal generator generates a calibration curve indicating a correspondence between subjective force values and sensor voltage values for the location where the subjective force was experienced using the data from the data store, wherein the calibration curve is used to calibrate a haptic feedback device.

Embodiments also relate to a method comprising inputting an audio signal into a machine learning circuit to compress the audio signal into a sequence of actuator signals. The machine learning circuit being trained by: receiving a training set of acoustic signals and pre-processing the training set of acoustic signals into pre-processed audio data. The pre-processed audio data including at least a spectrogram. The training further includes training the machine learning circuit using the pre-processed audio data. The neural network has a cost function based on a reconstruction error and a plurality of constraints. The machine learning circuit generates a sequence of haptic cues corresponding to the audio input. The sequence of haptic cues is transmitted to a plurality of cutaneous actuators to generate a sequence of haptic outputs.

Embodiments also relate to a haptic device that comprises a signal generator that is configured to receive an input word that is a unit of a language written using consonant-vowel pairs. The signal generator converts the input word into one or more consonant-vowel pairs of the input word. The signal generator further converts the one or more consonant-vowel pairs into a sequence of actuator signals. The sequence of actuator signals is formed from a concatenation of sub-sequences of actuator signals. Each phoneme corresponding to a unique sub-sequence of actuator signals. The haptic device further comprises a two dimensional array of cutaneous actuators configured to receive the sequence of actuator signals from the signal generator, each of the actuator signals mapped to a cutaneous actuator of the two dimensional array of cutaneous actuators.

Embodiments also relate to a haptic communication device including an array of cutaneous actuators to generate haptic sensations corresponding to actuator signals received by the array. The haptic sensations include at least a first haptic sensation and a second haptic sensation. The array includes at least a first cutaneous actuator to begin generating the first haptic sensation at a first location on a body of a user at a first time. A second cutaneous actuator begins generating the second haptic sensation at a second location on the body of the user at a second time later than the first time.

Embodiments also relate to a haptic communication device including one or more cutaneous actuators to generate haptic vibrations corresponding to actuator signals received by the one or more cutaneous actuators. A dampening member, proximate to a body of a user wearing the haptic communication device, focuses the haptic vibrations at one or more distinct locations on the body. The dampening member has one or more first openings, wherein the one or more cutaneous actuators transmit the haptic vibrations to the one or more distinct locations through the one or more first openings. A spacing member contacts the dampening member and is separated from the body by the dampening member. The spacing member has one or more second openings dimensioned to receive and secure the one or more cutaneous actuators.

Embodiments also relate to a haptic communication system including a speech signal generator configured to receive speech sounds or a textual message and generate speech signals corresponding to the speech sounds or the textual message. An envelope encoder is operably coupled to the speech signal generator to extract a temporal envelope from the speech signals. The temporal envelope represents changes in amplitude of the speech signals. Carrier signals having a periodic waveform are generated. Actuator signals are generated by encoding the changes in the amplitude of the speech signals from the temporal envelope into the carrier signals. One or more cutaneous actuators are operably coupled to the envelope encoder to generate haptic vibrations representing the speech sounds or the textual message using the actuator signals.

Embodiments also relate to a haptic communication system including a broadband signal generator to extract parameters from sensor signals describing a message for transmission to a user. Broadband carrier signals are generated by aggregating a plurality of frequency components. Actuator signals are generated by encoding the parameters from the sensor signals into the broadband carrier signals. One or more cutaneous actuators are communicatively coupled to the broadband signal generator to receive the actuator signals. Haptic vibrations are generated corresponding to the actuator signals on a body of the user to communicate the message to the user.

BRIEF DESCRIPTION OF THE DRAWINGS

The teachings of the embodiments can be readily understood by considering the following detailed description in conjunction with the accompanying drawings.

FIG. 11F illustrates an example of haptic outputs of different frequencies, according to an embodiment.

FIG. 11I illustrates an alternate arrangement of haptic devices with arrays of cutaneous actuators, according to an embodiment.

FIG. 11R is a chart illustrating the consonant phonemes in FIGS. 11K-11Q, and the mapping between the location, duration, and type of the haptic outputs corresponding to each consonant phoneme and the manner of articulation and place of articulation of each consonant phoneme, according to an embodiment.

FIG. 16I is a perspective view of a cylindrical end effector, in accordance with an embodiment.

DETAILED DESCRIPTION

Figure 1:
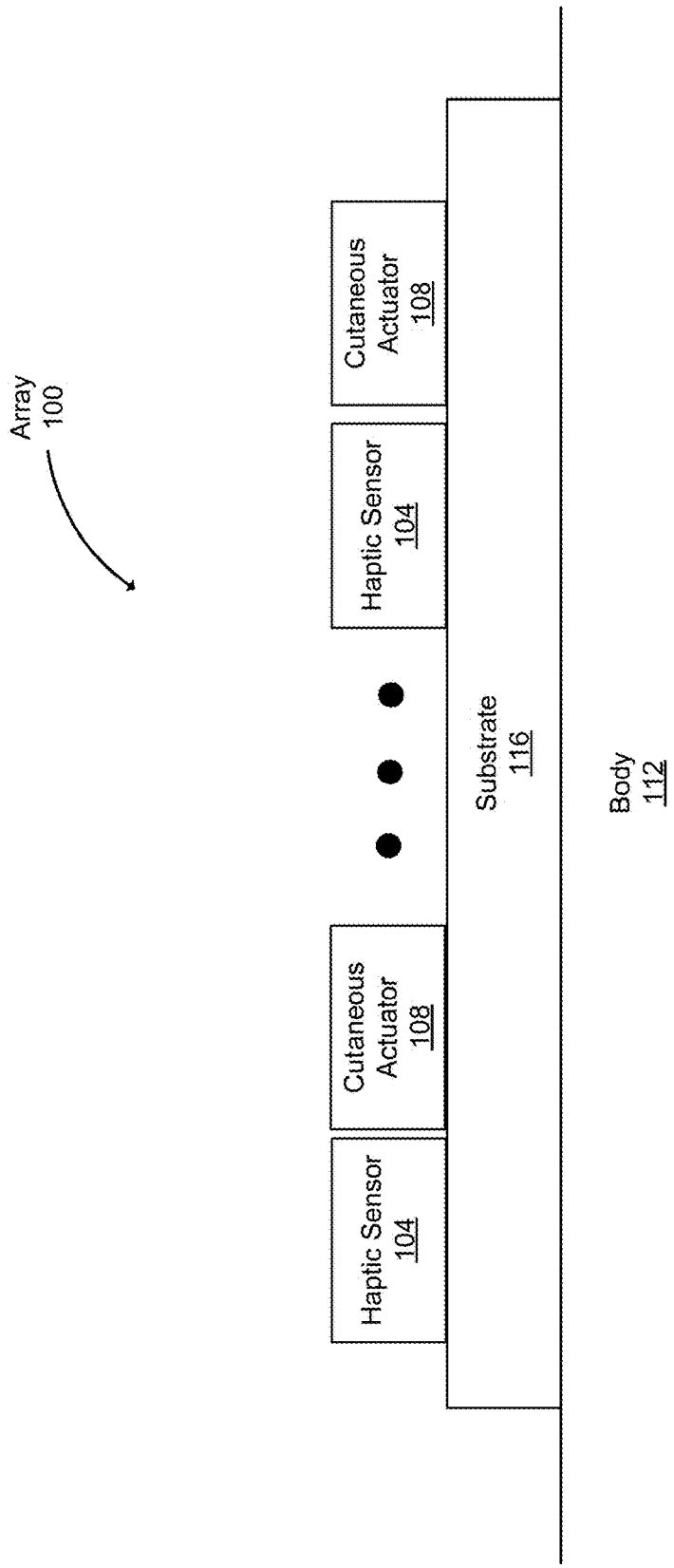
FIG. 1 is an example view of an array of haptic sensors and cutaneous actuators, in accordance with an embodiment.

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments are described herein with reference to the figures where like reference numbers indicate identical or functionally similar elements. Also in the figures, the left most digits of each reference number corresponds to the figure in which the reference number is first used.

Haptic Communication System Using Cutaneous Actuators

Embodiments relate to a mode of communication using the sense of touch to convey messages (including speech) to a user's body. A haptic output in the form of haptic outputs, for example, is generated by cutaneous actuators attached to the user's body. To generate the haptic output, a message is processed by an algorithm to generate a corresponding haptic illusion signal that is transmitted to a receiving device of the user to operate the actuators. The generated haptic illusion signals are processed into actuator signals for activating the cutaneous actuators. The cutaneous actuators receive the transmitted haptic illusion signals and transmit the haptic output corresponding to the received haptic illusion signals to a body of a receiving user.

In addition, in some embodiments, the force applied by the cutaneous actuators may be calibrated per-user, such that each user experiences a similar subjective level of force from the cutaneous actuators for the same objective level of force generated by the haptic illusion signals. This allows for a consistent experience throughout a user base. Additional details regarding calibration of the cutaneous actuators is described below with reference to FIG. 12.

Development of Lexicon for Haptic Communication

Haptic communication a mode of communication that is alternative or additional to other modes of communication that is currently widely used such as speech or text. The haptic communication can be agnostic to written or spoken languages, and can enhance or supplement communication between multiple users through word embedding. The haptic communication can also be used to facilitate communication with users with special needs such as deaf or blind people.

Words to be included in lexicon for use in haptic communication can be selected on the basis of most frequent use. For transmitting sense of haptic social touch from one user to another user, the lexicon may include haptic messages for greeting, parting, giving attention, helping, consoling, calming, pleasant, and reassuring touches. When converting speech to haptic output, most widely used words may be selected and mapped to a predetermined set of haptic symbols, as described below in detail with reference to FIG. 3.

Some words in the lexicon may be associated with a level of affinity between the users. For example, consoling touches may be acceptable between users who are already familiar with each other. Hence, the relationships between the users can govern which words in the lexicon or haptic outputs are permissible for transmission between users.

In addition, in some embodiments, phonemes, consonant-vowel pairs, or syllables, depending on the input words (i.e., input language), may be converted into sequences of haptic signals and transmitted to cutaneous actuators on a user's body. This results in the user being able to comprehend the input words without verbal or visual communication. Such a method may be useful for situations where verbal or visual communication is unavailable. Additional details are described below with reference to FIGS. 11 and 14. Furthermore, in some embodiments, a neural network may be used to convert an audio signal directly into a sequence of haptic signals. The neural network may be trained to constrain the conversion of the audio signal such that the resulting sequence of haptic signals can be feasibly implemented in a haptic device with limited numbers of cutaneous actuators, while still allowing accurate differentiation of different signals by users. Additional details are described below with reference to FIG. 13.

Example Haptic Sensors and Actuators

FIG. 1 is an example view of an array 100 of haptic sensors 104 and cutaneous actuators 108, in accordance with an embodiment. The haptic sensors 104 is optional and the array 100 may include only the cutaneous actuators 108 for receiving haptic signals. The array 100 may be placed or worn on a body 112 of a receiving user. The haptic sensors 104 and cutaneous actuators 108 may be mounted on a flexible substrate 116 configured to be placed on the body 112 of the receiving user. The substrate 116 is made of a flexible material such as plastics (e.g., polyethylene and polypropylene), rubbers, nylon, synthetics, polymers, etc.

The haptic sensors 104 measure parameters related to social touch on the body 112 by receiving forces, vibrations, or motions applied to the array 100. The haptic sensors 104 may be one or more of accelerometers, pressure sensors, and piezoelectric sensors. In one embodiment, the haptic sensors 104 may receive sensor input from a social touch that may be represented in dimensions of pressure, temperature, texture, sheer stress, time, and space or a subset thereof. In one embodiment, airborne ultrasound transducers may be used as a haptic sensor.

The haptic communication system may include cutaneous actuators 108 that transmit information related to social touch to the body 112 when a user is sending the information (i.e., the user is now a sending user). The cutaneous actuators 108 may be positioned on the array 100 to provide vibratory feedback when another user sends a haptic communication to the body 112 of the sending user. In embodiments, one actuator may induce a feedback vibration, while another actuator creates a second vibration to suppress the first from propagating to unwanted regions of the body 112 or array 100 to localize the haptic experience, as described below in detail with reference to FIGS. 9A through 9L.

In embodiments, the cutaneous actuators 108 may be one or more of voice coils, linear resonant actuators (LRAs), eccentric rotating mass actuators, piezoelectric actuators, electroactive polymer actuators, shape memory alloy actuators, pneumatic actuators, microfluidic actuators, and acoustic metasurface actuators. A voice coil includes a former, collar, and winding and provides motive force to the body 112 of the user by the reaction of a magnetic field to current passing through the coil. An LRA uses a voice coil and AC input to produce a vibration with a frequency and amplitude corresponding to an electrical signal. An eccentric rotating mass actuator uses the magnetic field of a DC current to move a small rotating mass to produce lateral vibration. A piezoelectric actuator produces a vibration corresponding to an AC current applied to it.

In embodiments, the haptic output produced by the cutaneous actuators 208 may include information on one or more of pressure, temperature, texture, sheer stress, time, and space.

Example Environment of Haptic Communication System

Figure 2:
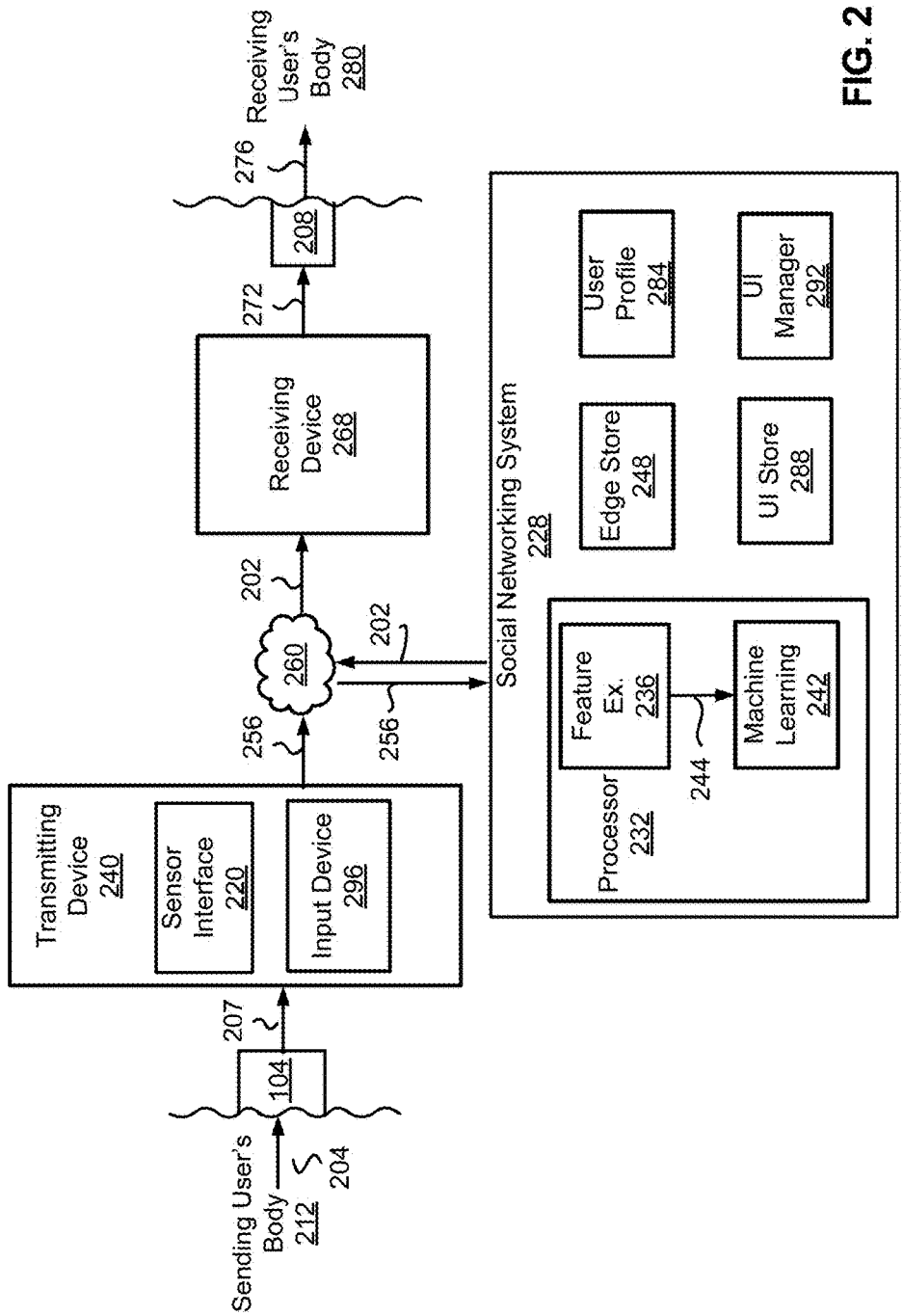
FIG. 2 is a block diagram of a haptic communication system receiving a haptic message from a sending user and sending the haptic illusion signal to a receiving user, in accordance with an embodiment.

FIG. 2 is an example block diagram of a haptic communication system 200, in accordance with an embodiment. The haptic communication system 200 may include a transmitting device 240, a social networking system 228 and a receiving device 268. The haptic communication system 200 may include other components not illustrated in FIG. 2 or the components may be arranged in a different manner.

A sending user's body 212 may be partially covered by the haptic sensors 104. The sending user's body 212 may transmit haptic touches 204 to the haptic sensors 104. The haptic sensors 104 may convert the haptic touches 204 to sensor signals 207. The sensor signals 207 may include current, voltage, pressure, some other type of sensor signal, or a combination thereof.

The transmitting device 240 is coupled to the haptic sensors 104. The transmitting device 240 includes, among other components, a sensor interface circuit 220 to receive sensor signals 207 from haptic sensors 104 and sends out a signal 256 for conversion to a haptic illusion signal 202. Alternatively or in addition to receiving the sensor signals 207, the transmitting device 240 may send a message in text form (e.g. received via an input device 296 such as a keyboard) for conversion to the haptic illusion signal 202. The transmitting device 240 sends the signal 256 based on the sensor signals 207 or message to the network 260, which may include any combination of local area and/or wide area networks, using both wired and/or wireless communication systems.

In one embodiment, the transmitting device 240 may include a signal generator to generate and transmit actuator signals (based on the sensor signals 207) to an array of cutaneous actuators (illustrated and described in detail below with reference to FIGS. 15A through 15E) placed on a receiving user's body 280 to cause the array to create continuous tactile motion along the body 280 of the receiving user. The actuator signals may correspond to words of a social touch lexicon. The actuator signals may include information on pressure, temperature, texture, sheer stress, time, and space of a physical touch perceived by the receiving user's body 280. These parameters (e.g., pressure) may be used by the array to generate haptic outputs corresponding to the parameters received by the array. For example, the parameters may be translated into a duration time, frequency, or amplitude of the haptic outputs. Alternately, the transmitting device 240 may send actuator signals to the social networking system 228 to adjust the actuator signals before they are transmitted to the body 280 of the receiving user.

The social networking system 228 communicates with haptic devices, e.g., haptic sensor 104, used by users of the social networking system 228 over the network 260. The social networking system 228 may include a processor circuit 232 to apply a conversion algorithm to the signals 256 to generate haptic illusion signals 202. The conversion algorithm may be embodied as a transfer function (also known as a transfer curve) that is a mathematical representation for fitting or describing the mapping of a signal 256 to the haptic illusion signals 202. The transfer function may be a representation in terms of spatial or temporal frequency, of the relation between the input and output of the signals 256 to haptic illusion signals 202 mapping system with zero initial conditions and zero-point equilibrium. In one embodiment, the social networking system 228 may include a signal generator to generate actuator signals to cause an array of cutaneous actuators placed on the receiving user's body 280 to create continuous tactile motion along the body of the user 280.

In one embodiment, the haptic illusion signals 202 generated by the social networking system 228 may be generated by combining generic haptic illusion signals with personalized haptic illusion signals customized to the sending user. The generic haptic illusion signals may correspond to predetermined the social touch lexicon such as "Greeting," "Parting," "Consoling," etc. The haptic illusion signals 202 may include one or more of aggregate values based on the signals 256, a shape of a wave of the received sensor signals 207, a frequency-domain representation of the signals 256, and a time-domain sample of the received signals 256. The processor circuit 232 may convert the signals 256 from the time or space domain to the frequency domain, e.g., using a Fourier transform to create a frequency-domain representation. The processor circuit 232 may performing time-domain sampling of the signals 256. Time-domain sampling reduces the signals 256 to a set of discrete-time samples, such as a set of values at a point in time and/or space.

In one embodiment, the processor circuit 232 may include a feature extraction component 236 operatively communicate with the sensor interface circuit 220 and extract features 244 from the received signals 256, as illustrated and described in detail below with respect to FIG. 4. The feature extraction component 236 may extract the features 244 by one or more of creating a frequency-domain representation of the received signals 256, and performing time-domain sampling of the signals 256.

The processor circuit 232 may include a machine learning circuit 242 communicating with the feature extraction component 236 to determine a touch signature of the sending user based on the extracted features 244 and automatically encode the touch signature into the haptic illusion signals 202. The touch signatures may be represented as a vector of values for each defined word of a social touch lexicon. For qualitative models, this touch signature vector may include values 0 or 1.

In one embodiment, the feature extraction component 236 extracts features from a user profile of the receiving user. The machine learning circuit 242 may further determine a score for the generated haptic illusion signals 202 based on the extracted features. The score may indicative of a likelihood of the receiving user expressing a preference for the haptic illusion signals 202 based on the user profile.

In one embodiment, the processor circuit 232 determines an affinity between the sending user and the receiving user, and modifies the haptic illusion signals 202 based on the determined affinity. For example, the processor circuit 232 may alter generic haptic illusion signals for "Greeting" to be reflective of a more intimate relationship between the first and receiving users if the affinity between them reflects that they are partners. In one embodiment, the processor circuit 232 retrieves a user profile of the receiving user, and modifies the haptic illusion signals 202 based on the retrieved user profile. For example, the processor circuit 232 may alter the haptic illusion signals 202 to be gentler (i.e., weaker) if the receiving user is of the female gender.

In embodiments, the processor circuit 232 may generate the haptic symbol set, where a distance between each haptic symbol of the haptic symbol set and each other haptic symbol of the haptic symbol set is greater than a threshold. The distance described herein may indicate, for example, spatial distances between the actuators operated by the haptic illusions signal 202, a timing difference between vibrations of the same or different actuators. The benefits and advantages of this method are that the haptic symbols of the resulting haptic symbol set are distinguishable from each other. The receiving user can thus more easily comprehend the haptic communication.

In one embodiment, the distance between each haptic symbol of the haptic symbol set and each other haptic symbol of the haptic symbol set may be determined by one or more of a Minkowski distance, a Mahalanobis distance, a Matsushita distance, a chi-squared distance, a Hamming distance, a cosine similarity, a dot product, and a Grassmann distance.

The haptic communication system 200 may further generate an implicit learning program based on the haptic symbols and the received speech signals, where the implicit learning program is immersive, non-intentional, age-independent, IQ-independent, and subconscious. The benefits and advantages of this approach are that the receiving user may more easily learn the haptic symbol set and the particular language of haptic communication that it represents.

In one embodiment, the social networking system 228 includes an edge store 248 that stores information describing connections between users on the social networking system 228 as edges. Some edges may be defined by users, allowing users to specify their relationships with other users. For example, users may generate edges with other users that parallel the users' real-life relationships, such as friends, co-workers, partners, and so forth. Other edges are generated when users sends haptic communication, such as "Greeting," "Parting," "Consoling," etc., speech signals 216, or social networking emoticons, e.g., "like," "love," "haha," "wow," "sad," "angry," etc. Other edges are generated when users interact with content items in the social networking system 228, such as expressing interest in a page on the social networking system, sharing a link with other users of the social networking system, and commenting on posts made by other users of the social networking system.

The edge store 248 also stores information about edges, such as affinity scores for content items, interests, and other users. Affinity scores, or "affinities," may be computed by the social networking system 228 over time to approximate a user's affinity for a type of haptic communication emotion associated with user interactions, an content item, interest, and other users in the social networking system 228 based on the actions performed by the user. For example, the edge store 248 may determine a user's affinity for the words "Greeting," "Parting," "Consoling," etc., as the number of times the user sent these words to another user. Computation of affinity is further described in U.S. Pat. No. 8,402,094, which is hereby incorporated by reference in its entirety.

Each user of the social networking system 228 may be associated with a user profile, which is stored in the user profile store 284. A user profile includes declarative information about the user that was explicitly shared by the user and may also include profile information inferred by the social networking system 228. In one embodiment, a user profile includes multiple data fields, each describing one or more attributes of the corresponding user of the social networking system 228. Examples of information stored in a user profile include biographic, demographic, and other types of descriptive information, such as user profile images, work experience, educational history, gender, hobbies or preferences, location and the like. A user profile may also store other information provided by the user, for example, images or videos. In certain embodiments, user profile images of users may be tagged with identification information of users of the social networking system 228.

In embodiments, the user profile store 284 may include, for each user, an avatar, a screenname, and the user's real name. An avatar is an icon or figure representing a particular user in computer games, Internet forums, social networking systems, etc. A screenname is a unique sequence of characters that a user may choose to use for identification purposes when interacting with others online, as in computer games, instant messaging, forums, and via the social networking system 228.

The social networking system 228 may continuously update the user profile for a user with the geolocation of the user's haptic sensor 104. A user's geolocation may be determined by the social networking system 228 based on information sent by a user's haptic sensor 104's GPS chip and satellite data, which mapping services can map. When a GPS signal is unavailable, the social networking system 228 may use information from cell towers to triangulate a user's haptic sensor 104's position or GPS and cell site triangulation (and in some instances, local Wi-Fi networks) in combination to zero in on the location of the user's haptic sensor 104; this arrangement is called Assisted GPS (A-GPS). The social networking system 228 may also determine the geolocation distance between two user's haptic sensors using the Haversine formula to calculate the great-circle distance between two points, as a straight line distance between the two client devices, which are associated with geolocation coordinates in terms of latitude and longitude, etc.

User interaction store 288 may be used by the social networking system 228 to track haptic communication on the social networking system 228, as well as interactions on third party systems that communicate information to the social networking system 228. Users may interact with other users on the social networking system 228, and information describing these interactions is stored in the user interaction store 288. Examples of interactions using haptic communication may include: commenting on posts, sharing links, and checking-in to physical locations via a mobile device, accessing content items, etc. Additional examples of interactions on the social networking system 228 that may be included in the user interaction store 288 are commenting on a photo album, communicating with a user, establishing a connection with an content item, joining an event to a calendar, joining a group, creating an event, authorizing an application, using an application, expressing a preference for an content item ("liking" the content item) and engaging in a transaction.

The user interaction store 288 may store information corresponding to haptic symbols or words, where each word includes information identifying an emotion type. Additionally, the user interaction store 288 may record a user's interactions with other applications operating on the social networking system 228. In some embodiments, data from the user interaction store 288 is used to infer interests or preferences of a user, augmenting the interests included in the user's user profile and allowing a more complete understanding of user preferences.

The user interaction manager 292 receives communications about user haptic communication internal to and/or external to the social networking system 228, populating the user interaction store 288 with information about user interactions. Interactions received by the user interaction manager 292 may include expressing an emotional preference for words in a haptic lexicon. In addition, a number of actions may involve one or more particular users, so these actions are associated with those users as well and stored in the user interaction store 288. The user interaction manager 292 may determine the time a user performed an interaction by a timestamp in the haptic illusion signals 202 or sensor signals 207 representing the interaction.

The transmitting device 240 includes input devices 296 such as a keyboard or pointing device to receive, such as a selection of a certain word from the lexicon. For example, a user may type in a word such as "Greeting," "Parting," "Consoling," etc., using the input device 296 and the social networking system 228 may generate haptic illusion signals 202 corresponding to these words.

The haptic communication system 200 may include a receiving device 268 that receives haptic illusion signals 202 from the social networking system 228 over the network 260 and transmit the haptic illusion signals 202 to cutaneous actuators 208. In one embodiment, the receiving device 268 may include an interface circuit that the haptic illusion signals 202 from the network 260. The receiving device 268 may generate actuator signals 272 corresponding to the haptic illusion signals 202.

The cutaneous actuators 208 receive the transmitted haptic illusion signals 202 and transmit haptic output 276 (e.g., vibrations) corresponding to the received haptic illusion signals 202 to a body 280 of a receiving user. In one embodiment, the cutaneous actuators 208 transmit the haptic output 276 to C tactile (CT) afferent nerve fibers of the body 280 of the receiving user. In the peripheral nervous system (PNS), a CT afferent nerve fiber is the axon of a sensory neuron. It carries an action potential from the sensory neuron toward the central nervous system (CNS). In one embodiment, the receiving device 268 transmits the actuator signals 272 to the cutaneous actuators 208. The cutaneous actuators 208 receive the actuator signals 272 and transmit haptic outputs 276 corresponding to the actuator signals 272 to the body 280 of the receiving user.

An external authorization server or an authorization server internal to the social networking system 228 enforces one or more privacy settings of the users of the social networking system 228. A privacy setting of a user determines how particular information associated with a user can be shared, and may be stored in the user profile of a user in the user profile store 284 or stored in the authorization server and associated with a user profile. In one embodiment, a privacy setting specifies particular information associated with a user and identifies the entity or entities with whom the specified information may be shared. Examples of entities with which information can be shared may include other users, applications, third party systems or any entity that can potentially access the information. Examples of information that can be shared by a user include user profile information like profile photo, phone numbers associated with the user, user's connections, actions taken by the user such as adding a connection, changing user profile information and the like.

The privacy setting specification may be provided at different levels of granularity. In one embodiment, a privacy setting may identify specific information to be shared with other users. For example, the privacy setting identifies a work phone number or a specific set of related information, such as, personal information including profile photo, home phone number, and status. Alternatively, the privacy setting may apply to all the information associated with the user. Specification of the set of entities that can access particular information may also be specified at various levels of granularity. Various sets of entities with which information can be shared may include, for example, all users connected to the user, a set of users connected to the user, additional users connected to users connected to the user all applications, all third party systems, specific third party systems, or all external systems.

One embodiment uses an enumeration of entities to specify the entities allowed to access identified information or to identify types of information presented to different entities. For example, the user may specify types of actions that are communicated to other users or communicated to a specified group of users. Alternatively, the user may specify types of actions or other information that is not published or presented to other users.

The authorization server includes logic to determine if certain information associated with a user can be accessed by a user's friends, third-party system and/or other applications and entities. For example, a third-party system that attempts to access a user's comment about a uniform resource locator (URL) associated with the third-party system must get authorization from the authorization server to access information associated with the user. Based on the user's privacy settings, the authorization server determines if another user, a third-party system, an application or another entity is allowed to access information associated with the user, including information about actions taken by the user. For example, the authorization server uses a user's privacy setting to determine if the user's comment about a URL associated with the third-party system can be presented to the third-party system or can be presented to another user. This enables a user's privacy setting to specify which other users, or other entities, are allowed to receive data about the user's actions or other data associated with the user.

Although the embodiment of FIG. 2 was described as the transfer function being applied in the social networking system 228, the transfer function can be executed at the transmitting device 240 to generate the haptic illusion signals 202 at the transmitting device 240. In such embodiment, the further processing by the social networking system 228 may not be performed. Alternatively, the transmitting device 240 may send the sensor signals 207 to the receiving device 268 where the transfer function can be executed to generate the actuator signals 272.

Moreover, although FIG. 2 illustrates a one-way haptic communication where the sending user sends a haptic signal to the receiving user, the haptic communication can be bidirectional. Further, a sending user can broadcast the haptic signal to a plurality of receiving users instead of a single user.

Example System for Converting Speech to Haptic Signals

Figure 3:
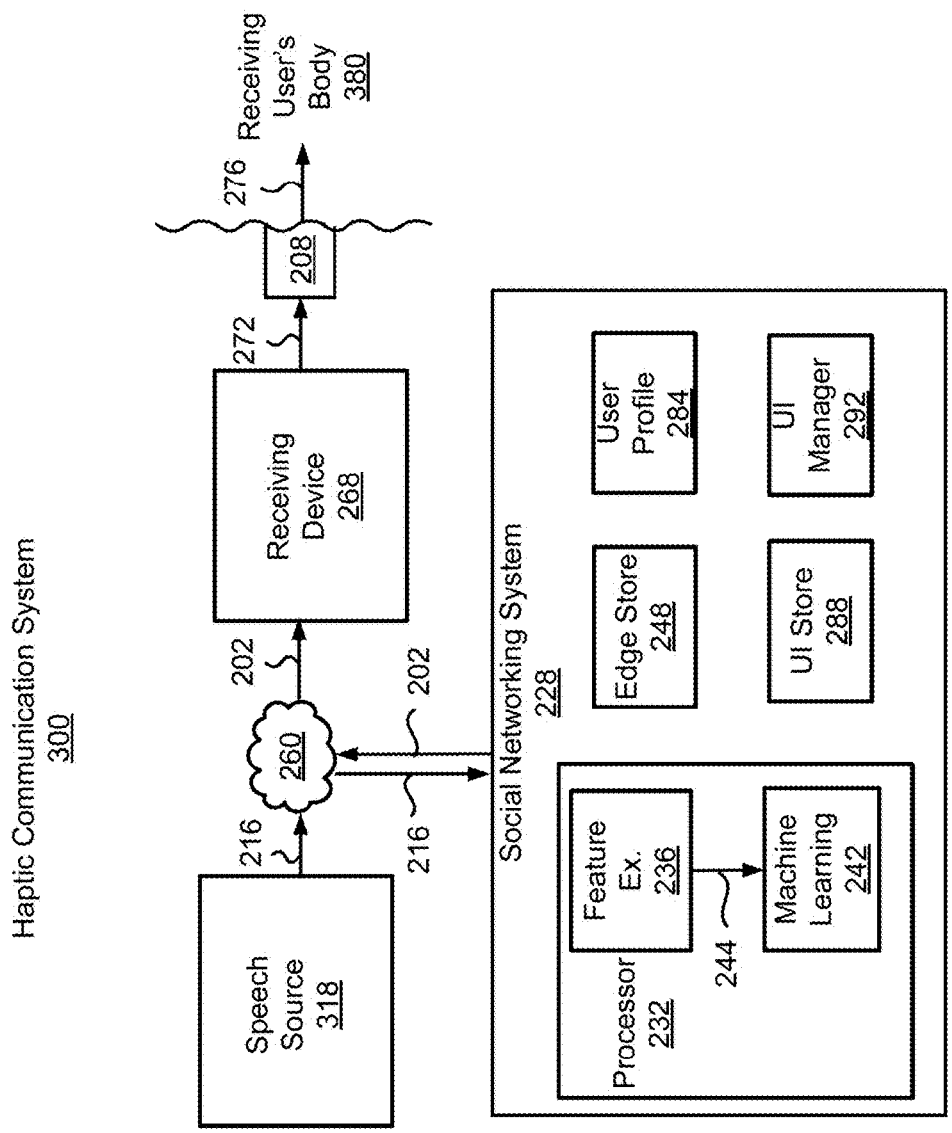
FIG. 3 is a block diagram of a haptic communication system converting a speech message from a source to a haptic signal, in accordance with an embodiment.

FIG. 3 is a block diagram of a haptic communication system 300 converting a speech message from a source 318 to a haptic signal, in accordance with an embodiment. The haptic communication system 300 decomposes speech signals into speech subcomponents and converts the speech subcomponents to distinct haptic symbols mapped to the speech subcomponents. The speech source 318 may process signals from a source (e.g., microphone) to generate speech signals 216. The speech signals 216 may be sent directly to the receiving device 268 or via the social networking system 228. For this purpose, the speech source 318 may include a microphone to detect voice signals from a sending user and/or a media storage that stores recordings of voice messages, as described below with reference to FIG. 10A.

Similar to the embodiment described above with reference to FIG. 2, the haptic communication system 300 includes the receiving device 268 and the social networking system. The operations and functions of the receiving device 268 and the actuators 208 in FIG. 2 are substantially the same as those of FIG. 3 except that the haptic illusion signals 202 represent a speech message, and therefore, detailed description thereof is omitted herein for the sake of brevity.

The processor circuit 232 may generate the haptic symbol set by generating unique haptic symbols corresponding to the speech subcomponents. The processor circuit 232 may identify a subset of the unique haptic symbols by characterizing a degree of similarity between each haptic symbol of the subset and each other haptic symbol of the subset. The processor circuit 232 may perform clustering analysis to identify groups of haptic symbols having a distance between members of the groups greater than a threshold. The processor circuit 232 may associate the subset with the haptic symbol set.

Figure 7:
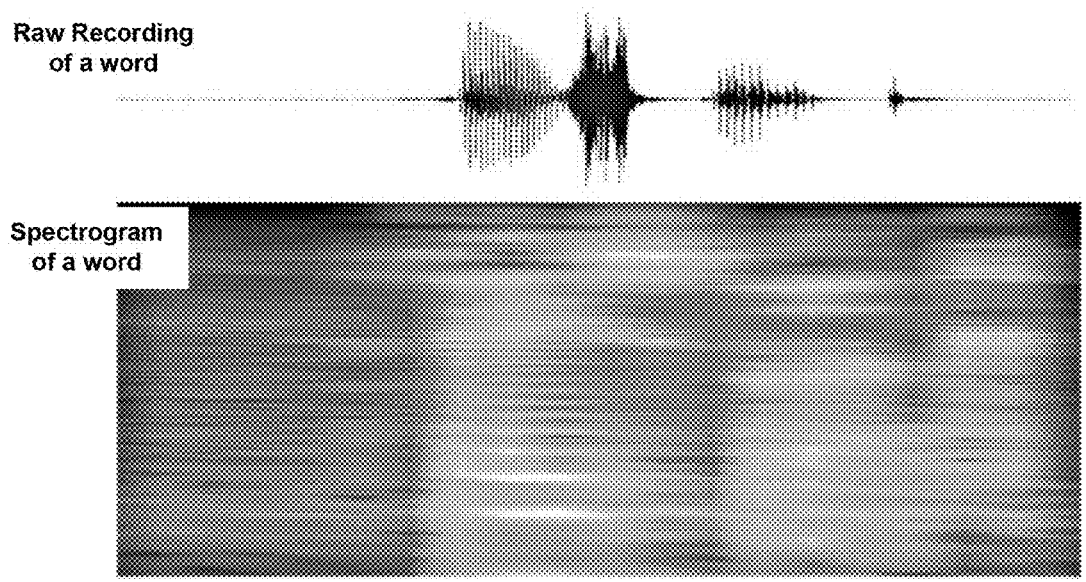
FIG. 7 is diagram illustrating a wave pattern of a word and a corresponding spectrogram of a word, in accordance with an embodiment.

In one embodiment, the processor circuit 232 of the social networking system divides the compressed spectrum of the speech signals 216 among multiple actuators 208 attached to the receiving user's body. As an example, vowels are recognized by the presence of significant low frequency energy and the localization of the energy in multiple discrete energy bands (also known as 'formants') as illustrated by FIG. 7, which shows the raw recording of the word 'facebook' and the spectrogram. The spectrogram shows the component frequencies as a function of time. As can be seen from the spectrogram the vowels 'A' and 'oo' have multiple bands of relatively high energy in the low frequency region. In contrast 'f', 'c', 'b', and 'k' are brief, low energy, and lack the localized energy band structure that vowels have. Detection of a low energy signal that lacks the frequency structure of vowels will trigger the playback speed to slow, allowing the user more time to appreciate the subtler pattern of the consonant.

In one embodiment, the cutaneous actuators 208 transmit the haptic outputs 276 by transmitting haptic output corresponding to vowels of the received speech signals 216 at a first speed. The cutaneous actuators 208 may transmit haptic output corresponding to consonants of the received speech signals 216 at a second speed lower than the first speed. The advantages and benefits of this approach are that vowels are relatively easy to recognize using automated techniques and by humans in a haptic representation of speech. However, consonants are shorter in duration and have ambiguous spectral signatures. By slowing the dynamics of the haptic presentation during consonants, relative to the speed at which vowels are displayed, the accuracy of perception will increase with less degradation of speed compared to uniform slowing.

In one embodiment, the processor circuit 232 slows the playback of actuator signals 272 while preserving the component frequencies at their original component values. In another embodiment the frequencies are transformed to lower values according to the time/frequency scaling approach described in the next paragraph under 'Frequency compression'.

In one embodiment, the speech spectrum of the received speech signals 216 may be reduced to a narrower range, while maintaining the distribution of sound waves and their inter-relationships in the speech signals 216. The speech source 318 may encode the speech signals 216 using a slower sampling rate. The sensor interface circuit 220 may modify characteristics of the speech signals 216 such as rhythmic and temporal patterns, pitch and duration of segmental elements. The speech source 318 may monotonically compress the short time spectrum of the speech signals 216, without changing the pitch.

In one embodiment, the processor circuit 232 of the social networking system 228 may split the speech signals into speech subcomponents. The speech subcomponents may include one or more of phonemes of the received speech signals 216, frequencies of the received speech signals 216, formants of the received speech signals 216, and semantics of the received speech signals 216. A phoneme is any of the perceptually distinct units of sound in a specified language that distinguish one word from another, for example p, b, d, and t in the English words pad, pat, bad, and bat. A formant refers to each of several prominent bands of frequency that determine the phonetic quality of vowels in the speech signals 216. Semantics may include logical aspects of meaning, such as sense, reference, implication, and logical form, lexical semantics (word relations), or conceptual semantics (the cognitive structure of meaning).

In one embodiment, when the speech subcomponents are frequencies of the speech signals, the instantaneous power in each frequency band determines the amplitude of respective actuators.

In one embodiment, the processor circuit 232 splits the received signals 216 by phoneme decomposition or Mel frequency cepstral coefficients (MFCC) to transform instantaneous power of frequency bands of the received speech signals. For example, the processor circuit 232 may identify phonemes from the signals 216 by computing the MFCC. The machine learning circuit 242, in the form of a feed forward neural network (FFNN) may be trained by back propagation procedure for identifying the phonemes. The extracted MFCC coefficients may then be used as input to a machine learning classifier. When the speech subcomponents are frequencies of the speech signals, the instantaneous power in each frequency band is determined using mel frequency ceptral coefficients.

The processor circuit 232 may map the speech subcomponents to haptic symbols of a haptic symbol set. The haptic symbol set may correspond to words of a generic social touch lexicon. The processor circuit 232 may convert the haptic symbols into the haptic illusion signals 202 or actuator signals. In one embodiment, the processor circuit 232 converts the haptic symbols by using a two-dimensional frequency mapping of first and second formants of the speech subcomponents to determine preferred locations of the cutaneous actuators 208 on the body of a receiving user. In other embodiments other pairs of formants may be used, e.g., the first and the third formants. In still other embodiments, the differences between formants define a point on a 2d map, e.g., f2-f1 and f3-f2 are mapped to a physical location of different actuators 208, where f1, f2, and f3 represent the frequencies of the first, second and third formants, respectively.

In one or more embodiments, consonants can be mapped separately, e.g., by using a one-to-one mapping between specific consonants and an actuator at a specific location of the receiving user's body.

In other embodiments, features of speech articulation are encoded for operating certain actuators rather than encoding the features of the speech signal. The features of speech articulation can include, for example, the location of occlusion during oral occlusive sounds: lips ([p], [b]), tongue blade ([t], [d]), tongue body ([k], [g]), or glottis ([?]).

In one embodiment, the machine learning circuit 242 may determine the speech subcomponents based on the extracted features 544 and generate the haptic symbols corresponding to the determined speech subcomponents.

Although FIG. 3 describes embodiments where the haptic illusion signals 202 is generated at the social networking system 228, the processing for generating the haptic illusion signals 202 can be performed at the speech source or the receiving device 268. For example, the receiving device 268 may be a portable device that includes a microphone to capture speech signals of other people around the user and a processor for converting the captured speech signals to haptic outputs.

Additional details regarding converting audio and speech to haptic signals is provided below with reference to FIGS. 11 and 14.

Example Block Diagram for Machine Learning

Figure 4:
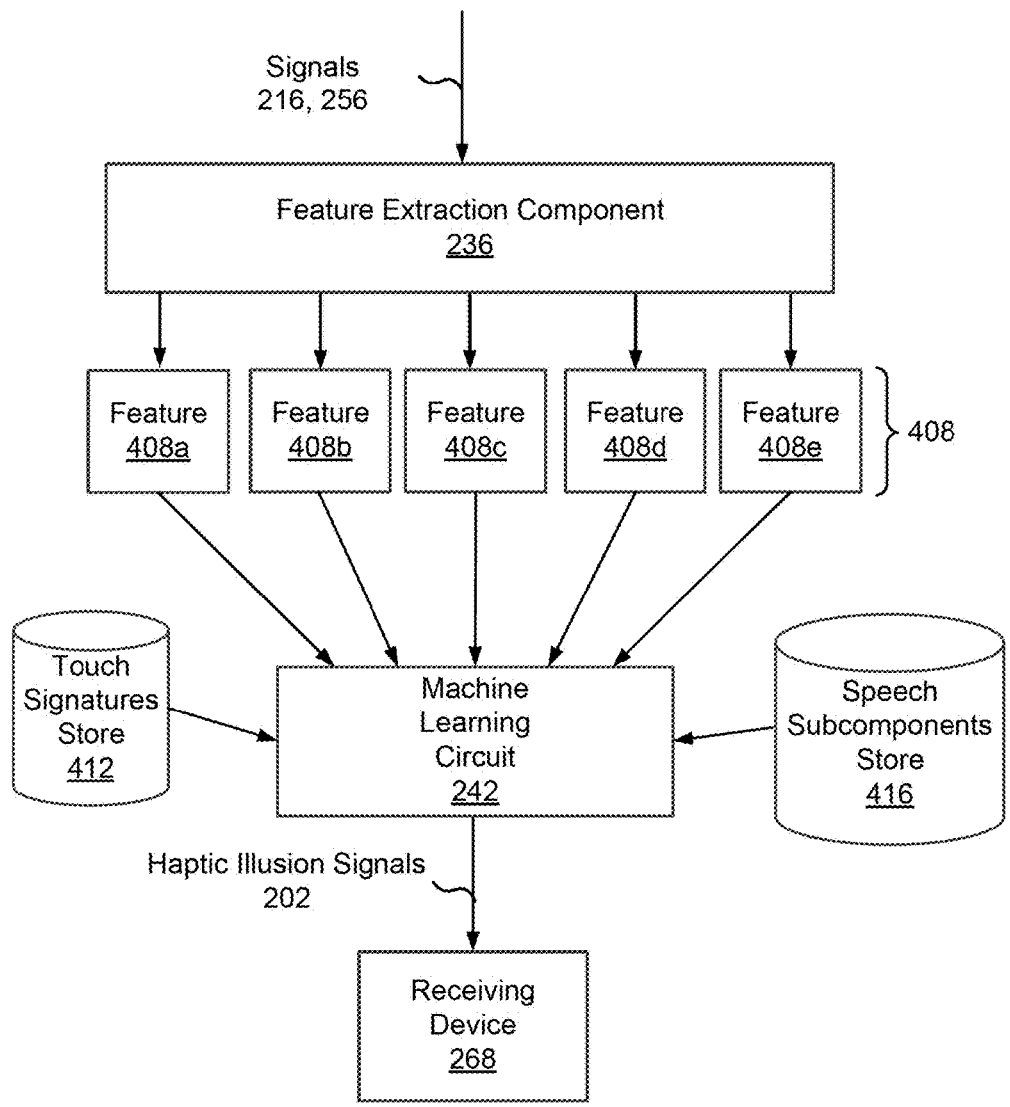
FIG. 4 is an example block diagram describing components associated with training a machine learning circuit for haptic communication, in accordance with an embodiment.

FIG. 4 is an example block diagram describing components associated with training a machine learning circuit 242 for haptic communication, in accordance with an embodiment. The components associated with the machine learning circuit 242 includes a feature extraction component 236, a touch signatures store 412 and a speech subcomponents store 416. The components illustrated in FIG. 4 may be distributed across different devices. Some of the processes associated with these components may be executed in parallel or sequentially. Alternatively, some processes may be executed in a pipelined fashion such that execution of a process is started before the execution of a previous process.

The feature extraction component 236 receives the signals 216, 256 and extracts features 408a, 408b, etc., from the signals 216, 256. The features 408a, 808b, etc., facilitate training of the machine learning circuit 242. In one embodiment, redundant input data in the signals 216, 256 such as the repetitiveness of signals or speech patterns may be transformed into the reduced set of features 408. The extracted features 408 contain the relevant information from the signals 216, 256 such that the machine learning circuit 242 is trained by using this reduced representation instead of the complete initial data. The features 408 corresponding to the signals 216, 256 are used for training the machine learning circuit 242 based on known touch signatures stored in the touch signatures store 412 and known speech subcomponents stored in the speech subcomponents store 416 that correspond to those features.

The touch signatures store 412 stores known touch signatures determined during an earlier calibration and training phase. The known touch signatures may correspond to a single user or a group of users. The touch signatures store 412 may be organized as a database, table, file, etc., stored on one or more of removable or non-removable memory cards, computer hard drives, etc. In one embodiment, the touch signatures store 412 includes multiple data fields, each describing one or more attributes of sensor signals 207. In one embodiment, the speech subcomponents store 416 is used to store known speech subcomponents determined during an earlier calibration and training phase. The known speech subcomponents may correspond to a single user or a group of users. The speech subcomponents store 416 may be organized as a database, table, file, etc., stored on one or more of removable or non-removable memory cards, computer hard drives, etc. In one embodiment, the speech subcomponents store 416 includes multiple data fields, each describing one or more attributes of the speech signals 216.

The features 408 may include a feature 408a describing a frequency-domain representation of the signals 216, 256. Extracting the feature 408a may include creating a frequency-domain representation of the signals 216, 256. The features 408 may include a feature 408b describing a time-domain representation of the signals 216, 256. Extracting the feature 408b may include performing time-domain sampling of the signals 216, 256. The features 408 may include a feature 408c describing aggregate values based on the signals 216, 256. The features 408 may include a feature 408d describing a shape of a wave of the signals 216, 256. The features 408 may include a feature 408e describing phonemes of the speech signals 216.

The machine learning circuit 242 functions as an autoencoder and is trained using training sets including information from the touch signatures store 412 and the speech subcomponents store 416. The touch signatures store 412 may store associations between known touch signatures for the touch lexicon. In embodiments, the machine learning circuit 242 is thereby configured to apply the transfer function to the signals 216, 256 by extracting features 408 from the signals 216, 256, determining a touch signature of the sending user based on the extracted features 408, and generating the haptic illusion signals 202 corresponding to the determined touch signature. In one embodiment, the machine learning circuit 242 determines speech subcomponents based on the extracted features 408 and generates haptic symbols corresponding to the determined speech subcomponents.

As described above, in some embodiments coarsely quantized signals are needed. In order to accomplish this the bottleneck layer (which, after training, will be what drives the haptic actuators) will have units that have coarsely quantized outputs, e.g., binary or trinary. In other embodiments the hidden layer will use a floating point representation with the output of that layer appropriately transformed to generate haptic gestures that are distinguishable by the user.

In one embodiment, the machine learning circuit 242 may transmit the haptic illusion signals 202 to the receiving device 268 if a likelihood that the haptic illusion signals 202 correspond to the signals 216, 256 exceeds a threshold. The likelihood may be indicative of a probability that the features 408 have a particular Boolean property or an estimated value of a scalar property. As part of the training of the machine learning model 242, the process may form a training set of features 408, touch signatures, and speech subcomponents by identifying a positive training set of features that have been determined to have the property in question, and, in some embodiments, forms a negative training set of features that lack the property in question. In one embodiment, the machine learning training applies dimensionality reduction (e.g., via linear discriminant analysis (LDA), principle component analysis (PCA), or the like) to reduce the amount of data in the features 408 to a smaller, more representative set of data.

The process uses machine learning to train the machine learning circuit 242 with the features of the positive training set and the negative training set serving as the inputs. Different machine learning techniques such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps may be used in different embodiments. The machine learning circuit 242, when applied to new features extracted from the signals 216, 256, outputs an indication of whether the signals 216, 256 have the property in question, such as a Boolean yes/no estimate, or a scalar value representing a probability.

In some embodiments, three datasets are used. Training for the machine learning circuit 242 is performed using the first dataset. The accuracy of the machine learning circuit 242 is tested using the second dataset. The third dataset, known as a validation set, may be formed of additional features, other than those in the training sets, which have already been determined to have or to lack the property in question. The process applies the trained machine learning circuit 242 to the features of the validation set to quantify the accuracy of the machine learning circuit 242. Common metrics applied in accuracy measurement include: Precision (P)=True Positives (TP)/(TP+False Positives (FP)) and Recall (R)=TP/(TP+False Negatives (FN)), where Precision refers to how many touch signatures the machine learning circuit 242 correctly predicted (TP) out of the total it predicted (TP+FP), and Recall refers to how many touch signatures the machine learning circuit 242 correctly predicted (TP) out of the total number of features that did have the property in question (TP+FN). In one embodiment, the process iteratively re-trains the machine learning circuit 242 until the occurrence of a stopping condition, such as the accuracy measurement indication that the model is sufficiently accurate, or a number of training rounds having taken place.

Example Process for Haptic Communication

Figure 5:
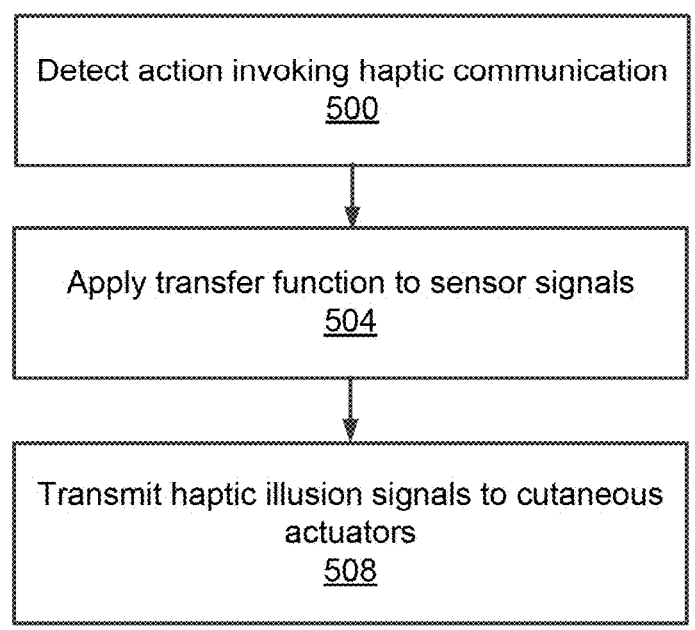
FIG. 5 is an example process for haptic communication, in accordance with an embodiment.

FIG. 5 is an example process for haptic communication, in accordance with an embodiment. The social networking system 228 detects 500 an action invoking haptic communication. For example, the social networking system 228 may receive sensor signals 207 from haptic sensor 104 detecting haptic input from a body 212 of a sending user. The haptic sensor 104 generate the sensor signals 207 corresponding to the received sensor input 204. Alternatively or in addition, the social networking system 228 may receive messages from input devices 296 such as the keyboard.

The processor circuit 232 applies 504 a transfer function to the received sensor signals 207 or other input to generate haptic illusion signals 202. The social networking system 228 transmits 508 the generated haptic illusion signals 202 to cutaneous actuators 208. The cutaneous actuators 208 receive the transmitted haptic illusion signals 202 and transmit haptic outputs 276 corresponding to the received haptic illusion signals 202 to a body 280 of a receiving user.

Example Process for Converting Speech to Haptic Communication

Figure 6:
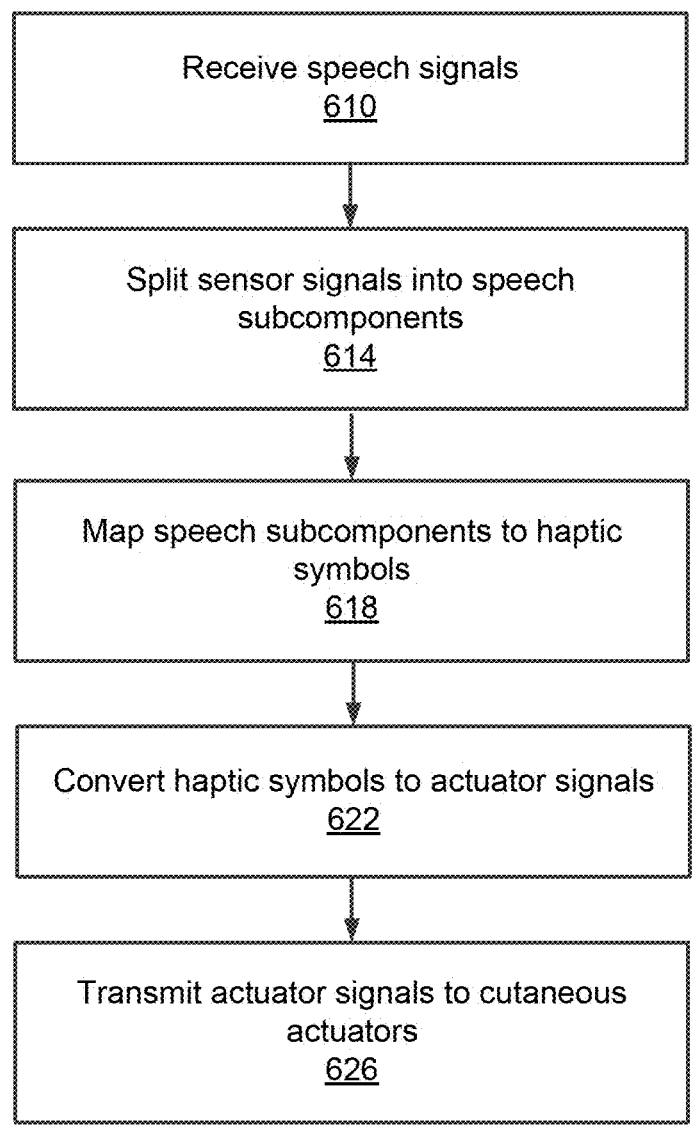
FIG. 6 is an example process for converting speech to haptic communication, in accordance with an embodiment.

FIG. 6 is an example process for converting speech to haptic communication, in accordance with an embodiment. The processor circuit 232 receives 610 speech signals 216 from the speech source 318 (e.g., via a microphone). The processor circuit 232 splits 614 the received signals 216, 256 into speech subcomponents. The processor circuit 232 maps 618 the speech subcomponents to haptic symbols of a haptic symbol set. The processor circuit 232 converts 622 the haptic symbols into actuator signals. The receiving device 268 transmits 626 the actuator signals to cutaneous actuators 208. The cutaneous actuators 208 receive the actuator signals and transmit haptic outputs 276 corresponding to the actuator signals to a body 280 of a user.

In one embodiment, the haptic communication may be part of a multi-modal communication. The social networking system 228 may, for example, select one or more modes of communication among text messages, audio signals and haptic communication for transmission to a user based on various factors such as availability of actuators on the user, affinity between a sending user and a receiving user, and preference of the users. Also, multiple modes of communication can be combined to transmit a message in an effective manner. For example, a message may be transmitted using a combination of audio signals, haptic output and a visual signal. To increase the efficiency of the multimodal communication, coding theory such as Huffman coding may be used to design a combination of message elements in different modes of communication.

Additional details regarding converting speech to haptic communications is described below with reference to FIGS. 11 and 14.

Generating Inside the Body Illusions

Embodiments also relate to operating multiple cutaneous actuators to provide the sensation of motions or actions occurring within the body. A part of receiving user's body (e.g., limb or head) is placed between the cutaneous actuators. The cutaneous actuators are operated with a temporal relationship or relative amplitudes, causing the illusion of motions or actions occurring inside the body part. By differing temporal relationship or relative amplitudes between the haptic output (e.g., vibrations) generated by the cutaneous actuators, differing sensations of actions or motions within the body can be generated.

Figure 8A:
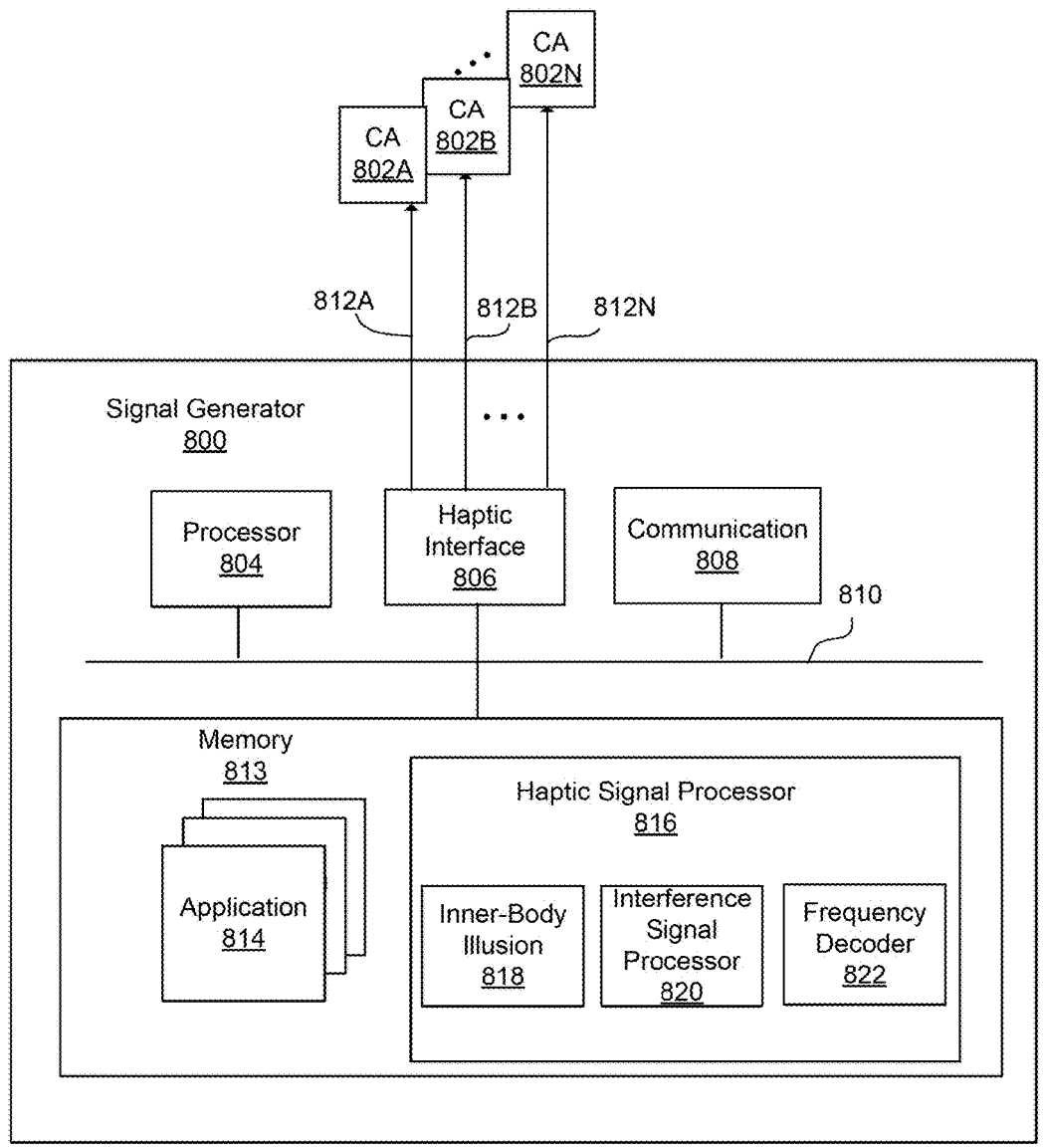
FIG. 8A is a block diagram illustrating a signal generator for operating cutaneous actuators, according to an embodiment.

FIG. 8A is a block diagram illustrating a signal generator 800 for operating cutaneous actuators 802A through 802N (hereinafter collectively referred to as "cutaneous actuators 802"), according to an embodiment. The signal generator 800 may be part of the receiving device 268 or it can be a stand-alone device that generates actuator signals 812A through 812N (hereinafter collectively referred to as "actuator signals 812") for transmitting to the cutaneous actuators 802. When the signal generator 800 is part of the receiving device 268, the signal generator 800 communicates with other computing devices such as a social networking system 228 or other servers to receive the haptic illusion signal 202.

The signal generator 800 may include, among other components, a processor 804, a haptic interface circuit 806, a communication module 808, memory 813 and a bus 810 connecting these components. The signal generator 800 may include other components not illustrated in FIG. 8A such as user interface modules for interacting with users or speakers. The signal generator 800 may also be a part of a larger device or an add-on device that expands function of another device.

The processor 804 reads instructions from the memory 813 and executes them to perform various operations. The processor 804 may be embodied using any suitable instruction set architecture, and may be configured to execute instructions defined in that instruction set architecture. The processor 804 may be general-purpose or embedded processors using any of a variety of instruction set architectures (ISAs), such as the x86, PowerPC, SPARC, RISC, ARM or MIPS ISAs, or any other suitable ISA. Although a single processor is illustrated in FIG. 8, the signal generator 800 may include multiple processors.

The haptic interface circuit 806 is a circuit that interfaces with the cutaneous actuators 802. The haptic interface circuit 806 generates actuator signals 812 based on commands from the processor 804. For this purpose, the haptic interface circuit 806 may include, for example, a digital-to-analog converter (DAC) for converting digital signals into analog signals. The haptic interface circuit 806 may also include an amplifier to amplify the analog signals for transmitting the actuator signals 812 over cables between the signal generator 800 and the cutaneous actuators 802. In some embodiments, the haptic interface circuit 806 communicates with the actuators 802 wirelessly. In such embodiments, the haptic interface circuit 806 includes components for modulating wireless signals for transmitting to the actuator 802 over wireless channels.

The communication module 808 is hardware or combinations of hardware, firmware and software for communicating with other computing devices. The communication module 808 may, for example, enable the signal generator 800 to communicate with the social networking system 228, a transmitting device 240 or a speech source 318 over the network 260. The communication module 808 may be embodied as a network card.

The memory 813 is a non-transitory computer readable storage medium for storing software modules. Software modules stored in the memory 813 may include, among others, applications 814 and a haptic signal processor 816. The memory 813 may include other software modules not illustrated in FIG. 8, such as an operating system.

The applications 814 uses haptic output via the cutaneous actuators 802 to perform various functions, such as communication, gaming, and entertainment. At least one of these applications 814 uses illusions of motions or actions within a body created by the operation of the cutaneous actuators 802, as described below in detail with reference to FIG. 8B through FIG. 8F.

The haptic signal processor 816 is a module that determines the actuator signals 812 to be generated by the haptic interface circuit 806. The haptic signal processor 816 generates digital versions of the actuator signals and sends to the haptic interface circuit 806 via bus 810. A digital version of the actuator signals include information defining the analog actuator signals to be generated by the haptic interface circuit 806. For example, the digital version of the actuator signals may indicate, for example, the amplitude or frequency of the analog actuator signals, time at which the actuator signals are to be transmitted by the haptic interface circuit 806, and waveform of the actuator signals. The haptic signal processor 816 receives commands from the applications 814 and determines parameters associated with the actuator signal 812. The parameters of the actuator signal 812 may include, among others, timing gap between activation of the actuator signals, duration of the actuator signals, the amplitude of the actuator signals, the waveform of the actuator signals, which actuator signals to become active, and modes of cutaneous actuators (if the cutaneous actuators have more than one mode of operation).

The haptic processor 816 may include sub-modules such as an inner-body illusion module 818, an interference signal processor 820 and a frequency decoder module 822. The inner-body illusion module 818 is invoked to generate actuator signals 812 that cause the cutaneous actuators to generate the sensation or illusion of motions or actions occurring inside the body, as described below with reference to FIGS. 8B through 8G. The interference signal processor 820 is responsible for generating actuator signals 812 that causes cutaneous actuators to generate vibrations that result in constructive or destructive interference on the receiving user's skin, as described below in detail with reference to FIGS. 9A through 9L. The frequency decoder module 822 is responsible for generating actuator signals 812 in an operating mode where the speech signal 216 is encoded using a frequency decomposition scheme, as describe below in detail with reference to FIGS. 10A through 10E. The haptic processor 816 may include other modules for operating the cutaneous actuators to operate in different modes or perform additional or alternative functionality.

The signal generator 800 as illustrated in FIG. 8A is merely illustrative and various modification may be made to the signal generator 800. For example, instead of embodying the signal generator 800 as a software module, the signal generator 800 may be embodied as a hardware circuit.

Figure 8B:
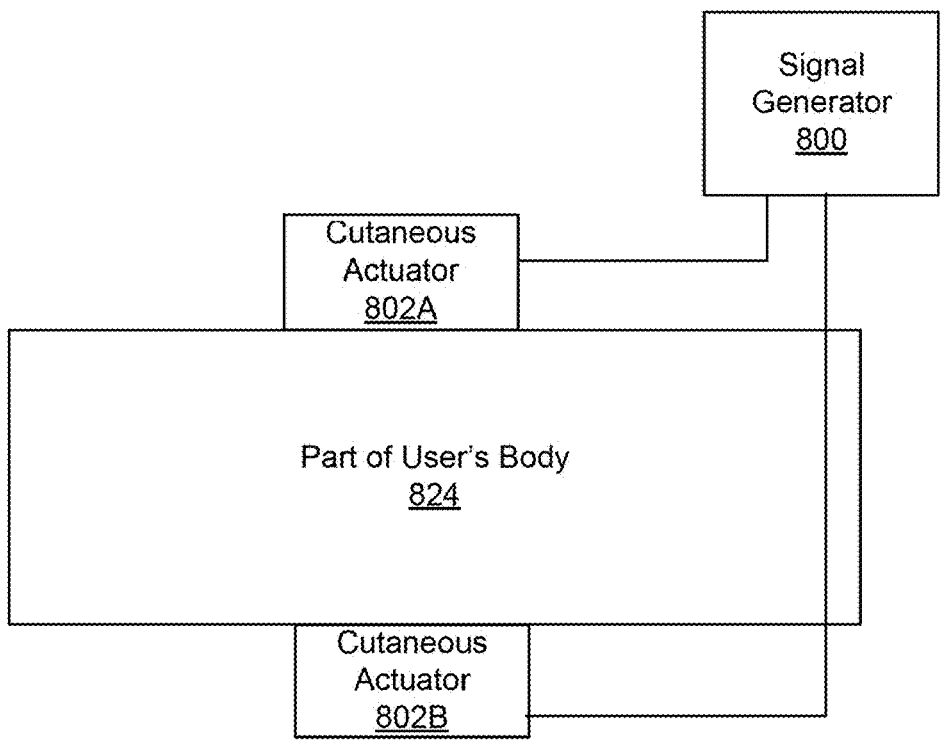
FIG. 8B is a diagram illustrating cutaneous actuators on a part of a receiving user's body to generate illusion of actions or motions occurring with the receiving user's body, according to an embodiment.

FIG. 8B is a diagram illustrating cutaneous actuators 802A, 802B on a part of receiving user's body 824 (e.g., torso, forearm, leg, head) to generate illusion of actions or motions occurring within the receiving user's body, according to an embodiment. In the embodiment of FIG. 8B, two cutaneous actuators 802A, 802B are located at opposite sides of the user's body part 824. The cutaneous actuators 802A, 802B can be any type of actuators but vibrotactile actuators, such as voice coils and motors, are better adapted to providing these inner body illusions.

By activating the two cutaneous actuators 802A, 802B with a predetermined time interval, the user perceives motions or actions occurring within the user's body part 824 instead of the user's skin. For example, an illusory sensation such as (i) a bullet or projectile entering from a patch of skin and exiting through another path of skin, (ii) a virtual actuator vibrating inside the body part, (iii) a center point of motion moving gradually from one point to another, (iv) saltation occurring inside the body part can be generated. By controlling parameters such as the amplitude, timing and/or sequence of activation, the motion or action inside the user's body part 824 can be emulated.

Figure 8C:
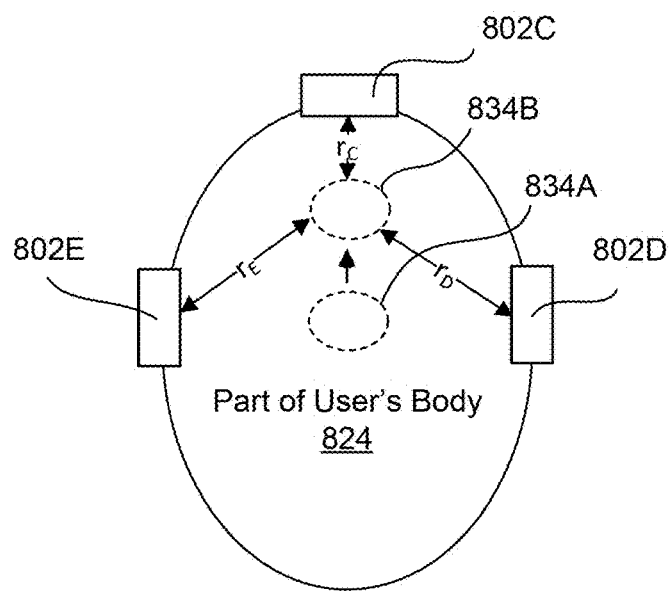
FIG. 8C is a schematic diagram illustrating three cutaneous actuators for generating sensory illusions of a center point of vibrations in the receiving user's body moving from one point to another, according to an embodiment.

More than two cutaneous actuators may be employed to create more diverse inner body sensations. FIG. 8C is a schematic diagram illustrating three cutaneous actuators 802C, 802D, 802E for generating sensory illusions of a center point of vibrations in the receiving user's body 824 (e.g., the user's head) moving from point 834A to 834B, according to an embodiment. A first cutaneous actuator 802C is mounted on the top, a second cutaneous actuators 802D is attached to one side of the body part 824, and the last cutaneous actuators 802E is attached to the opposite side of the body part 824. By activating the cutaneous actuators in a certain sequence, the sensation of actions or motions in the user's body part 824 can be generated. For example, by activating cutaneous actuators 802C simultaneously with cutaneous actuator 802D followed by addition vibrations from cutaneous actuator 802E causes the sensation of vibrations to move from a center point 834A between the cutaneous actuators 802E, 802D to another location 834B closer to the cutaneous actuator 802C.

FIGS. 8D through 8G are timing diagrams illustrating the waveforms of actuator signals 830A, 830B applied to two cutaneous actuators, according to embodiments. The actuator signals 830A, 830B are assumed to cause corresponding cutaneous actuators to generate vibrations with approximately the same wave patterns. By modulating the amplitude and/or time of the vibrations at the actuators 802A, 802B, various illusory sensation can be generated.

Figure 8D:
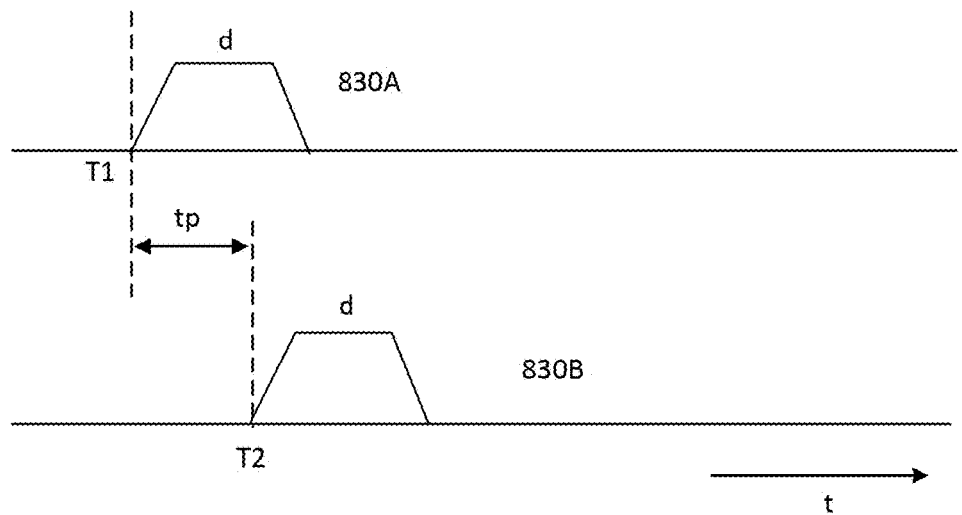
FIG. 8D illustrates waveforms for generating the sensation of a motion from a patch of skin with the cutaneous actuator to another path of skin, according to one embodiment.

FIG. 8D illustrates waveforms for generating the sensation of a motion from a patch of skin with the cutaneous actuator 802A to another path of skin with the cutaneous actuator 802B. By separating the on-set time of the two cutaneous actuators 802A, 802B by temporal distance of tp, a sensation of an object moving from one cutaneous actuator to the other cutaneous actuators through the body can be created. In one embodiment, the temporal distance tp is set according to the following equation:

$$tp = a \times d + b \quad (1)$$

where a and b are constants and d is the duration of the vibrations. The frequency of the vibrations may be 20 to 300 Hz, the amplitude of the vibration may be 10 to 35 dB and the duration of vibrations may be between 20 milliseconds and 5 seconds.

Figure 8E:
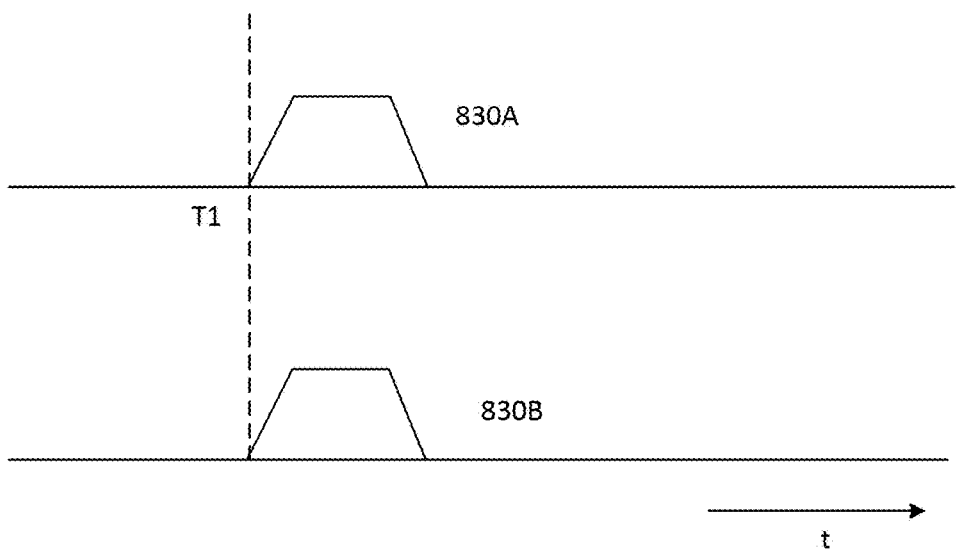
FIGS. 8E through 8G are diagrams illustrating waveforms for generating various sensations, according to embodiments.

FIG. 8E illustrates waveforms for generating the sensation of a virtual actuator between the cutaneous actuators 802A, 802B, according to one embodiment. This is a special case of FIG. 8D where tp is set to 0. When the two cutaneous actuators 802A, 802B are activated simultaneously, a sensation of vibrations occurring at a point between the two cutaneous actuators 802A, 802B are created. By controlling the amplitude of the vibrations, the point of virtual actuator may be moved closer to either of the two cutaneous actuators 802A, 802B.

Taking an example of creating the sensation of a virtual actuator vibrating at an amplitude of A at location 834B of FIG. 8C, the amplitudes $A_C$, $A_D$, $A_E$ of the vibrations generated by three actuators 802C, 802D, 802E are set to $A_C = \alpha \times A$, $A_D = \beta \times A$ and $A_E = \gamma \times A$, respectively, where $\alpha$, $\beta$, and $\gamma$ are determined as functions of distances $r_C$, $r_D$, $r_E$ from the cutaneous actuators to the virtual actuator location. In one embodiment, $\alpha$, $\beta$, and $\gamma$ are determined as follows:

$$\alpha = r_C / (r_C + r_D + r_E) \quad (2)$$

$$\beta = r_D / (r_C + r_D + r_E) \quad (3)$$

$$\gamma = r_E / (r_C + r_D + r_E) \quad (4)$$

In other embodiments, $\alpha$, $\beta$, and $\gamma$ are determined as functions of Barycentric coordinates $a_C$, $a_D$, $a_E$ of the location of the cutaneous actuators 802C, 802D, 802E using one of the following equations:

$$A_C = a_C \times A; \; A_D = a_D \times A; \; A_E = a_E \times A \quad (5)$$

$$A_C = \log(a_C+1)/\log(A\max+1) \times A; \; A_D = \log(a_D+1)/\log(A\max+1) \times A;$$

$$A_E = \log(a_E+1)/\log(A\max+1) \times A \quad (6)$$

$$A_C = \sqrt{a_C} \times A; \; A_D = \sqrt{a_D} \times A; \; A_E = \sqrt{a_E} \times A \quad (7)$$

where Amax is $a_C + a_D + a_E$.

Figure 8F:
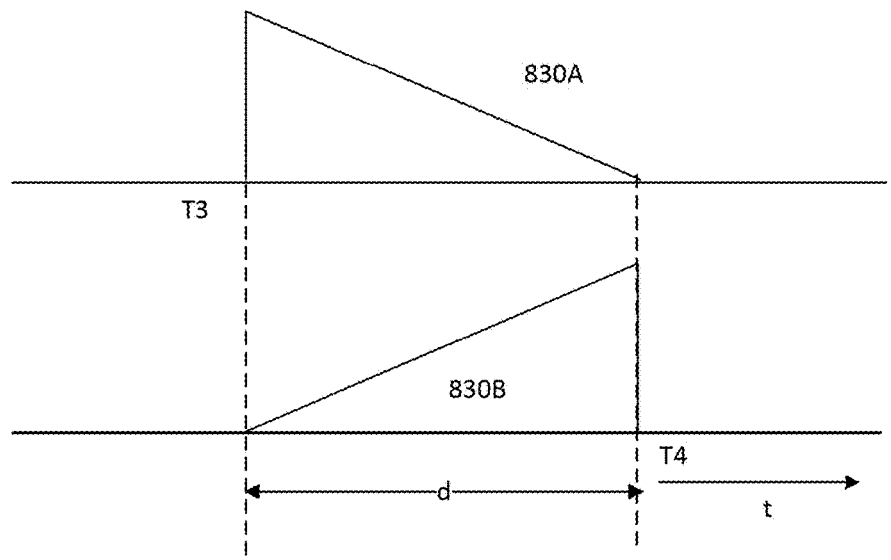

FIG. 8F illustrates waveforms for generating the sensation of panning of vibrations from a point at or closer to the cutaneous actuator 802A to a point at or closer to the cutaneous actuator 802B, according to one embodiment. In this embodiment, the actuator signal 830A peaks at time T3 and then gradually decreases until it reaches zero at time T4 (which is temporally separated by duration d which is duration of the ramp, from time T3). The actuator signal 830B, on the other hand, starts to increase from time T3 and gradually increases until time T4. The increase may be linear increase. When the actuator signals 830A and 830B are applied to the cutaneous actuators 802A and 802B, the receiving user experiences sensation vibrations moving from a patch of skin placed with the cutaneous actuator 802A to another patch of skin placed with the cutaneous actuator 802B over time d.

Figure 8G:
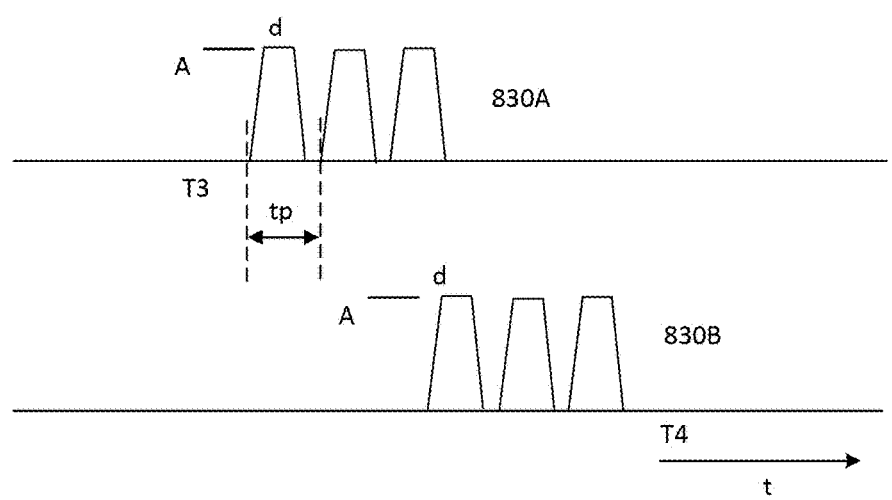

FIG. 8G illustrates waveforms for generating the sensation of saltation from a point at or closer to the cutaneous actuator 802A to a point at or closer to the cutaneous actuator 802B, according to one embodiment. To generate such sensation, a number of pulses are sent in the actuator signal 830A to activate the cutaneous actuator 802A. Each pulse may have the same amplitude of A, the same duration of d, and offset by a temporal distance of tp. Subsequently, a number of pulses are sent in the actuator signal 830B to activate the cutaneous actuator 802B. Each pulse of the actuator signal 830B has the same amplitude and the same duration as those of the actuator signal 830A. To create such sensation, the duration of each pulse is shorter than 100 ms and satisfies the following equation:

$$(tp-d) < d \qquad (8)$$

That is, the off-times (tp−d) between the actuator signals 830A, 830B are shorter than the duration d of the on-times of the actuator signals 830A, 830B.

Figure 8H:
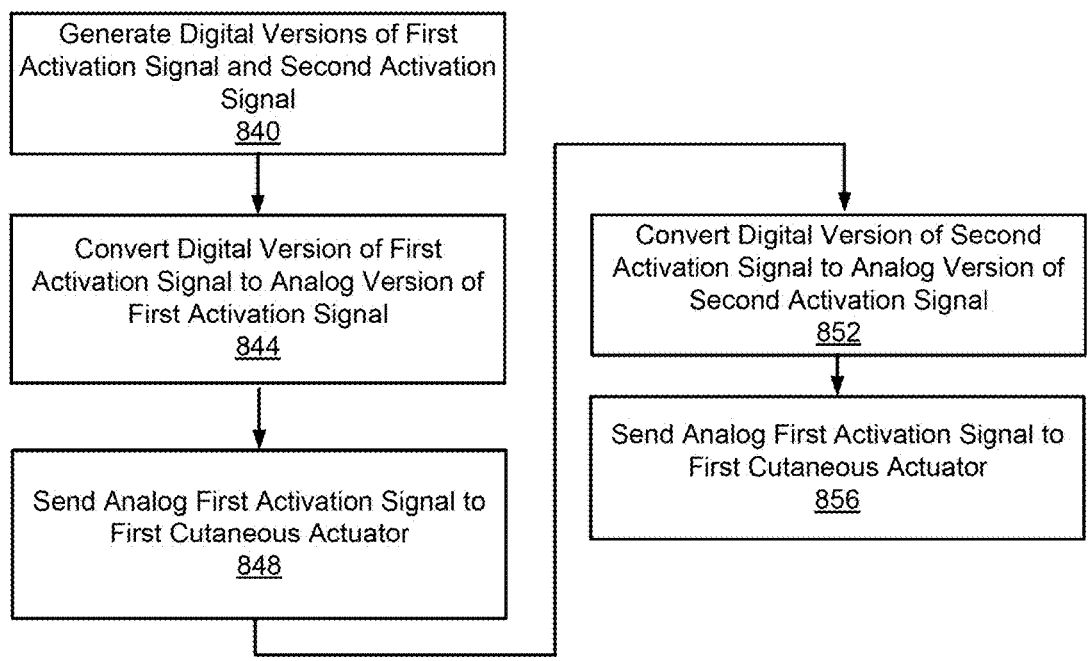
FIG. 8H is a flowchart illustrating a method of operating cutaneous actuators to produce illusion of actions or motions occurring within the receiving user's body, according to one embodiment.

FIG. 8H is a flowchart illustrating a method of operating cutaneous actuators to produce illusion of actions or motions occurring within the receiving user's body, according to one embodiment. The digital versions of first activation signal and second activation signal is generated 840 at inner-body illusion module 818. These digital signals may be generated based on commands from one or more applications 814.

The digital version of the first activation signal is then converted 840 into an analog signal for sending over to a first cutaneous actuator over a wireless or wired communication by the haptic interface circuit 806. Then, the converted analog first activation signal is sent 848 to the first activation actuator. As a result, vibrations is generated by the first cutaneous actuator.

Similarly, the digital version of the second activation signal is converted 852 into an analog signal for sending over to a second cutaneous actuator over a wireless or wired communication by the haptic interface circuit 806. Then, the converted analog second activation signal is sent 856 to the first activation actuator. As a result, vibrations is generated by the second cutaneous actuator. The first and second cutaneous actuators may be placed with a part of the user's body in-between and the amplitude or timing of vibrations of the cutaneous actuators are modulated so that the illusion of actions or motions within the user's body is produced.

The processes and their sequences illustrated in FIG. 8 are merely illustrative and various modifications may be made. For example, the conversion to analog signals for second activation signal may occur before sending the analog first activation signal to the first cutaneous actuator. Alternatively, the conversion to analog signals for the first and second activation signals may occur in parallel.

The sensation or illusion of motions or actions within a user's body part provided by embodiments described herein may enhance immersiveness of application such as video games. Further, such sensations or illusion may be adopted to widen vocabulary and/or increase bandwidth of haptic communication. Such illusions may produce instructional and directional cues for navigation purposes and object interactions. Inside the body illusion may have medical applications, and could be used to massage the head to reduce headaches and reduce motion sickness and balance disorders.

Haptic Communication System Using Interference of Haptic Outputs

Embodiments also relate to enhancing haptic communication by using two or more cutaneous actuators to create constructive or destructive interference patterns on the receiving user's skin. The actuator signals for the two or more cutaneous actuators are shaped and generated so that the two or more cutaneous actuators cause vibrations on the receiving user's patch of skin to increase or decrease at different locations. In this way, various enhancement to haptic communication including, but not limited to, (i) improved spatial resolution of the vibrations, (ii) creation of virtual cutaneous actuators, and (iii) providing additional encoding schemes for embedding information in the vibrations can be achieved.

When multiple main cutaneous actuators are used, vibrations from one main cutaneous actuators may propagate to regions of the receiving user's skin near where other main cutaneous actuators are located. Because such over-propagation of vibrations from one main cutaneous actuator may confuse the receiving user with respect to vibrations generated by other main cutaneous actuators, the main cutaneous actuators spaced apart with sufficient distance to prevent the confusion. Embodiments provide a mechanism to prevent or reduce the over-propagation of vibrations by generating counter-vibrations at auxiliary actuators where the auxiliary actuators vibrate with an opposite phase and lower amplitude.

Figure 9A:
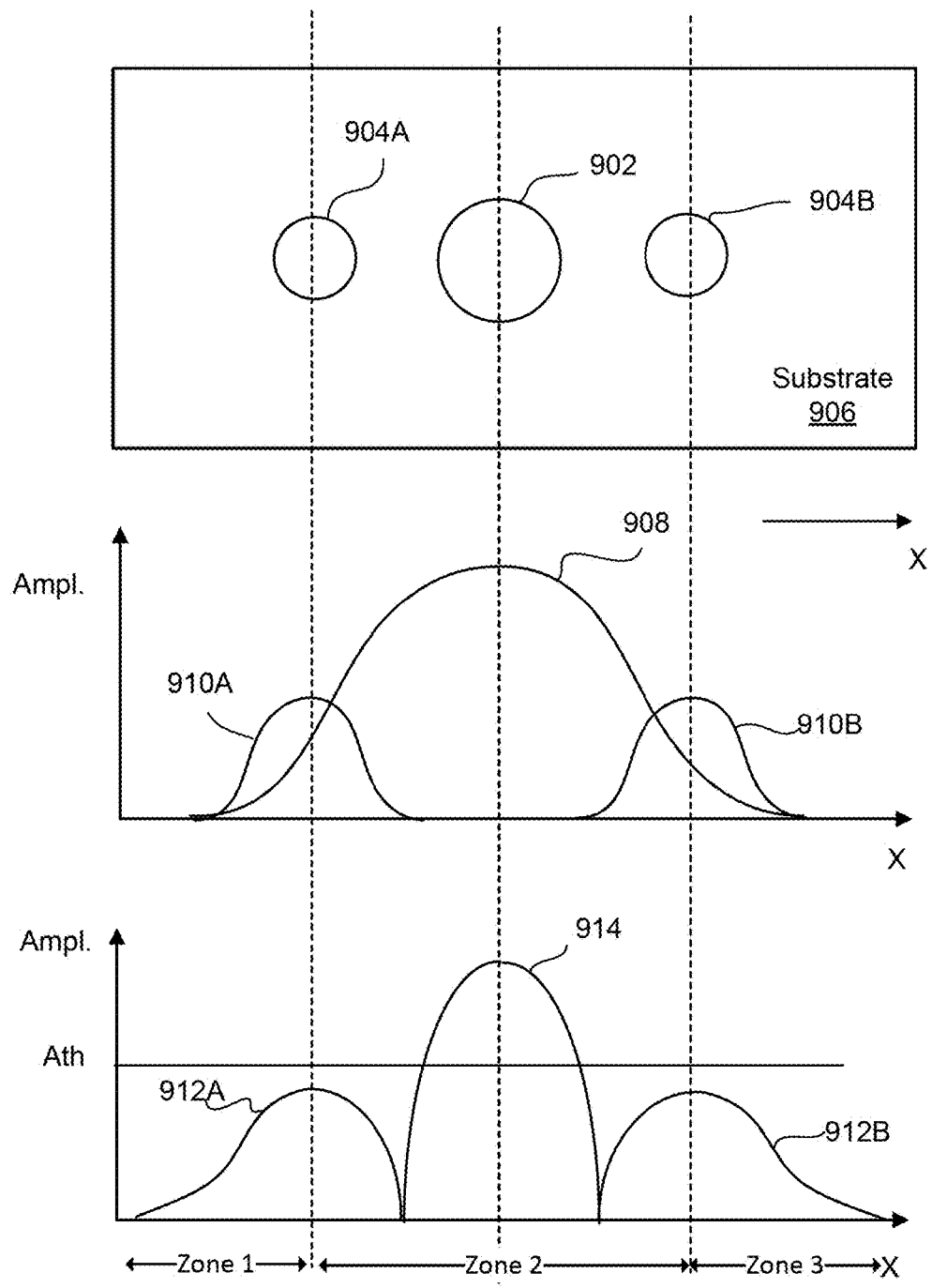
FIG. 9A is a diagram illustrating using auxiliary cutaneous actuators to enhance localization of haptic outputs from a main cutaneous actuator, according to one embodiment.

FIG. 9A is a diagram illustrating using auxiliary cutaneous actuators 904A, 904B to enhance localization of vibrations from a main cutaneous actuator 902, according to one embodiment. The main cutaneous actuator 902 has two adjacent auxiliary cutaneous actuators 904A, 904B placed at the left and the right sides of the main cutaneous actuator 902. All three actuators 902, 904A, 904B may be placed on a substrate 906 or other mounting mechanism onto a patch of the receiving user's skin.

The main cutaneous actuator 902 is an actuator that generates main vibrations on the substrate 906 to provide haptic communication to the receiving user via the vibrations it generates. For this purpose, the main cutaneous actuator 902 receives its actuator signal 812 from the haptic interface circuit 806 as defined by the interference signal processor 820 (refer to FIG. 8A). Curve 908 show the amplitude of main vibrations generated by the main cutaneous actuator propagating in x-direction (horizontal direction)

The auxiliary actuators 904A, 904B generates counter-vibrations to localize the vibrations of the main cutaneous actuator 902. The counter-vibrations has an opposite phase (i.e., 180 degrees out of phase at the locations of the auxiliary actuator 904A and 904B) relative to the vibrations generated by main cutaneous actuator 902. Curves 910A, 910B illustrate the propagation of the counter-vibrations along x-direction. The auxiliary actuators 904A, 904B may be smaller than the main cutaneous actuator 902.

When the vibrations of the main cutaneous actuator 902 and the counter-vibrations of interact, destructive interference occurs between the vibrations and the counter-vibrations. The combined vibrations as a result of the interference, as shown by curve 914 in zone 2, has decreased range of vibrations and a peak amplitude relative to main vibrations (shown as curve 908). Although the counter-vibrations as shown by curves 912A, 912B tend to propagate along a further distance in zones 1 and 3 due to constructive interference with the vibrations of the main cutaneous actuator 902, the amplitude of the counter-vibrations may at a lower than a sensory threshold of the receiving user. Therefore, the counter-vibrations from the auxiliary actuators 904A, 904B localize the main vibrations of the main cutaneous actuator 902, and increase the spatial resolution of haptic communication. Moreover, other mechanisms such as providing damper or making the substrate 906 thicker in areas beyond zone 2 may be used in conjunction to reduce the propagation of the counter-vibrations.

Although the embodiment of FIG. 9A illustrates the auxiliary actuators 904A, 904B at opposite sides along x-direction for the sake of explanation, in practice, more than two auxiliary actuators may surround the main cutaneous actuator 902. Moreover, auxiliary cutaneous actuators may have the same size as the main cutaneous actuator, or auxiliary cutaneous actuators may be of different sizes.

Figure 9B:
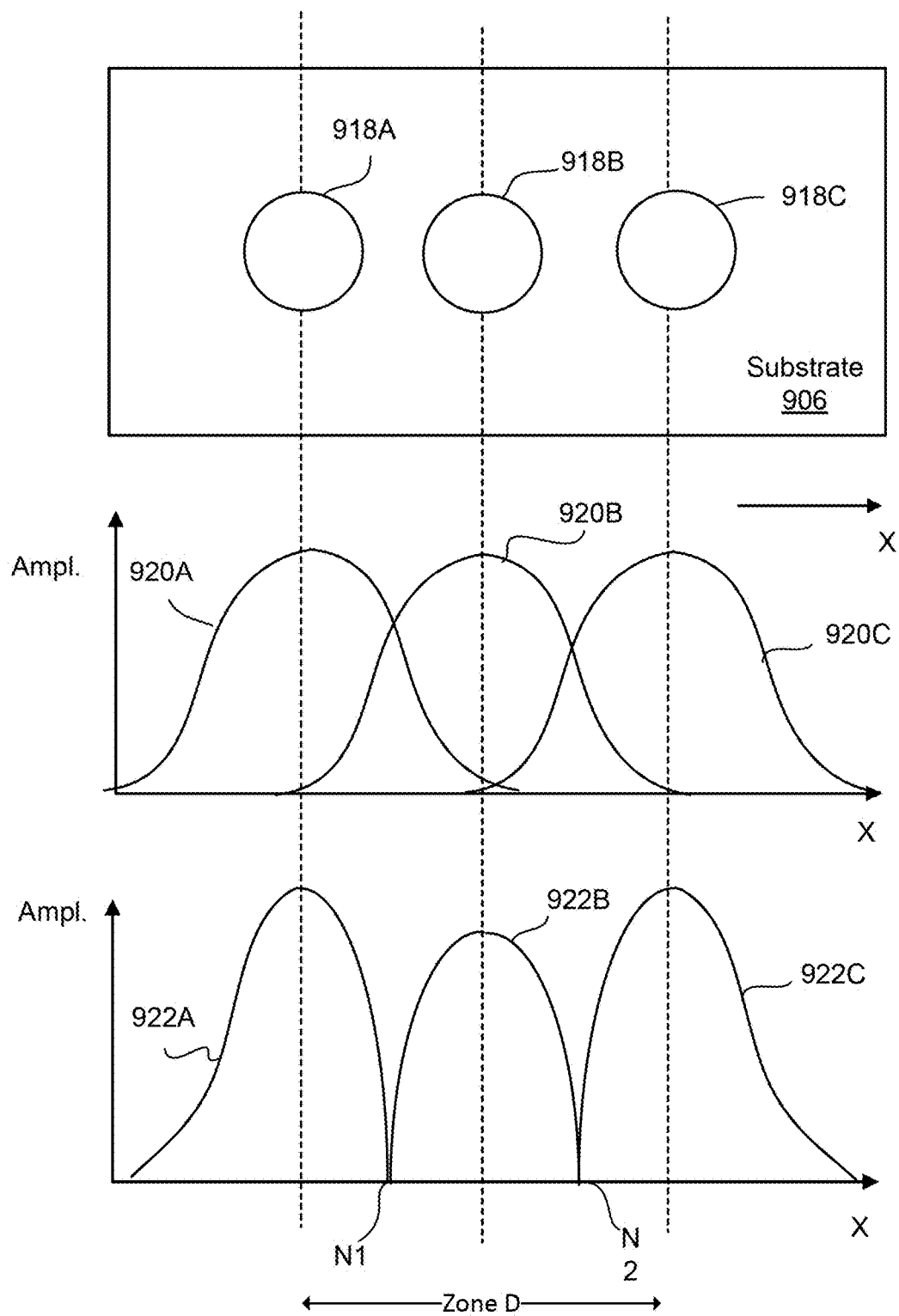
FIG. 9B is a diagram illustrating cutaneous actuators to enhance localization of haptic outputs of multiple cutaneous actuators, according to one embodiment.

FIG. 9B is a diagram illustrating cutaneous actuators 918A through 918C to enhance localization of vibrations of multiple cutaneous actuators, according to one embodiment. The embodiment of FIG. 9B is the same as the embodiment of FIG. 9A except that all three actuators are main cutaneous actuators that generate vibrations for sensing by the receiving user. In the example of FIG. 9B, curves 920A, 920B, 920C representing vibrations generated by the cutaneous actuators 918A, 918B, 918C, respectively, have the same shape, representing that they all have the same peak amplitude.

The operation principle of the cutaneous actuators 918A through 918C are the same as the embodiment of FIG. 9A. The side cutaneous actuators 918A, 918C generate vibrations that are opposite in phase (180 degrees out of phase) relative to the vibrations generated by the center cutaneous actuators 918B. However, instead of relying on counter-vibrations with smaller amplitude, the embodiment of FIG. 9B relies on the destructive interference between vibrations of the adjacent cutaneous actuators to increase spatial resolution associated with the center cutaneous actuator 918B.

As shown in FIG. 9B, nodes N1 and N2 where the amplitude of the combined vibrations become zero due to destructive interference of vibrations occurs within zone D. That is, the vibrations from the center cutaneous actuators 918B do not propagate beyond zone D, increasing the spatial resolution of the spatial communication.

The embodiment of FIG. 9B is advantageous, among other reasons, because no separate auxiliary cutaneous actuators is used and there is no need to fine tune the operational parameters (e.g., amplitude and phase of counter-vibrations) of the auxiliary cutaneous actuators.

Figure 9C:
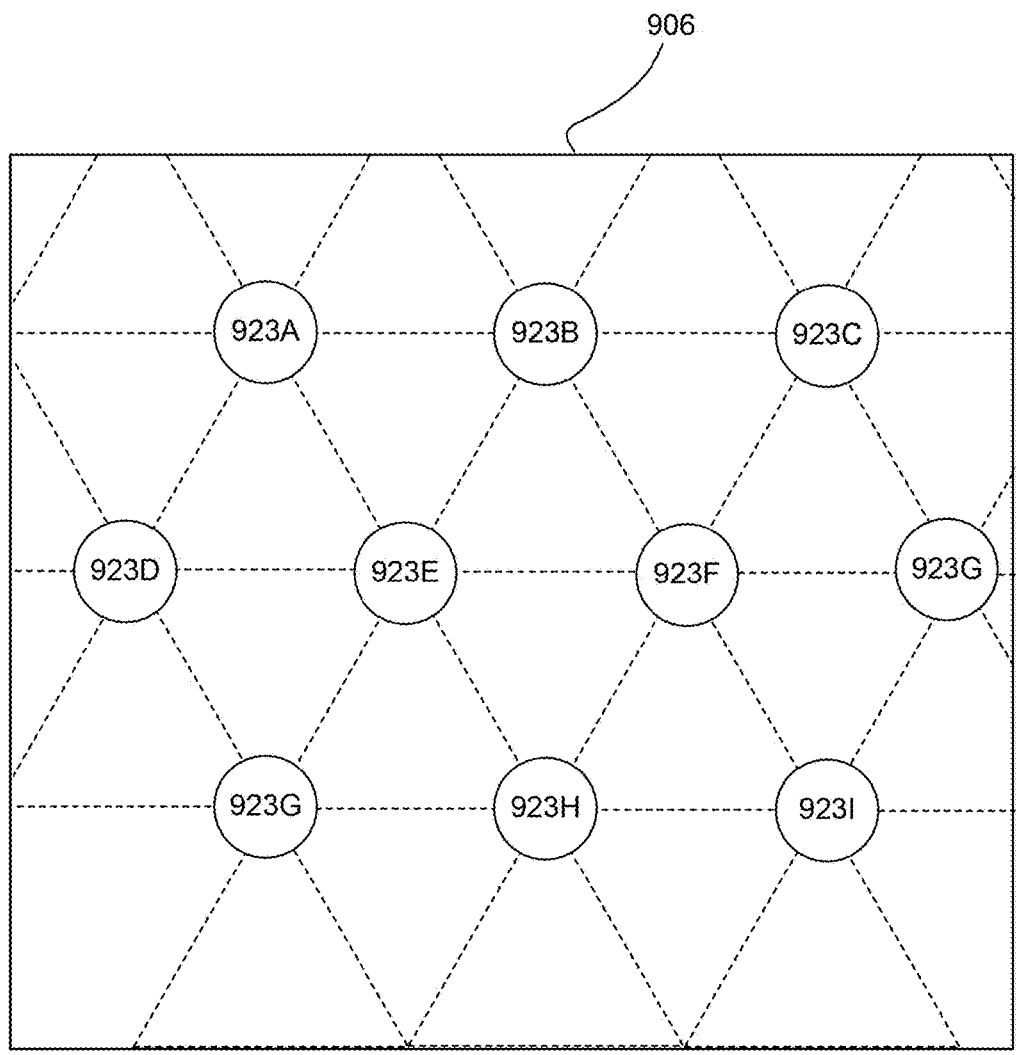
FIG. 9C is a diagram illustrating a lattice structure of cutaneous actuators, according to one embodiment.

Although the embodiment of FIG. 9B is explained using three cutaneous actuators aligned in horizontal direction for the sake of explanation, the same principle can be expanded to two dimensional pattern. FIG. 9C is a diagram illustrating a lattice structure of cutaneous actuators 923A through 923I, according to one embodiment. In FIG. 9C, cutaneous actuators 923E, 923F are surrounded by 6 other cutaneous actuators. When two adjacent cutaneous actuators are activated, they may produce vibrations of an opposite phase to localize their vibrations.

Figure 9D:
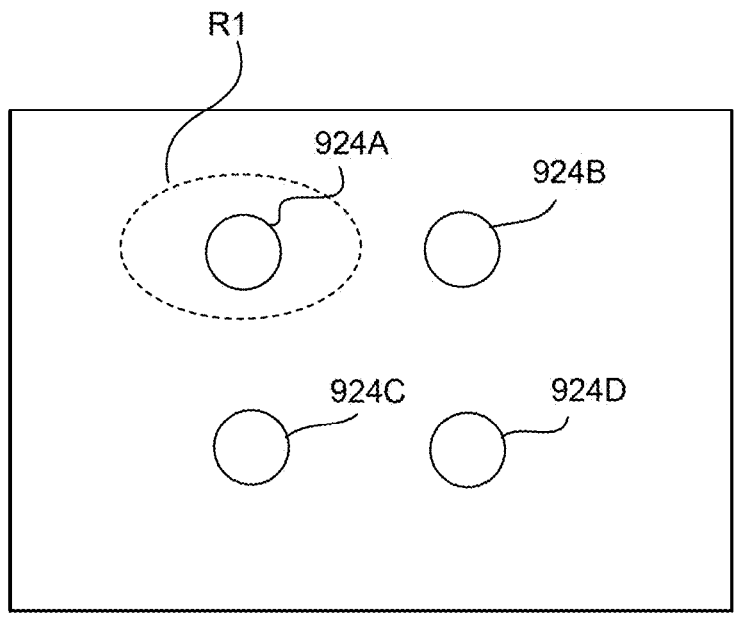
FIGS. 9D and 9E are diagrams illustrating virtual cutaneous actuators using constructive interference, according to one embodiment.

Constructive interference of vibrations generated at multiple cutaneous actuators may be used to create a virtual actuator. FIG. 9D is a diagram illustrating vibrations perceived by a receiving user when a cutaneous actuator 924A is activated, according to one embodiment. In FIG. 9D, the amplitude of the vibrations generated by the cutaneous actuator 924A is above a threshold that can be sensed by the receiving user. The user will sense the vibrations in region R1 around the cutaneous actuator 924A. The region R1 will be wider or narrower depending on the amplitude of the vibrations. When other cutaneous actuators 924B, 924C, 924D are individually activated to generate vibrations above the sensory threshold, the receiving user will sense vibrations in respective regions around the actuators.

Figure 9E:
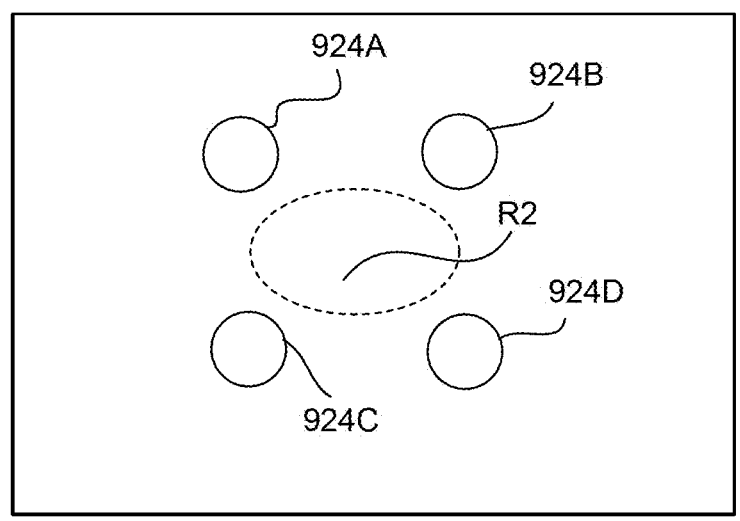

When a cutaneous actuator (e.g., 924A) is weakly activated so that the generated vibrations do not exceed the sensory threshold, the receiving user would not sense the vibration. However, when multiple cutaneous actuators are operated in conjunction to generate vibrations at the same phase, the constructive interference between the vibrations will create regions where the amplitude of the vibrations is above the sensory threshold. For example, FIG. 9E is a diagram illustrating vibrations detected by the receiving user at region R2 when four cutaneous actuators 924A through 924D are activated to generate vibrations below the sensory threshold, according to one embodiment. The vibrations generated by the cutaneous actuators 924A through 924D are in the same phase, and hence, the constructive interference of the vibrations result in the largest amplitude in the center of R2 region, as if a cutaneous actuator is operated at the center of region R2.

By selectively operating the cutaneous actuators 924A through 924D and/or controlling the amplitude of the generated vibrations, the perceived center location of the vibrations can be moved around. In this way, virtual cutaneous actuators can be created to give the perception of providing more cutaneous actuators than the number of physical cutaneous actuators.

By providing the cutaneous actuators with actuator signals that gradually change over time, a virtual motion can be created. By using the same principle as the virtual cutaneous actuators but changing the amplitude of the actuator signals, the perceived center locations of the vibrations can be moved over time. This creates the sensation of the virtual cutaneous actuators physically moving over a path.

Figure 9F:
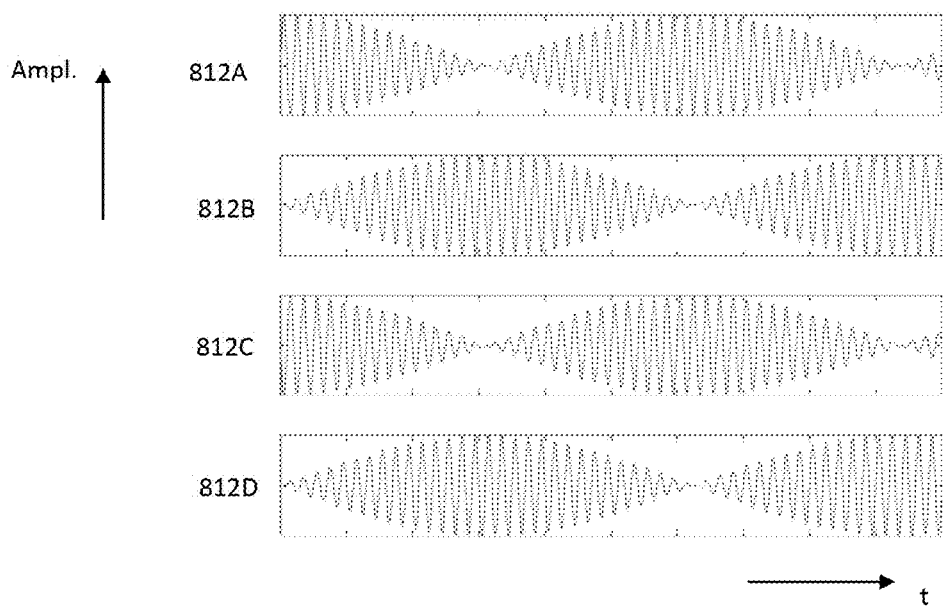
FIG. 9F is a diagram illustrating waveforms of actuator signals to cause the sensation of a virtual motion, according to one embodiment.

FIG. 9F is a diagram illustrating waveforms of actuator signals 812A through 812D to cause the sensation of a virtual motion, according to one embodiment. The actuator signals 812A, 812B, 812C, 812D are fed cutaneous actuators 924A, 924B, 924C, 924D, respectively. The actuator signals 812A and 812C have the same pattern (although the signals 812A and 812C are 180 degrees out of phase with each other) whereas the actuator signals 812C and 812D have the same pattern (although the signals 812C and 812D are 180 degrees out of phase with each other).

Figure 9G:
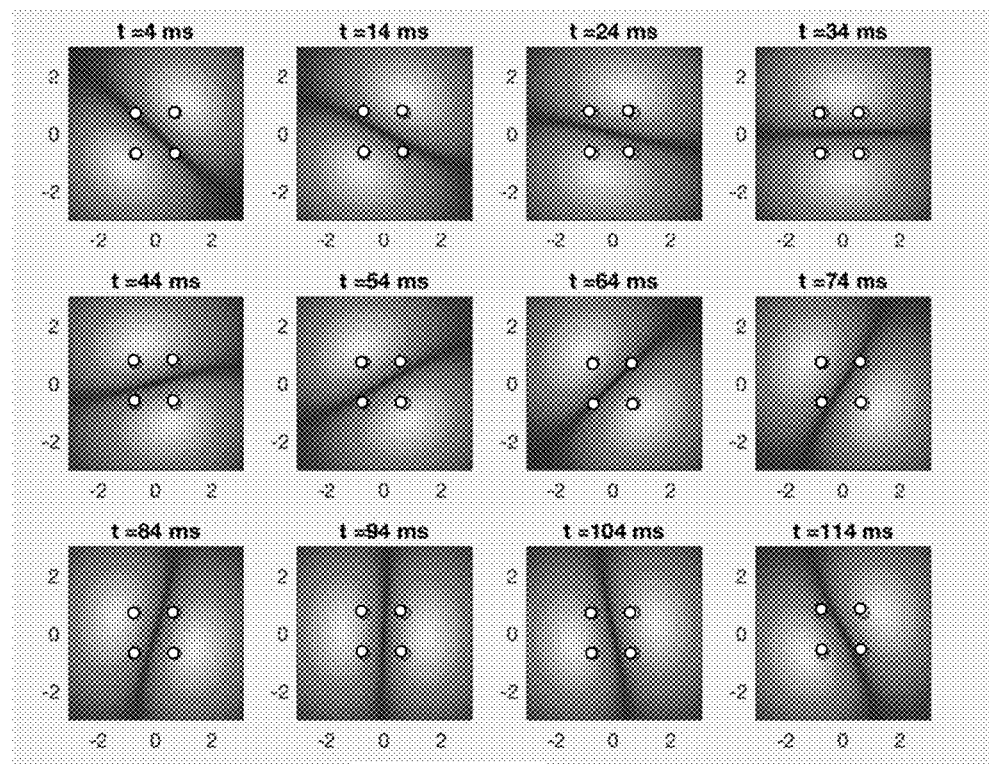
FIG. 9G are diagrams illustrating a virtual motion created by the waveforms of FIG. 9F, according to one embodiment.

FIG. 9G are diagrams illustrating a virtual motion created by the waveforms of FIG. 9F, according to one embodiment. As the actuator signals 812A through 812D are fed to the cutaneous actuators 924A through 924D, two center points of vibrations are created. The vibrations are 180 degrees of phase with each other, and are separated by a region that has zero amplitude. The center points rotate in a clockwise direction, creating the sensation of the virtual movement.

In the embodiment of FIG. 9G, the centers of the vibrations are located beyond the four cutaneous actuators 924A through 924D. Sensations can be created beyond the dimension of the array of the cutaneous actuator array. This is advantageous, among other reasons, because a compact haptic device can be used to provide vibrational sensation over a larger area.

By applying different waveforms and different configuration of the cutaneous actuator array, various virtual motion can be embodied.

Figure 9H:
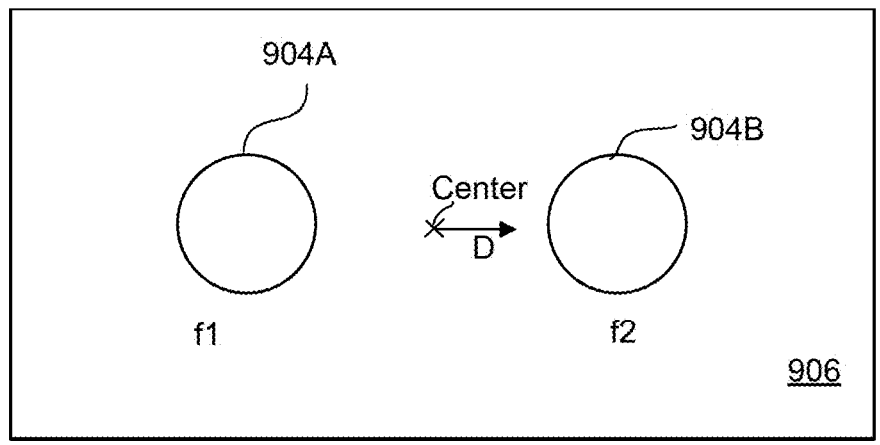
FIG. 9H is a diagram illustrating placement of two cutaneous actuators applied with different frequency modulation, according to one embodiment.

FIG. 9H is a diagram illustrating placement of two cutaneous actuators 904A, 904B applied with different frequencies, according to one embodiment. By differing the frequencies applied to the cutaneous actuators, beat patterns of different frequencies can be generated by interference between the vibrations generated by the cutaneous actuators. Such beat patterns may be used to encode information for haptic communication.

Figure 9I:
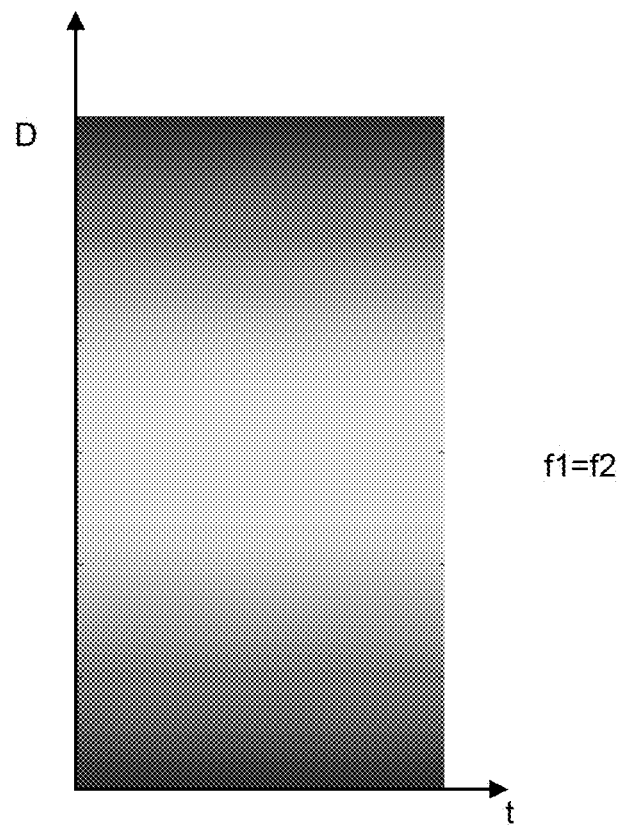
FIGS. 9I through 9K are diagrams illustrating haptic output patterns detected by the receiving user, according to embodiments.

FIG. 9I is a diagram illustrating a vibration pattern when the same frequency of vibrations are generated by the two cutaneous actuators 904A, 904B, according to one embodiment. The vertical axis of FIG. 9G represents distance D from a center between the two cutaneous actuators 904A, 904B, and the horizontal axis represents time. When the two actuators produce vibrations of the same frequency, no apparent beat pattern is observed as shown in FIG. 9I.

Figure 9J:
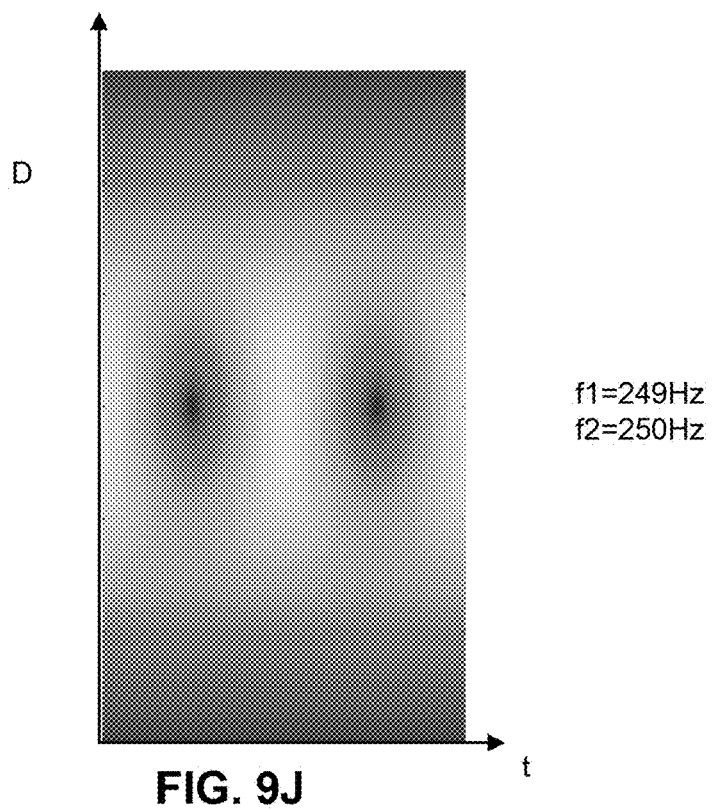
Figure 9K:
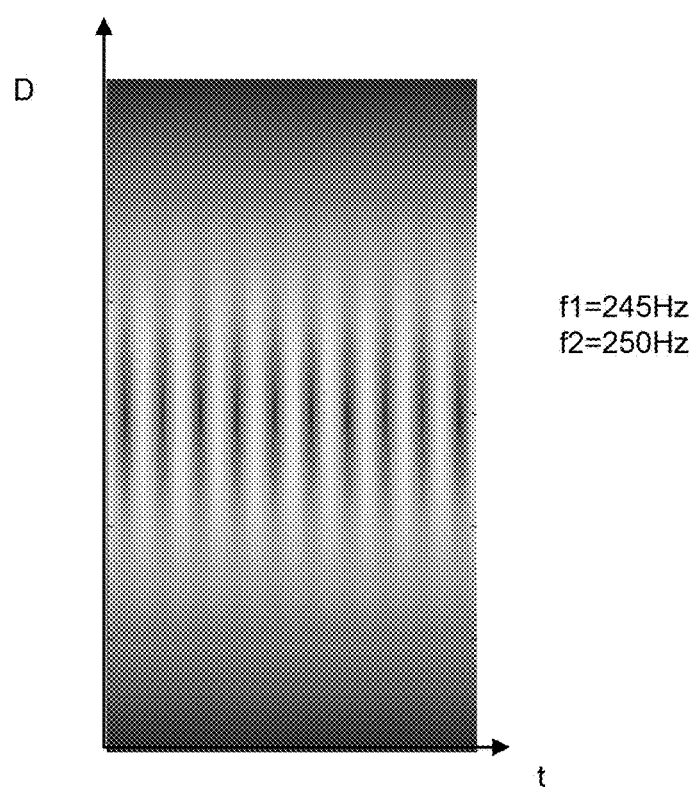

FIGS. 9J and 9K are diagrams illustrating vibration patterns when the two cutaneous actuators 904A, 904B generate vibrations of different frequencies, according to one embodiment. Specifically, FIG. 9J illustrates the vibration pattern when the cutaneous actuator 904A generates vibrations with frequency (f1) of 249 Hz and the cutaneous actuator 904B generates vibrations with frequency (f2) of 250 Hz. As shown in FIG. 9J, the vibrations pattern generated as a result include a beat pattern of a lower frequency. FIG. 9K illustrates the vibration pattern generated when the cutaneous actuator 904A generates vibrations with frequency (f1) of 245 Hz and the cutaneous actuator 904B generates vibrations with frequency (f2) of 250 Hz. As the difference increases, the resulting vibrations exhibit a beat pattern of a higher frequency.

Hence, by leveraging the varying beat pattern resulting from the difference in the frequency difference between the vibrations of the cutaneous actuators 904A, 904B, information for haptic communication can be embedded in the vibrations.

Figure 9L:
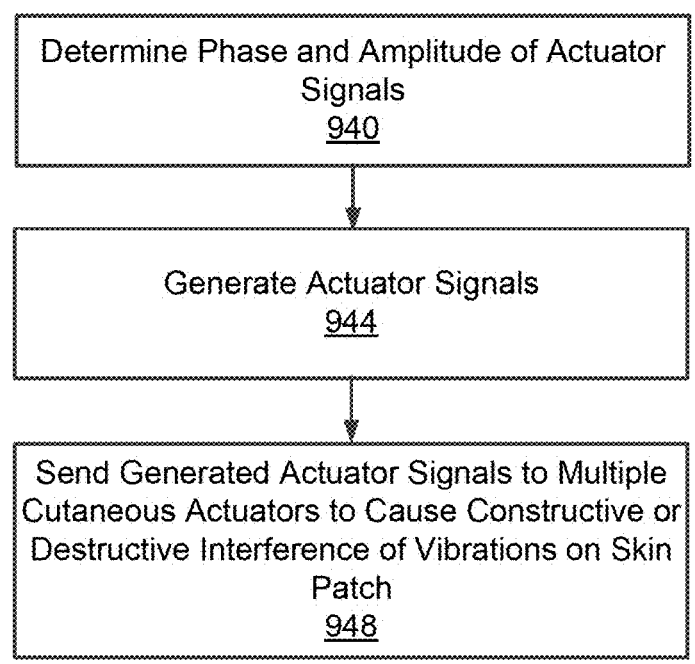
FIG. 9L is flowchart illustrating using interference of haptic outputs from at least two cutaneous actuators for enhanced haptic communication, according to one embodiment.

FIG. 9L is flowchart illustrating using interference of vibrations from at least two cutaneous actuators for enhanced haptic communication, according to one embodiment. After receiving instructions on haptic information to convey to the receiving user, the interference signal processor 820 determines 940 the phase and amplitude of multiple actuator signals. For this purpose, the interference signal processor 820 may reference the receiving user's sensory threshold, configuration of the cutaneous actuator array, and receiving user's preferences or settings.

Based on the determination of the interference signal processor 820, the haptic interface circuit 806 generates 944 the actuator signals. Such process may include performing digital to analog conversion based on instructions from the interference signal processor 820.

The generated actuator signals are then sent 948 to corresponding cutaneous actuators to cause constructive or destructive interferences of vibrations on the receiving user's patch of skin.

The process illustrated in FIG. 9L is merely illustrative and various modifications may be made to the process. For example, generating 944 the actuator signals may be performed in parallel with sending 948 of the generated actuator signals.

Selectively Using Dominant Frequency Bands in Haptic Communication System

Embodiments also relate to performing haptic communication using frequency decomposition of a speech where dominant frequencies of the speech is detected and then sent to a signal generator to actuate actuators mapped to the dominant frequencies. The digitized version of the speech is segmented into a plurality of frames and then a predetermined number of dominant frequencies are detected from each frame. The dominant frequencies are sent over to the signal generator so that the actuators corresponding to the dominant frequencies are activated for a time period. The activation time period may correspond to the frame or be shorter or longer than the frame.

The acoustic structure of speech is characterized by multiple peaks in the frequency spectrum (i.e., formants) generated by resonances in the vocal tract. These formants are the one of the primary information-carrying features of speech for many phonemes, especially vowels. In frequency decomposition algorithms, adjacent frequency bands are mapped to spatially adjacent cutaneous actuators on the skin. In light of the poor spatial resolution and poor intensity discriminability of the skin, it is challenging for a receiving user to identify the location of the cutaneous actuators with the greatest intensity, especially when adjacent actuators are also activated due to the typically broad shoulders of the formant peaks in the spectrum. Embodiments identify frequencies with local maxima and the corresponding cutaneous actuators are activated while other cutaneous actuators are not activated. In this way a clearer unique haptic signature is presented for each unique formant pattern by the activation of the cutaneous actuators. This approach can be used alone or in a hybrid system in which vowels (i.e., prominent formant structure) and/or non-vowels are encoded.

Figure 10A:
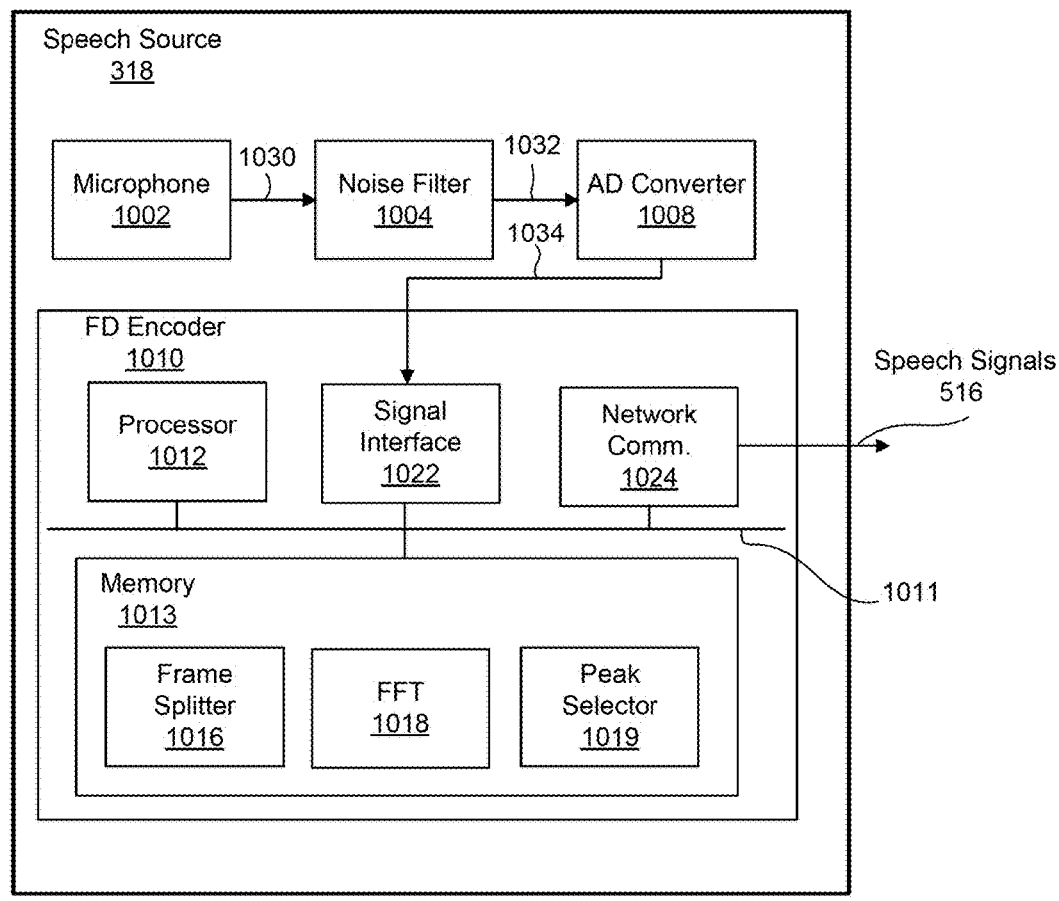
FIG. 10A is a block diagram of a speech source performing frequency decomposition using selective dominant frequencies, according to one embodiment.

FIG. 10A is a block diagram of the speech source 318 performing frequency decomposition using selective dominant frequencies, according to one embodiment. The speech source 318 generates the speech signal 216 by processing voice signals (e.g., received from a source such as a microphone 1002) using frequency decomposition. As described above with reference to FIGS. 3 and 8, the speech signal 216 may be sent directly over the network 260 or via the social networking system 228 to a receiving device 268 (including, e.g., the signal generator 800) for decoding and generating actuator signals 812. The speech source 318 may include, among other components, the microphone 1002, a noise filter 1004, an analog-to-digital (AD) converter 1008, and a frequency decomposition (FD) encoder 1010.

The microphone 1002 is a hardware component for capturing a sending user's voice. Instead of microphone 1002, the speech source may include other voice sources such as a storage medium (e.g., CD or DVD player) or a speech synthesizer that generates voice signal from text. The microphone 1002, in response to detecting the sending user's voice, generates a voice signal 1030 in an analog format.

The noise filter 1004 receives the voice signal 1030 and performs filtering using circuit components to generate a filtered voice signal 1032. The noise filter 1004 may use various well know technique or techniques to be developed in the future to reduce noise and amplify frequency components of the voice signal 1030 corresponding to the sending user's voice.

The AD converter 1008 receives the filtered voice signal 1032 and digitizes it to generate a digital version 1034 of the voice signal for further processing by the FD encoder 1010. For this purpose, the AD converter 1008 includes components for sampling the filtered voice signal 1032 and quantizing the sampled voice signal.

The FD encoder 1010 performs frequency decomposition of the digitized voice signal 1034 using dominant frequencies, and generates the speech signal 216 as a result. The FD encoder 1010 may include, among other components, a processor 1012, a signal interface 1022, a network communication module 1024, a memory 1013 and a bus 1011 connecting these components. Although the FD encoder 1010 is illustrated in FIG. 10A as being a microprocessor capable of various operations, the FD encoder 1010 may be embodied as a dedicated hardware circuit for performing the frequency decomposition.

The processor 1012 reads and executes instructions, for example, stored in the memory 1013. Although a single processor is illustrated in FIG. 10A, a plurality of processors may be used in parallel. In some embodiments, the processor 1012 is a circuitry specifically designed for digital signal processing.

The signal interface 1022 is an interface circuit for receiving the digitized voice signal 1034 from the AD converter 1008. The signal interface 1022 may use well known serial or parallel bus schemes to receive the digitized voice signal 1034 and/or other signals.

The network communication module 1024 includes hardware circuit that formats and sends the speech signals 216 to the signal generator 800. The speech signals 216 include frame information and dominant frequency information. The network communication module 1024 may perform, among other operations, packetizing the frame information and the dominant frequency information for transmittal to the signal generator 800.

The memory 1013 is a non-transitory computer readable storage medium that stores software modules. The memory 1013 may store, among other modules, a frame splitter 1016, a Fast Fourier Transformation (FFT) module 1018 and a peak selector 1119. The memory 1013 may include other software components illustrated in FIG. 10A, such as an operation system (OS).

Figure 10B:
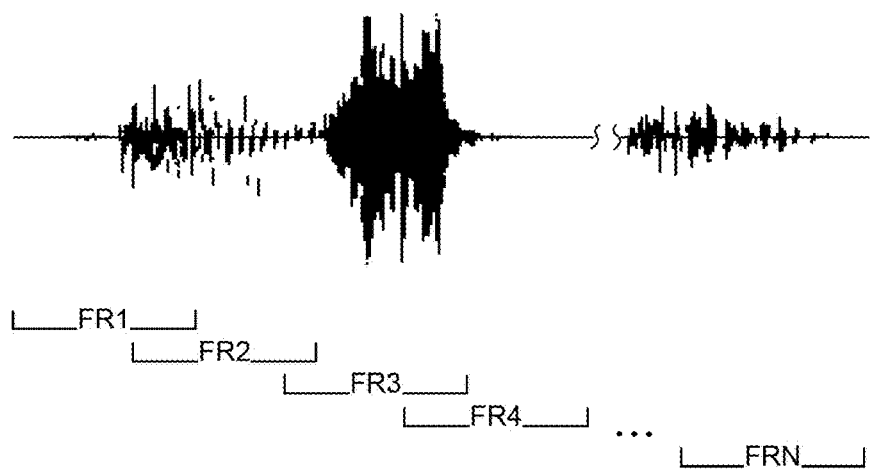
FIG. 10B is a diagram illustrating splitting a digitized version of a voice signal into multiple frames, according to one embodiment.

The frame splitter 1016 splits the digitized voice signal 1034 into frames. FIG. 10B is a diagram illustrating splitting the digitized voice signal 1034 into multiple frames FR1 through FRN, according to one embodiment. For example, when 44.1 kHz sampling rate is used for the digitized voice signal 1034, each frame may include 1024 samples corresponding to 23.2 ms. The frame length may be long enough so that adequate frequency resolution is maintained, but short enough so the signal can be viewed as statistically stationary over the duration of the frame (i.e., short enough so that the statistics of the signal are approximately constant). In addition, for digital signal processing, it is convenient to use a frame length whose number of samples is a power of 2. As shown in FIG. 10B, frames can overlap (for example, 50% overlap between adjacent frames).

Figure 10C:
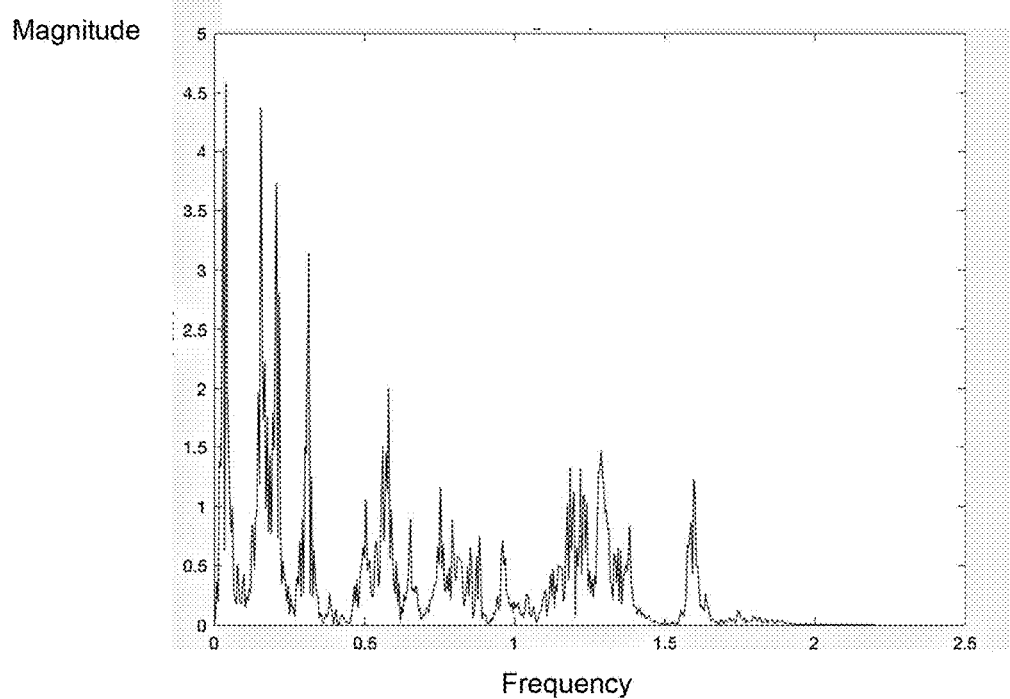
FIG. 10C is a graph illustrating a result of applying Fast Fourier Transform to a portion of the digitized version of the voice signal in a frame, according to one embodiment.

The FFT module 1018 performs Fast Fourier transform on a portion of the digitized voice signal of each frame in a time domain to a frequency domain. As a result of FFT, an approximate power spectrum of the portion of the digitized voice signal over the corresponding frame is obtained. The signal power is clustered in a relatively small number of locations in the frequency spectrum, which correspond to the speech formants. The fine fluctuations are due in part to numerical artifacts but these do not affect the dominant frequencies and hence, no further technique is applied to reduce the artifacts. FIG. 10C is a graph illustrating the result of the Fast Fourier transformation, according to one embodiment. In other embodiments, spectral estimation techniques other than FFT may be used to transform the portion of digitized voice signal in a time domain to a frequency domain.

Figure 10D:
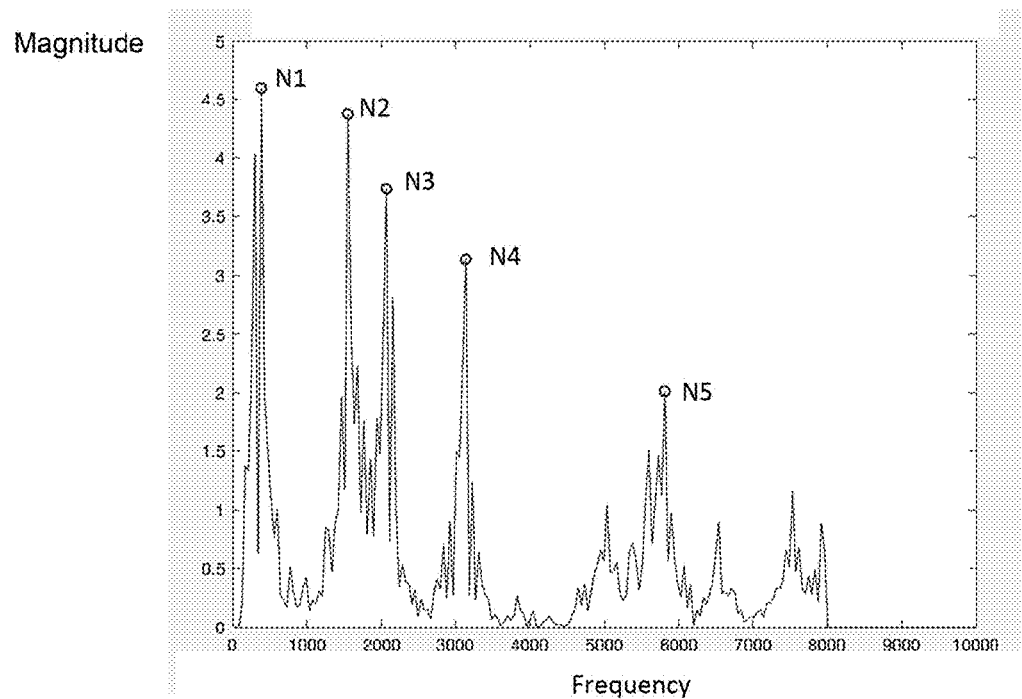
FIG. 10D is a graph illustrating selection of a predetermined number of dominant frequencies, according to one embodiment.

In one embodiment, the peak selector 1019 sets portions of the frequency domain spectrum that is outside the frequency range of interest (e.g., 200 Hz-8.4 kHz) to zero. Then, a frequency location of the highest peak magnitude (i.e., a first dominant frequency) in the frequency domain spectrum is identified. After the location is identified, a window surrounding the peak by +/−400 Hz is set to zero, so that any relative peak magnitude within 400 Hz of the identified peak is ignored. The next highest peak (i.e., a second dominant frequency) is identified, and a window surrounding the next highest peak magnitude by +/−400 Hz is set to zero. The same process is repeated to identify a predetermined number of peaks or dominant frequencies. FIG. 10D illustrates five peaks N1 through N5 of the dominant frequencies, according to one embodiment. The frame number and the corresponding dominant frequencies and amplitudes in the frame are sent to the signal generator 800 as the speech signal 216 by the network communication module 1024.

The frequency domain spectrum is divided into a number of channels (e.g., 32 channels) between the lower and upper cutoff frequencies (e.g., 200 Hz and 8.4 kHz, respectively). In one embodiment, the channels are linearly spaced below 1 kHz and spaced logarithmically above 1 kHz. Each peak identified above is associated with the channel with the closest center frequency.

After the signal generator 800 receives the speech signal 216, the frequency decoder module 822 (refer to FIG. 8A) extracts the frame number and the corresponding dominant frequencies. The frequency decoder module 822 may perform pre-processing to enhance the haptic communication. The pre-processing may include, for example, adjusting the playback time of the speech signal 216. In one embodiment, the duration of the frame is preserved at the frequency decoder module 822 so that the frames at the speech source 318 and frames at the signal generator 800 are of the same duration. The frames at the signal generator 800 can be played successively, so a nonzero overlap on input frames results in a slower than real-time playback on output. Alternatively, the degree of overlap can be preserved on output, or a different, arbitrary, amount of overlap can be used. Alternatively, the output frame length can be made different from the input frame length. In addition, averaging of successive output frames playback can be implemented. In general, the playback rate can be slower or faster than the original recording rate.

The frequency decoder module 822 also determines the cutaneous actuators 802 to be activated. Each cutaneous actuator may be mapped to a certain channel and an actuator may be activated for a time representing a frame when the speech signal 216 indicates that a dominant frequency corresponding the actuator is present in the frame. In one embodiment, the cutaneous actuators 802 are driven with an intensity that is proportional to the magnitude of respective peaks of the dominant frequencies. In another embodiment, the cutaneous actuators 802 are driven with a fixed intensity, independent of the magnitude of the corresponding spectral peaks of the dominant frequencies.

Although above embodiments describe the speech source 318 and the signal generator 800 as being located remotely from each other, the speech source 318 may be co-located with the signal generator 800 and communicate via wire or short-distance communication. Further, the speech source 318 and the signal generator 800 may be embodied as a single device.

Figure 10E:
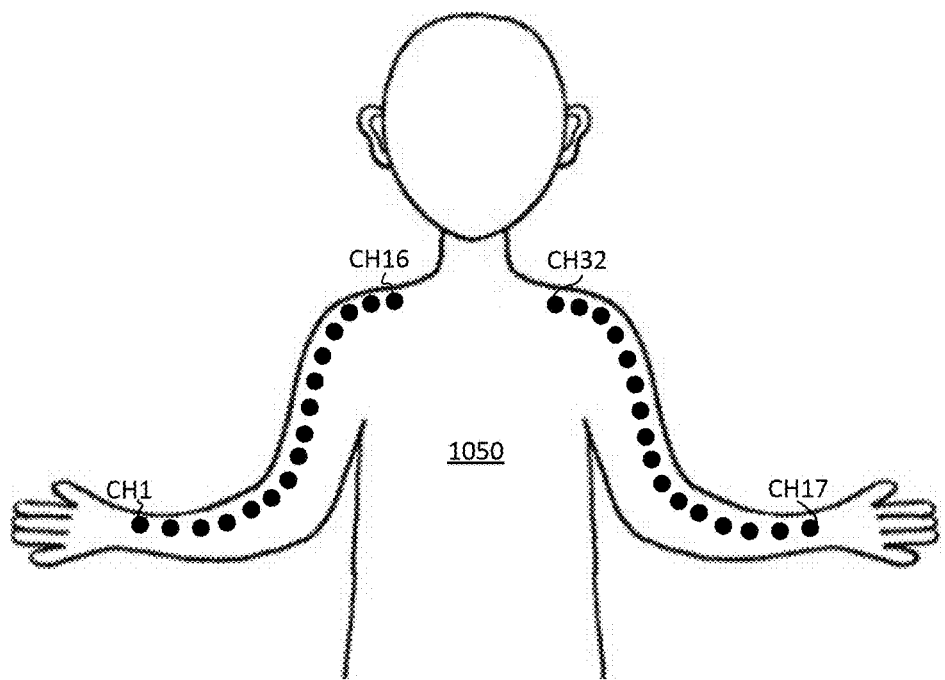
FIG. 10E is a diagram illustrating placing of actuators on the receiving user for reproducing the voice signal using frequency decomposition, according to one embodiment.

FIG. 10E is a diagram illustrating placing of cutaneous actuators on the receiving user 1050 for reproducing the voice signal using frequency decomposition, according to one embodiment. The signal generator 800 outputs actuator signals 812A through 812N to the cutaneous actuators 802A through 802N where each cutaneous actuator corresponds to a channel of dominant frequency as described above with reference to FIG. 10D.

In the embodiment of FIG. 10E, the first channel has a center frequency of 387.6 Hz and is mapped to a cutaneous actuator that is close to the left wrist. The second channel has a center frequency of 689.1 Hz and is mapped to a cutaneous actuator that is about an inch away from the first, placed more proximally on the left arm. Channel 16 is mapped to a cutaneous actuator near the left shoulder. Channel 17 is mapped to a cutaneous actuator that is near the right wrist, and progressively higher channels appear more proximally at higher locations with channel 32 near the right shoulder.

Further, each of the channels in the embodiment of FIG. 10E has the following center frequencies in kHz: 0.3876, 0.6891, 0.9905, 1.2920, 1.4212, 1.5073, 1.6365, 1.7657, 1.8949, 2.0241, 2.1964, 2.3256, 2.4979, 2.6701, 2.8424, 3.0577, 3.2730, 3.4884, 3.7037, 3.9190, 4.1774, 4.4358, 4.7373, 4.9957, 5.3402, 5.6417, 5.9862, 6.3308, 6.6184, 7.1490, 7.2366 and 8.0104. Each dominant frequency in the speech signal 216 is mapped to the channel with the closest center frequency.

Figure 10F:
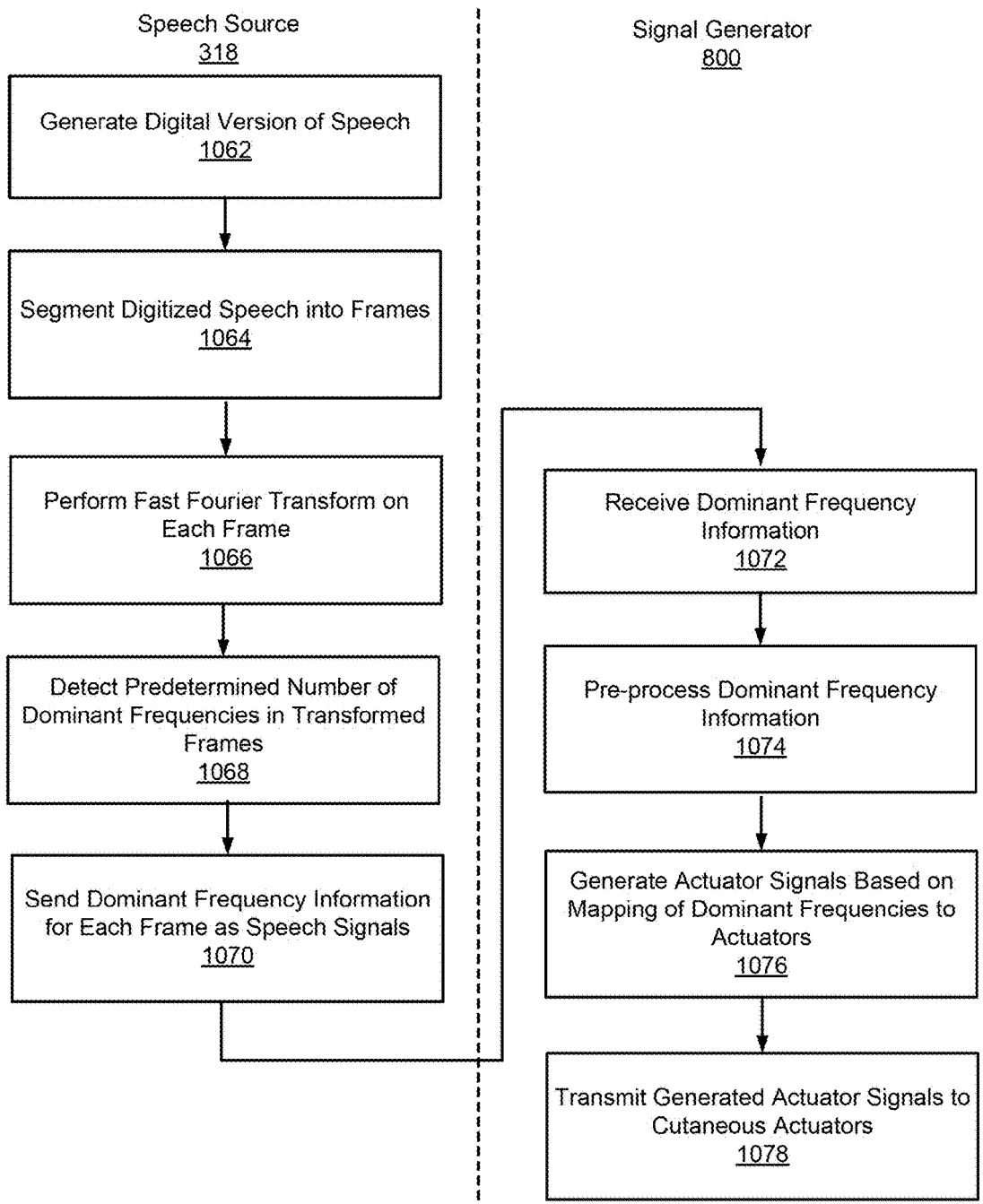
FIG. 10F is a flowchart illustrating a process of performing haptic communication using selective dominant frequencies, according to one embodiment.

FIG. 10F is a flowchart illustrating a process of performing haptic communication using selective dominant frequencies, according to one embodiment. The speech source 318 receives the voice signal from a source, and then generates 1062 a digitized speech signal. The digitized speech signal is segmented 1064 into a plurality of frames.

The segmented frames are then processed by performing 1066 Fast Fourier Transform on each frame. Then, the speech source 318 detects 1068 a predetermined number of dominant frequencies with highest peak amplitudes in the result of the FFT. Spectral estimation techniques other than FFT may be applied to the speech source 318 to generate a frequency domain spectrum. The speech source 318 sends 1070 dominant frequency information and the frame information as the speech signals to the signal generator 800.

The signal generator 800 receives 1072 the dominant frequency information and the frame information from the speech source 318. Then the signal generator 800 preprocesses 1074 the dominant frequency information and the frame information by adjusting the length, sequence or overlapping of the frames.

The signal generator 800 also generates 1076 actuator signal based on the mapping of dominant frequencies to the actuator. Then, the generated actuator signals are transmitted 1078 from the signal generator 800 to the cutaneous actuators.

The sequence and processes as described in FIG. 10F is merely illustrative and various modifications can be made. For example, instead of performing segmentation 1064 on the digitized speech, analog signal may be segmented and then digitization may be performed thereafter. Further, preprocessing 1074 may be performed in parallel with or at the same time of generating 1076 of the actuator signals.

Haptic Communication System Using Haptic Symbol Set

Embodiments also relate to a haptic symbol set which specify sequences of haptic signals to be generated from input words of a language, such as English. As noted above, various methods can be used to convert an input sequence of words into an output sequence of haptic signals. In one embodiment, the haptic signals are based on the phonemes of the input sequence of words.

Figure 11A:
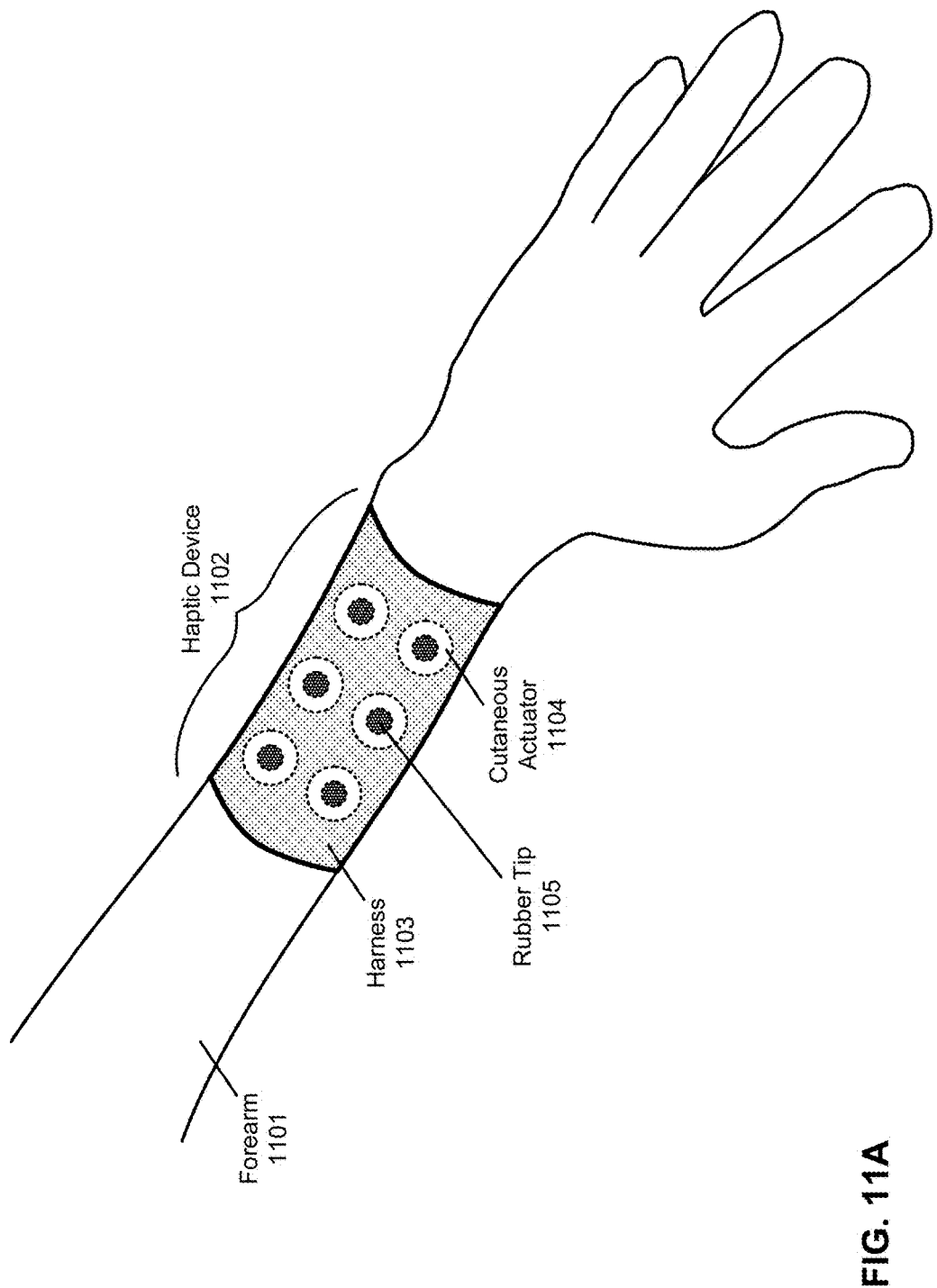
FIG. 11A illustrates an exemplary haptic device with cutaneous actuators that can be used to transmit sequences of haptic illusion signals to a user based on a sequence of input words, according to one embodiment.

FIG. 11A illustrates an exemplary haptic device 1102 with cutaneous actuators that can be used to transmit sequences of haptic illusion signals to a receiving user based on a sequence of input words, according to one embodiment. The haptic device 1102 includes a harness 1103, upon which are attached a two dimensional array of cutaneous actuators 1104 which, as described above, contact the skin of the user's forearm 1101 and are able to exert a vibrations upon the user's forearm. Each cutaneous actuator 1104 may also include a rubber tip 1105.

The harness 1103 affixes the cutaneous actuators 1104 to fixed positions facing the skin on the dorsal side of the forearm 1101. The harness 1103 may wrap around the receiving user's forearm 1202 when fitted on the receiving user's forearm 1202. The harness 1103 may be made of any combination of elastic or inelastic fabric, such as rayon, nylon, foams, rubbers, polymers, cotton, etc. The harness 1103 may further include rigid members, made of plastic, metal, or other rigid materials in order to provide structural support for the harness 1103, to protect sensitive components embedded in the harness 1103, or to cause the harness 1103 to be affixed at a certain position on the user's forearm 1101. In one embodiment, the harness 1103 includes a fitted rigid member that is contoured according to the shape of a wrist of a human of average height and build and of a particular age (and gender). The harness 1103 is built around this fitted rigid member such that a wearer of the harness 1103 wears the harness 1103 in a certain position which conforms the fitted rigid member to the contour of the shape of the receiving user's wrist. If the harness 1103 is worn in any other position, the fitted rigid member may cause discomfort for the receiving user as it does not match the contour of the user's arm in that position. Thus, the harness 1103 can be designed to be worn in only a limited number of positions, which in turn causes the cutaneous actuators 1104 to be in a similar position (within a threshold range of distances) each time the harness 1103 is worn by the receiving user. Instead of rigid members, in other embodiments, non-rigid members, such as thicker fabrics (e.g., exceeding 1 cm), fabric cutouts, and so on, may be used to achieve the same effect. As an example, the harness 1103 may be configured such that the two dimensional array of cutaneous actuators 1104 are placed 2 cm in a proximal direction from user's wrist, and such that the two dimensional array of cutaneous actuators 1104 are situated medially on the dorsal side of the user's forearm 1101. Additionally, instead of the user's wrist, any another anatomical feature of the user's forearm (or user's body) may be used instead as a landmark to affix the haptic device.

The harness 1103 may further be adjustable such that its dimensions may be changed to become form fitting with the user's forearm 1101. This may be achieved with straps which connect a portion of the harness 1103 with another portion, and which may be adjustable in length or include removably attachable material, such as Velcro, on one surface of the strap, in order to attach the strap to the harness 1103 along different points of the strap. This causes the dimensions of the harness, such as its diameter, to change, and allows the harness 1103 to be form fitting to the user's forearm 1101. Alternatively, or in combination, the harness 1103 may include elastic materials, which cause the harness to compress against the user's forearm 1101, but which also allow expansion when the user initially puts the harness 1103 on his or her forearm 1101.

Attached to the harness 1103 may be a signal generator (not shown), such as signal generator 800, in order to generate actuator signals 272, which are transmitted to the cutaneous actuators 1104. In one embodiment, the signal generator generates sequences of actuator signals which are representative of phonemes of input words. In this fashion, a user, after training, is able to understand phonemes via haptic feedback rather than audio or visual transmission of the words (e.g., via speech or written words). This can be significantly advantageous for users who may have difficulties communicating using audio or visual means, and may also be useful where such audio or visual communication are unavailable, such as in a loud environment with low available light (e.g., a search and rescue operation). Additional details regarding these sequences of actuator signals are described below with reference to FIGS. 11B through 11J.

The cutaneous actuators 1104 generate a haptic output (e.g., vibrations) which can be sensed by the skin of the user's forearm. In one embodiment, the cutaneous actuators 1104 are placed on an interior surface of the harness 1103 facing the skin of the user's forearm. As used here, cutaneous actuator(s) 1104 may refer to a single cutaneous actuator 1104 or the two dimensional array of cutaneous actuators 1104 which are attached to the harness 1103 as shown. The haptic output generated by each of the cutaneous actuators 1104 may include a force or pressure or other output that may be sensed by the user's skin, such as electrical stimulus, temperature stimulus (e.g., heat), negative pressure (e.g., suction), vibrational output, shear movement stimulus, and so on. The cutaneous actuators 1104 may be similar to the cutaneous actuators described above, such as cutaneous actuators 108, 208, and 802. The cutaneous actuators 1104 are arranged in a two dimensional array on the harness 1103, and with their orientation such that an activation of a cutaneous actuator 1104, which generates the haptic output, causes a sensation to be sensed by the user. In the case where the cutaneous actuators 1104 provide a force sensation (e.g., pressure), the cutaneous actuators 1104 are arranged such that the force sensation generated by the cutaneous actuators 1104 is directed towards the user's skin.

The cutaneous actuators 1104 receive actuator signals 1111 from a signal generator or other device, and in response to the receipt of the actuator signals 1111, generates a haptic output. The haptic output may be generated within a threshold response time from the receipt of the actuator signal (e.g., 10 ms). When the cutaneous actuator 1104 generates a haptic output, it is activated, transitioning from a non-activated state. Furthermore, the cutaneous actuators 1104 may have a ramp up and ramp down interval that is within a threshold interval (e.g., 1 ms). This is the time required for the cutaneous actuators 1104 to go from a state of non-activation to a state of full activation. As noted above, the cutaneous actuators 1104 may be of many types, including voice coils, linear resonant actuators (LRAs), eccentric rotating mass actuators, piezoelectric actuators, electroactive polymer actuators, shape memory alloy actuators, pneumatic actuators, microfluidic actuators, and acoustic metasurface actuators, and so on. The actuator signal generated by the signal generator is such that the signal will activate the cutaneous actuators 1104 based on the type of the cutaneous actuators 1104, and may include both a signal as well as the power needed to drive the cutaneous actuator 1104. By providing a sequence of haptic outputs to the user, the haptic device 1102 is able to generate a pattern which can be recognized (i.e., sensed) by the receiving user and which allows for the user to discern information from the pattern. Additional details regarding generating this sequence of haptic outputs is described below with reference to FIGS. 11B through 11J.

Figure 11B:
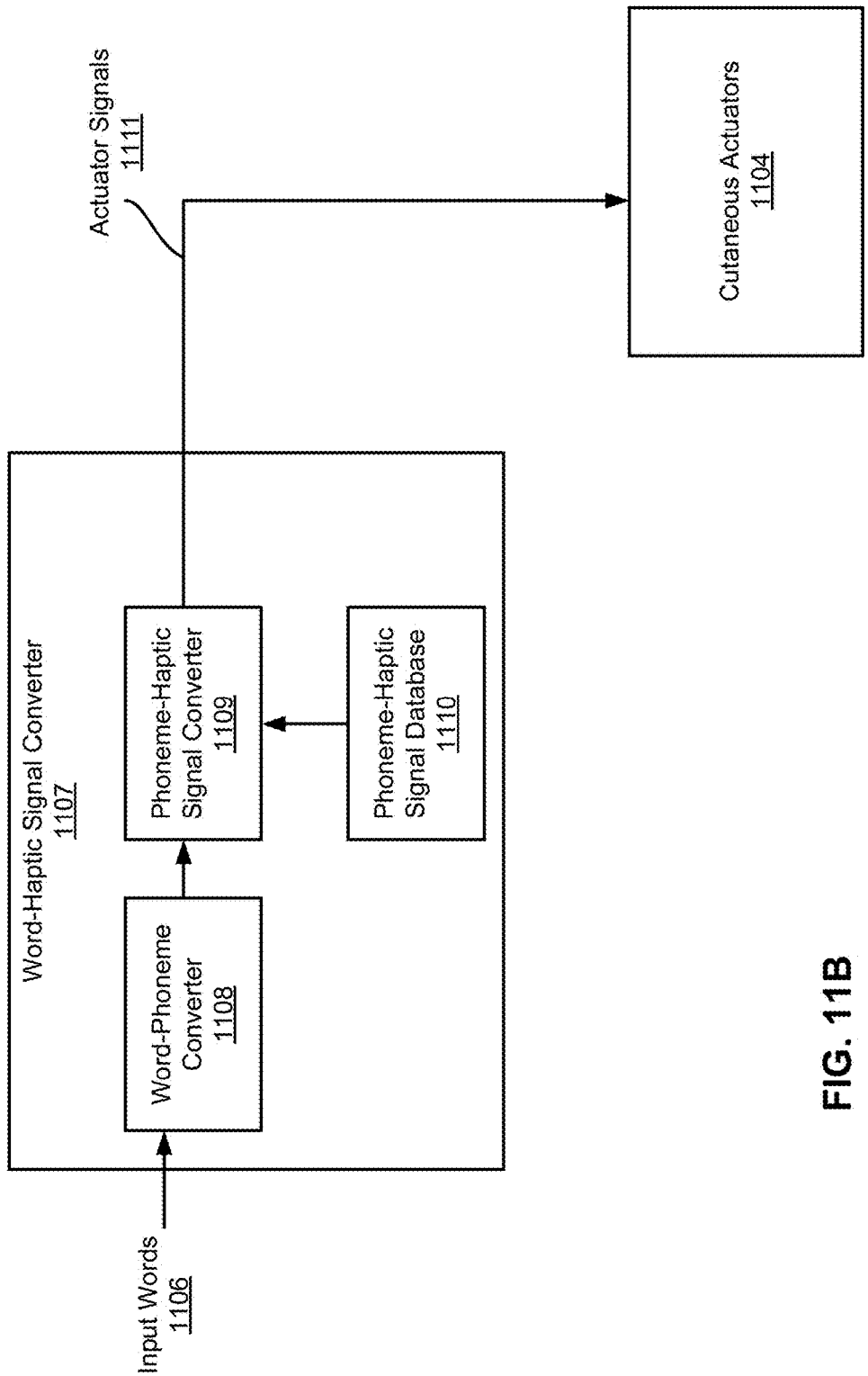
FIG. 11B is a block diagram illustrating the components of a system for converting input words to haptic illusion signals to activate the cutaneous actuators, according to an embodiment.
Figure 11C:
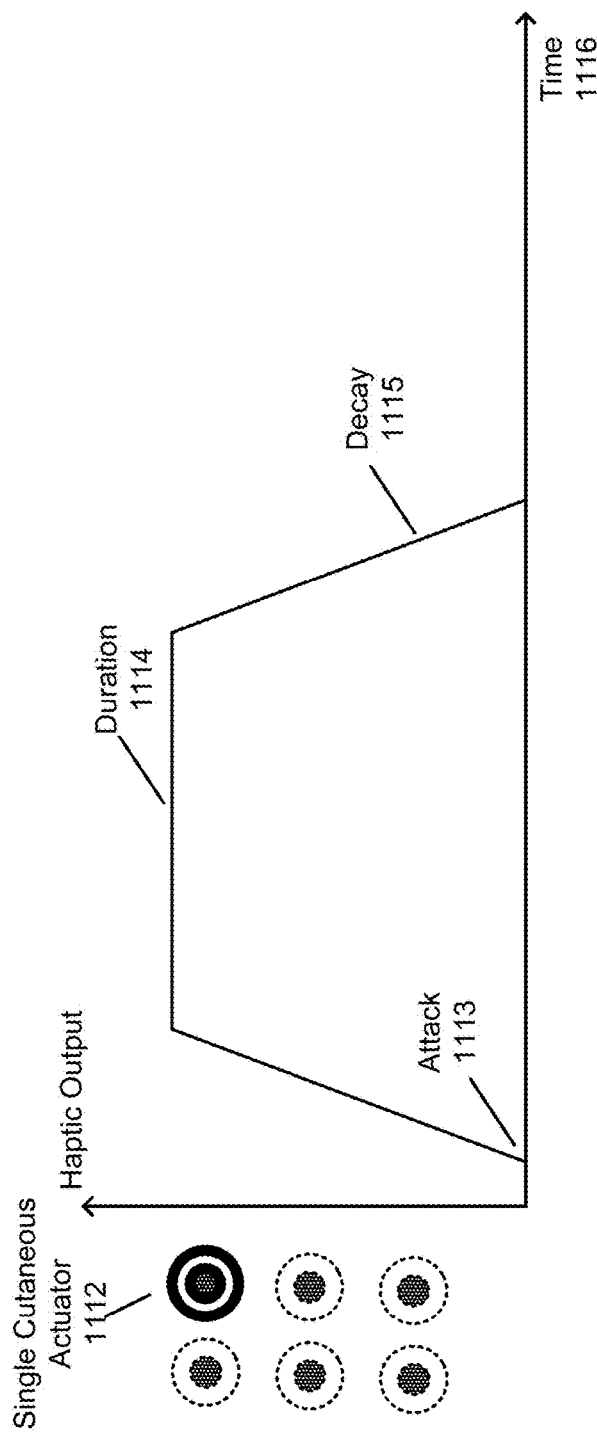
FIG. 11C illustrates an example of a haptic output for a single cutaneous actuator from a single haptic illusion signal, according to an embodiment.
Figure 11D:
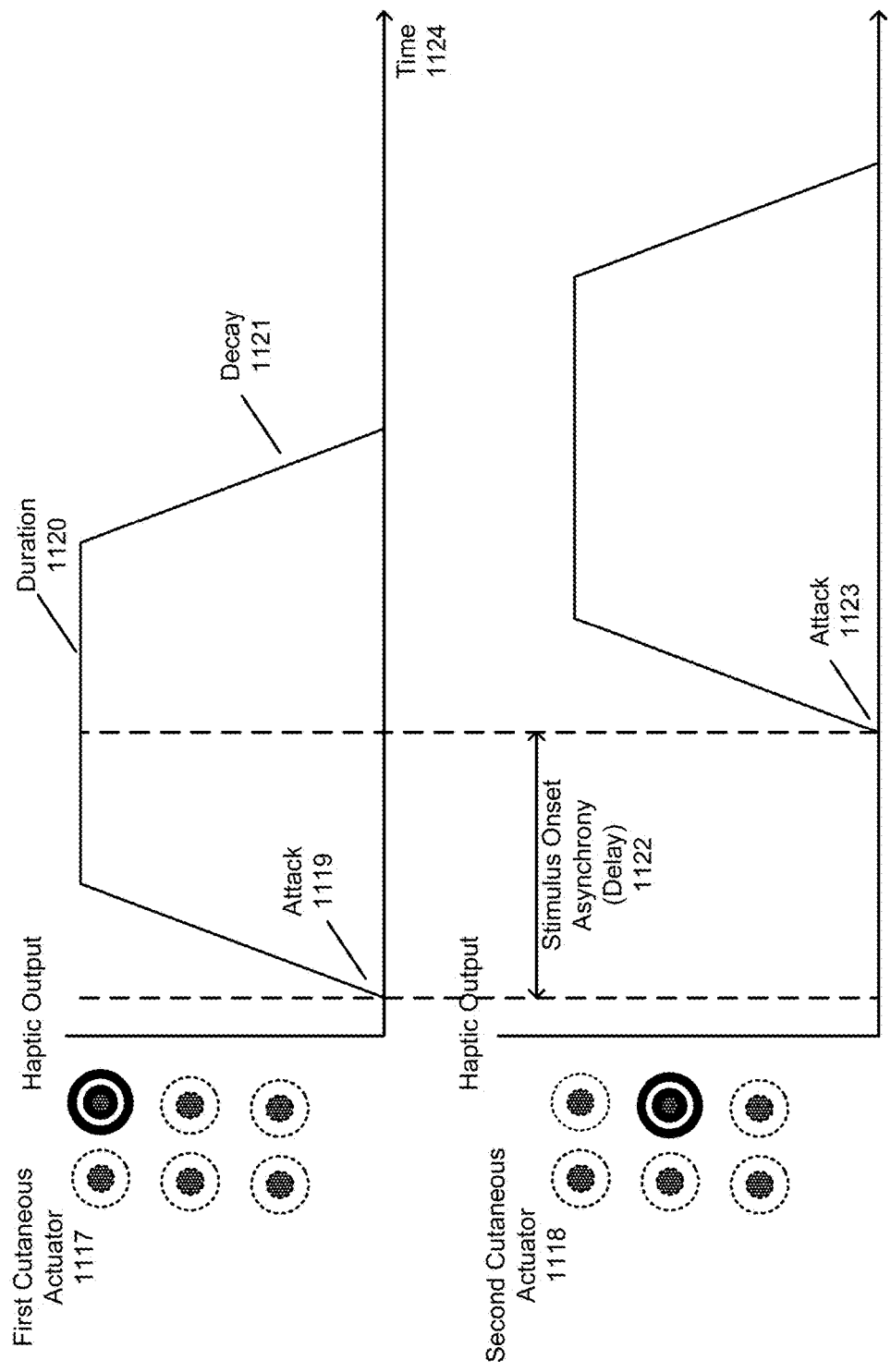
FIG. 11D illustrates an example of haptic outputs for two cutaneous actuators from a sequence of two haptic illusion signals, according to an embodiment.
Figure 11E:
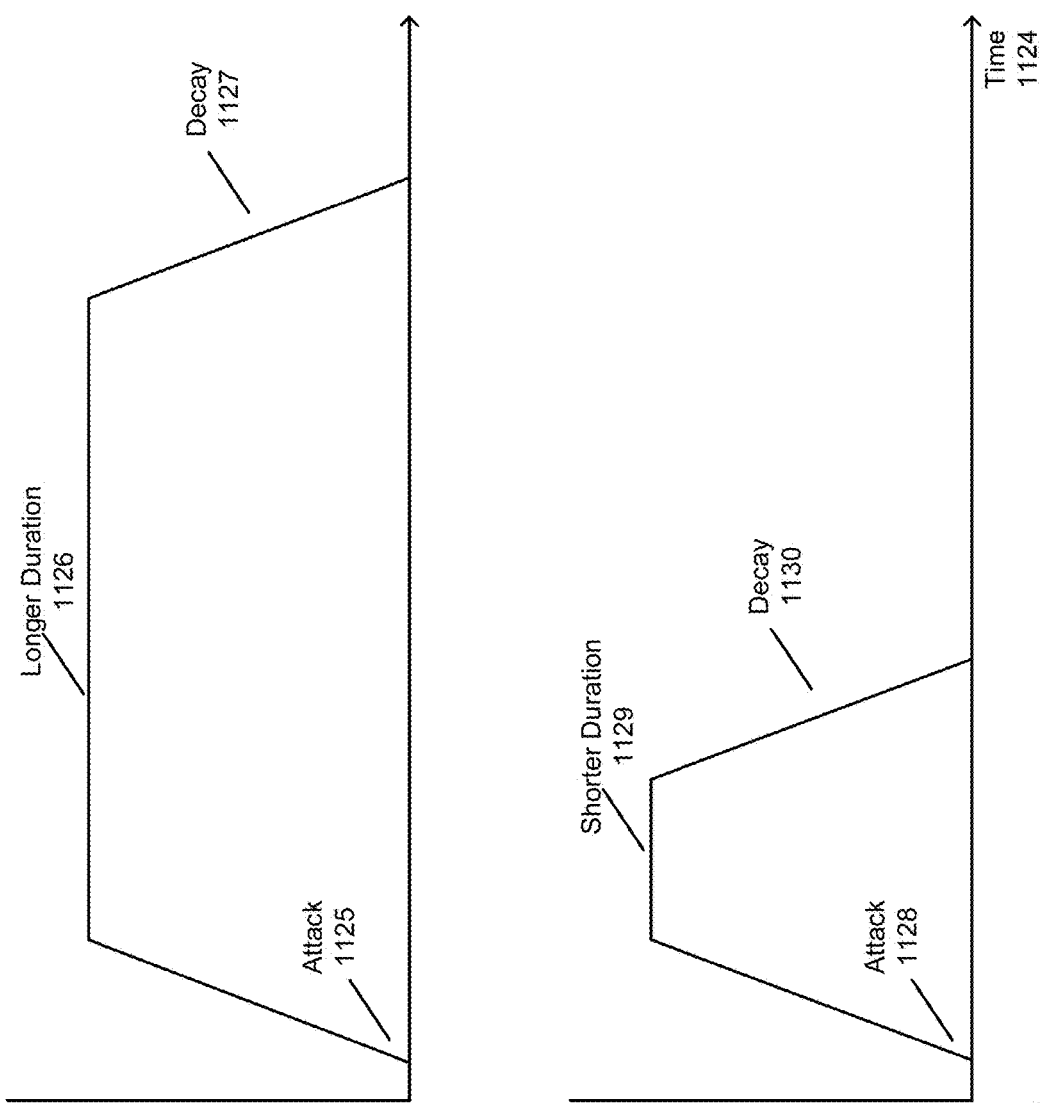
FIG. 11E illustrates an example of haptic outputs of different durations, according to an embodiment.
Figure 11G:
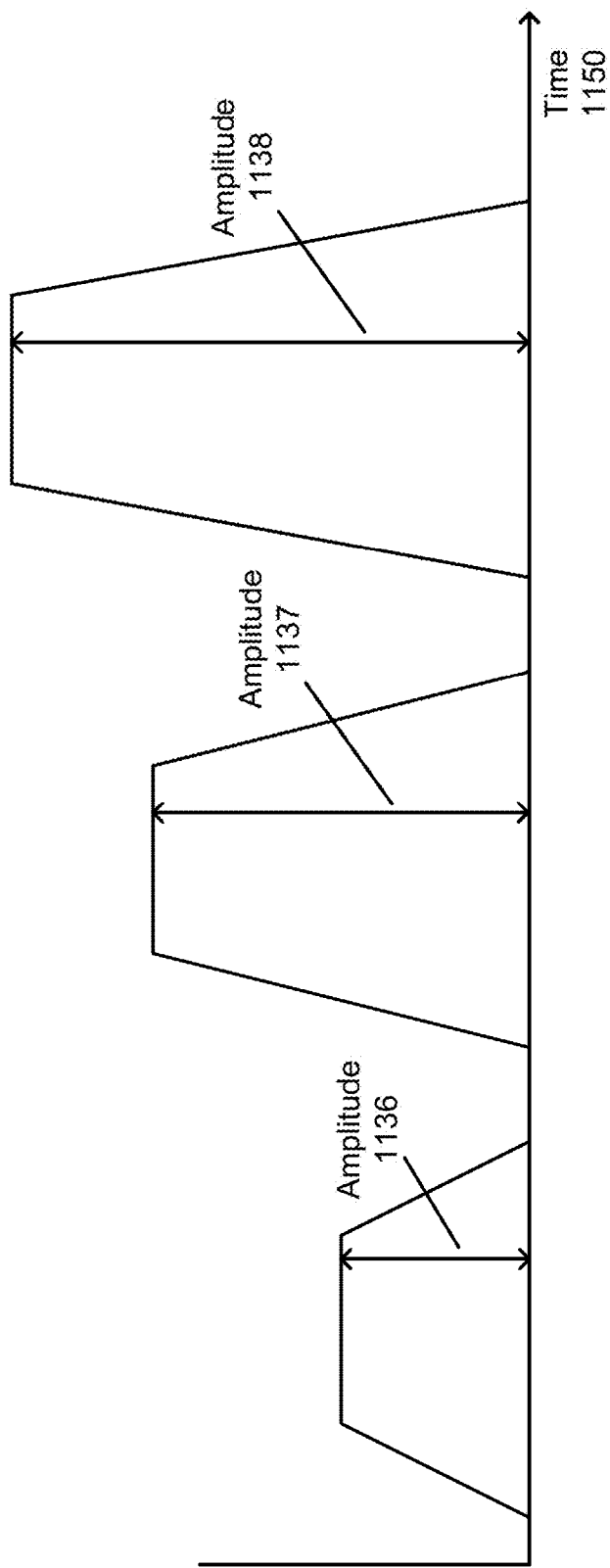
FIG. 11G illustrates an example of haptic outputs of different amplitudes, according to an embodiment.
Figure 11H:
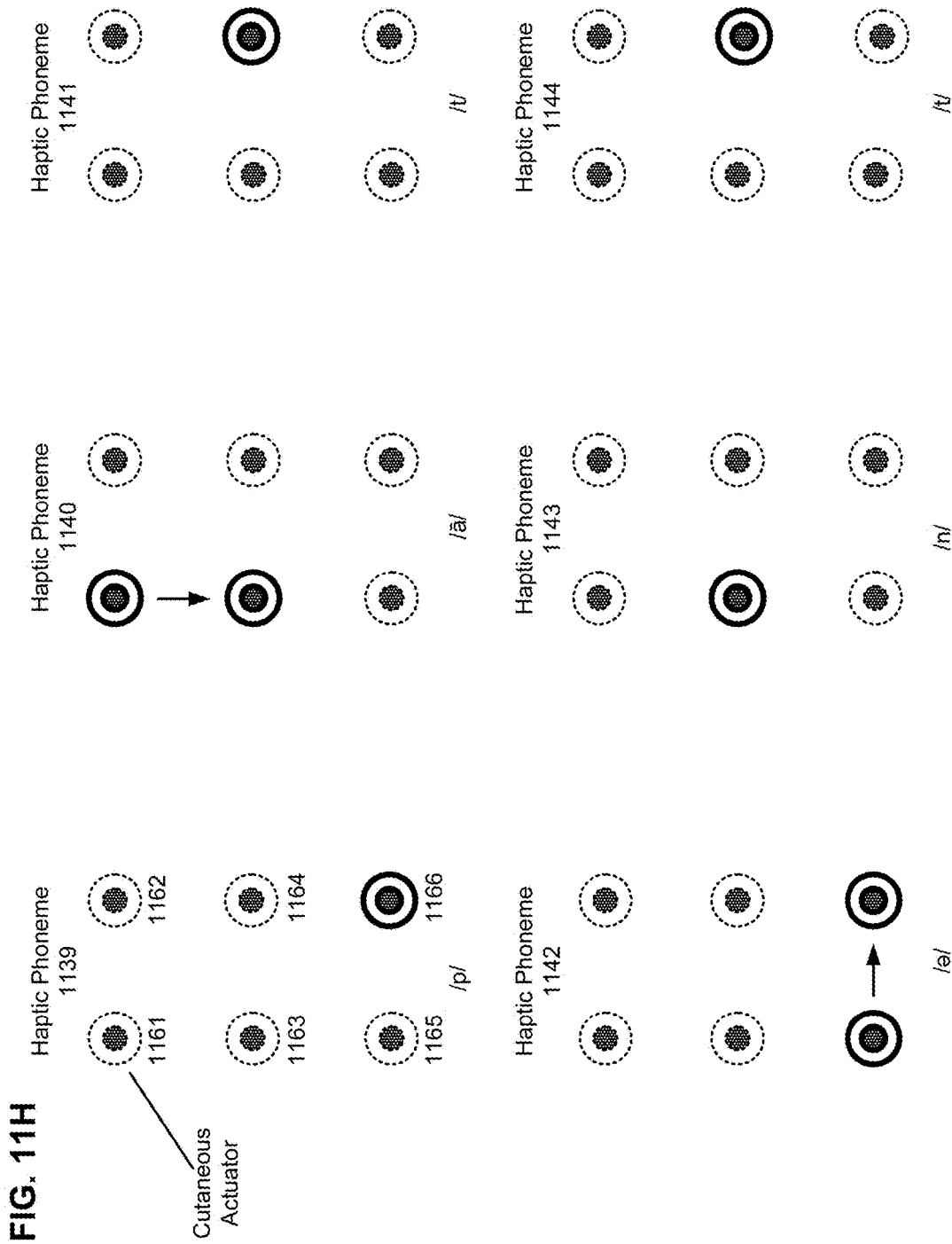
FIG. 11H illustrates exemplary sequence of haptic outputs for an example input word, according to an embodiment.

Although a two by six array of cutaneous actuators 1104 is shown in FIGS. 11C, 11D and 11H, this configuration is simply for the purposes of illustration and in other embodiments the array of cutaneous actuators 1104 may include fewer or more cutaneous actuators 1104 and may be arrayed in a different fashion (e.g., three by six). The cutaneous actuators 1104 may be arranged in a non-regular pattern that differs from the regular pattern shown in FIGS. 11C, 11D, and 11H. Instead, the arrangement of the cutaneous actuators 1104 may be arbitrary.

In one embodiment, the cutaneous actuators 1104 each include a single rubber tip 1105 which may contact the skin. Each rubber tip 1105 may contact the user's skin when the respective cutaneous actuator 1104 generates a haptic output. This may occur because the cutaneous actuator 1104 pushes the rubber tip 1105 towards the user's skin. When the rubber tip 1105 contacts the user's skin, this causes the user to feel a sensation (e.g., a touch sensation). The rubber tip 1105 may reduce the contact area of the cutaneous actuators 1104 with the skin and focus the haptic output provided by the cutaneous actuators 1104. They may have a diameter of 1 cm.

FIG. 11B is a block diagram illustrating the components of a system for converting input words 1106 to actuator signals 1111 to activate the cutaneous actuators 1104, according to an embodiment. These components may be stored as computer readable instructions in memory, such as the memory 813. In another embodiment, these components are separately implemented using dedicated hardware, including a processor and memory.

The input words 1106 are words in any spoken language, such as English. Thus, as the input words 1106 can be spoken, the input words 1106 may be converted into phonemes, which may, for example, be represented by the International Phonetics Alphabet (IPA). For example, the word "language" may be translated to the sequence of phonemes "|'læŋgwɪdʒ |."

The word-haptic signal converter 1107 is a deterministic finite state machine which accepts the input words 1106 and outputs a unique sequence of output actuator signals 1111 for every sequence of non-homonymic input words 1106. If two sequence of input words 1106 are homonyms of each other, then the word-haptic signal converter 1107 would generate the same sequence of actuator signals 1111 for both sequences. The word-haptic signal converter 1107 includes a word-phoneme converter 1108, a phoneme-haptic signal converter 1109 and a phoneme-haptic signal database 1110. In one embodiment, the word-phoneme converter 1108 may be a component in a signal generator, such as signal generator 800.

The word-phoneme converter 1108 converts the input words into sequences of phonemes. The output of the word-phoneme converter 1108 may be in the form of a standard phonetic alphabet, such as the IPA, or may be in another format, such as a compressed phonetic alphabet compressed to have a number of phonetic symbols representing phonemes in the corresponding language of the input words 1106 that corresponds to the total number of phonemes available in that language. The word-phoneme converter 1108 may convert words to phonemes based on a word-phoneme sequence database, or using a set of rules to convert letters to sounds. These rules consider the context of letters within an input word 1106 to generate an approximate phonetic spelling of the word. In some cases, an input word 1106 may be composed of multiple individual words, and while the input word 1106 has no correspondence in the word-phoneme sequence database, the individual subparts do. The word-phoneme converter 1108 may search an input word 1106 which is not recognized in the word-phoneme sequence database for sub-parts that are recognized, and if recognized, the word-phoneme converter 1108 may convert the individual sub-parts to their phonetic counterparts.

The phoneme-haptic signal converter 1109 converts the phonemes received from the word-phoneme converter 1108 to actuator signals 1111 using the phoneme-haptic signal database 1110. For each phoneme received from the word-phoneme converter 1108, the phoneme-haptic signal converter 1109 accesses the phoneme-haptic signal database 1110 to determine the corresponding sequence of actuator signals 1111 to output. In one embodiment, each phoneme has a single corresponding sequence of actuator signals 1111 stored in the phoneme-haptic signal database. However, in other embodiments, the actuator signals 1111 corresponding to a phoneme depend upon other phonemes surrounding a phoneme in a word. In such a case, the phoneme-haptic signal converter 1109 may search for a phoneme in the phoneme-haptic signal database 1110, but also search for the phoneme with its immediately preceding phoneme, its immediately following phoneme, and a sequence including the immediately preceding phoneme, the phoneme itself, and the immediately following phoneme. If the phoneme-haptic signal converter 1109 identifies multiple matches in the phoneme-haptic-signal database 1110, the phoneme-haptic signal converter 1109 may select one based on priority rules for that phoneme, or may use default rules, such as selecting first the match that matches all three phonemes, then the match that matches the phoneme and its preceding phoneme, and then the match that matches the phoneme and the following phoneme, and so on. For example, the word apple has the phonetic translation of "æp ə l," which comprises the phonemes "ae," "p," "ah," and "l." In this case, a match in the phoneme-haptic signal database 1110 may indicate that the phoneme "p" preceded by "ae" should result in a different corresponding sequence of actuator signals 1111 than the phoneme "p" in any other scenario. In that case, the different actuator signal is selected by the phoneme-haptic signal converter 1109 for output in correspondence with detecting the "p" phoneme.

Note that the sequence of actuator signals 1111 that are generated are not just patterned based on which cutaneous actuators 1104 to activate in sequence. Instead, the sequence of actuator signals 1111 may also be patterned such that each actuator signal 1111 in the sequence may have a different duration, vibrational frequency, and so on. In addition, the absence of a actuator signal 1111, combined with other actuator signals 1111, may also indicate a particular sequence that corresponds to a phoneme. Thus, the duration of signals, frequency, and the lack of signals, may all contribute to different sequences of actuator signals 1111 that represent different phonemes. Additionally, the actuator signals 1111 may not simply be binary (e.g., on and off) but may be variable instead, allowing the haptic output of the cutaneous actuators 1104 to vary in intensity, and allowing haptic outputs that follow complex patterns and waveforms.

The actuator signals 1111 output by the word-haptic signal converter 1107 are transmitted to the cutaneous actuators 1104. Each actuator signal 1111 activates one of the cutaneous actuators 1104 for a duration of time (and in some embodiments, for a particular intensity, frequency, and so on). At the point when the cutaneous actuator 1104 receives its actuator signal 1104, it activates. When the same actuator signal 1111 ceases, the cutaneous actuator 1104 deactivates. Alternatively, the actuator signals 1111 are digital in that they transmit a specified duration and start time (and the other factors described above, such as frequency) for a specified cutaneous actuator 1104. This digital signal is converted by a processor or by the cutaneous actuators 1104 themselves, and subsequently the corresponding cutaneous actuator 1104 activates according to the specifications in the digital signal. A sequence of these actuator signals 1111 can generate a unique pattern that can be recognized and distinguished by a user from other sequences of actuator signals 1111. In this fashion, the phonemes of the input words 1106 may be converted into haptic sensations via the word-haptic signal converter 1107.

Note that the word-haptic signal converter 1107 may also be able to generate sequences of actuator signals 1111 for non-word input, such as punctuation, numbers, symbols, and other text elements which may be used in the language. The sequences of actuator signals for these elements may also be stored in the phoneme-haptic signal database 1110.

A set of examples of particular actuator signals 1111 and a description of an example correspondence between phonemes and actuator signals are described below with reference to FIGS. 11C through 11I.

FIG. 11C illustrates an example of a haptic output for a single cutaneous actuator from a single actuator signal, according to an embodiment. In the illustrated example, the haptic output is generated by a single cutaneous actuator 1112 following the input of a single actuator signal. A single actuator signal is the smallest unit of a actuator signal 1111 that, by itself, is able to cause a change in the cutaneous actuators 1104 when transmitted to the cutaneous actuators 1104. In one embodiment, the haptic output caused by the single actuator signal is represented by the graph in FIG. 11C, which plots an intensity of the haptic output, whether it be force, vibration, pressure, or any of the other types of sensations described above, versus time 1106. In this embodiment, the single haptic output has an attack 1113, duration 1114, and a decay 1115. The attack 1113 occurs where the intensity of the haptic output "ramps up" or increases. In the case where the haptic output is a force-based output by the single cutaneous actuator 1112, the attack 1113 indicates that the force does not increase to a maximum level instantaneously, but that the increase to the maximum intensity level occurs over a period of time. After the maximum intensity level (as specified by the actuator signal 1111) is reached, the maximum intensity level is maintained for a duration 1114. This duration may also be specified by the actuator signal 1111. Subsequently, the actuator signal 1111 indicates that the intensity should return to a baseline, such as zero. Thus, the haptic output enters a decay 1115, where a time interval exists between the intensity of the haptic output at the maximum level and the intensity of the haptic output reaching the baseline value. In one embodiment, this single haptic output represents a consonant phoneme of an input word 1106. Thus, if a consonant phoneme is encountered in an input word, the corresponding actuator signal 1111 which is outputted causes a corresponding single cutaneous actuator to generate a haptic output that may be similar to the one shown in FIG. 11C, i.e., a single activation of a specified duration and to a maximum intensity level.

FIG. 11D illustrates an example of haptic outputs for two cutaneous actuators from a sequence of two actuator signals, according to an embodiment. While FIG. 11C illustrated a single actuator signal that caused a single cutaneous actuator to generate a haptic output, FIG. 11D illustrates a sequence of two actuator signals that cause each of the two different cutaneous actuators to generate a haptic output. Each actuator signal is transmitted to a different cutaneous actuator 1104. In the illustrated example, one of the actuator signals is transmitted to the first cutaneous actuator 1117, and another of the actuator signals is transmitted to the second cutaneous actuator 1118 (with the selected cutaneous actuator indicated by a bolded outline). The two actuator signals are modulated such that the haptic output for the first cutaneous actuator 1117 occurs temporally prior to the haptic output for the second cutaneous actuator 1118. The attack 1123 portion of the haptic output for the second cutaneous actuator 1117 occurs temporally after the attack 1119 portion of the first cutaneous actuator by a stimulus onset asynchrony (SOA) 1122 delay period. In one embodiment, this SOA is 0.17×D+65, where D refers to the length of the duration 1120 of the haptic output for the first cutaneous actuator 1117 and both 0.17 and 65 are constants which modify the duration value. Thus, the SOA period is a function of the duration of the haptic output. The result of the two different haptic outputs occurring at two different cutaneous actuators is that the user experiences a motion between the two actuators that appears to be a smooth stroking motion between the two actuators, and specifically from the first cutaneous actuator 1117 to the second cutaneous actuator 1118.

In one embodiment, this "two point" haptic output represents a vowel phoneme of an input word 1106. Thus, if a vowel phoneme is encountered in an input word, the corresponding sequence of actuator signals 1111 which is outputted causes two different cutaneous actuators to generate two different haptic outputs separated by a temporal delay that may be similar to the one shown here in FIG. 11D.

FIG. 11E illustrates an example of haptic outputs of different durations, according to an embodiment. In addition to the single and two point haptic outputs shown in FIG. 11C and FIG. 11D, respectively, where the duration shown for the haptic outputs is the same, in other embodiments the haptic output generated by a cutaneous actuator 1104 from a actuator signal 1111 can be of different durations. For example, as illustrated in FIG. 11E, one of the haptic outputs with attack 1125 and decay 1127 has a longer duration 1126 (e.g., 400 ms) where the intensity of the haptic output is at a maximum level (i.e., after the attack 1125 and before the decay 1127), and the other haptic output with attack 1128 and decay 1130 has a relatively shorter duration 1129 (e.g., 150 ms) where the haptic output is at the maximum level. Like the single and two point haptic outputs, the haptic outputs illustrated in FIG. 11E with different durations may be used to represent different phonemes of the input words 1106. For example, while a two point haptic output may represent a short vowel phoneme, while a two point haptic output with each haptic output having longer duration may be used to represent a long vowel phoneme.

FIG. 11F illustrates an example of haptic outputs of different frequencies, according to an embodiment. In addition to the single, two point, and different duration haptic output described above, in other embodiments the haptic output generated by a cutaneous actuator 1104 from a actuator signal 1111 can have a repeating pattern, such as a waveform, with the repetition of the pattern being at different frequencies. FIG. 11F illustrates a low frequency 1131 pattern and a high frequency 1133 pattern. The high frequency 1133 pattern repeats at a higher frequency than the low frequency pattern 1131. In the illustrated example, the duration 1132 of the low frequency pattern is also longer than the duration 1134 of the high frequency 1133 pattern, however, this does not always need to be the case. If the haptic output is a vibration that can be represented as a waveform, then the duration of each pattern in the waveform can be considered a wavelength, and the maximum intensity of the haptic output can be considered the maximum amplitude. Furthermore, although a single maximum intensity level for the haptic output is illustrated for both the low frequency 1131 and high frequency 1133 haptic outputs, in other embodiments the amplitude can be variable and may differ depending on the frequency, and may further differ over time.

In one embodiment, the different frequencies of haptic output may be targeted towards different sensory cells in the user's skin. In one embodiment, the higher frequency haptic outputs (e.g., 250 Hz), such as the high frequency 1133 haptic output, are targeted towards Pacinian corpuscle cells, while the low frequency haptic outputs (e.g., 30 Hz), such as the low frequency 1131 haptic output, are targeted towards Merkel cells. In such a case, the frequency of the high frequency 1133 haptic output is sufficiently high to trigger response in the Pacinian corpuscle cells and to avoid triggering the Merkel cells, whereas the low frequency 1131 haptic output is of a frequency that triggers the Merkel cells but not the Pacinian corpuscle cells. As Pacinian corpuscle cells (also known as Lamellar corpuscle cells) are sensitive to vibration, while Merkel cells are sensitive to general touch, different types of haptic output can target different mechanoreceptor cells in the user's skin and be associated with different phonemes when converting the input words 1106 to actuator signals 1111 which are used to cause the cutaneous actuators 1104 to generate the haptic outputs.

In one embodiment, the low frequency 1131 and high frequency 1133 haptic outputs are generated by a single cutaneous actuator of the cutaneous actuators 1104, but with a linear offset between the two haptic outputs, which may cause a difference between the phase of the two different haptic outputs. Thus, the haptic output of the single cutaneous actuator may appear to resemble a summation of the high frequency 1133 and low frequency 1131 haptic outputs, but with an offset between the low frequency 1131 and high frequency 1133 haptic outputs (e.g., 10% of the duration or frequency). Despite having combined the two haptic outputs, because the user's skin senses the high and low frequency haptic outputs using different cells, there may be little ambiguity when the user senses the haptic output and thus the user may be able to easily distinguish the two different frequencies in the haptic output. The different frequencies of haptic output may represent different phonemes in the input words 1106. For example, high frequency haptic output may represent digraphs (e.g., "/ʒ/ or zh) while the low frequency haptic output may represent certain consonants.

FIG. 11G illustrates an example of haptic outputs of different amplitudes, according to an embodiment. In addition to the various haptic output types shown above, in other embodiments the haptic output generated by a cutaneous actuator 1104 from a actuator signal 1111 can be of different intensities, otherwise known as amplitudes. For example, as illustrated in FIG. 11G, the three different haptic outputs have amplitudes 1136, 1137, and 1138. These haptic outputs with different amplitudes may be used to represent different phonemes or sounds of the input words 1106. For example, a larger amplitude of haptic output may represent an emphasis, end of sentence, punctuation mark, or so on, while a smaller amplitude may represent normal speech.

While certain types of haptic outputs have been described above with reference to FIGS. 11C through 11G, in other embodiments additional haptic output types may be generated by the cutaneous actuators 1104. Furthermore, the haptic outputs described above may represent more than just phonemes, and may represent numbers, punctuation marks, tone of voice, musical notes, audio cues, and so on. In addition, the sequences haptic outputs described above may be generated by more than one cutaneous actuator 1104 to represent a single phoneme or other element.

FIG. 11H illustrates exemplary sequence of haptic outputs for an example input word 1106, according to an embodiment. In the illustrated example, the input word 1106 is "patent." This word has 6 different phonemes: 1) /p/, 2) /ā/, 3) /t/, 4) /ə /, 5) /n/, and 6) /t/. Note that the second and fourth phonemes are vowels. The word-haptic signal converter 1107 converts each of these phonemes into a sequence of actuator signals 1111, which are transmitted to the cutaneous actuators 1104, which generate a haptic output, such as a vibrational output, based on the actuator signals 1111 and which are sensed by the user. For ease of discussion, each of the sequence of haptic outputs associated with a phoneme is referred to as a haptic phoneme. Thus, the six phonemes of the word "patent" are translated into six haptic phonemes which are sensed by the user. After training, the user may be able to identify the word "patent" after sensing these six haptic phonemes. A similar process would occur for other words.

In the illustrated example of FIG. 11H, a 3×2 two dimensional array of cutaneous actuators 1161-1166 is represented by concentric circles, with each set of two concentric circles representing one cutaneous actuator. The cutaneous actuators 1161-1166 are labeled for haptic phoneme 1139, but are not repeatedly labeled for haptic phonemes 1140-1144 for clarity. However, the cutaneous actuators indicated in haptic phonemes 1140-1144 are the same as those in the same positions in haptic phoneme 1139. This two dimensional array of cutaneous actuators 1161 through 1166 may correspond to the two dimensional array of cutaneous actuators 1104 in FIG. 11A.

Each haptic phoneme 1139-1144 indicates a sequence of haptic outputs by this array of cutaneous actuators that corresponds to a phoneme of the input word "patent". Each single haptic output in a sequence of haptic outputs corresponds to activation of a cutaneous actuator, and is represented by a set of two solid concentric circles for that cutaneous actuator. In contrast, non-activated cutaneous actuators are represented by dotted concentric circles. Furthermore, a two point sequence of haptic outputs is represented by two sets of solid concentric circles, with an arrow in between the two sets indicating an activation of a first cutaneous activator which is located in a direction immediately opposite the direction of the arrow, followed by the activation of a second cutaneous actuator which is indicated in a direction immediately following the direction of the arrow. The two point sequence of haptic outputs may be similar to the sequence described above with reference to FIG. 11D. For example, for haptic phoneme 1140 for the phoneme "/ā/" is indicated by the activation of the cutaneous actuator 1161 followed by the activation of the cutaneous actuator 1163 (after a delay period).

The sequences of haptic outputs for each haptic phoneme may be separated from each other by a delay period with no haptic output (e.g., of 200 ms), or by a special delimiter haptic output (e.g., all actuators activate at the same time for an interval of time).

In the illustrated example, 1) /p/ corresponds to the haptic phoneme 1139 and activation of the cutaneous actuator 1166, 2) /ā/ corresponds to the haptic phoneme 1140 and activation of the cutaneous actuator 1161 followed by 1163, 3) /t/ corresponds to the haptic phoneme 1141 and activation of the cutaneous actuator 1164, 4) /ə / corresponds to the haptic phoneme 1142 and activation of the cutaneous actuator 1165 followed by 1166, 5) /n/ corresponds to the haptic phoneme 1143 and activation of the cutaneous actuator 1163, and 6) the second /t/ corresponds to the haptic phoneme 1144 and activation of the cutaneous actuator 1164 (same as the first /t/).

The correspondence between each haptic phoneme and phoneme may be selected based on articulation association. This means that a correspondence is made between the physical location of the haptic output of each haptic phoneme in the two dimensional array of cutaneous actuators and the location of articulation of the corresponding phoneme when spoken by a human. For example, the phoneme /p/ is the voiceless bilabial stop, which corresponds to an articulation of the user's lips. This may correspond to a location in the two dimensional array of cutaneous actuators representing the front of a user's mouth. In the illustrated example, this is cutaneous actuator 1166, which is activated in response to the phoneme /p/. The sequences of haptic outputs for the remaining haptic phonemes may be constructed similarly.

Furthermore, in one embodiment, the duration of haptic output for consonant phonemes may be shorter than that of vowel phonemes. This may occur either due to the shorter duration for each activation of a cutaneous actuator for a consonant phoneme versus a vowel phoneme, or due to the vowel phoneme using a two point sequence of haptic output versus a single haptic output for a consonant phoneme. For example, a haptic output for a consonant phoneme may be of a duration of 180 ms, while a haptic output for a vowel phoneme may be of a duration of 270.5 ms. For consonant phonemes, the duration of the haptic output may be determined experimentally by starting at a baseline duration (e.g., 150 ms) and adding the time needed to "ramp up" and "ramp down" (as described above), which may be 20% of the duration time. For vowel phonemes, the duration of the haptic output may be determined based on a separate baseline (e.g., 100 ms), plus the ramp up and ramp down interval, and plus the SOA interval.

The illustrated array of cutaneous actuators may allow for a combination of 36 haptic phonemes, which includes all combinations of single haptic outputs (6) and two point haptic outputs (30). The two point haptic outputs are limited to those that 1) do not involve activation of a second cutaneous actuator which is diagonal from the first activated cutaneous actuator; and 2) which are short distance motions, i.e., the first and second activated cutaneous actuators are situated adjacent to each other. However, this may not represent the total number of phonemes in a language. In such a case, the number of cutaneous actuators may be increased to accommodate for the total number of phonemes. An example of such a combination of cutaneous actuators is shown and described with reference to FIG. 11I. Note that although a particular combination of haptic outputs are shown here for each phoneme, in other embodiments the combinations of haptic outputs to phonemes may differ.

FIG. 11I illustrates an alternate arrangement of haptic devices with arrays of cutaneous actuators, according to an embodiment. As noted above, in some cases there may be more phonemes or other speech elements that need to be represented via haptic output but an insufficient number of combinations of haptic outputs available with a particular array of cutaneous actuators. Additionally, in some cases the use of the entire available set of combinations of haptic outputs for an array of cutaneous actuators may be undesirable, as some combinations of haptic outputs may be too similar to other combinations, resulting in a high error rate (i.e., low disambiguation rate) for users of the haptic device. Thus, more cutaneous actuators may be needed in these scenarios. The device shown in FIG. 11I is an example of a device with additional cutaneous actuators. This device includes a forearm haptic device 1145 with two 4×2 array of cutaneous actuators 1146 on the dorsal side and the ventral side of the user's forearm, as well as an upper arm haptic device 1147 with a set of 4×2 array of cutaneous actuators 1148 on the dorsal side of the user's upper arm. The combination of these two haptic devices allows for 24 individual combinations of single haptic outputs (via the 24 individual cutaneous actuators), as well as a large combination of two point haptic outputs. This system supports a much larger number of haptic phonemes for translation of phonemes in input words 1106 to actuator signals 1111 and to haptic outputs in the cutaneous actuators.

In addition to the alternate haptic device shown in FIG. 11I, the cutaneous actuators used to deliver the haptic output could be attached to an arm band, body armor, gloves, a jacket, a shirt, vest, sole of a shoe, on a wearable device, on a smartphone, and so on, so long as the cutaneous actuators on these devices can deliver a haptic output to the user.

Figure 11J:
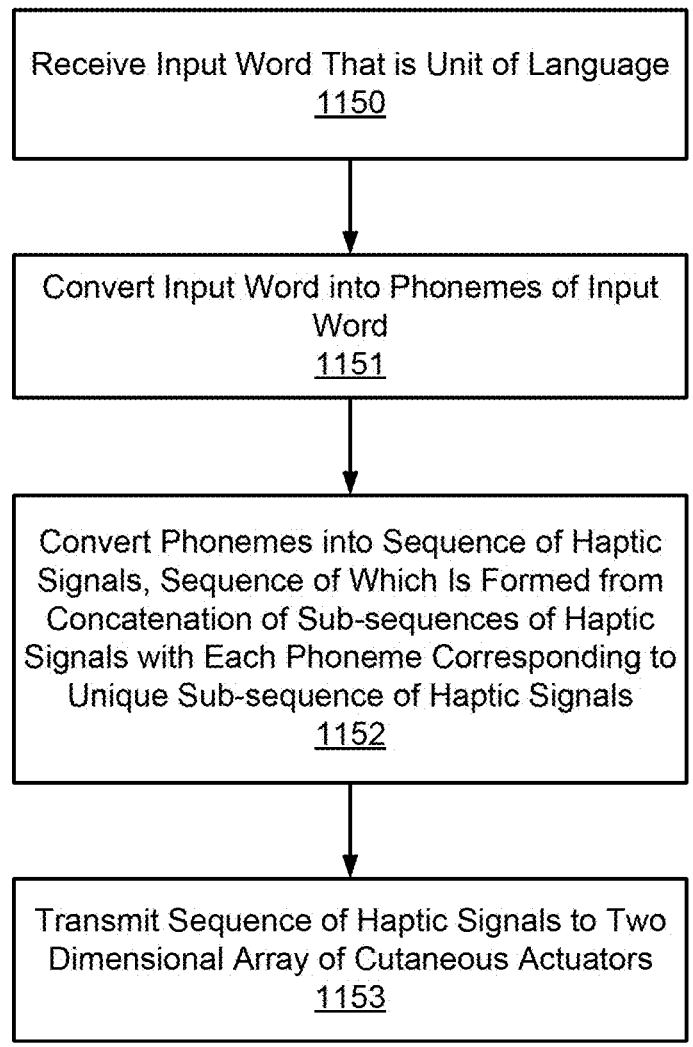
FIG. 11J is a flowchart illustrating a method of converting input words into haptic output based on phonemes, according to an embodiment.

FIG. 11J is a flowchart illustrating a method of converting input words into haptic output based on phonemes, according to an embodiment. The process described in the flowchart may be performed by the word-haptic signal converter 1107, which in turn may be a component of a signal generator that may be part of a haptic device. Although a particular arrangement of steps is shown here, in other embodiments the process may be arranged differently.

Initially, the word-haptic signal converter 1107 receives 1150 an input word which is a unit of a language, such as English. The word-haptic signal converter 1107 converts 1151 the input word into its component phonemes. For example, the word "apple" would be converted into the phonemes "ae," "p," "ah," and "l."

The word-haptic signal converter 1107 converts 1152 the phonemes into a sequence of actuator signals. This sequence is formed from a concatenation of sub-sequences of actuator signals. Each phoneme corresponds to one of these sub-sequences of actuator signals. Each of the actuator signals are mapped to a cutaneous actuator of a two dimensional array of cutaneous actuators placed on an interior surface of a harness shaped to wrap around a user's arm. The interior surface of the harness facing the user's arm when worn by the user.

The word-haptic signal converter 1107 transmits the sequence of actuator signals to the two dimensional array of cutaneous actuators. This causes the cutaneous actuators to activate in accordance with the sequence of actuator signals, and in turn, causes the user to sense a series of haptic outputs from the cutaneous actuators. If trained, the user may then be able to recognize the haptic outputs as phonemes of a word, and decipher the input word from the haptic outputs. In this fashion, a user may be able to recognize words haptically rather than aurally or visually.

Figure 11K:
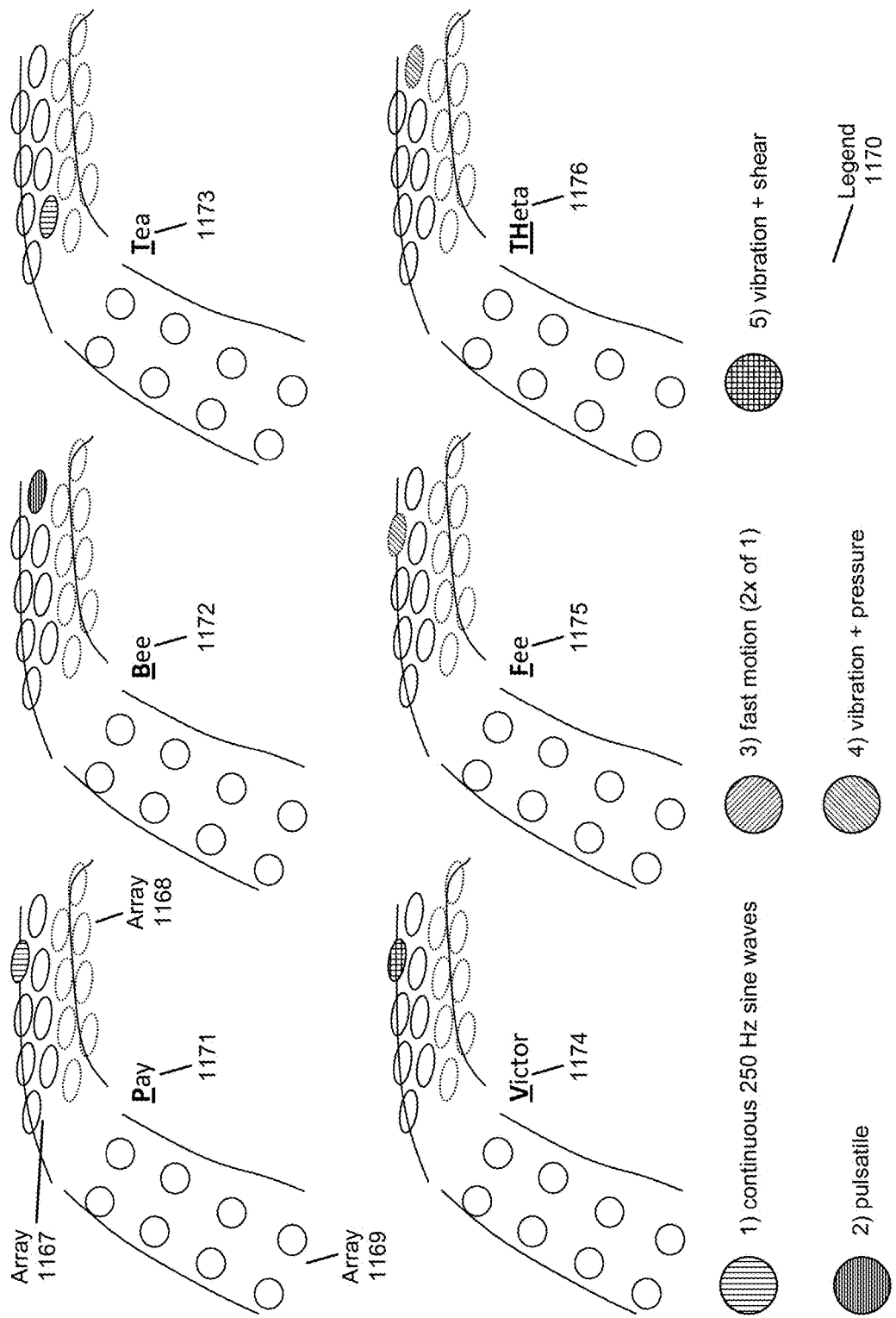
FIG. 11K illustrates an exemplary mapping of the phonemes "/p/," "/b/," "/t/," "/v/," "/f/,", and "/θ/," into sequences of haptic outputs, according to an embodiment.

FIG. 11K illustrates an exemplary mapping of the phonemes "/p/," "/b/," "/t/," "/v/," "/f/,", and "/θ/," into sequences of haptic outputs, according to an embodiment. In addition to the phonemes to haptic outputs shown in FIG. 11K, FIGS. 11L-11Q illustrate additional exemplary mappings between phonemes and haptic outputs. Additionally, FIGS. 11R-11T illustrate an exemplary rationale for the mapping of the phonemes to haptic outputs of FIGS. 11K-11Q based on place and manner of articulation. In FIGS. 11K-11Q, representations of a user's arm are shown. The arm includes multiple cutaneous actuators, represented by circles. As shown, an array 1167 of cutaneous actuators is present on the posterior ("back side") of the user's forearm, another array 1168 of cutaneous actuators is present on the anterior of the user's forearm, and yet another array 1169 of cutaneous actuators is present on the posterior of the user's upper arm. The location of these arrays of cutaneous actuators may correspond to those shown in FIG. 11I, with the arrays 1167 and 1168 corresponding to the cutaneous actuators in the forearm haptic device 1145, and the array 1169 corresponding to the cutaneous actuators of the upper arm haptic device 1147. Each array 1167-1169 includes a set of 4×2 (or 8 total) cutaneous actuators, with the cutaneous actuators arranged lengthwise along the user's arm, with each array having four rows of two cutaneous actuators each arranged along the proximal-distal axis of the user's arm.

FIG. 11K additionally illustrates a legend 1170. The legend 1170 indicates a type of haptic output corresponding to an illustrated fill pattern of some of the circles that represent the cutaneous actuators. A circle with a fill pattern indicates that the cutaneous actuator corresponding to the circle is by itself or in combination with other cutaneous actuators generating the type of haptic output indicated in the legend for that fill pattern. The indicated types of haptic outputs, as numbered in the legend 1170, are 1) a continuous 250 Hz sine wave output, 2) a pulsatile output, 3) a fast motion, 4) a vibration plus pressure, and 5) a vibration plus shear. The first listed type output, the continuous 250 Hz sine wave, corresponds to a sine wave movement at a cutaneous actuator of 250 Hz. This means that the cutaneous actuator changes the haptic output smoothly over time, in accordance with the shape of a sine wave. The (second listed) pulsatile output corresponds to a repeated pattern of activation to a specific activation position of a cutaneous actuator for a period of time, followed by a de-activation of the cutaneous actuator for a period of time. The activation and deactivation a similar to a square wave, in that the cutaneous actuator activates to the specified activation position as quickly as it is capable, and similarly deactivates as quickly as possible. As the cutaneous actuator may have a response time for activation and deactivation, the haptic output may not represent a perfect square wave, but rather a trapezoidal waveform. The fast motion output is similar to the output indicated in 1), but operates at twice the frequency, i.e., 500 Hz. Note that although 250 Hz and 500 Hz are indicated here, other frequencies may also be used instead. The vibration plus pressure output corresponds to an output that has both a vibratory sensation and a pressure sensation. The vibratory sensation may be achieved by a sine wave output similar to the output type 1) with a frequency above a threshold that could be perceived as vibration (e.g., exceeding 100 Hz) or with the output similar to the output type 2), or any other type of output that provides a rapid and continuous change to the haptic output that may be sensed as vibration. The pressure sensation is a sensation at the user's arm of a pressure that exceeds a normal pressure (i.e., where the cutaneous actuator is not activated). The pressure sensation may be achieved by having the cutaneous actuator activate beyond a threshold level, such that the cutaneous actuator applies a minimum level of pressure to the user's arm. The cutaneous actuator may apply this minimum pressure in addition to the output that generates the vibratory sensation. The vibratory sensation and the pressure sensation may be applied simultaneously or sequentially. The vibration plus shear output corresponds to an output that has a vibratory sensation and a shear sensation (which may be applied simultaneously or sequentially). The vibratory sensation may be similar or identical to the vibratory sensation described above for the vibration+pressure output. The shear sensation is a sensation of a movement that is tangential to the surface of the user's arm. This may be achieved by a smooth transition between activations of multiple cutaneous actuators, resulting in a sensation of a sliding movement along the path of the sequentially activated cutaneous actuators. Alternatively, a cutaneous actuator may be able to generate, by itself, a shear movement.

The haptic output indicated by the fill patterns for each of the depictions of the user's arms in FIGS. 11K-11Q correspond to a phoneme, which is shown as the underlined portion of the sample word that is adjacent to the respective arm. For example, phoneme 1171 is the phoneme "/p/" (using IPA notation). This phoneme is present in the pronunciation of the word "pay." Therefore, the word "pay" is shown, with the letter "p," corresponding to the phoneme "/p/," underlined. A similar method of indicating the phoneme is provided for the remaining phonemes illustrated in FIGS. 11K-11Q. Additionally, some of the phonemes shown in FIGS. 11K-11Q have arrows which indicate the sequence of activations of the cutaneous actuators that generate the sequence of haptic outputs that are mapped to each phoneme. In some cases, such as with the vibration plus shear output, multiple cutaneous actuators may be activated in sequence to generate the desired type of haptic output. In these cases, the arrows not only indicate the sequence of haptic outputs, but also how the specified type of haptic output is achieved. For example, in the case of vibration plus shear, the arrow indicates the direction of the shear sensation. Furthermore, when a sequence of cutaneous actuators are activated, one cutaneous actuator may deactivate before the activation of the next cutaneous actuator in the sequence, or the activations of each may overlap by a specified amount. For example, one cutaneous actuator may begin the process of deactivation while the next cutaneous actuator in sequence may begin the activation process. Additional details regarding the different sequences of haptic outputs corresponding to various phonemes are described below with reference to FIGS. 11K-11Q. Note that the IPA-transcribed phonemes described below for the sample words correspond to General American English pronunciation.

FIG. 11K illustrates examples of haptic outputs for the phonemes "/p/," "/b/," "/t/," "/v/," "/f/," and "/θ/." These are labeled, in the same order, as phonemes 1171-1176 in FIG. 11K. As noted above, the phonemes are labeled as an underlined portion of an exemplary word containing that phoneme. For example, phoneme 1176 uses the exemplary word "theta," with the "th" being underlined, corresponding to the phoneme "/θ/" (i.e. the voiceless dental fricative).

Thus, the phoneme 1171 or "/p/" is represented by a single activation of a cutaneous actuator using a continuous sine wave output (type 1) as shown, and corresponds to the "p" in the sample word "pay" as shown. The "/b/" phoneme 1172 is represented by a pulsatile output (type 2) of a single cutaneous actuator as shown, and corresponds to the "b" in "bee." The "/t/" phoneme 1173 is represented by a single cutaneous actuator with a continuous sine wave output (type 1) as shown, and corresponds to the "t" in "tea." The "/v/" phoneme 1174 is represented by a vibration plus shear output (type 6) with a single cutaneous actuator as shown, and corresponds to the "v" in "victor." The "/f/" phoneme 1175 is represented by a vibration plus pressure output (type 5) with a single cutaneous actuator as shown, and corresponds to the "f" in "fee." The "/θ/" phoneme 1176 by a vibration plus pressure output (type 5) with a single cutaneous actuator as shown, and corresponds to the "th" in "theta."

Figure 11L:
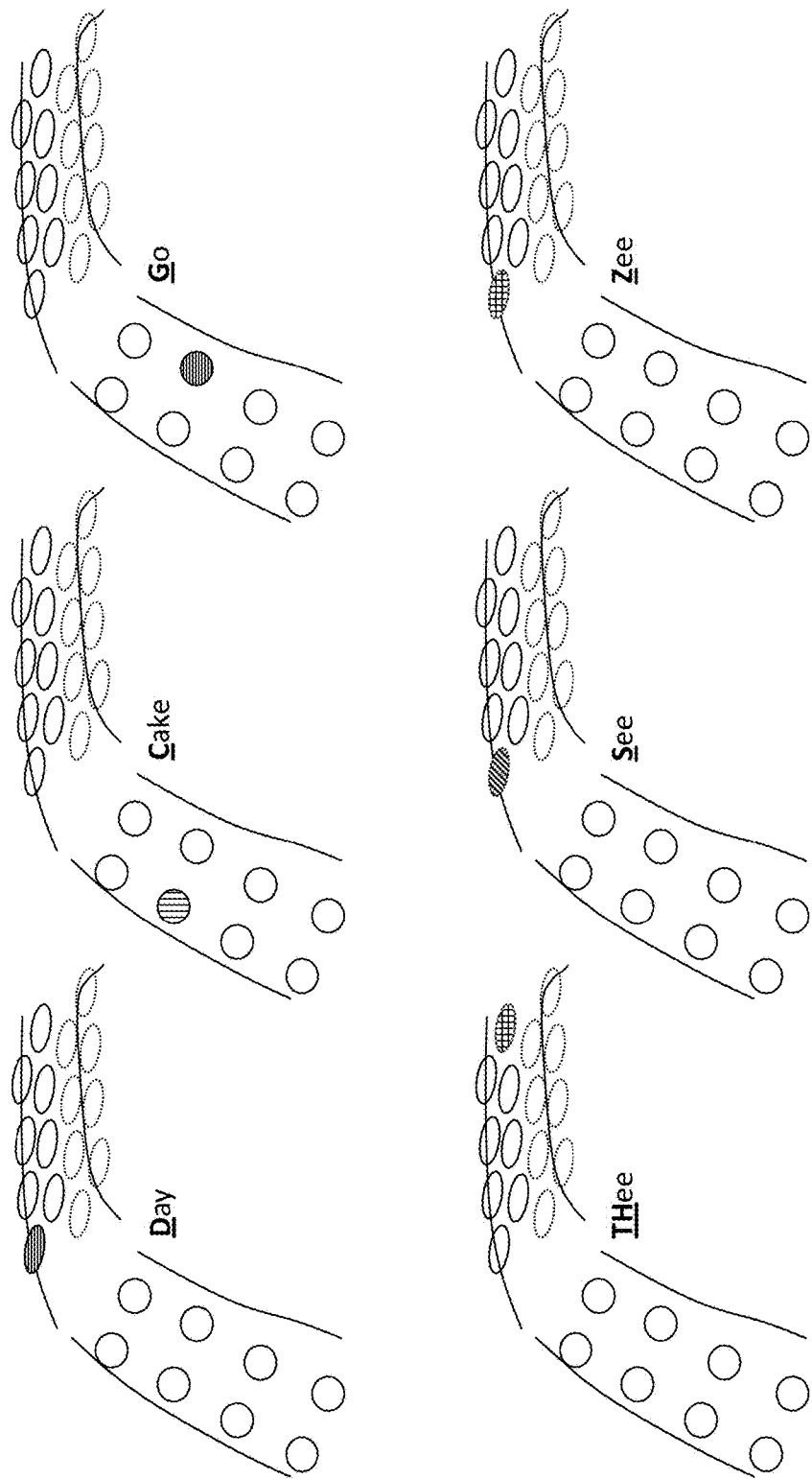
FIG. 11L illustrates examples of haptic outputs for the phonemes "/d/," "/k/," "/g/," "/ð/," "/s/," and "/z/," according to an embodiment.

FIG. 11L illustrates examples of haptic outputs for the phonemes "/d/," "/k/," "/g/," "/ð/," "/s/," and "/z/," according to an embodiment. As illustrated, the phoneme "/d/" corresponds to the "d" in "day," "/k/" to the "c" in "cake," "/g/" to the "g" in "go," "/ð/" (a voiced dental fricative) to the "th" in "thee," "/s/" to the "s" in "see," and "/z/" to the "z" in "zee." As with FIG. 11K, each phoneme is represented by a corresponding activation of one or more cutaneous actuators generating a haptic output of a type indicated by the fill pattern as shown. For clarity and brevity's sake, a description of the different haptic outputs will not be repeated here for each of the different phonemes for most of the remainder of the phonemes shown in FIGS. 11L-11Q, unless special distinction is needed. Instead, reference is made to the figure itself which describes the different types of haptic outputs corresponding to each phoneme.

Figure 11M:
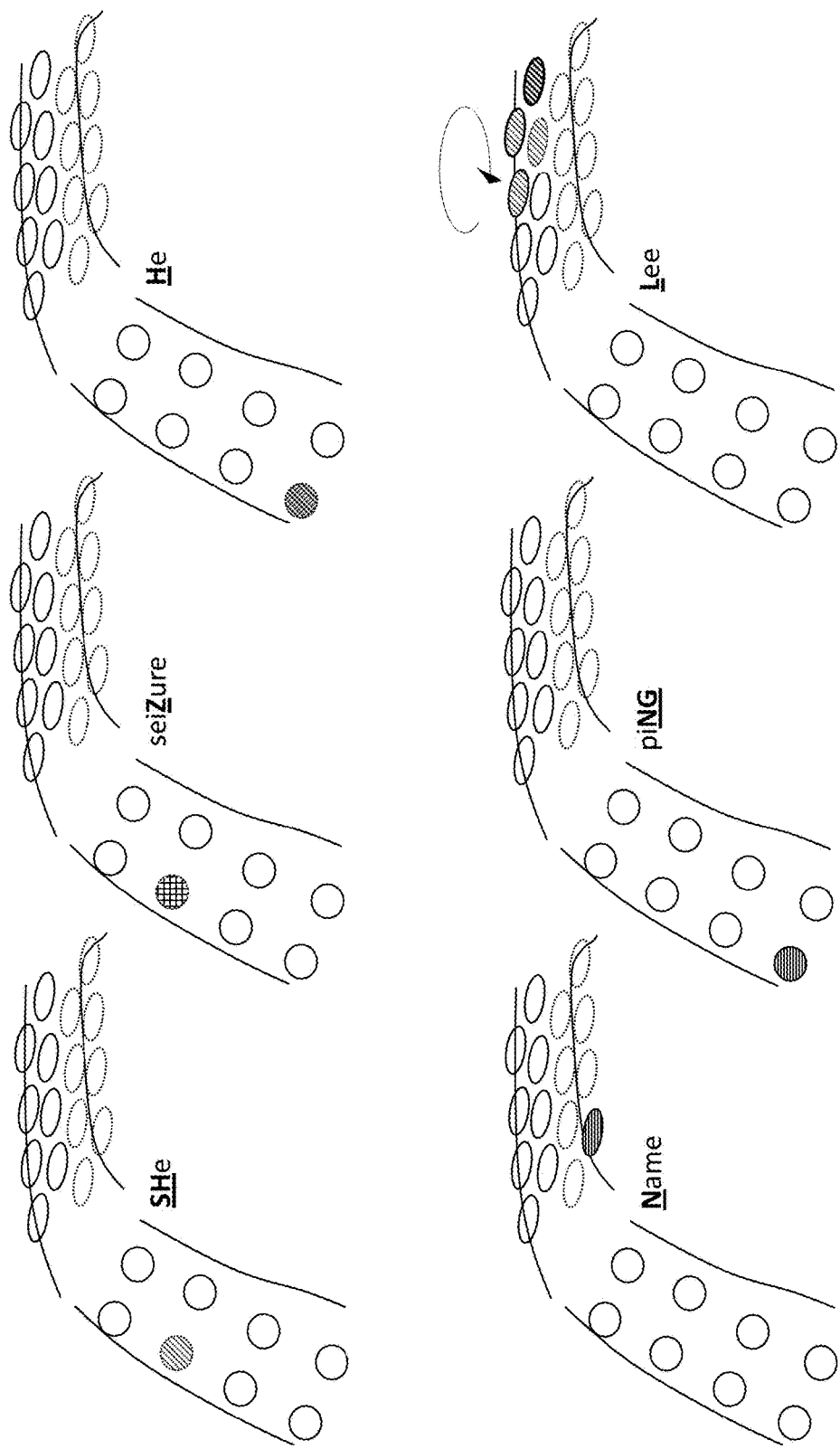
FIG. 11M illustrates examples of haptic outputs for the phonemes "/ʃ/," "/ʒ /," "/h/," "/n/," "/ŋ /," and "/l/," according to an embodiment.

FIG. 11M illustrates examples of haptic outputs for the phonemes "/ʃ/," "/ʒ/," "/h/," "/n/," "/ŋ/," and "/l/," according to an embodiment. As illustrated, the phoneme "/ʃ/" (a voiceless postalveolar fricative) corresponds to the "sh" in "she," "/ʒ/" (a voiced palatoalveolar sibilant fricative) to the "z" in "seizure," "/h/" to the "h" in "he," "/n/" to the "n" in "name," "/ŋ/" (a velar nasal) to the "ng" in "ping," and "/l/" to the "l" in "lee." As with FIG. 11K, each phoneme is represented by a corresponding activation of one or more cutaneous actuators generating a haptic output of a type indicated by the fill pattern as shown. Note that the phoneme "/l/" here corresponds to a haptic output that comprises sequential activation of four different cutaneous actuators, in the order shown by the circular arrow illustrated in FIG. 11M for the phoneme "/l/" and as represented by the sample word "lee."

Figure 11N:
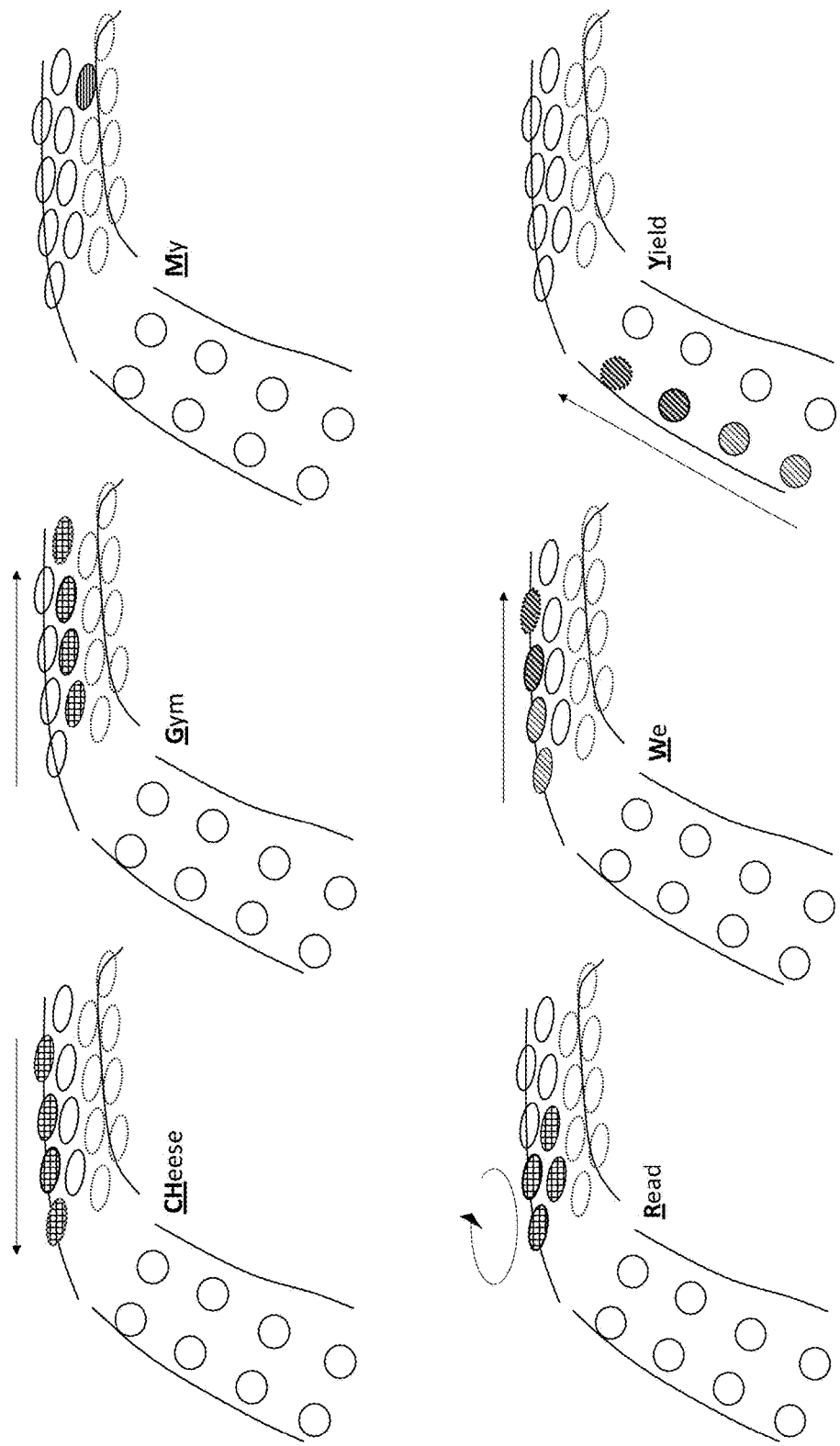
FIG. 11N illustrates examples of haptic outputs for the phonemes "/t͡ʃ/," "/d/," "/m/," "/ɹ /," "/w/," and "/j/," according to an embodiment.

FIG. 11N illustrates examples of haptic outputs for the phonemes "/t͡ʃ/," "/d/," "/m/," "/ɹ/," "/w/," and "/j/," according to an embodiment. As illustrated, the phoneme "/t͡ʃ/" (a voiceless palato-alveolar affricate) corresponds to the "ch" in "cheese," "/d/" to the "g" in "gym," "/m/" to the "m" in "my," "/ɹ/" (an alveolar approximant) to the "r" in "read," "/w/" to the "w" in "we," and "/j/" to the "y" in "yield." As with FIG. 11K, each phoneme is represented by a corresponding activation of one or more cutaneous actuators generating a haptic output of a type indicated by the fill pattern as shown. Note that the phonemes "/t͡ʃ/," "/d/," and "/w/," all correspond to haptic outputs of multiple cutaneous actuators as indicated by the straight arrow, with direction of activation sequence, shown above the illustrations of their haptic outputs as shown in FIG. 11N. For example, the phoneme "/d/" shows an activation of cutaneous actuators from the proximal to distal positions along a single column of cutaneous actuators, as shown.

Figure 11O:
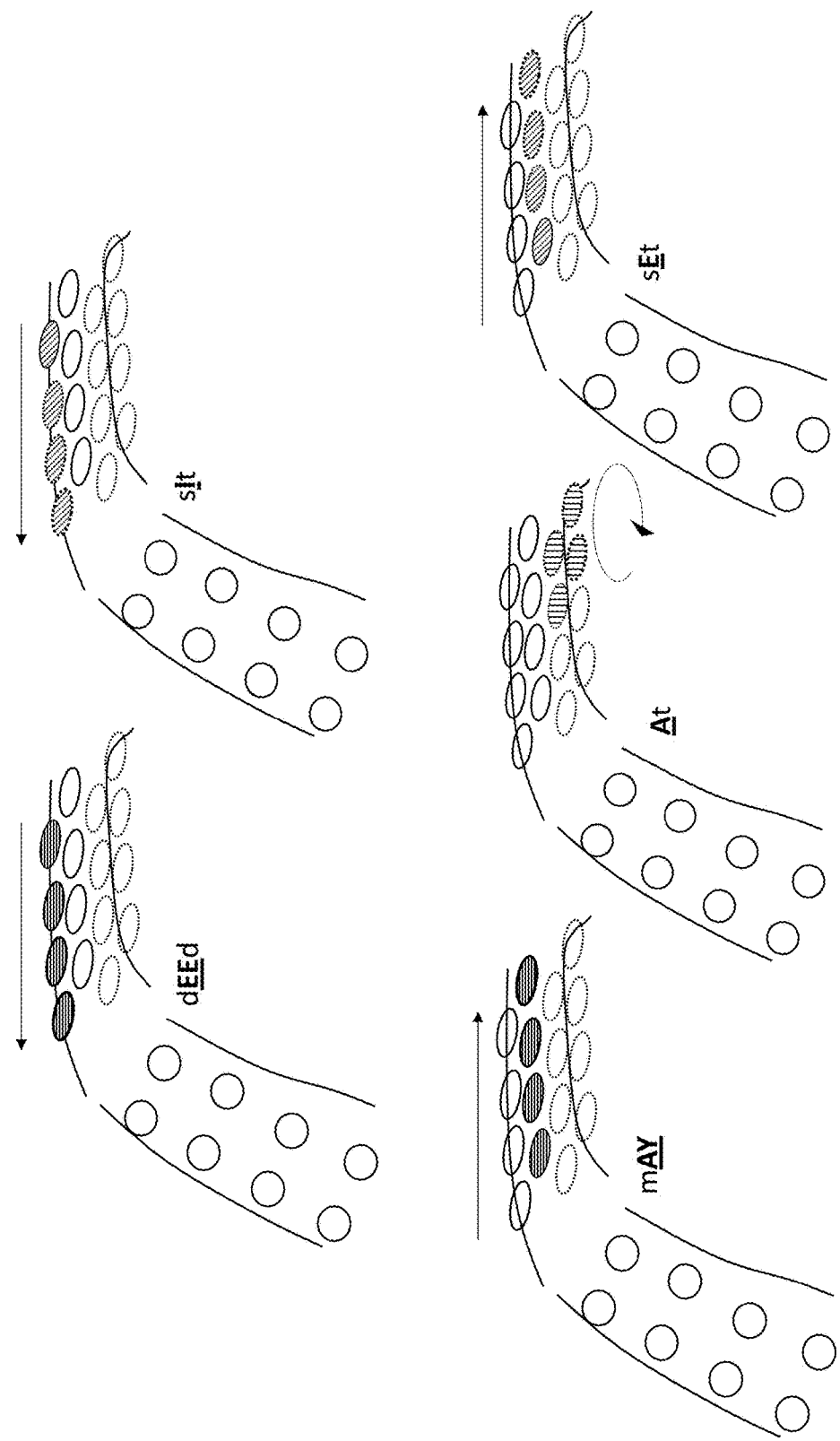
FIG. 11O illustrates examples of haptic outputs for the phonemes "/i/," "/ɪ /," "/e/," "/æ /," and "/ɛ/," according to an embodiment.

FIG. 11O illustrates examples of haptic outputs for the phonemes "/i/," "/ɪ/," "/e/," "/æ/," and "/ɛ/," according to an embodiment. As illustrated, the phoneme "/i/" corresponds to the "ee" in "deed," "/ɪ/" (a near-close near-front unrounded vowel) to the "i" in "sit," "/e/" to the "ay" in "may," "/æ/" (an near-open front unrounded vowel) to the "a" in "at," and "/ɛ/" (an open-mid front unrounded vowel) to the "e" in "set." As with FIG. 11K, each phoneme is represented by a corresponding activation of one or more cutaneous actuators generating a haptic output of a type indicated by the fill pattern as shown. Note that the phoneme "/æ/" is represented by a sequence of haptic outputs on the anterior of the user's forearm (i.e., in the array 1168).

Figure 11P:
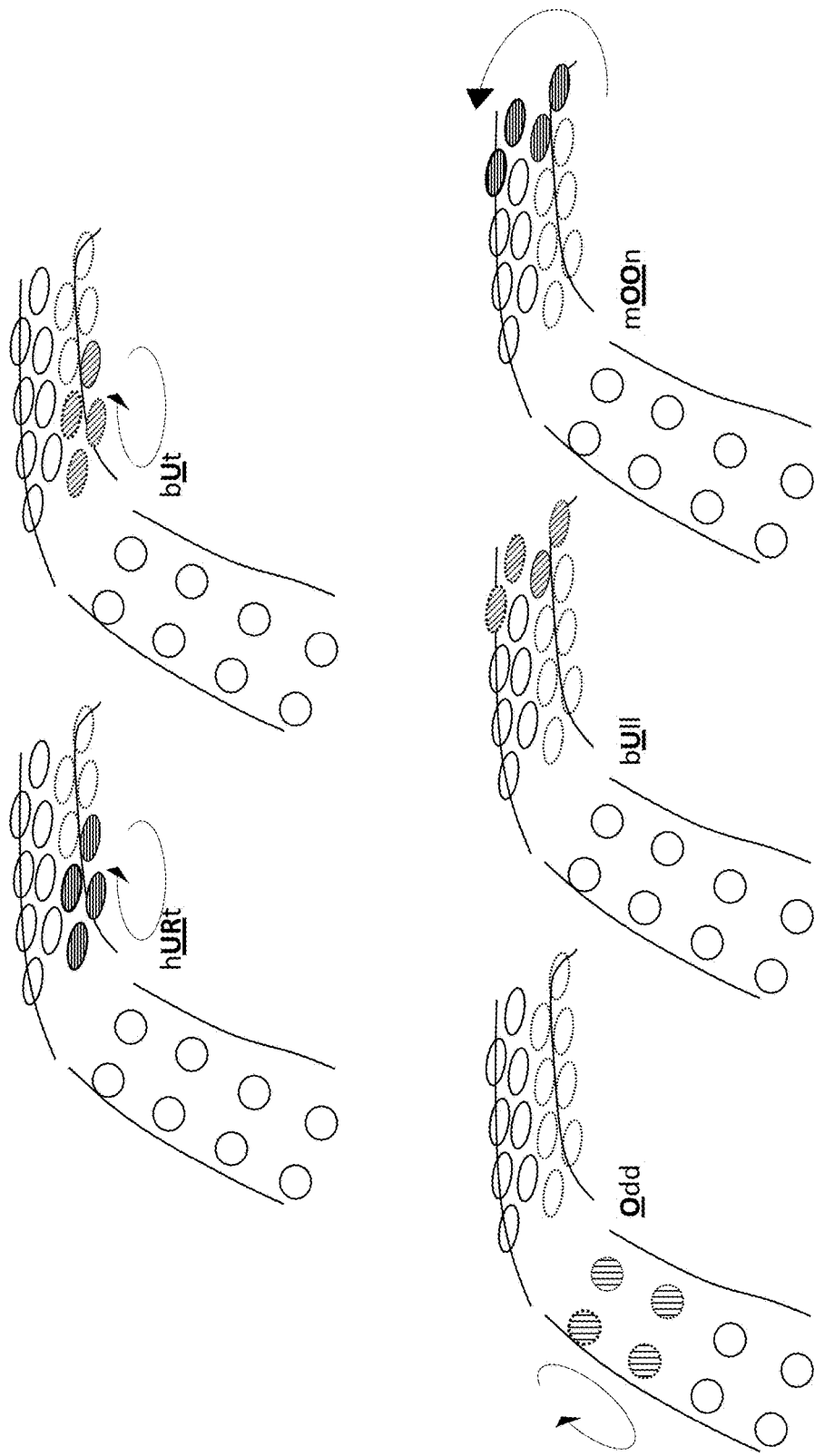
FIG. 11P illustrates examples of haptic outputs for the phonemes "/ɝ /," "/ʌ/," "/ɒ /," "/ʊ /," and "/u/," according to an embodiment.

FIG. 11P illustrates examples of haptic outputs for the phonemes "/ɝ/," "/ʌ/," "/ɒ/," "/ʊ/," and "/u/," according to an embodiment. As illustrated, the phoneme "/ɝ/" (an r-colored open-mid central unrounded vowel) corresponds to the "ur" in "hurt," "/ʌ/" (an open-mid back unrounded vowel) to the "u" in "but," "/ɒ/" (an open back rounded vowel) to the "o" in "odd," "/ʊ/" (an near-close near-back rounded vowel) to the "u" in "bull," and "/u/" to the "oo" in "moon." As with FIG. 11K, each phoneme is represented by a corresponding activation of one or more cutaneous actuators generating a haptic output of a type indicated by the fill pattern as shown.

Figure 11Q:
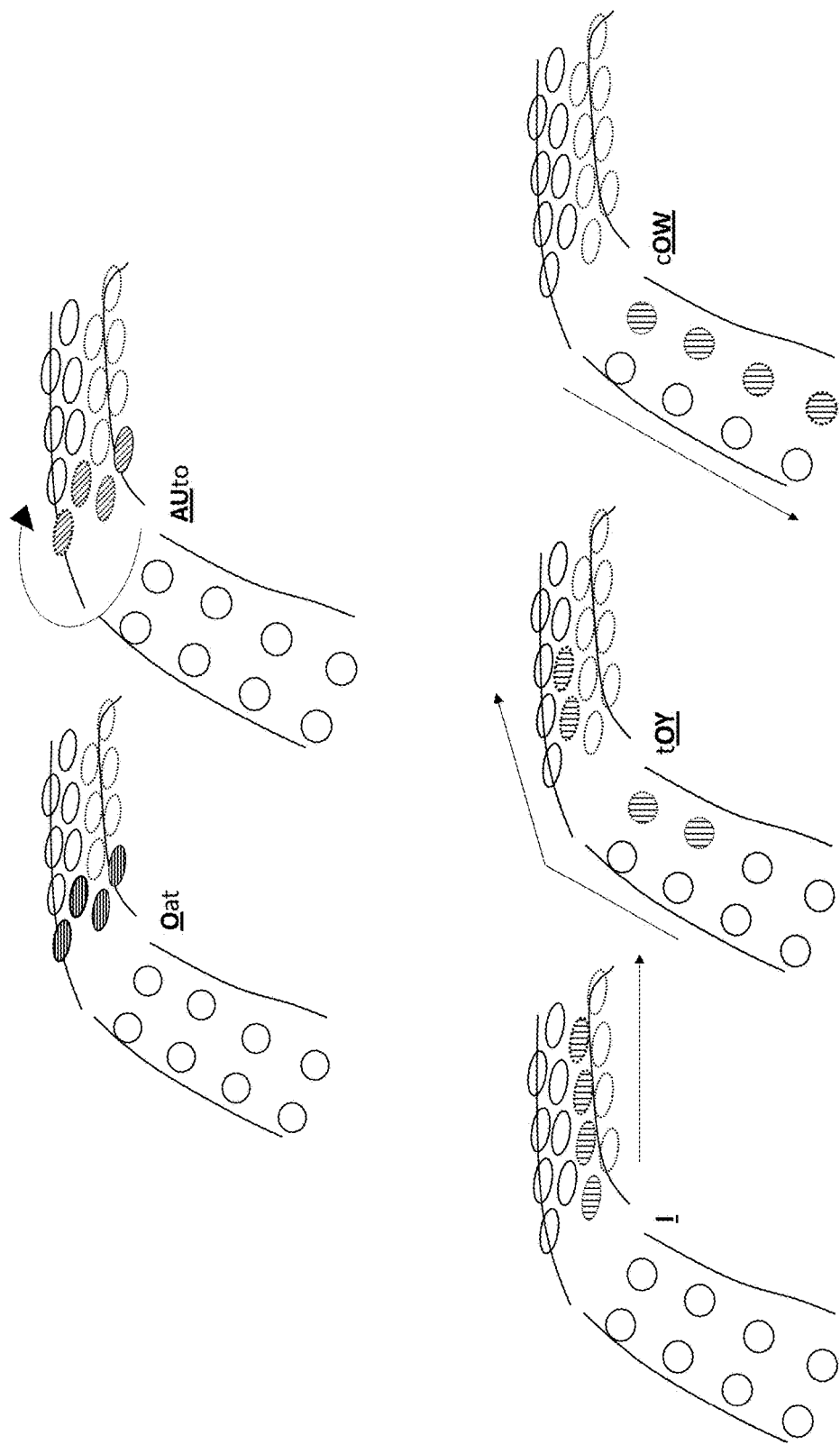
FIG. 11Q illustrates examples of haptic outputs for the phonemes "/ə /," "/ɔ /," "/aɪ /," "/ɔɪ /," and "/aʊ /," according to an embodiment.
Figure 11S:
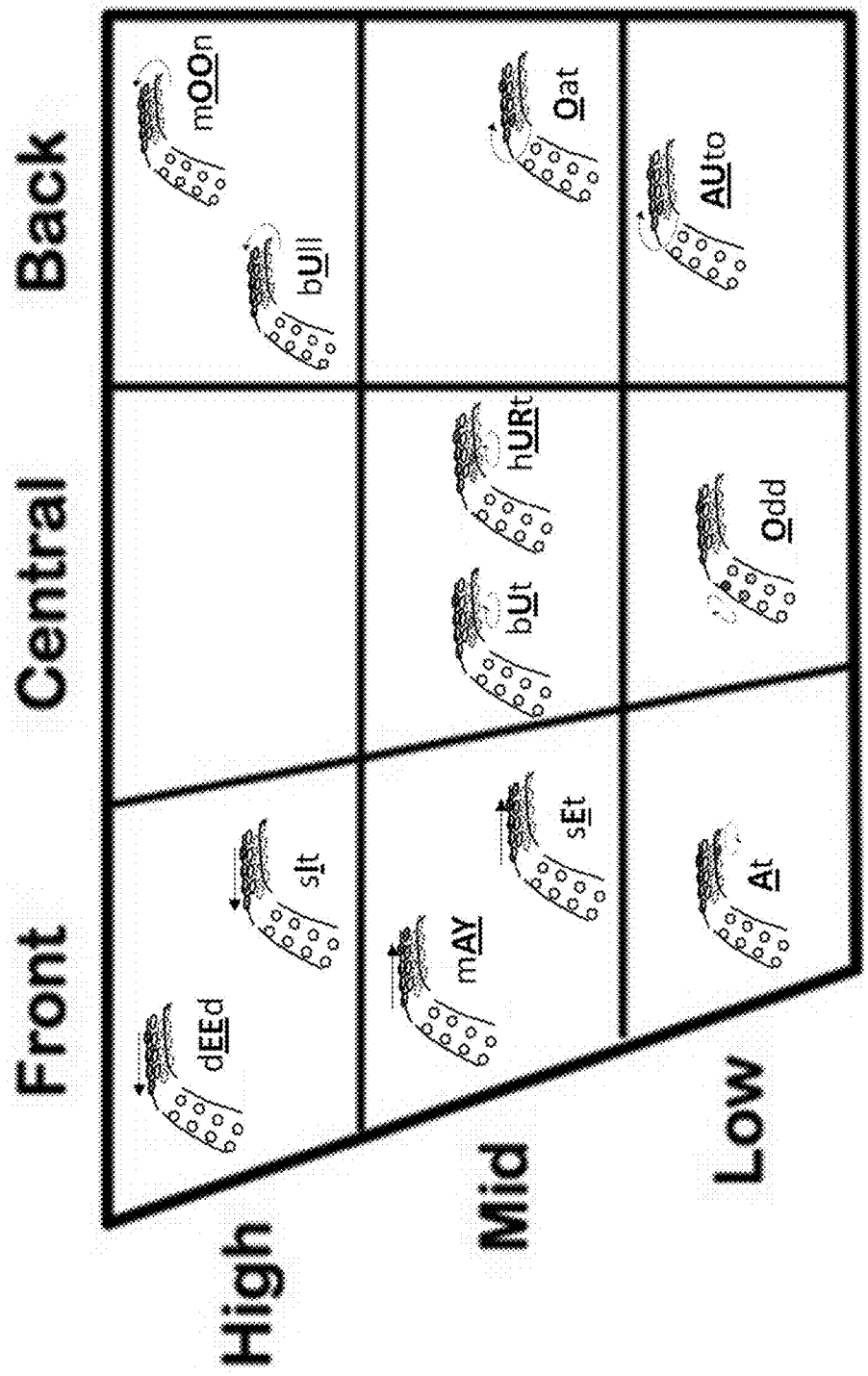
FIG. 11S is a chart illustrating the vowel phonemes in FIGS. 11K-11Q, and the mapping between the location, duration, and type of the haptic outputs corresponding to each vowel phoneme and the manner of articulation and place of articulation of each vowel phoneme, according to an embodiment.
Figure 11T:
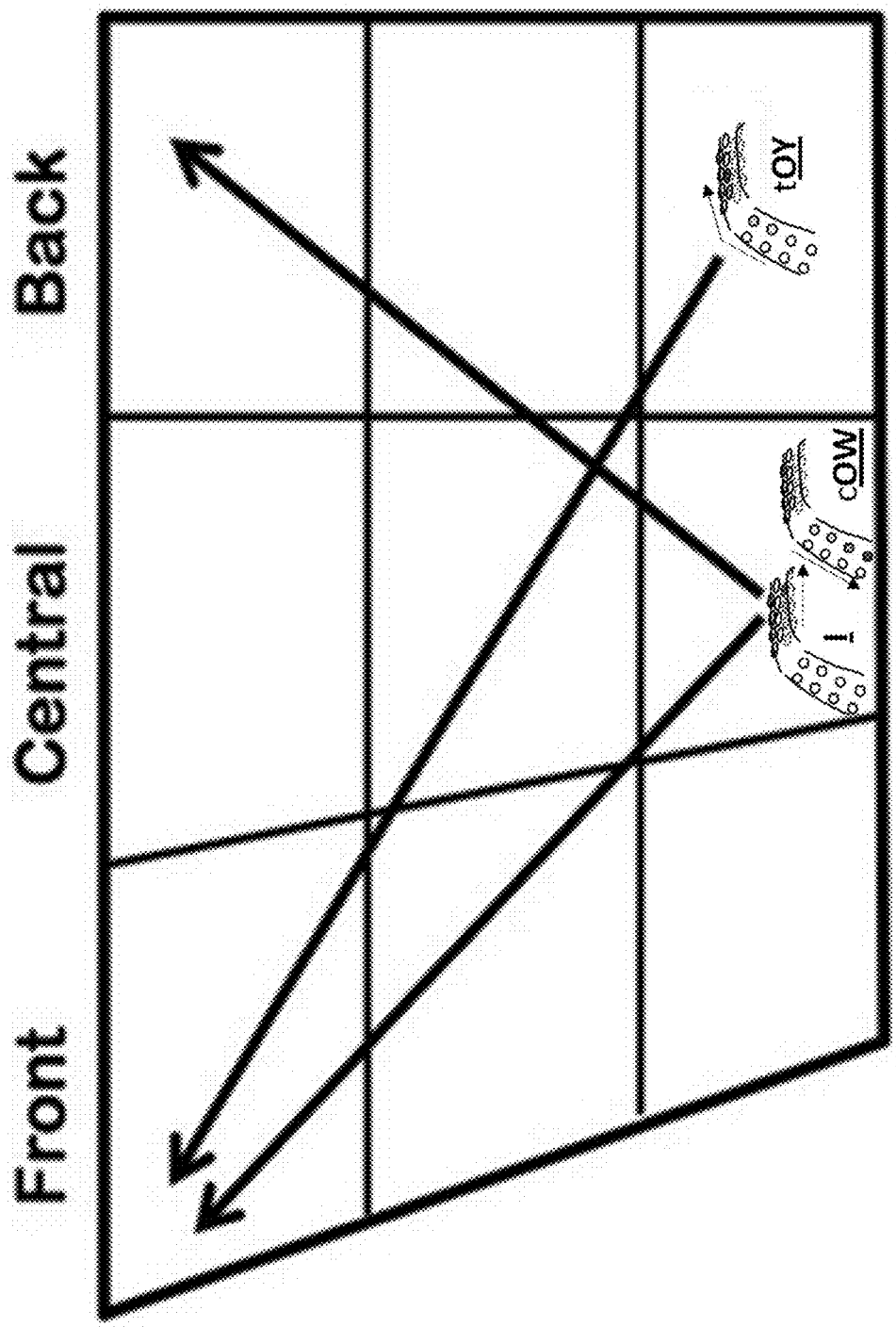
FIG. 11T is a chart illustrating the diphthong phonemes in FIG. 11Q, and the mapping between the location, duration, and type of the haptic outputs corresponding to each diphthong phoneme and the manner of articulation and place of articulation of each diphthong phoneme, according to an embodiment.

FIG. 11Q illustrates examples of haptic outputs for the phonemes "/ə/," "/ɔ/," "/aɪ/," "/ɔɪ/," and "/aʊ/," according to an embodiment. As illustrated, the phoneme "/ə/" (a mid-central unrounded vowel) corresponds to the "o" in "oat," "/ɔ/" (an open-mid back rounded vowel) to the "au" in "auto," "/aɪ/" to the "i" in "I," "/ɔɪ/" to the "oy" in "toy," and "/aʊ/" to the "ow" in "cow." Note that the last three phonemes described here are diphthongs. As with FIG. 11K, each phoneme is represented by a corresponding activation of one or more cutaneous actuators generating a haptic output of a type indicated by the fill pattern as shown.

FIG. 11R is a chart illustrating the consonant phonemes in FIGS. 11K-11Q, and the mapping between the location, duration, and type of the haptic outputs corresponding to each consonant phoneme and the manner of articulation and place of articulation of each consonant phoneme, according to an embodiment. The row legend describes the different manners of articulation of the phonemes described in FIGS. 11K-11Q, while the column legend describes the place of articulation of the same phonemes. The manner of articulation is the configuration and interaction of the articulators, which include speech organs such as the tongue, lips, and palate, when making a speech sound, i.e., the phoneme. The place of articulation is the point of contact where an obstruction occurs in the vocal tract between an articulatory gesture (e.g., a mouth movement), an active articulator (e.g., a part of the tongue), and a passive location (e.g., the roof of the mouth). These apply to consonant phonemes.

In one embodiment, the location and type of the haptic output associated with each phoneme, as described above in FIGS. 11K-11Q, have a relationship to the manner of articulation and place of articulation of that phoneme. Thus, the haptic outputs may be associated with the phonemes in a manner that adheres to certain rationale in order to create this relationship. These rationale are described below.

1) Consonant phonemes may be related to haptic outputs that are at a single point, such that no movement (e.g., shear) is sensed by the user due to the haptic output.

2) In contrast, vowel consonants may be related to haptic output that create a sense of motion for the user. This may include a haptic output or sequence of haptic outputs that have a shear sensation.

3) Shorter vowels may have a total duration of haptic output that is relatively shorter than the total duration of haptic output related to longer vowels.

4) Voiced phonemes (those that use the larynx) are related to haptic outputs having a pulsatile type.

5) Unvoiced or voiceless phonemes are related to haptic outputs having a vibration type.

6) Phonemes that are produced closer to the front of the mouth (or generally closer to the mouth) are mapped to haptic outputs that are closer to the user's wrist.

7) Phonemes that are produced closer to the rear of the throat (or generally closer to the throat) are mapped to haptic outputs that are closer to the user's shoulder.

8) Plosives (i.e., a stop, or a consonant phoneme which blocks airflow in the vocal tract) are related to a haptic output that is at a single point or location on the user's upper arm.

9) Fricatives (i.e., consonants that force air through a narrow channel, such as lips, tongue/soft palate, etc.) are related to a haptic output that includes two points of haptic output on the user's upper arm that are of a vibration type.

10) Nasals (i.e., a phoneme made with the soft palate lowered so that sound escapes through the nose) are related to a haptic output of a single point on the user's forearm.

Using the above rationale, a mapping between phonemes and haptic outputs can be generated, such as the one shown in the above FIGS. 11K-11Q. FIG. 11R further illustrates this mapping between haptic outputs and phonemes by showing the relationship between the characteristics of the haptic outputs and the manner and place of articulation of the corresponding mapped phonemes. These characteristics may include the location of the haptic output on the user's arm, the duration, the type, the movement experienced, the sequence of cutaneous actuators activated, and so on. For example, the manner of articulation of the phonemes "/p/" and "/b/" are voiceless and voiced stop consonants. Furthermore, the place of articulation of the phonemes "/p/" and "/b/" are bilabial, or near the lips. Thus, the corresponding mapping of these phonemes is to haptic outputs that are 1) at a single point, as they are consonants, 2) near the user's wrist, as they are plosive, and 3) vibration type for the voiceless "/p/" and pulsatile for the voiced "/b/." The remaining consonant phonemes shown in FIG. 11R are mapped in a similar fashion.

For the places of articulation listed, labiodental consonants are articulated with the lower lip and upper teeth, and dental consonants are articulated with the tongue against the upper teeth. Both these correspond to haptic outputs near the user's wrist. Alveolar consonants are articulated with the tongue against/close to the superior alveolar ridge, which is between the upper teeth and the hard palate, and palatal consonants are articulated with the body of the tongue raised against the hard palate (the middle part of the roof of the mouth). Both these types of consonants are mapped to haptic output that have locations midway between the user's shoulder and the user's wrist on the haptic device shown FIGS. 11K-11Q. Velar consonants are articulated with the back part of the tongue against the soft palate (the back of the roof of the mouth, or velum). Glottal consonants use the glottis (i.e., the opening between the vocal folds) for articulation. Thus, these are mapped to haptic output that is nearer the user's shoulder on the user's upper arm.

For the manners of articulation listed, fricatives and nasals, along with their corresponding mappings, have been noted above. Affricate consonants begin as a stop or plosive and release as a fricative, and map here to vibration plus a linear shear type movement for the haptic output. Liquid consonants include lateral consonants (in English—"l" in "led") and rhotics (in English—"r" in "red"). These are mapped to haptic outputs that have a vibration type plus a shear type that has a circular activation of the cutaneous actuators resulting in a circular shear sensation. Finally, glide, or semivowel consonants, are phonemes that are similar to a vowel sound but do not act as the nucleus of a syllable, such as the "w" and "y" consonants. These are mapped to vibration plus pressure haptic outputs with an additional sequence of activation of cutaneous actuators as indicated by the respective arrows. For these cases, the level of pressure generated may increase with each successive cutaneous actuator that is activated.

FIG. 11S is a chart illustrating the vowel phonemes in FIGS. 11K-11Q, and the mapping between the location, duration, and type of the haptic outputs corresponding to each vowel phoneme and the manner of articulation and place of articulation of each vowel phoneme, according to an embodiment. The illustration in FIG. 11S is similar to that of FIG. 11R, but is noted for vowel phonemes instead of the consonant phonemes in FIG. 11S. Here, vowels are divided into their place of articulation: 1) front, 2) central, and 3) back, describing the position of the tongue in the mouth on the transverse plane (i.e., front/anterior of mouth, center of mouth, or back/posterior of mouth) in the formation of the phoneme. The vowels are further divided into 1) high, 2) mid, and 3) low vowels, describing the position of the tongue in the mouth on the frontal plane (i.e., near the roof of the mouth, in-between, or near the bottom of the mouth) in the formation of the vowel. As noted above in the list of rationales, the position of the tongue indicates the appropriate position of the haptic output for a phoneme. Thus, the "/ɒ/" vowel phoneme in "odd" is a central and low vowel, meaning the tongue is nearer to the user's throat, and thus the corresponding haptic output is on the user's upper arm. Note also that some of the haptic outputs, such as the "/u/" in "moon" activate a sequence of haptic outputs that transitions from one array of haptic outputs on one side of the user's forearm to the other side. Such a sequence may be mapped for vowels with certain places of articulation, such the back vowels shown here.

FIG. 11T is a chart illustrating the diphthong phonemes in FIG. 11Q, and the mapping between the location, duration, and type of the haptic outputs corresponding to each diphthong phoneme and the manner of articulation and place of articulation of each diphthong phoneme, according to an embodiment. Diphthongs, or gliding vowels, are a combination of two adjacent vowels sounds within the same syllable. These diphthongs are mapped to sequences of the type 1) haptic output described above (sine wave vibration), with the start and end location of the sequence of haptic output matching the place of articulations of the tongue of the starting and ending vowels for the diphthong. For example, the diphthong "oy" in the word "toy" begins with the vowel phoneme "/ɔ/," which is a back vowel, and ends as a front vowel phoneme /ɪ/, as shown by the arrow in FIG. 11S which emanates from the word "cow" and points towards the front vowel section. Thus the haptic output sequence mapped to this diphthong begins nearer the shoulder, and ends nearer the wrist. A similar mapping is performed for the "I" diphthong and "ow" diphthong in the word "cow," as shown in FIG. 11S.

Calibration of Haptic Device Using Sensor Harness

Embodiments also relate to a method for calibrating a haptic device to provide haptic outputs that are consistently perceived across different users in accordance to each user's subjective sensation. Each user's subjective experience due to force applied to the user's skin may vary. Due of these subjective differences, a haptic feedback system would create inconsistent experiences across users if it were to apply the same objective level of haptic outputs for all users. A haptic feedback system is calibrated on a per-user basis such that each user experiences the same subjective level of haptic outputs as other users.

Figure 12A:
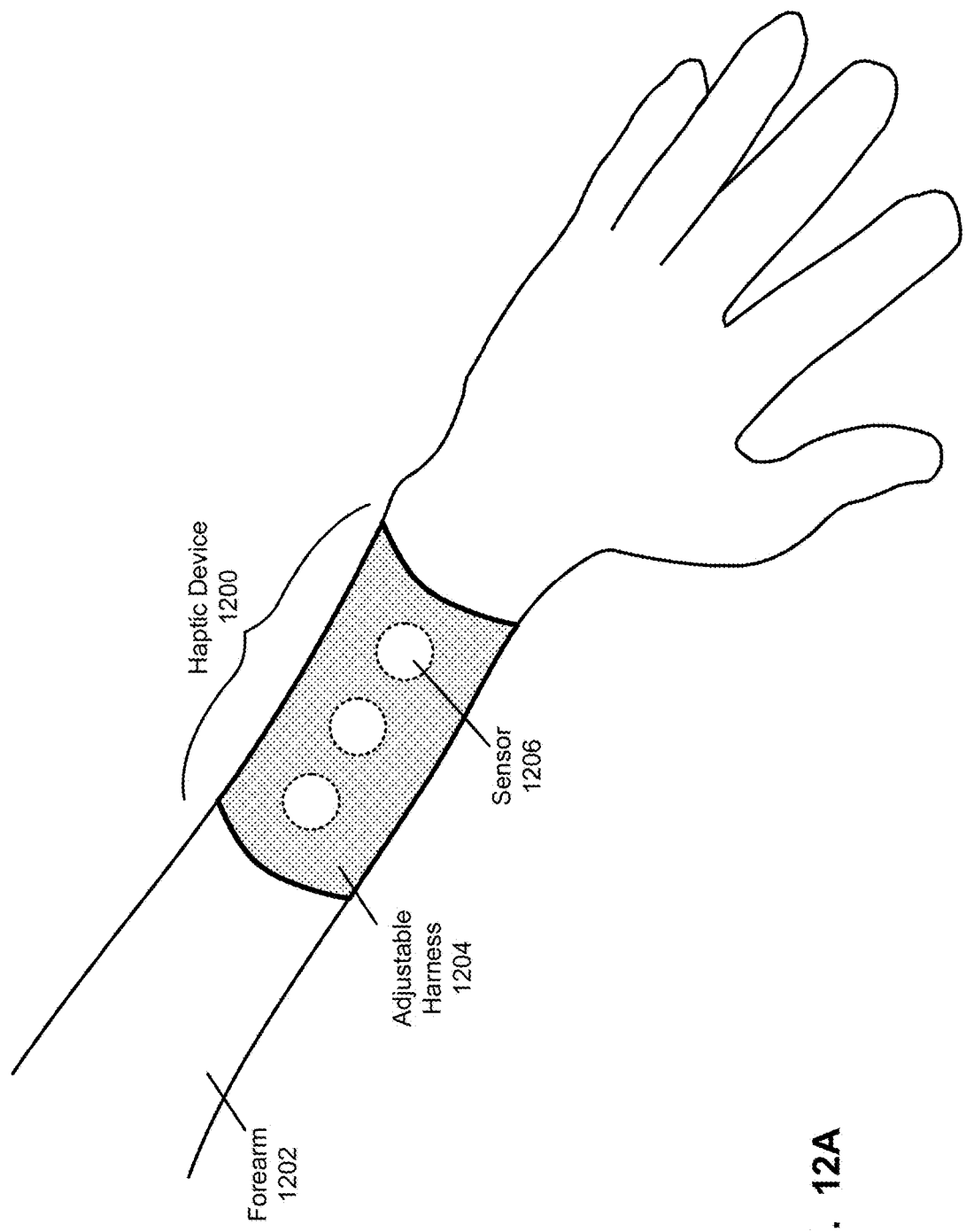
FIG. 12A illustrates a haptic device that may be attached to a user's forearm to calibrate a haptic device based on subjective force, according to an embodiment.

FIG. 12A illustrates a haptic device 1200 that may be attached to a user's forearm 1202 to calibrate a haptic device based on subjective force, according to an embodiment. The haptic device 1200 includes an adjustable harness 1204, and one or more sensors 1206.

The sensors 1206 detect one or more types of displacement or parameters associated with haptic output including acceleration, strain, and so on. These sensors may be similar to the haptic sensors 104 described above with reference to FIG. 1. They are attached to the interior surface of the adjustable harness 1204 at regular intervals and face the skin of the user's forearm 1202 (i.e., the sensing components of the sensors 1206 face the user's skin). The sensors 1206 are separated by at least a threshold distance from each other. In one embodiment, there are three sensors 1206 total. After the adjustable harness 1204 is fitted on the user, the user's skin may contact the sensors 1206 and cause the sensors to detect a force value, which may be in the form of a voltage value corresponding to the force value. This voltage value is transmitted to a calibration component, such as that described with reference to FIG. 12B.

The adjustable harness 1204 may be similar to the harness 1103 of FIG. 11A, and may use similar materials and have similar structural components, including, for example, rigid or non-rigid members that cause the adjustable harness 1204 to be worn in relatively similar positions on the user's forearm 1202 each time it is fitted to the user's forearm 1202. However, the adjustable components of the adjustable harness 1204 may allow for a more fine-grained adjustment of the fitment of the adjustable harness 1204 against the user's forearm. In particular, in one embodiment, the adjustable harness 1204 includes an adjustment mechanism (not shown) at the location of each sensor 1206. This adjustment mechanism allows for adjustment of the haptic output exerted by the adjustable harness 1204 against the user's forearm at the location of the sensors 1206 by adjusting the circumference of the adjustable harness 1204, or via some other means. Furthermore, the adjustment mechanism may have various markings to indicate the level of adjustment that has occurred. For example, form of markings that indicate a dimension of the adjustable harness 1204 (e.g., a circumference of the adjustable harness 1204) at a particular level of adjustment may be provided. An adjustment mechanism may have marking indicating the total circumference of the adjustable harness 1204 at each level of adjustment. The adjustment mechanism may be an adjustable strap (which may be elastic or non-elastic), a hook and loop fastener combination (e.g., Velcro®), a retractable strap, a ratcheting strap or buckle, and so on.

The user, after wearing the adjustable harness 1204, can use the adjustment mechanisms to adjust the haptic output provided by the adjustable harness 1204 on the user's forearm 1202 to a certain level that is comfortable to the user, or in the case of calibration, to a level that achieves a specified subjective level of the haptic output. By adjusting the adjustable harness 1204 to achieve a specific subjective level of the haptic output, the sensors 1206 may be able to determine the objective level of the haptic output generated by the adjustable harness 1204 at a particular adjustment position (as described above). This information is transmitted to an additional system that can determine a correlation between the user's subjective level of the haptic output (i.e., the force that is felt) versus the actual objectively measured level of the haptic output based on the sensor 1206 output. Such information can be used to calibrate the response of haptic feedback devices for each user, such that the subjective level of the haptic output generated by these haptic feedback devices are the same for each user. Additional details regarding this system and method of calibration will be described in further detail with reference to FIGS. 12B through 12D.

Figure 12B:
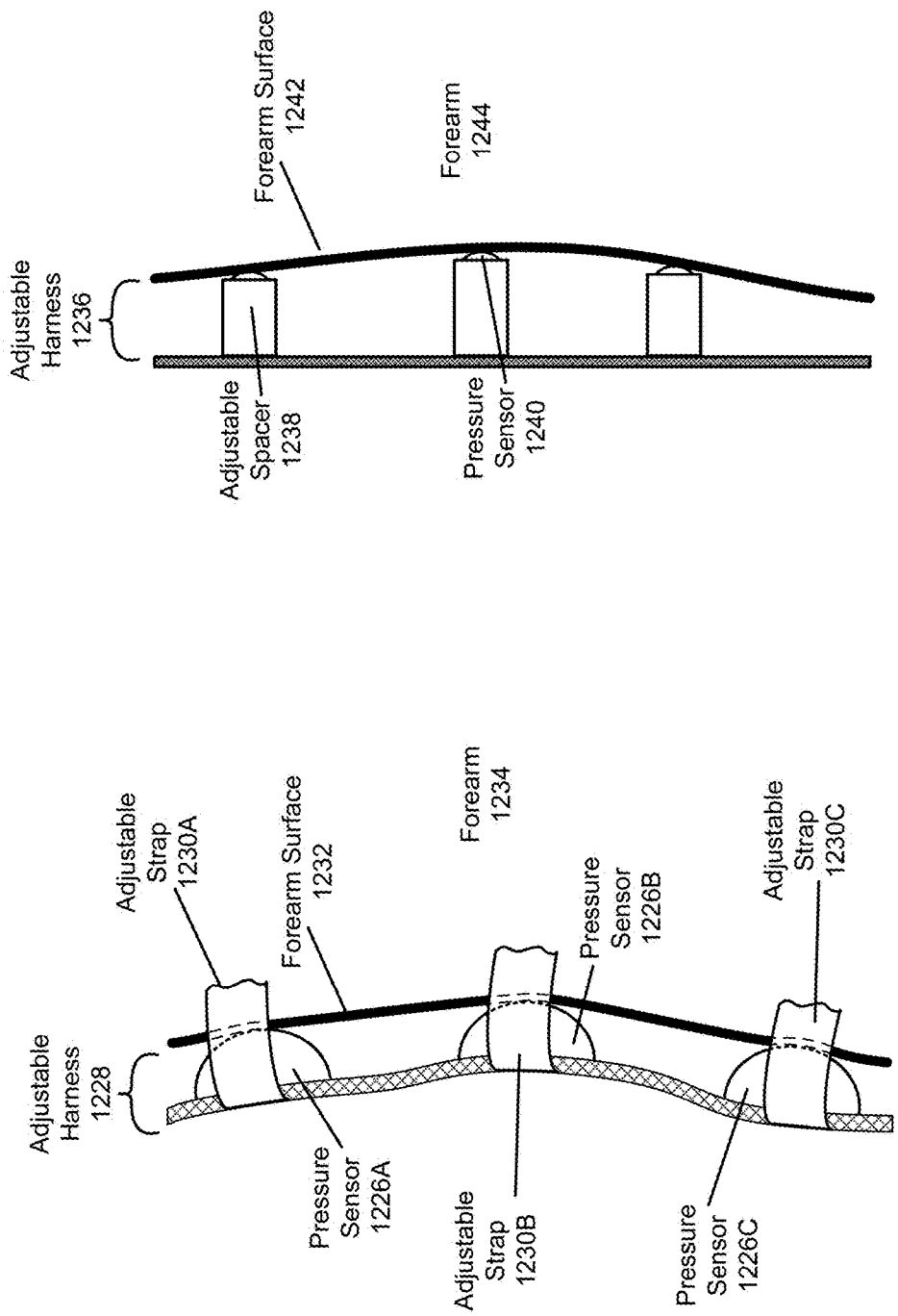
FIG. 12B illustrates detail views of two different examples of the haptic device of FIG. 12A, according to an embodiment.

FIG. 12B illustrates detail views of two different examples of the haptic device 1200 of FIG. 12A, according to an embodiment. Two types of adjustable harnesses for the haptic device 1200 are shown in FIG. 12B: 1) the adjustable harness 1228; and 2) the adjustable harness 1236.

The adjustable harness 1228 may include, among other components, three pressure sensors 1226A-C, each attached to the adjustable harness 1228. At each point on the adjustable harness 1228 at which a pressure sensor 1226 is attached, an adjustable strap 1230 is attached to the adjustable harness 1228. The adjustable strap 1230 may be an adjustable mechanism as described above with reference to FIG. 12A. The adjustable strap 1230 adjusts the force of the pressure sensors 1226 against the forearm surface 1232. This may be accomplished by tightening or loosening the adjustable harness 1228 against the forearm surface 1232, which may reduce the circumference of the adjustable harness 1228. In one embodiment, the adjustable straps 1230 are adjusted using a motorized mechanism.

To perform the calibration of subjective force and objective force as described above, a user wearing the adjustable harness 1228 may indicate, for each level of adjustment of the adjustable strap 1230, a level of subjective force due to the corresponding pressure sensor 1226 pressing against the forearm surface 1232. For each level of subjective force indicated, each pressure sensor 1226 indicates an objective level of force by, for example, a voltage amount output by the pressure sensor 1226 due to the force sensed by the pressure sensor 1226. This establishes, for each pressure sensor 1226, and thus for each location on the user's forearm corresponding to the location of the pressure sensor 1226, a relationship between objective force measured by the pressure sensor 1226 and the subjective level of force experienced by the user. As shown further below with reference to FIGS. 12C through 12F, such a relationship may be used to develop a calibration curve for the user and to calibrate haptic devices to generate haptic output that is calibrated in accordance with the user's sense of subjective force, such that all users experience a consistent level of subjective force for an intended level of haptic feedback.

In another embodiment, instead of using adjustable straps, an adjustable harness 1236 of the haptic device 1200 may include adjustable spacers 1238 on the interior surface of the adjustable harness 1236, each having a pressure sensor 1240 attached to the side of the adjustable space opposite the interior surface of the adjustable harness 1236 and facing the forearm surface 1242. Each adjustable spacer 1238 may adjust its length to increase or decrease the distance between the interior surface of the adjustable harness 1236 and the forearm surface 1242. This may be achieved via various mechanisms, such as a screw mechanism, inflatable bladder, spring mechanism, and so on. The adjustable spacer 1238 may include markings to indicate the current level of adjustment.

The pressure sensor 1240, which may be similar to the pressure sensor 1226, senses the pressure due to the combination of the adjustable harness 1236 and adjustable spacer 1238 on the forearm surface 1242. The user, as in the case of the adjustable harness 1228, may adjust the length of the spacer and indicate a level of subjective force, and the system may determine the amount of actual force indicated by each pressure sensor 1240 for the corresponding subjective force experienced.

In another embodiment, instead of using pressure sensors, such as pressure sensors 1226 and 1240, the adjustable harness includes cutaneous actuators, such as cutaneous actuators 1104. In this case, instead of measuring force, the system determines the haptic output exerted by the cutaneous actuator versus the subjective haptic output experienced by the user. Additional details regarding this alternative method are described below with reference to FIGS. 12D through 12F.

Figure 12C:
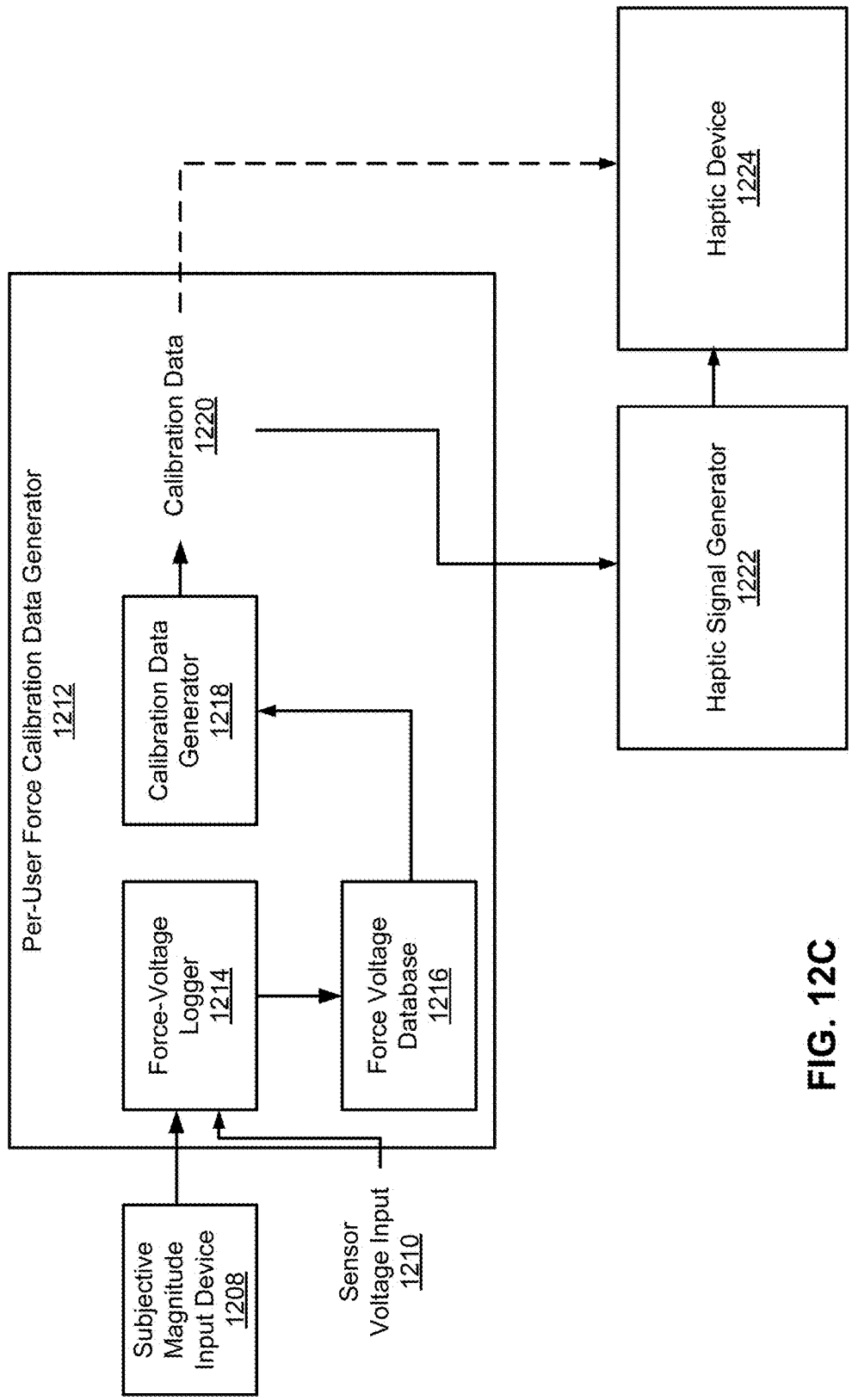
FIG. 12C is a block diagram illustrating the components of a system for calibrating haptic feedback on a per-user basis using subjective force inputs and voltage readings from sensors, according to an embodiment.

FIG. 12C is a block diagram illustrating the components of a system for calibrating haptic feedback on a per-user basis using subjective force inputs and voltage readings from sensors, according to an embodiment. These components may be stored as computer readable instructions in memory, such as the memory 813. In another embodiment, these components are separately implemented using dedicated hardware, including a processor and memory.

The subjective magnitude input device 1208 receives inputs from a user indicating a subjective level of force at a particular location on the user's body corresponding to a location where a pressure sensor, such as pressure sensor 1226, is located. The level of subjective force may be specified on an arbitrary scale, such as from 0-10 (with 10 being highest). The lowest level of subjective force may be that where no force is sensed by the user, or where any sensation of force is only perceived 50% of the time. The highest level may be one where any additional increase in force does not cause a change in perception by the user, or where the subjective feeling of force becomes uncomfortable or painful. The location may be specified by some identifier of the pressure sensor, via interfacing a visual representation of the user's body (or portion of the user's body), and so on. The subjective magnitude input device 1208 may include a type of input device, such as a keypad, keyboard, voice recognition system, or other device, which allows a user to input the subjective level of force values along with the location or pressure sensor for which the subjective level of force is indicated.

The sensor voltage input 1210 is a value indicating an objective measurement of force sensed by the corresponding pressure sensor for which the user provides a subjective level of force via the subjective magnitude input device 1208. This objective measurement may be a voltage outputted by the pressure sensor. It may also be measured in some other format, such as decibels, Newtons, and so on. This information may be requested from the corresponding pressure sensor when it is indicated by the user via the subjective magnitude input device 1208.

The per-user force calibration data generator 1212 receives the subjective level of force from the subjective magnitude input device 1208 and the sensor voltage input 1210 for multiple pressure sensors and at multiple levels of subjective force, and generates a set of calibration data 1220 for the user undergoing the force calibration process described herein. The per-user force calibration data generator 1212 includes a force-voltage logger 1214, a force voltage database 1216, a calibration data generator 1218, and the output calibration data 1220. The calibration data 1220 may be used to calibrate a haptic device, such as haptic device 1224.

The force-voltage logger 1214 logs the input values of the subjective level of force from the subjective magnitude input device 1208 and the corresponding sensor voltage inputs 1210. This may occur each time a value is entered into the subjective magnitude input device 1208. The force-voltage logger 1214 stores the associations between the received subjective level of force and the sensor voltage input for the corresponding pressure sensor to the force voltage database 1216.

The calibration data generator 1218 generates calibration data 1220 for each location on the user's body for which a set of sensor voltage inputs and subjective level of force measurements are available. The calibration data 1220 indicates for each level of force the corresponding voltage of a pressure sensor at that location, and is unique for each user. This calibration data 1220 may be represented in a graph, as described below with reference to FIG. 12D. This calibration data 1220 may be transmitted to a haptic signal generator 1222 or directly to a haptic device 1224 (as indicated by the dotted lines). When the user wears the haptic device 1224, the haptic signal generator 1222 uses the calibration data 1220 when transmitting actuator signals to the haptic device 1224. An example of how this calibration data 1220 is used is described below.

An application, such as application 814 of FIG. 8, may request a haptic feedback to be transmitted to the haptic device 1224. Regardless of the user wearing the haptic device 1224, the application transmits the same haptic feedback request. This would result in the haptic device 1224 generating the same objective level of haptic output on the user but may also result in different subjective levels of force experienced for each user. Using the calibration data 1220, the haptic signal generator 1222 is able to modify the actuator signals sent to the haptic device 1224 such that this difference subjective experience does not occur, and instead, every user experiences the same subjective level of haptic output. As the calibration data 1220 indicates a sensor voltage for every level of subjective force, the haptic signal generator 1222 may modify the actuator signal to request the haptic device 1224 to either generate a stronger haptic output from a default value if it is the case that the user's subjective level of haptic output is lower than a baseline, or to generate a lower haptic output from a default value in the case where the user's subjective level of haptic output is greater than a baseline. In this case a baseline may be a hypothetical scenario where the subjective level of haptic output experienced by a user is exactly the same as a corresponding sensor voltage input, i.e., a one to one relationship between sensor voltage and subjective haptic output. This is unlikely to be the case as the subjective level of haptic output is likely to be non-linear in relation to the sensor voltage input. However, this baseline may be used as the default case if calibration data 1220 were unavailable. Note that before applying the calibration data 1220, the calibration data 1220 may be normalized to match a scale of the actuator signals for the haptic feedback device.

Although a haptic signal generator 1222 is described here as receiving the calibration data 1220, the calibration data 1220 may in some cases be received directly by the haptic device 1224, which modifies incoming actuator signals according to the method described above with reference to FIG. 12C.

Although the above description is made in regards to pressure sensors, in other embodiments the sensors may not be pressure sensors, but are rather other sensors, such as temperature sensors, acceleration sensors, vibrational sensors, shear sensors, and so on. In yet other embodiments, the sensor voltage input 1210 is not from a sensor, but instead indicates a value generated by a cutaneous actuator indicating a level of activation for that cutaneous actuator. In one embodiment, the value is a voltage indicating an amount of force applied by the cutaneous actuator. In these alternative embodiments, the subjective magnitude input device 1208 may also receive different types of subjective magnitude measurements instead of measurements of subjective force levels, with the type of subjective magnitude indicated by the user corresponding to the type of haptic output generated by the cutaneous actuator. As an example, if the cutaneous actuator were outputting a vibrational haptic output, the subjective magnitude indicated by the user would be a magnitude of vibration.

In another embodiment, the subjective magnitude input device 1208 may receive the indication of the subjective magnitude levels while the user is performing different activities, such as running, walking, talking, working out, sitting, and so on. The subjective magnitude measured during these various events may differ from each other, and thus additional calibration data 1220 may be generated for each of these activities. When the calibration data 1220 is used, different sub-sets of the calibration data 1220 may be utilized depending upon the currently detected activity.

Figure 12D:
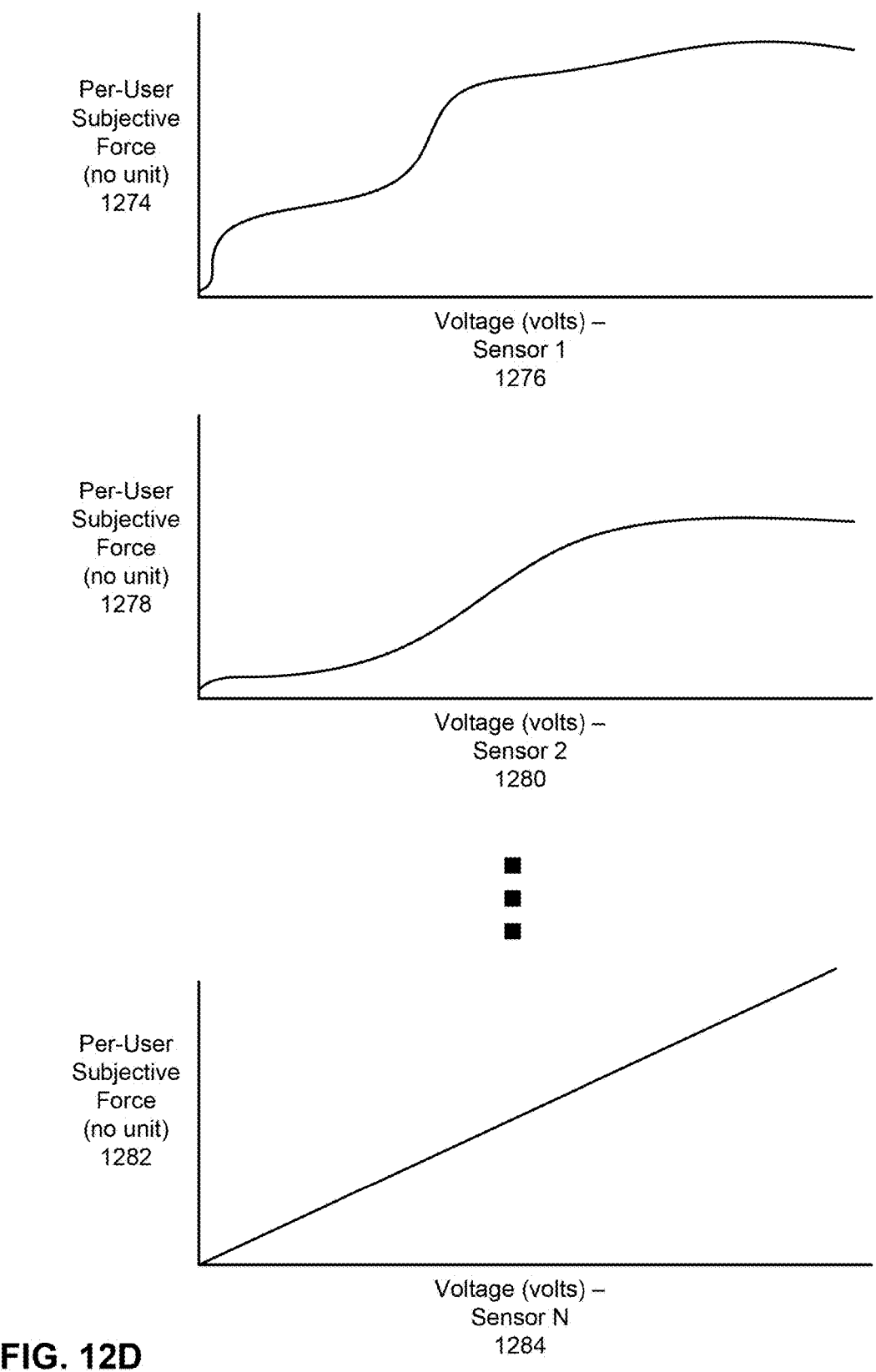
FIG. 12D illustrates a graph representation of the calibration data described with reference to FIG. 12C.

FIG. 12D illustrates a graph representation of the calibration data 1220 described with reference to FIG. 12C. Three different graphs for three different sensors, such as pressure sensors 1226A-C, are shown. However, in other embodiments, there may be more sensors, and thus more sets of calibration data. In addition, in other embodiments, the sensors may measure other values aside from pressure, such as vibration, and the subjective level of force measurement would match accordingly and be a subjective measurement of the user of the corresponding value.

As shown with the graph plotting the per-user subjective force 1274 with the voltage 1276 for sensor 1, the subjective level of force measured by the user is not co-linear with the voltage, but instead varies non-uniformly. Note that the graphs shown here are examples only, and in practice the non-uniformity may not be as pronounced as shown here. However, note that the subjective level of force measurement increases monotonically with the increase in voltage 1276.

Additional sets of calibration data 1220 are collected for additional sensors. Thus, illustrated are graphs representing such calibration data 1220 for a sensor 2 with a subjective level of force 1278 plotted against voltage 1280, and for a sensor N with a subjective level of force 1282 plotted against a voltage 1284. The greater the number of sensors, the more accurate the calibration data 1220 for a user can be, as the subjective levels of force for more locations on the user's body where a haptic device will make contact are measured. When a haptic device applies a haptic output to these same locations, the corresponding calibration data 1220 for that location may be used so that an appropriate subjective level of force is sensed by the user, as described previously.

Note that the graph for sensor N is represented by a straight line, indicating co-linearity between the subjective level of force 1282 and the voltage 1284. This is unlikely to occur in practice, however, this graph also illustrates a baseline curve, which may be a reference from which a haptic device may adjust the voltage to a cutaneous actuator in order to calibrate its haptic output for a user. When an actuator signal is received by the haptic device, it may indicate a particular voltage to be applied to a cutaneous actuator. The haptic device may first find in the calibration data 1220 a sensor, which when the calibration data 1220 was generated, was at the same location on the user's body as the location of the cutaneous actuator. The haptic device also determines an objective level of haptic output (e.g., a force value measured in Newtons) for the cutaneous actuator for the voltage to be applied, and finds the equivalent voltage for the sensor when the sensor sensed the same level of haptic output. Such an equivalence between voltage and haptic output levels may be stored in the calibration data 1220. The haptic device may determine in the calibration data 1220 for the sensor if the subjective level of force at that voltage level for the sensor is above or below the baseline for that voltage level. As noted above, this baseline is represented by the graph for sensor N. If it is above the baseline, then the haptic device may lower the voltage to be applied to the cutaneous actuator such that the user would experience the subjective level of force matching the baseline value. Conversely, if it below, then the haptic device may increase the voltage to be applied to the cutaneous actuator. For example, at a voltage level of 1V for a sensor, corresponding to an objective level of force of 1N, the subjective level of force may be measured as 5 in the baseline. However, for the user in question, a voltage level of 1V corresponds to a subjective level of force of 6 at the particular location on the user's body (assuming that the equivalence of voltages between the sensor and cutaneous actuator is one to one). This means that the user feels a stronger subjective level of force than the baseline for the same objective force. Consequently, the haptic device, when applying a force to the same location on the user's body, may lower the voltage such that less than 1N is applied, but resulting in a subjective level of force experienced that is in accordance with the baseline value, i.e. 5.

The change to the voltage may also be determined using the calibration data 1220. The haptic device may determine the point in the calibration data 1220 for the sensor where the user experienced a subjective level of force that matches the baseline level of force (1N in the above example). The haptic device determines the voltage from the sensor at that subjective level of force, and determines the equivalent voltage for the cutaneous actuator. This is the modified voltage that is applied to the cutaneous actuator. Following from the example above, the calibration data 1220 indicates that at 0.8V for the sensor, the user experienced a subjective level of force of 5. Again, assuming that the equivalence between the voltage of the sensor and the cutaneous actuator is one to one, the haptic device would apply a voltage of 0.8V to the cutaneous actuator, instead of 1V, resulting in the desired subjective level of force of 5 and matching the baseline.

Figure 12E:
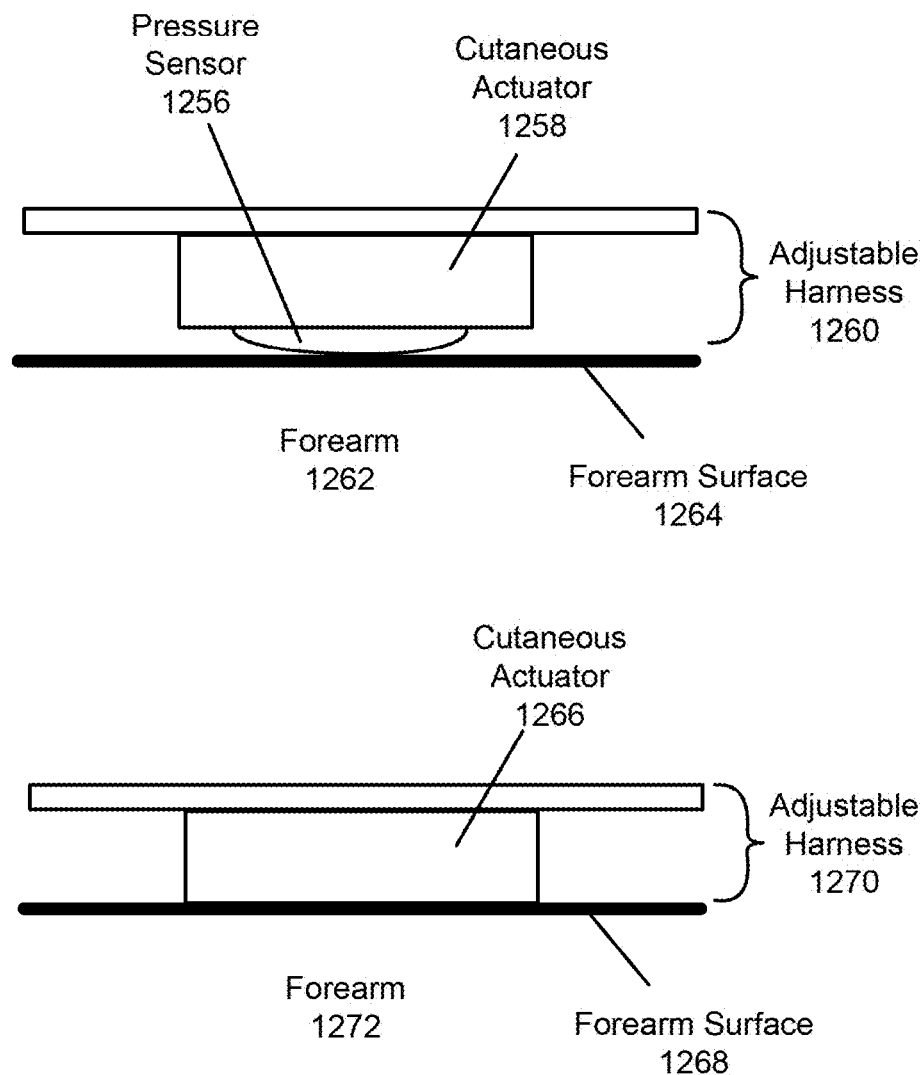
FIG. 12E illustrates an alternative arrangement of generating calibration data using cutaneous actuators, according to an embodiment.

FIG. 12E illustrates an alternative arrangement of generating calibration data using cutaneous actuators, according to an embodiment. In FIG. 12E, the adjustable harness uses cutaneous actuators, such as those described above, in order to generate the calibration data 1220. This may be the same cutaneous actuator used to ultimately generate the haptic output to the user. Two arrangements are shown in FIG. 12E. In the first one, cutaneous actuator 1256 is placed on the interior surface of an adjustable harness. A pressure sensor 1256 is placed on a cutaneous actuator 1256 on a side of the cutaneous actuator 1256 opposite the side facing the interior surface of the adjustable harness. The pressure sensor 1256 contacts the forearm surface 1264 of the forearm 1262 when the adjustable harness 1260 is worn by the user on the user's forearm. Instead of using an adjustable strap or other adjustable mechanism to change the force applied by the adjustable harness 1260, instead the cutaneous actuator 1258 is activated at different levels of haptic output, with the pressure sensor 1256 recording a sensor voltage level at these different levels of haptic output. The user indicates a subjective level of force at the subjective magnitude input device 1208 for each of the levels of haptic output, while the pressure sensor 1256 provides the corresponding sensor voltage input.

In the second arrangement, no pressure sensor is present. Instead, a cutaneous actuator 1266 is attached to the interior surface of the adjustable harness 1270 and makes contact directly with the forearm surface 1268 of the forearm 1272. As with the adjustable harness 1260, no adjustment mechanism is used to modify a level of force. Instead, the cutaneous actuator 1266 directly provides a haptic output to the forearm surface 1268. The input to the cutaneous actuator 1266, whether it be a voltage or other value, is provided as the sensor voltage input 1210, instead of a sensor voltage value. As before, the user provides the subjective magnitude to the subjective magnitude input device 1208. Here, the cutaneous actuator 1266 may provide any type of haptic output—not just a pressure type. For example, the cutaneous actuator 1266 may provide a vibration type output, a shear force output, a displacement type output, an electrical output, a temperature output, an auditory output, and so on. These may all generate a haptic sensation with the user, and the user may indicate the subjective magnitude of the sensation with the subjective magnitude input device 1208. This method allows the system to calibrate for a user's sensation for any type of cutaneous actuator. A representation of the calibration data 1220 is described in detail below with reference to FIG. 12F.

Figure 12F:
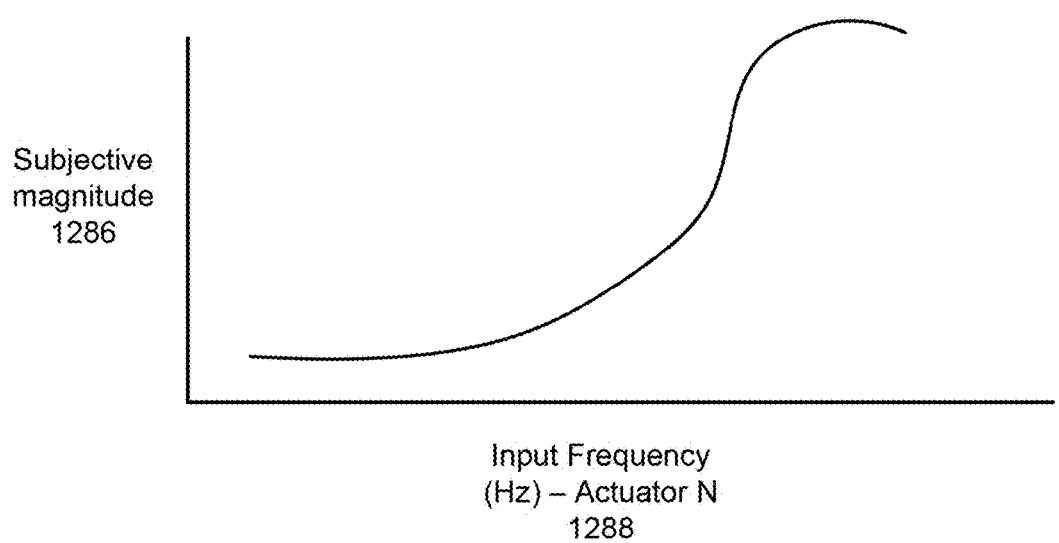
FIG. 12F illustrates an example representation of calibration data as a graph using a cutaneous actuator as in FIG. 12E, according to an embodiment.

FIG. 12F illustrates an example representation of calibration data as a graph using a cutaneous actuator as in FIG. 12E, according to an embodiment. In the illustrated graph, an input frequency 1288 into the cutaneous actuator, such as cutaneous actuator 1266 is plotted on the horizontal axis, and a subjective magnitude 1286 of the haptic output is plotted on the vertical axis. The cutaneous actuator in this case may provide a vibrational haptic output. As the frequency of the vibration increases, as shown in the input frequency 1288 axis, the subjective magnitude 1286 that is perceived increases. In one embodiment, the subjective magnitude may be measured as above, i.e., in accordance with the user's perception of the strength of the haptic output. For example, in the illustrated example, the subjective magnitude is measured by first determining, at a given input frequency 1288 for the cutaneous actuator, a minimum amplitude of voltage to the cutaneous actuator where a user may detect the haptic output (the vibration) at least 50% of the time over multiple tests. At this level, the detection of the user is measured in decibel (dB) relative to a 1 micron peak or dB relative to 1N displacement. In other words, the subjective magnitude is computed as $20*\log_{10}(x)$, where x is the objectively measured force or displacement created by the cutaneous actuator. Over the range of input frequencies 1288, a human detection threshold curve is thus generated. The inverse of this curve is then used as the calibration data 1220 and is the one shown in FIG. 12F. In other words, the subjective magnitude is the inverse of the detection threshold for the cutaneous actuator over the range of input frequencies.

In another embodiment, the subjective magnitude of the haptic output is adjusted in an array with a reference level. This generates an iso-sensitivity curve. Such an iso-sensitivity curve is determined at various reference levels of objective haptic output to generate calibration data across all levels of haptic output. Each iso-sensitivity curve is similar to that shown in FIG. 12F, however, the calibration data includes multiple iso-sensitivity curves, with each corresponding to a different level above the minimum sensation level (e.g., 0 dB above, 10 dB above, 20 dB above, and so on). The minimum level is represented by the curve shown in FIG. 12F, and each of the iso-sensitivity curves with levels above the minimum level can be represented as curves that are parallel to the curve shown in FIG. 12F. A user may adjust one or more cutaneous actuators to use one of these iso-sensitivity curves. This increases or decreases the subjective magnitude experienced by the user, although other aspects, such as the frequency of the haptic output from the cutaneous actuator, remains the same.

Figure 12G:
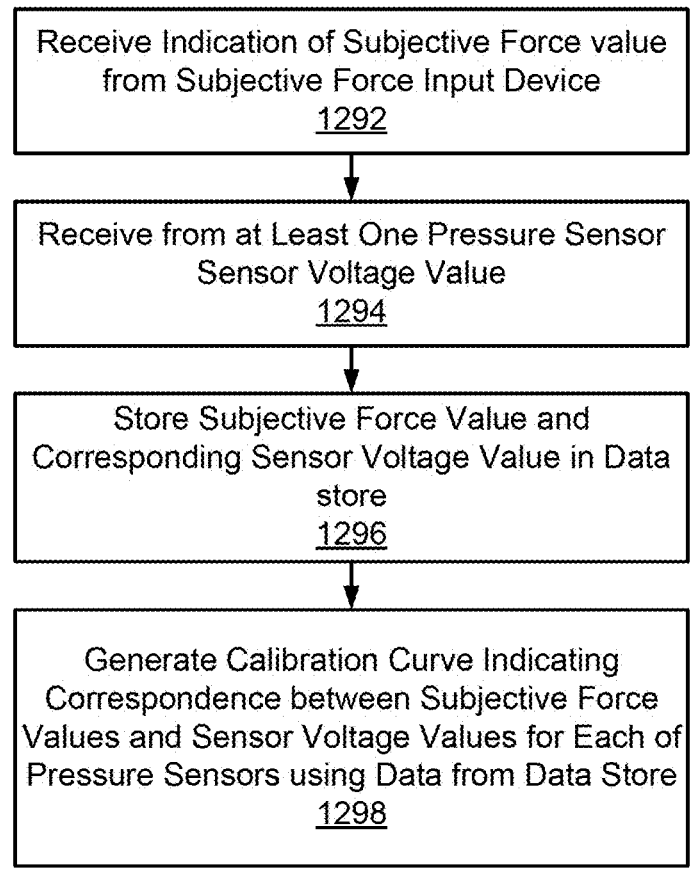
FIG. 12G is a flowchart illustrating a method for gathering per-user calibration data for haptic output, according to an embodiment.

FIG. 12G is a flowchart illustrating a method for gathering per-user calibration data for haptic output, according to an embodiment. The process described in the flowchart may be performed by the per-user force calibration data generator 1212, which in turn may be a component of a signal generator that may be part of a haptic device. Although a particular arrangement of steps is shown here, in other embodiments the process may be arranged differently.

Initially, the per-user force calibration data generator 1212 receive 1292 an indication of the subjective force value from a subjective force input device, such as the subjective force input device 1208. The per-user force calibration data generator 1212 receives 1294 from at least one pressure sensor, such as pressure sensor 1226, a sensor voltage value.

The per-user force calibration data generator 1212 stores the subjective force value and the corresponding sensor voltage value in a data store, such as the force voltage database 1216. Using this information, the per-user force calibration data generator 1212 generates 1298 a calibration curve indicating a correspondence between subjective force values and sensor voltage values for each of the pressure sensors using the data from the data store. This calibration curve may be used to calibrate a haptic device, such that each user experiences a same subjective level of force for the same intended haptic output.

Neural Network Model for Generation of Compressed Haptic Actuator Signal from Audio Input Embodiments also relate to using machine learning to generate a model to convert an audio input to a sequence of haptic outputs of multiple cutaneous actuators in a haptic device for decoding by a human. While an automated system may be able to encode audio into and decode audio from haptic output in an arbitrarily complex fashion, the requirements for human decoding of the haptic output are different. In particular, the encoding of audio signals for human-capable decoding should follow various constraints, such as high compressibility and low entropy. Such a conversion may be achieved by training a machine learning model to convert the audio input to haptic outputs within these constraints.

Figure 13A:
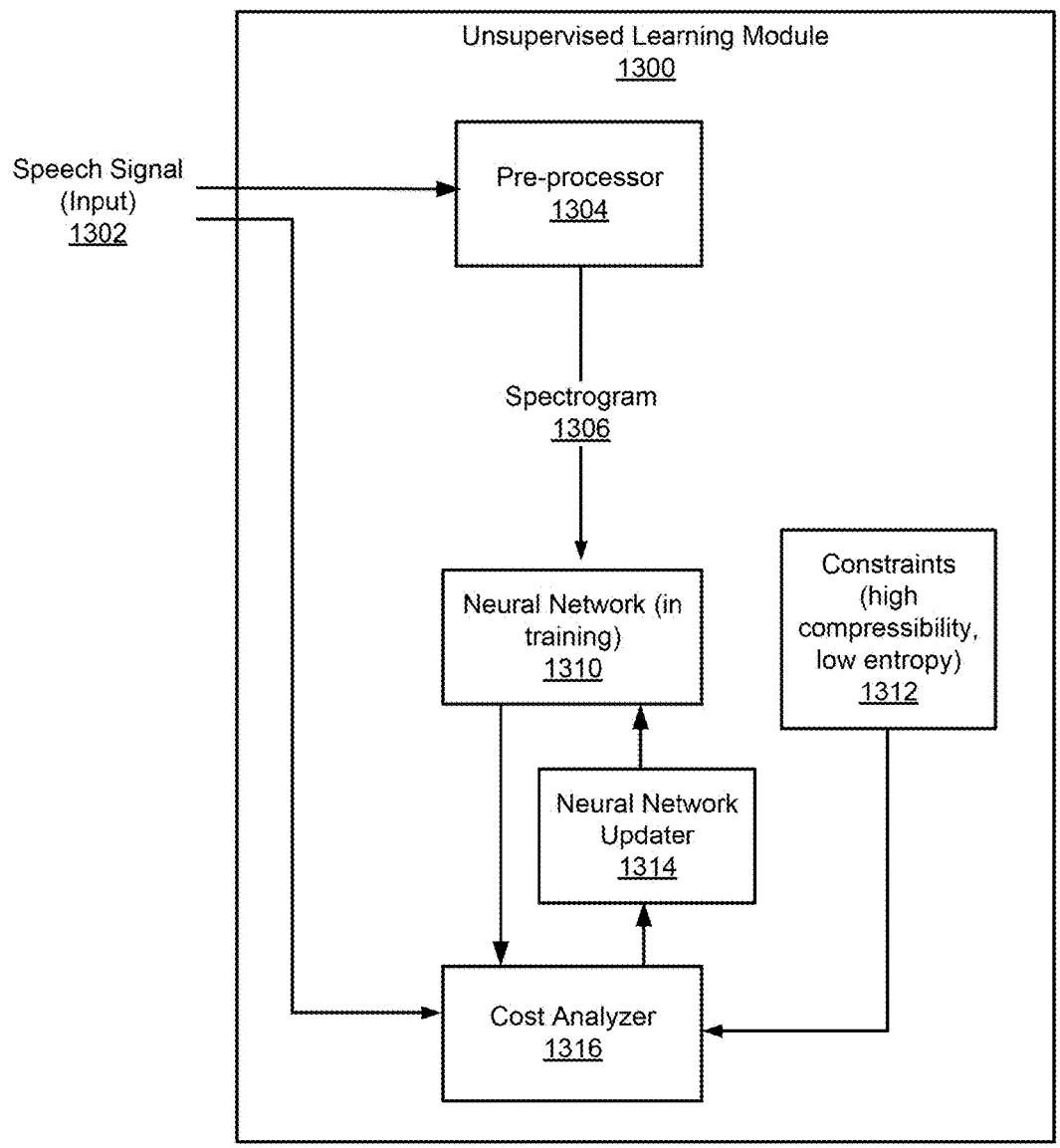
FIG. 13A is a block diagram illustrating an unsupervised learning module used to train a neural network in compressing an audio input to a sequence of haptic cues, according to an embodiment.

FIG. 13A is a block diagram illustrating an unsupervised learning module 1300 used to train a neural network 1310 in compressing an audio input to a sequence of haptic cues, according to an embodiment. The unsupervised learning module 1300 may be used to generate a set of coefficients and other settings for the neural network 1310. In one embodiment, the neural network 1310 is also known as a machine learning circuit or a machine learning algorithm. The components of the block diagram in FIG. 13A may be stored as computer readable instructions in memory, such as the memory 813. In another embodiment, these components are separately implemented using dedicated hardware, including a processor and memory.

The unsupervised learning module 1300 receives an acoustic signal 1302 as input. The input may be any audio waveform, and may be encoded in any format, at any bit rate, sample rate, etc.

The pre-processor 1304 of the unsupervised learning module 1300 first converts the acoustic signal 1302 into a spectrogram 1306. Such a spectrogram can be generated using a Fourier transform of the original acoustic signal 1302. If the input acoustic signal 1302 is digital (i.e., is sampled), then a discrete Fourier transform may be used to convert the acoustic signal 1302 to the spectrogram 1306. The spectrogram 1306 represents the magnitude of various frequencies over windows of time for the input acoustic signal 1302. For example, the spectrogram 1306 may represent the acoustic signal 1302 in 32 ms slices. The spectrogram 1306 represents the audio in each slice by frequency, and indicates for each frequency the magnitude of the frequency in that slice. In one embodiment, the magnitude is represented by the log of the amplitude (i.e., the log amplitude). The magnitude and frequency values can be represented numerically, and these numerical representations are used as the input feature for the neural network 1310. In another embodiment, the spectrogram 1306 is a Mel-frequency cepstrum, and is represented using Mel-frequency cepstrum coefficients (MFCCs).

The neural network 1310 is a machine learning model that is trained in order to receive as input the pre-processed acoustic signal 1302 and generate as output a sequence of actuator signals representing the acoustic signal 1302 and also obeying a variety of constraints 1312. The neural network 1310 may be a convolutional neural network. The convolutional neural network processes on multiple slices (or frames) of the spectrogram in order to generate a sequence of actuator signals. These actuator signals are intended to be a representation of the center slice among the multiple slices that are processed. In another embodiment, the neural network 1310 is a recurrent neural network, which has nodes that form a directed cycle. In this fashion, the neural network 1310 may process each slice of the spectrogram 1306 separately, but with each slice influencing the state of the neural network 1310 for the processing of the subsequent slice. The neural network 1310 may use any one of a common set of activation functions, such as the sigmoid, softmax, rectifier, or hyperbolic tangent. The input features are fed into the neural network 1310, which has been initialized with randomized weights. The output of the neural network 1310 indicates a combination of haptic cues for each slice of the input audio. Each of these haptic cues indicates the haptic output for a cutaneous actuator, such as cutaneous actuator 108, and may be represented by one or more nodes in the final layer of the neural network 1310. Each node of the neural network 1310 may indicate for each cutaneous actuator 108, a percentage value that may be used to determine whether or not to activate a particular state of the cutaneous actuator. For example, if the percentage is below 50%, then the cutaneous actuator should not be activated. Multiple nodes may be used if the cutaneous actuator has more than two states.

The neural network 1310, during training, is also constrained based on the various constraints 1312, which will be described in further detail below. These constraints 1312 aim to constrain the output of the neural network 1310 towards high compressibility, low entropy, low ordinality (i.e., fewer number of possible haptic outputs), sparsity, temporal stability, and spatial stability. Subsequent to the training process, the neural network 1310 is able to produce a set of haptic cues for a set of cutaneous actuators which represents the input acoustic signal 1302. When the haptic outputs indicated by these haptic cues are sensed by a user, the user, who may be trained, may then be able to recreate, or at least have an understanding of the input acoustic signal. The haptic output, if recorded, may also be used to reconstruct the original input acoustic signal. In this fashion, an acoustic signal can be compressed into a haptic (or tactile) signal.

The cost analyzer 1316 determines, during the training of the neural network 1310, the cost of the current iteration of the neural network 1310. The cost is computed based on the error between a reconstructed version of the acoustic signal using the current output of the neural network 1310 in addition to how well the current iteration of the neural network 1310 meets the constraints 1312.

The reconstruction of the haptic cues into the original speech signal may be achieved via a second neural network, hereinafter called a reconstruction neural network. The reconstruction neural network is trained on the reverse of the actions of the neural network 1310. It receives as input the compressed haptic cues from the neural network 1310 and is trained to attempt to generate an output that most closely matches the original input features (the spectrogram 1306) with as small of an error amount as possible. The training of the reconstruction neural network attempts to reduce this error amount (e.g., using gradient descent) until a satisfactory minima is reached (e.g., after a certain number of iterations). At this point, the error between the reconstructed spectrogram generated by the reconstruction neural network and the input spectrogram 1306 is compared and an error amount is determined. In one embodiment, the reconstructed spectrogram is further converted into a reconstructed audio signal, which is compared with the input audio signal 1302 to determine the error. The error may be computed via cross power spectral density, or other methods. In other embodiments, the error is not computed using a reconstruction neural network, but using some other function that attempts to determine a relationship between the output actuator signals and the spectrogram 1306, such as a correlation. The difference in the identified relationship may be deemed to be the error amount.

In addition to the error amount, the cost also includes a computation based on how well the current iteration of the neural network 1310 meets the constraints 1312. These constraints 1312 may compute a cost value based on the output of the neural network 1310 and/or the hidden layers within the neural network 1310. Additional details regarding the individual constraints 1312 are described immediately below.

The constraints 1312 are various restrictions on the output of the neural network 1310 and are implemented in the training of the neural network 1310 by modifying the cost function used to train the neural network 1310. A list of exemplary constraints 1312 and how they are achieved by modifying the cost function are described below. Two goals of the constraints 1312 are to achieve a high compressibility—such that a high throughput is achieved with a limited number of haptic outputs, and low entropy—such that the haptic outputs are not highly disordered but rather have a discernable pattern. In one embodiment, the constraints 1312 include 1) low ordinality, 2) high sparsity, 3) high temporal stability, and 4) high spatial stability.

1) A first constraint 1312 is low ordinality. This constraint 1312 is to limit the number of the types of haptic cues to a manageable amount within a human ability to detect the different types of output. In particular, the types may be limited to an off state, and two on states (represented at the actuator with a 1) 100 Hz sinusoid and a 2) 250 Hz sinusoid in one embodiment). These indicate the frequency at which a cutaneous actuator vibrate at when on. In one embodiment, this constraint of low ordinality is achieved by indicating a lower cost for outputs from the neural network 1310 that achieve the indicated number of outputs, and indicating a very high cost for those that do not. In another embodiment, this constraint of low ordinality is achieved by having the neural network 1310 configured to output two nodes for each cutaneous actuator, one node indicating a 100 Hz state, and the other indicating at 250 Hz state. The cost function in this scenario would be modified such that a high cost is given if any of these output nodes for one cutaneous actuator are simultaneously active.

2) A second constraint 1312 is high sparsity. This constrains the number of cutaneous actuators that are activated at once as humans may become confused when exposed to more than a few active cutaneous actuators. This sparsity constraint 1312 may be achieved by adding a cost that is proportional or increases with the number of cutaneous actuators that are indicated to be active by the neural network 1310 for a set of haptic cue outputs at a time slice. For example, the cost function for sparsity may compute the number of nodes indicating activation of cutaneous actuators, and derive a cost value in proportion to the number of nodes. In another embodiment, this sparsity constraint 1312 is achieved by filtering out outputs from the neural network 1310 that exceed a max number of activated cutaneous actuators. The result from the iteration of the neural network is discarded and a new iteration is performed with newly modified weights.

3) A third constraint 1312 is temporal stability. This constrains the frequency of changes in the state of cutaneous actuators so that they do not change too rapidly, which may cause confusion as a human may not be able to perceive such rapid changes. This temporal stability constraint 1312 may be achieved by adding a cost that is proportional to the number of changes from the output of the previous slice of the input spectrogram 1306. As the neural network 1310 may be a recurrent neural network, it can recall information from a prior state, and thus the cost may be increased when the prior information indicates that a change has occurred.

4) A fourth constraint 1312 is spatial stability. This constraint the spatial variability of activated cutaneous actuators such that they are nearer together spatially on a haptic device. In other words, cutaneous actuators that are activated should be clustered close together. In one embodiment, this constraint is achieved by having only certain groups of cutaneous actuators to be on at any given time. Thus, if the neural network 1310 output indicates that cutaneous actuators from more than one group are active at one time, the cost for this constraint may be indicated to be very large. Alternatively, the result may be dropped and the neural network executed with newly updated weights. In another embodiment, the cost for this constraint may be achieved by decreasing the cost for outputs from the neural network 1310 where adjacent cutaneous actuators are active at the same time while fewer cutaneous actuators which are further away are active. For example, for each cutaneous actuator that is active, a base cost is indicated. However, for each adjacent cutaneous actuator that is active, the base cost is subtracted by an amount which may correspond to the distance to the adjacent cutaneous actuator. The sum of all the costs are added together to generate the total cost for the spatial stability constraint. In addition, the neural network 1310 may receive as input data regarding the configuration and distances between cutaneous actuators. This may provide the additional information to the neural network 1310 that may assist in optimizing training time.

Although four different constraints 1312 are described above, in other embodiments, the constraints 1312 include more than these four. In one case, an additional constraint is the inclusion of a joint phoneme classifier. The joint phoneme classifier is trained upon the output of the neural network 1310, and the error rate from this classifier is included in the overall cost function computed by the cost analyzer 1316. This may allow for an increase in the correspondence between the haptic cues and any phonemes represented in the haptic cues.

The cost analyzer 1316 computes a weighted average of the costs for each constraint and the error from the reconstruction of the haptic cues (over ever time slice) to derive a final cost value. This is transmitted to the neural network updater 1314 which updates the neural network 1310 based on this cost.

The neural network updater 1314 updates the neural network 1310 based on the computed cost from the cost analyzer 1316. This may be achieved using standard neural network training mechanisms, such as backpropagation and stochastic gradient descent. The process of updating the neural network 1310 and analyzing the cost via the cost analyzer 1316 are repeated until a desired error rate is achieved or where accuracy is no longer improved when testing against a validation set. Other standard indicators for stopping training may also be used.

Figure 13B:
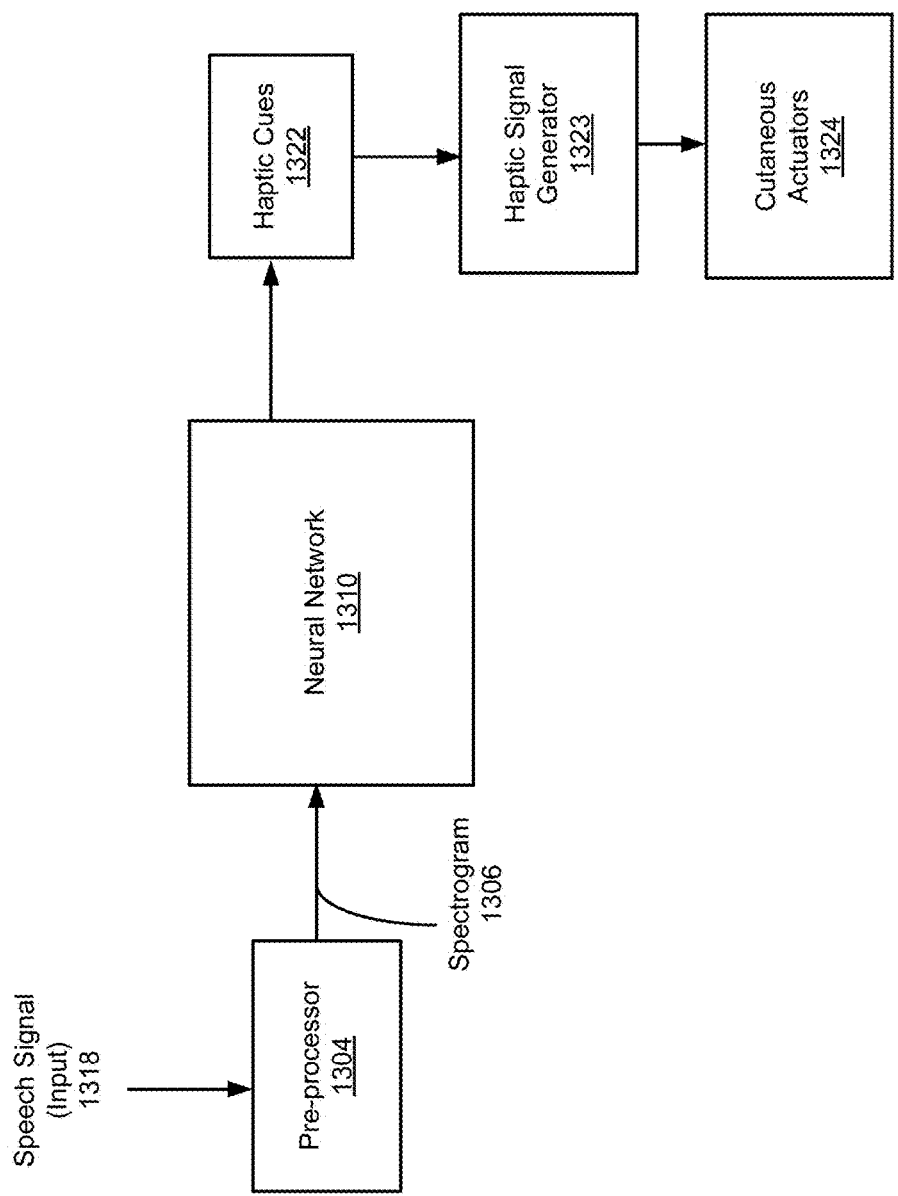
FIG. 13B is a block diagram illustrating the use of the neural network after it has been trained, according to an embodiment.

FIG. 13B is a block diagram illustrating the use of the neural network 1310 after it has been trained, according to an embodiment. An acoustic signal 1318 (not part of the training set used to train the neural network 1310) is received by the pre-processor 1304, which converts it into a spectrogram 1306. The trained neural network 1310 receives the spectrogram 1306, and outputs a set of haptic cues 1322 for each time slice of the spectrogram. These haptic cues 1322 indicate a pattern of haptic outputs for the cutaneous actuators of the haptic device 1324, but may not yet be in a format that can be used by the haptic device 1324 directly. For example, the haptic cues 1322 may be output as a set of percentage values, as described above with reference to FIG. 13A. Thus, the haptic cues 1322 may first be converted into actuator signals by a haptic signal generator 1323, before being transmitted to the cutaneous actuators 1324 to generate the corresponding haptic outputs.

Figure 13C:
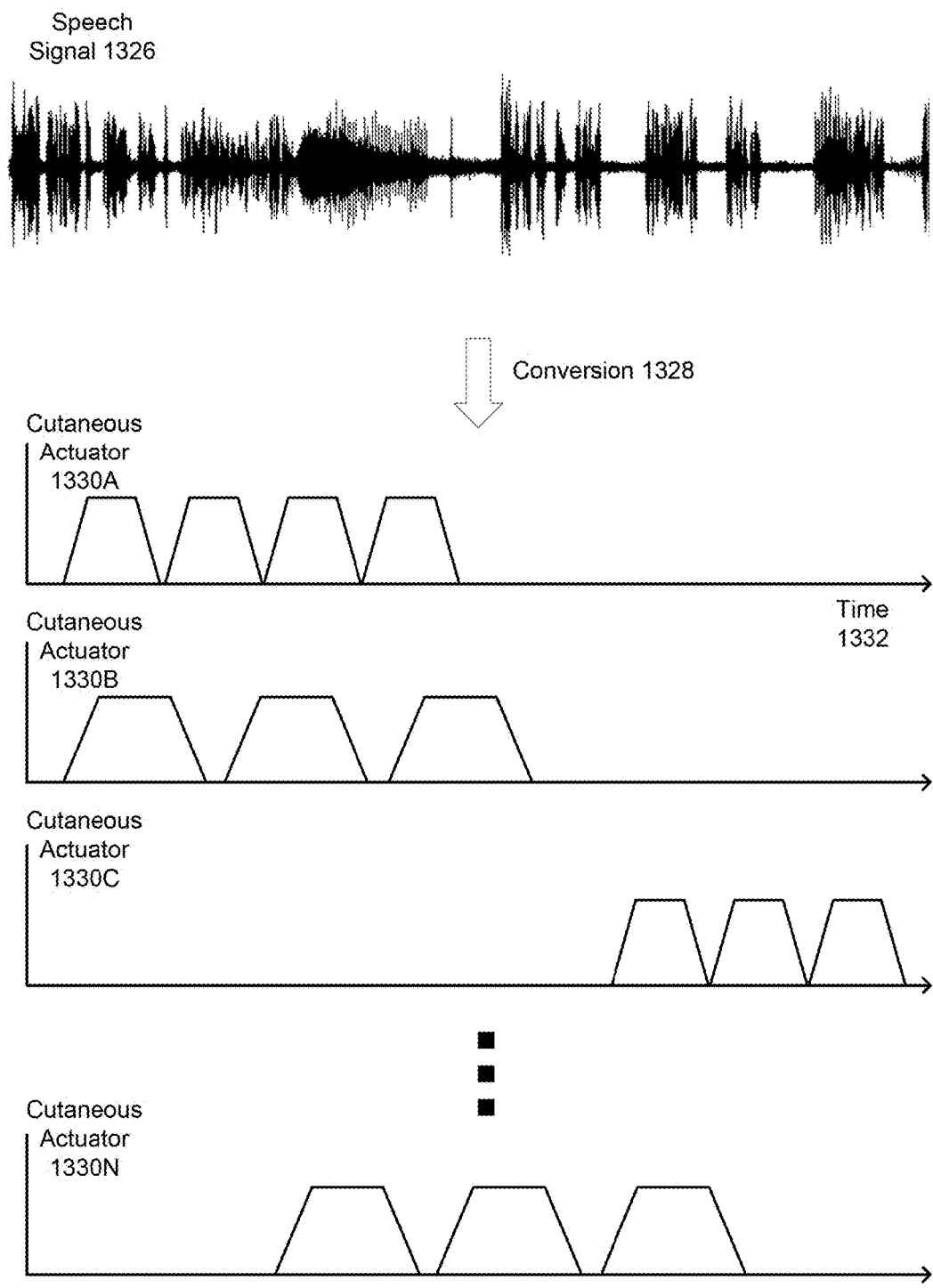
FIG. 13C illustrates a conversion using the neural network of a speech signal into a set of haptic outputs for a set of cutaneous actuators, according to an embodiment.

FIG. 13C illustrates a conversion using the neural network 1310 of a speech signal into a set of haptic outputs for a set of cutaneous actuators 1330, according to an embodiment. The speech signal 1326 may be a sampled waveform, such as the one illustrated. This speech signal 1326 is converted 1328 using the process described above into a sequence of haptic cues, which are subsequently transmitted to a haptic device and causes a set of cutaneous actuators 1330A-N on the haptic device to generate a set of haptic outputs, as shown. After sensing these haptic outputs, a human may be able to determine information about the original speech signal 1326. This may allow a human to understand some aspects of the original speech signal 1326 without having hear the speech signal 1326 or via any other auditory means.

Figure 13D:
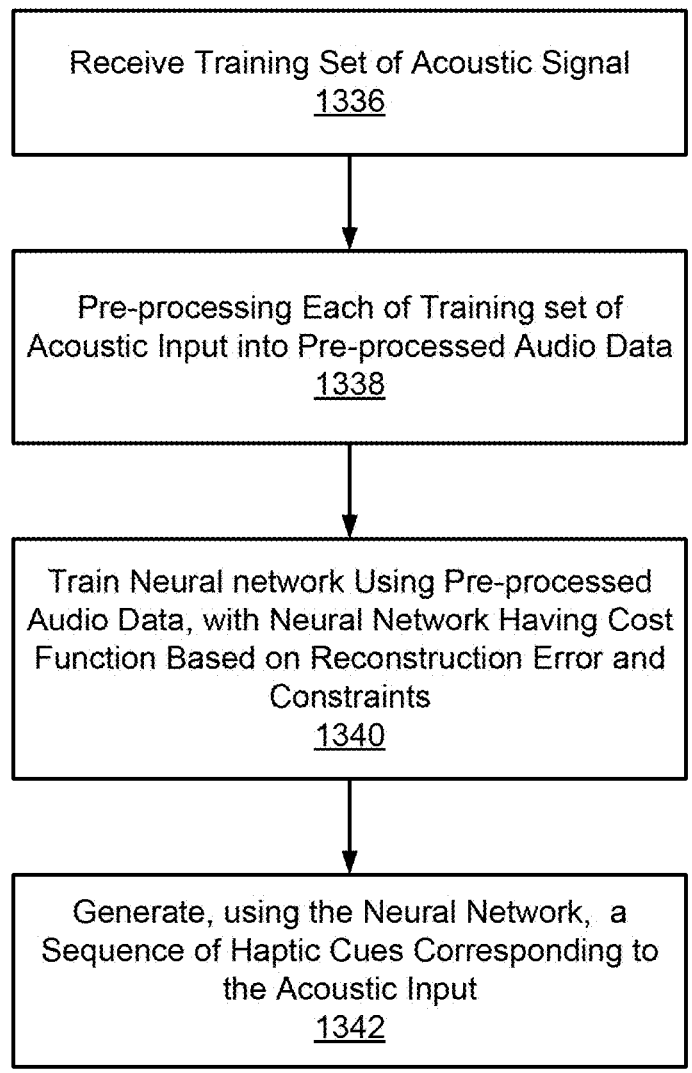
FIG. 13D is a flowchart illustrating a method for training a machine learning circuit to generate a set of compressed haptic cues from an acoustic signal, according to an embodiment.

FIG. 13D is a flowchart illustrating a method for training a machine learning circuit to generate a set of compressed haptic cues from an acoustic signal, according to an embodiment. The process described in the flowchart may be performed by the unsupervised learning module 1300. Although a particular arrangement of steps is shown here, in other embodiments the process may be arranged differently.

The unsupervised learning module 1300 receives 1336 a training set of speech signals, such as the speech signal 1302. The unsupervised learning module 1300 pre-processes 1338 the training set of speech signal into pre-processed audio data. The pre-processed audio data may include at least a spectrogram, such as the spectrogram 1306. The unsupervised learning module 1300 trains 1340 a neural network using the pre-processed audio data. Additionally, the neural network generates 1342 a sequence of haptic cues corresponding to the speech signal. The neural network has a cost function based on a reconstruction error and a plurality of constraints, such as the constraints 1312. These constraints cause the sequence of haptic cues that are output to have high compressibility and low entropy. The sequence of haptic cues are transmitted cutaneous actuators to generate a sequence of haptic outputs. These cutaneous actuators face a skin surface, such as forearm surface, of a user's body.

Speech Algorithm to Apply Haptic Communication Patterns Related to Consonant-Vowel Pairs or Syllables Embodiments also relate to a haptic symbol set which specify sequences of actuator signals for operating haptic actuators to be generated from input words of a language. However, unlike the system described with regards to FIGS. 11A through 11J, the haptic symbols here are based on units within the written form of the language, rather than phonemes, which are represented in the spoken component of the language. Such units may include consonant-vowel pairs or syllables. Unlike a language such as English, which has a written system that does not break down into syllables or consonant-vowel pairs, other writing systems of other languages have such a feature. For example, the hiragana writing system of Japanese is a syllabary, while the Devanagari script of Hindi is an abugida, i.e., it uses consonant-vowel pairs in the writing system.

Figure 14A:
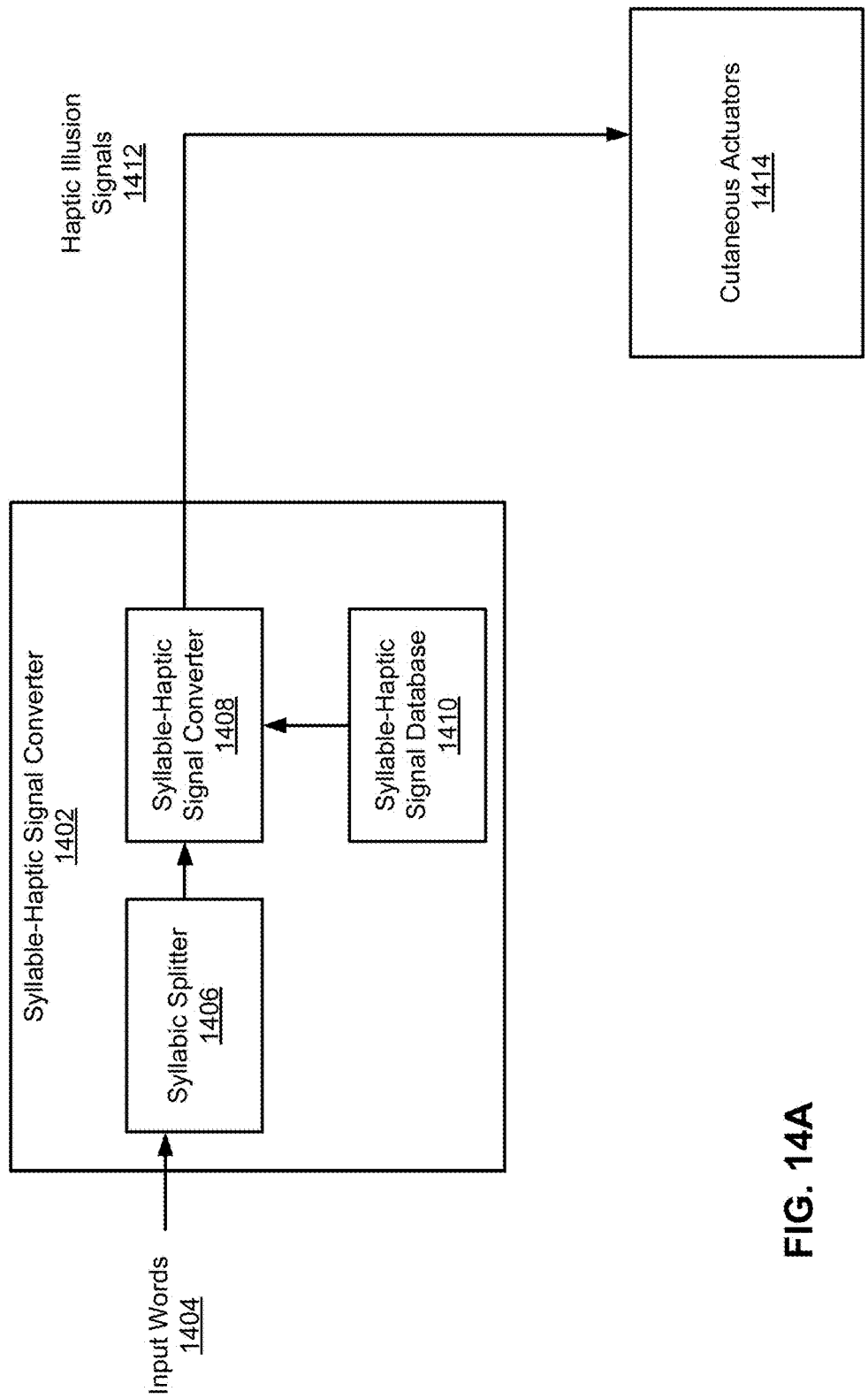
FIG. 14A is a block diagram illustrating the components of a system for converting the syllables of input words to haptic illusion signals to activate cutaneous actuators of a haptic device, according to an embodiment.

FIG. 14A is a block diagram illustrating the components of a system for converting the syllables of input words 1404 to actuator signals 1412 to activate cutaneous actuators 1414 of a haptic device, according to an embodiment.

The input words 1404 are words in a language that can be formed from a limited number of syllables. While languages such as English (and other European languages), when spoken, are formed as syllables as well, the number of possible syllables in such a language exceed 10,000, and thus the syllables of such a language cannot be easily represented by unique sequences of actuator signals. Instead, the input words 1404 may be from a language that can be formed using a limited number of syllables (e.g., under 100), such as with Japanese.

The syllable-haptic signal converter 1402 is similar to the word-haptic signal converter 1107, but converts the input words 1404 into component syllables, and converts these syllables into sequences of actuator signals, instead of converting into phonemes. The syllable-haptic signal converter 1402 includes a syllabic splitter 1406, a syllable-haptic signal converter 1408 and a syllable-haptic signal database 1410. In one embodiment, the syllable-haptic signal converter 1402 may be a component in a signal generator, such as signal generator 800.

The syllabic splitter 1406 converts the input words 1404 into component syllables. The output of the syllabic splitter 1406 may be a set of symbols representing the syllables of the language of the input words 1404. For example, Japanese may be represented by 46 syllables, as indicated by the hiragana writing system. The syllabic splitter 1406 may convert words to syllables based on a syllable database which indicates the syllables that correspond to the letters or other elements in the written form of the input words 1404.

The syllable-haptic signal converter 1408 may be similar to the phoneme-haptic signal converter 1109, but converts the syllables of the input words 1404 into sequences of actuator signals, instead of the phonemes of the input words. For each syllable received from the syllabic splitter 1406, the syllable-haptic signal converter 1408 accesses the syllable-haptic signal database 1410 to determine the corresponding sequence of actuator signals 1412 to output. In one embodiment, each syllable has a single corresponding sequence of actuator signals 1412.

The sequence of actuator signals 1412 that are generated are not just patterned based on which cutaneous actuators 1414 of a haptic device to activate in sequence. Instead, the sequence of actuator signals 1412 may also be patterned such that each actuator signal 1412 in the sequence may have a different duration, and such that the absence of a signal, combined with other actuator signals 1412, may also indicate a particular sequence that corresponds to a syllable. Thus, the duration of signals, and the lack of signals, may all contribute to different sequences of actuator signals 1412 that represent different syllables. Additionally, the actuator signals 1412 may not simply be binary (e.g., on and off) but may be variable instead, allowing the haptic output of the cutaneous actuators to vary in intensity, and allowing haptic outputs that follow complex patterns and waveforms.

The actuator signals 1412 output by the syllable-haptic signal converter 1402 are transmitted to the cutaneous actuators 1414, which may be similar to the cutaneous actuators 1104 of FIG. 11B. Each actuator signal 1412 activates one of the cutaneous actuators 1414 for a duration of time (and in some embodiments, for a particular intensity, frequency, and so on). At the point when the cutaneous actuator 1414 receives its actuator signal 1412, it activates. When the same actuator signal 1412 ceases, the cutaneous actuator 1414 deactivates. Alternatively, the actuator signals 1412 are digital in that they transmit a specified duration and start time (and other factors, such as intensity) for a specified cutaneous actuator 1414. This digital signal is converted by a processor by the cutaneous actuators 1414 themselves, and subsequently the corresponding cutaneous actuator 1414 activates according to the specified duration at the specified start time. A sequence of these actuator signals 1412 can generate a unique pattern that can be recognized and distinguished by a user from other sequences of actuator signals 1412.

A set of examples of particular haptic outputs generated by the actuator signals 1412 corresponding to syllables is described below with reference to FIG. 14B.

Figure 14B:
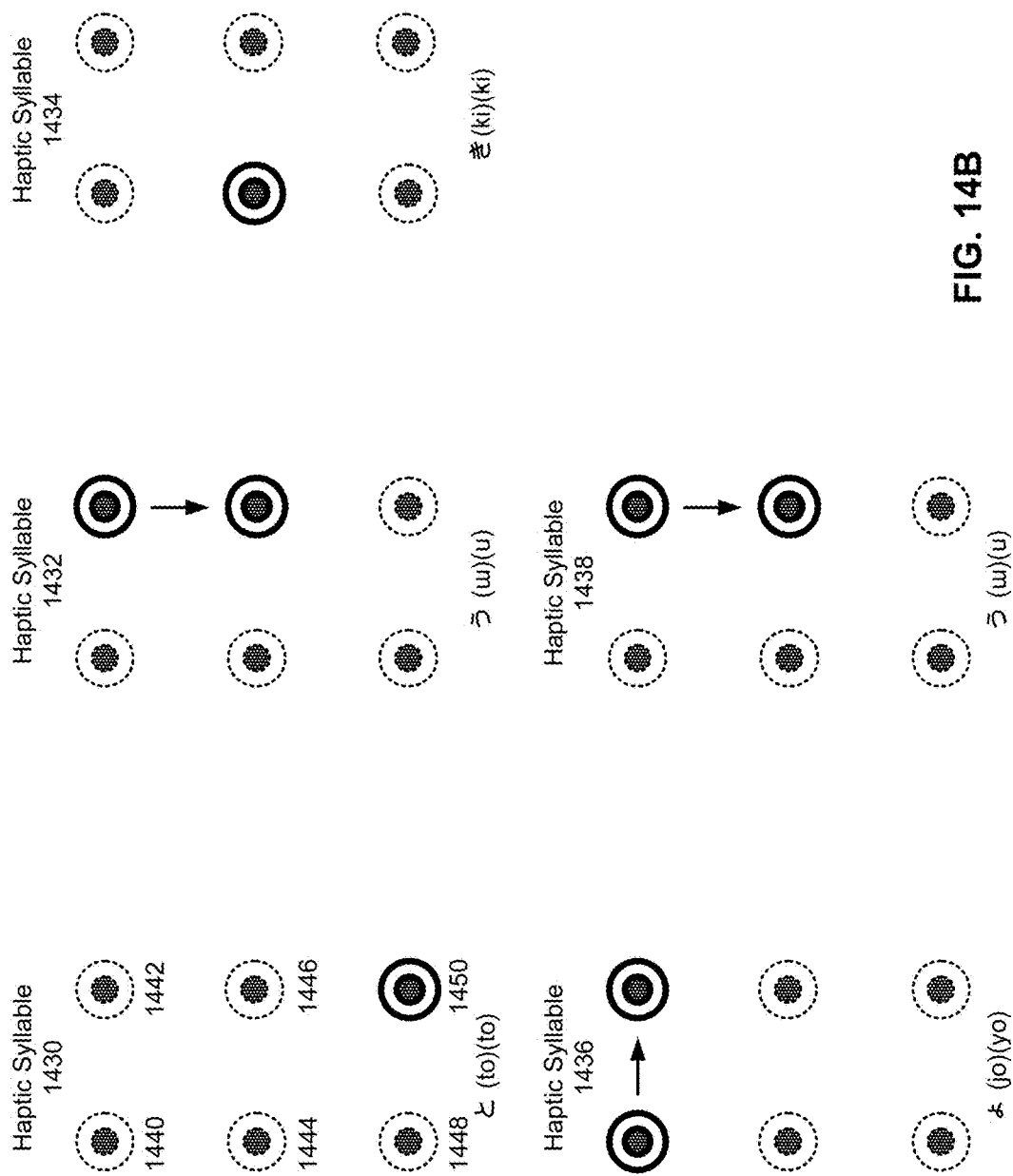
FIG. 14B illustrates exemplary sequence of haptic syllable haptic outputs for an example input word, according to an embodiment.

FIG. 14B illustrates exemplary sequence of haptic syllable haptic outputs for an example input word 1404, according to an embodiment. In the illustrated example, the input word 1404 is "Tōkyō," or "Tokyo" in English. This word includes 5 different syllables: 1) /to/, 2) /ɯ/ or "u", 3) /ki/, 4) /jo/ or "yo", and 5) /ɯ/ or "u". Note that the second, fourth, and fifth syllables are vowels. The syllable-haptic signal converter 1402 converts each of these syllables into a sequence of actuator signals 1412, which are transmitted to the cutaneous actuators 1414, which generate a haptic output based on the actuator signals 1414 and which are sensed by the user. For ease of discussion, each of the sequence of haptic outputs associated with a syllable is referred to as a haptic syllable. Thus, the five syllables here are translated into five haptic syllables, which are sensed by the user. After training, the user may be able to identify the word "Tōkyō" after sensing these five haptic syllables. A similar process would occur for other words.

In the illustrated example of FIG. 14B, a 3×2 two dimensional array of cutaneous actuators 1440-1450 is represented by concentric circles, with each set of two concentric circles representing one cutaneous actuator. The cutaneous actuators 1440-1450 are labeled for haptic syllable 1430, but are not repeatedly labeled for haptic syllables 1432-1438 for clarity. However, the cutaneous actuators indicated in haptic syllables 1432-1438 are the same as those in the same positions in haptic syllable 1430. This two dimensional array of cutaneous actuators 1440-1450 may correspond to the two dimensional array of cutaneous actuators 1104 in FIG. 11A.

Each haptic syllable 1432 through 1438 indicates a sequence of haptic outputs by this array of cutaneous actuators that corresponds to a syllable of the input word "Tōkyō". Each single haptic output in a sequence of haptic outputs corresponds to activation of a cutaneous actuator, and is represented by a set of two solid concentric circles for that cutaneous actuator. In contrast, non-activated cutaneous actuators are represented by dotted concentric circles. Furthermore, a two point sequence of haptic outputs is represented by two sets of solid concentric circles, with an arrow in between the two sets indicating an activation of a first cutaneous activator which is located in a direction immediately opposite the direction of the arrow, followed by the activation of a second cutaneous actuator which is indicated in a direction immediately following the direction of the arrow. The two point sequence of haptic outputs may be similar to the sequence described with reference to FIG. 11D. For example, for haptic syllable 1432 for the syllable "/ɯ/" is indicated by the activation of the cutaneous actuator 1442 followed by the activation of the cutaneous actuator 1446, after a delay period, such as the SOA delay described above with reference to FIG. 11D.

The sequences of haptic outputs for each haptic syllable may be separated from each other by a delay period with no haptic output (e.g., of 200 ms), or by a special delimiter haptic output (e.g., all actuators activate at the same time for an interval of time).

In the illustrated example, 1) "to" corresponds to the haptic syllable 1430 and activation of the cutaneous actuator 1450, 2) "u" corresponds to the haptic syllable 1432 and activation of the cutaneous actuator 1442 followed by 1446, 3) "ki" corresponds to the haptic syllable 1134 and activation of the cutaneous actuator 1444, 4) "yo" corresponds to the haptic syllable 1436 and activation of the cutaneous actuator 1440 followed by 1442, and 5) "u" corresponds to the haptic syllable 1438 and activation of the cutaneous actuator 1442 followed by 1446 (same as 2).

The correspondence between each haptic syllable and each spoken syllable may be selected based on articulation association, in a fashion similar to that described above for FIG. 11H. Furthermore, in one embodiment, the duration of haptic output for consonant syllables may be shorter than that of vowel syllables, in a fashion similar to that described above for FIG. 11H. Although a particular combination of haptic outputs are shown here for each syllable, in other embodiments the combinations of haptic outputs to syllables may differ.

Figure 14C:
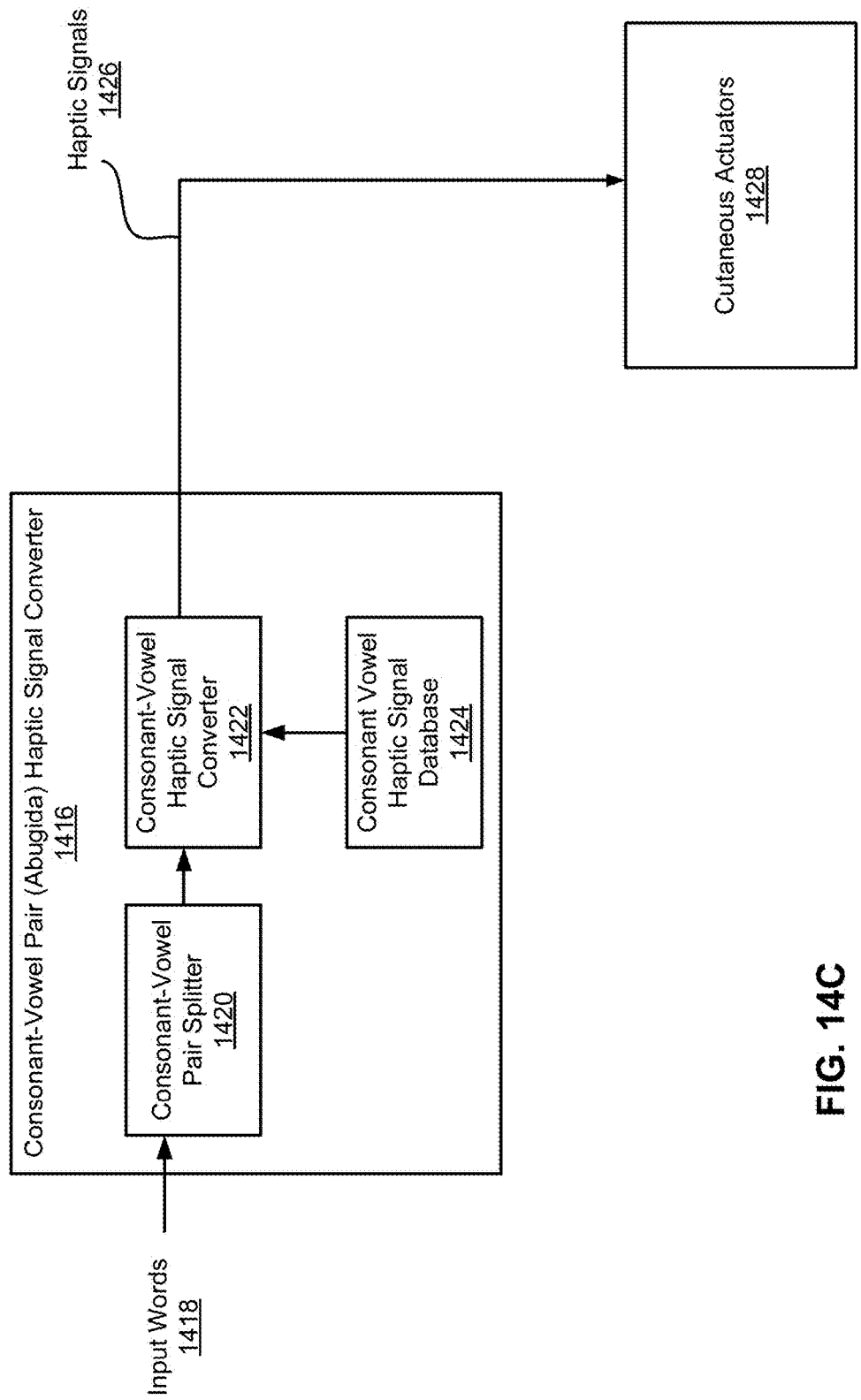
FIG. 14C is a block diagram illustrating the components of a consonant-vowel pair (Abugida) haptic signal converter for converting consonant-vowel pairs of input words to actuator signals, according to an embodiment.

FIG. 14C is a block diagram illustrating the components of a consonant-vowel pair (Abugida) haptic signal converter 1416 for converting consonant-vowel pairs of input words 1418 to actuator signals 1426 to activate cutaneous actuators 1428 of a haptic device, according to an embodiment. These components may be stored as computer readable instructions in memory, such as the memory 813. In another embodiment, these components are separately implemented using dedicated hardware, including a processor and memory. While FIG. 14A described a system for converting syllables to actuator signals, FIG. 14C describes a system for converting consonant-vowel pairs to actuator signals. The consonant-vowel pair (Abugida) haptic signal converter 1416 may include, among other components, a consonant-vowel pair splitter 1420, a consonant-vowel haptic converter 1422 and a consonant vowel haptic signal database 1424.

The input words 1418 are words in a language that can be formed from a limited number of consonant-vowel pairs. An example of such a language is Hindi, which uses the Devanagari script, and which represents the spoken language in consonant-vowel pairs. These types of languages are called abugida. Note that languages such as English, while representable in consonant-vowel pairs, would have a very high number of such pairs, and thus such a representation may not be feasible for conversion into sequences of actuator signals.

The consonant-vowel (C-V) pair haptic signal converter 1416 is similar to the syllable-haptic signal converter 1402, but converts the input words 1418 into component C-V pairs, and converts these C-V pairs into sequences of actuator signals, instead of converting into syllables. The C-V pair haptic signal converter 1416 includes a consonant-vowel pair splitter 1420, a consonant-vowel haptic signal converter 1422 and a consonant-vowel haptic signal database 1424. In one embodiment, the C-V pair haptic signal converter 1416 may be a component in a signal generator, such as signal generator 800.

The C-V pair splitter 1420 converts the input words 1418 into component C-V pairs. The output of the syllabic splitter 1406 may be a set of symbols representing the C-V pairs of the language of the input words 1418.

The C-V haptic signal converter 1422 may be similar to the syllable-haptic signal converter 1408, but converts the C-V pairs of the input words 1404 into sequences of actuator signals, instead of the syllables of the input words. For each C-V pair received from the C-V pair splitter 1420, the C-V haptic signal converter 1422 accesses the C-V haptic signal database 1424 to determine the corresponding sequence of actuator signals 1426 to output.

The actuator signals 1426 output by the C-V pair haptic signal converter 1416 are transmitted to the cutaneous actuators 1428, which may be similar to the cutaneous actuators 1104 of FIG. 11B. Each actuator signal 1426 activates one of the cutaneous actuators 1428 for a duration of time (and in some embodiments, for a particular intensity, frequency, and so on). A set of examples of particular haptic outputs generated by the actuator signals 1428 corresponding to C-V pairs is described below with reference to FIG. 14D.

Figure 14D:
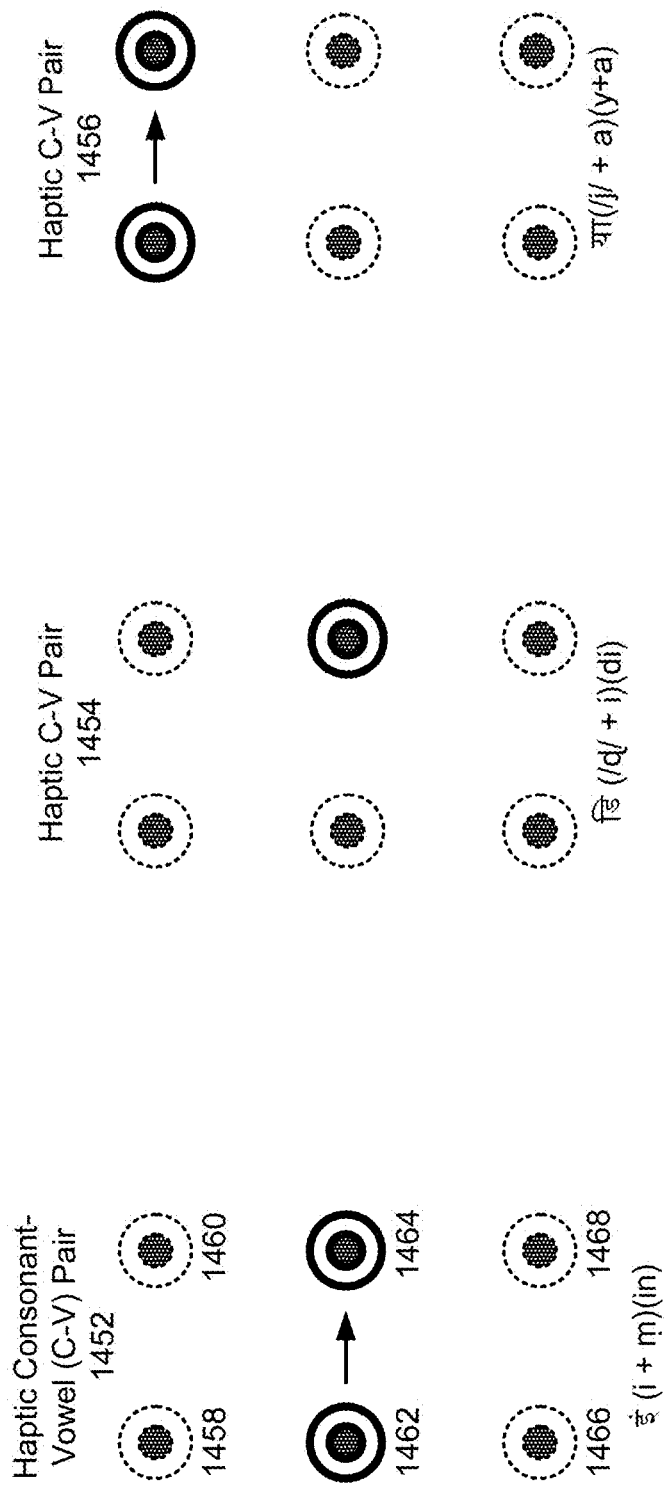
FIG. 14D illustrates an example sequence of haptic C-V pair haptic outputs for an example input word, according to an embodiment.

FIG. 14D illustrates an example sequence of haptic C-V pair haptic outputs for an example input word 1418, according to an embodiment. In the illustrated example, the input word 1418 is "India," which is written as "इंडिया" in Devanagari script. This word includes three different C-V pairs: 1) i+m̐, 2) /ḍ/+i, and 3) /j/+a. These are approximately pronounced as "in," "di," and "ya," respectively. The C-V haptic signal converter 1416 converts each of these C-V pairs into a sequence of actuator signals 1426, which are transmitted to the cutaneous actuators 1428, which generate sequences of haptic output. For ease of discussion, each of the sequence of haptic outputs associated with a C-V pair is referred to as a haptic C-V pair. Thus, the three C-V pairs here are translated into three haptic C-V pairs. A similar process would occur for other words.

In the illustrated example of FIG. 14D, a 3×2 two dimensional array of cutaneous actuators 1458-1468 is represented by concentric circles, with each set of two concentric circles representing one cutaneous actuator. The cutaneous actuators 1458-1468 are labeled for haptic C-V pair 1452, but are not repeatedly labeled for haptic C-V pairs 1454 and 1456 for clarity. This two dimensional array of cutaneous actuators 1458-1468 may correspond to the two dimensional array of cutaneous actuators 1104 in FIG. 11A.

Each haptic C-V pair 1452-1456 indicates a sequence of haptic outputs by this array of cutaneous actuators that corresponds to a C-V pair of the input word "India," similar to the process noted above for the haptic syllables of FIG. 14B.

In the illustrated example, 1) "i+m̐" corresponds to the haptic C-V pair 1452 and activation of the cutaneous actuator 1462 followed by the cutaneous actuator 1464, 2) "/ḍ/+i" corresponds to the haptic C-V pair 1454 and activation of the cutaneous actuator 1464, and 3) "/j/+a" corresponds to the haptic C-V pair 1156 and activation of the cutaneous actuator 1458 followed by 1460.

The correspondence between each haptic C-V pair and each spoken C-V pair may be selected based on articulation association, in a fashion similar to that described above for FIG. 11H.

Figure 14E:
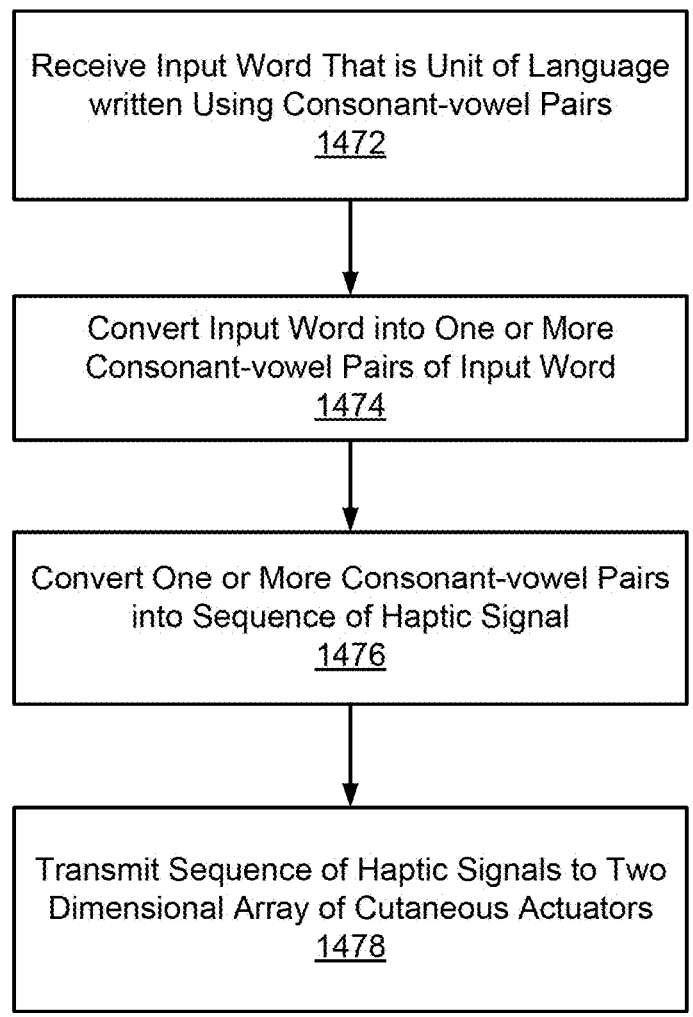
FIG. 14E is a flowchart illustrating a method of converting input words into haptic output based on C-V pairs, according to an embodiment.

FIG. 14E is a flowchart illustrating a method of converting input words into haptic output based on C-V pairs, according to an embodiment. The process described in the flowchart may be performed by the C-V pair haptic signal converter 1416, which in turn may be a component of a signal generator that may be part of a haptic device. Although a particular arrangement of steps is shown here, in other embodiments the process may be arranged differently.

Initially, the C-V pair haptic signal converter 1416 receives 1472 an input word which is a unit of a language that is written using C-V pairs, such as Hindi. The w C-V pair haptic signal converter 1416 converts 1474 the input word into its component C-V pairs.

The C-V pair haptic signal converter 1416 converts 1152 the C-V pairs into a sequence of actuator signals. This sequence is formed from a concatenation of sub-sequences of actuator signals. Each C-V pair in the language corresponds to one of these sub-sequences of actuator signals. Each of the actuator signals are mapped to a cutaneous actuator of a two dimensional array of cutaneous actuators placed on an interior surface of a harness shaped to wrap around a user's arm. The interior surface of the harness facing the user's arm when worn by the user.

The C-V pair haptic signal converter 1416 transmits the sequence of actuator signals to the two dimensional array of cutaneous actuators. This causes the cutaneous actuators to activate in accordance with the sequence of actuator signals, and in turn, causes the user to sense a series of haptic outputs from the cutaneous actuators. If trained, the user may then be able to recognize the haptic outputs as C-V pairs of a word, and decipher the input word from the haptic outputs. In this fashion, a user may be able to recognize words haptically rather than aurally or visually. A similar flow may be used for converting input words to syllables, and syllables to sequences of haptic output, and thus is omitted here for sake of brevity.

Haptic Communication System Using Cutaneous Actuators for Simulation of Continuous Human Touch Embodiments also relate to a haptic communication device including an array of cutaneous actuators to generate haptic sensations corresponding to actuator signals received by the array. The array includes a first cutaneous actuator to generate first haptic sensation at a first location on a body of a user at a first time, and a second cutaneous actuator to generate second haptic sensation at a second location on the body of the user at a second time later than the first time. The array of cutaneous actuators may be mounted on a substrate placed on the body of the user. A signal generator generates the actuator signals to cause the array to create continuous tactile motion along the body of the user from the first location to the second location. The signals correspond to words of a social touch lexicon.

Figure 15A:
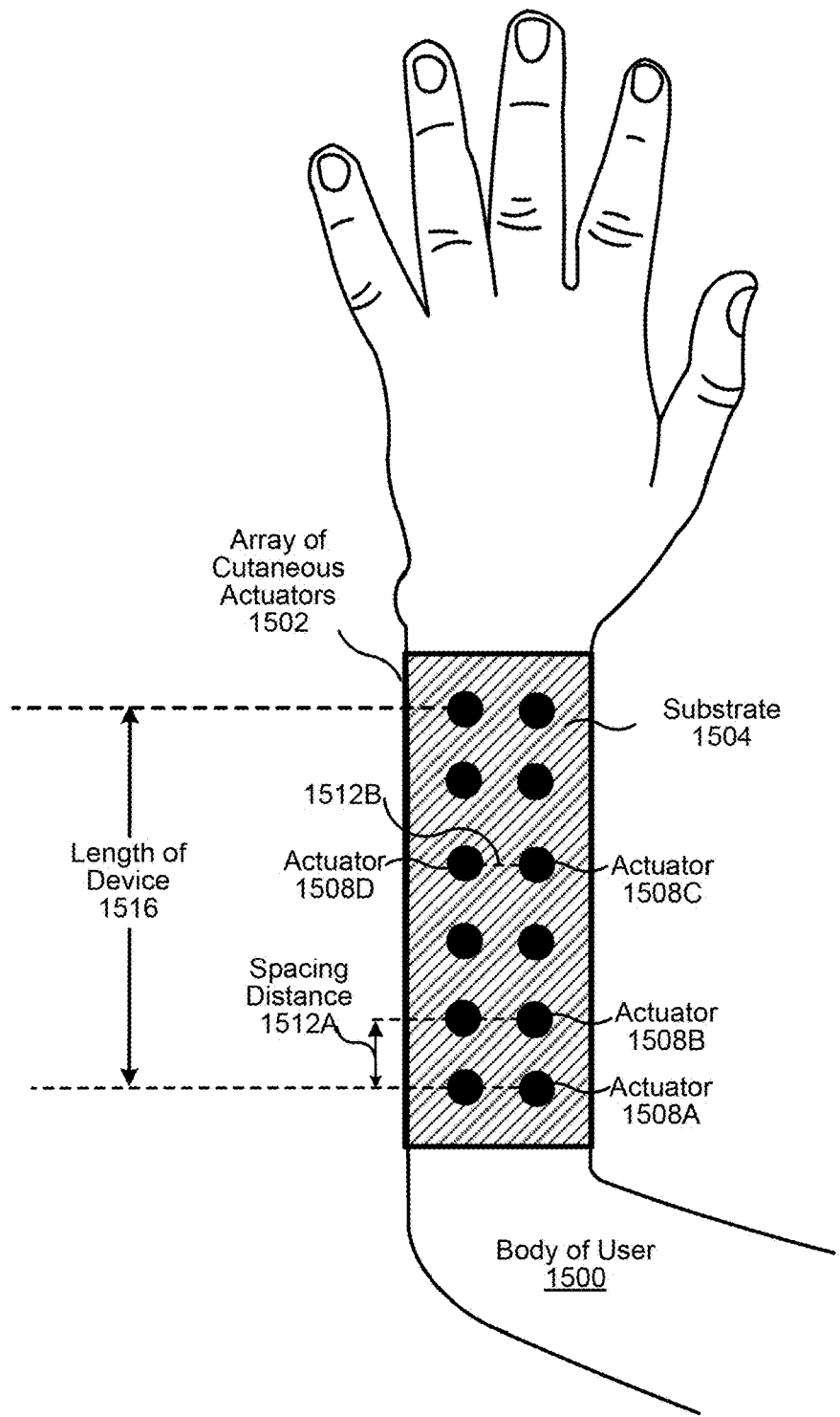
FIG. 15A is a planar view of an example array of cutaneous actuators mounted on a substrate, in accordance with an embodiment.

FIG. 15A is a planar view of an example array 1502 of cutaneous actuators mounted on a substrate 1504, in accordance with an embodiment. The substrate 1504 may be placed or wrapped around a part of a user's body 1500, e.g., on a forearm, chest, back, thigh, neck, etc. The substrate 1504 may be made of a flexible material such as plastics (e.g., polyethylene and polypropylene), rubbers, nylon, synthetics, polymers, etc. In one embodiment, the array 1502 of cutaneous actuators may be mounted on a flexible substrate 1504 such as a soccer shin guard. The array 1502 of cutaneous actuators provides haptic sensations to create continuous tactile motion along the body 1500 of the user from the beginning of the array 1502 to the end of the array 1502. When the individual cutaneous actuators are stimulated in a sequence such that the generating of the haptic sensations by each cutaneous actuator overlaps the generating of the haptic sensations by the next cutaneous actuator in the sequence, the array 1502 creates a sense of continuous tactile motion (e.g., stroking or moving touch) on the body 1500 rather than discrete actuation points, as described below with reference to FIG. 15B.

The array 1502 of cutaneous actuators generates haptic sensations corresponding to actuator signals (described above with respect to FIG. 2 and below with respect to FIG. 15B) received by the array 1502. For example, the actuator signals may correspond to words of a social touch lexicon to provide pleasant or calming touches to the body 1500 of the user. The haptic sensations include sensations provided by one or more of the cutaneous actuators mounted on the substrate 1504.

FIG. 15A illustrates an array 1502 of twelve cutaneous actuators arranged in two rows and six columns. The twelve points of vibrations generated by the cutaneous actuators may be used to create haptic illusions on the body 1500. In one embodiment, high bandwidth, light weight, portable and wearable cutaneous actuators may be used. For example, each cutaneous actuator may be a voice coil, a linear resonant actuator (LRA), an eccentric rotating mass (ERM) actuator, a piezoelectric actuator, an electroactive polymer actuator, a shape memory alloy actuator, a pneumatic actuator, a microfluidic actuator, some other type of transducer, or a combination thereof, as described above with reference to FIG. 1. For example, six voice coils may be used to create tactile illusions by discrete placement and continuous strokes. A psychophysical control model may be determined to specify how to parametrically control the cutaneous actuators, as illustrated and described in detail below with reference to FIG. 15E.

Each cutaneous actuator is a transducer that converts an actuator signal in a form of electrical energy (e.g., voltage or current signals) to haptic sensations at a particular location on the body 1500. The array 1502 of cutaneous actuators includes a first cutaneous actuator 1508A to begin generating a first haptic sensation at a first location on the body 1500 of the user at a first time t1, as described and illustrated below with respect to FIG. 15B. The array 1502 includes a second cutaneous actuator 1508B to begin generating a second haptic sensation at a second location on the body 1500 of the user at a second time t2 later than the first time. The first cutaneous actuator 1508A and the second cutaneous actuator 1508B are separated by a spacing distance 1512A along the body 1500 of the user. The spacing distance between other consecutive pairs of the cutaneous actuators may be the same or different. In one embodiment, the spacing distance 1512A separating the first cutaneous actuator 1508A and the second cutaneous actuator 1508B is less than 40 mm. For example, the cutaneous actuators may be placed 35 mm apart along a line of the dorsal forearm 1500.

In one embodiment, the distance 1516 separating the first cutaneous actuator and a last cutaneous actuator of the array 1502 is less than 15 cm. The distance 1516 between the first cutaneous actuator 1508A and the last cutaneous actuator on the array 1502 is the length of the device 1516 and corresponds to the length of the surface on the body 1500 that experiences the calming or pleasant touches. For example, the length 1516 may be 14 cm along a line of the dorsal forearm 1500. Larger or smaller spacing distances 1512A or lengths 1516 may be used to vary the sensations provided to the user. Different distances 1512A and lengths 1516 may also be used to determine a preferred distance 1512A or length 1516, as described below with respect to FIG. 15E.

The array 1502 of the cutaneous actuators may be a one-dimensional array, a two-dimensional array or a two-dimensional pattern having cutaneous actuators spaced unevenly and distributed across the substrate 1504. The array 1502 of the cutaneous actuators may include one or more rows of cutaneous actuators and one or more columns of cutaneous actuators. FIG. 15A illustrates an embodiment having a two-dimensional array. Cutaneous actuators 1508A, 1508B, and 1508C are located in a first row of the array 1502 of the cutaneous actuators. Cutaneous actuator 1508D is located in a second row of the array 1502 of the cutaneous actuators. The spacing distance 1512B separating the first row of cutaneous actuators (1508C) and the second row of cutaneous actuators (1508D) is less than 40 mm. For example, the rows may be placed 35 mm apart along a line of the dorsal forearm 1500.

Mathematical functions (psychophysical models) may be determined, as described below with respect to FIG. 15E, that associate the illusory continuous movements produced by the array 1502 as a function of stimulation time, frequency, amplitude of the vibrations, etc. Discrete grids of vibrating actuators (such as motors in a cellphone or smartwatch) may thus be placed on the forearm (or along the skin) to evoke continuous movements such as when a finger or a hand is touched and moved across the forearm (or the skin).

Figure 15B:
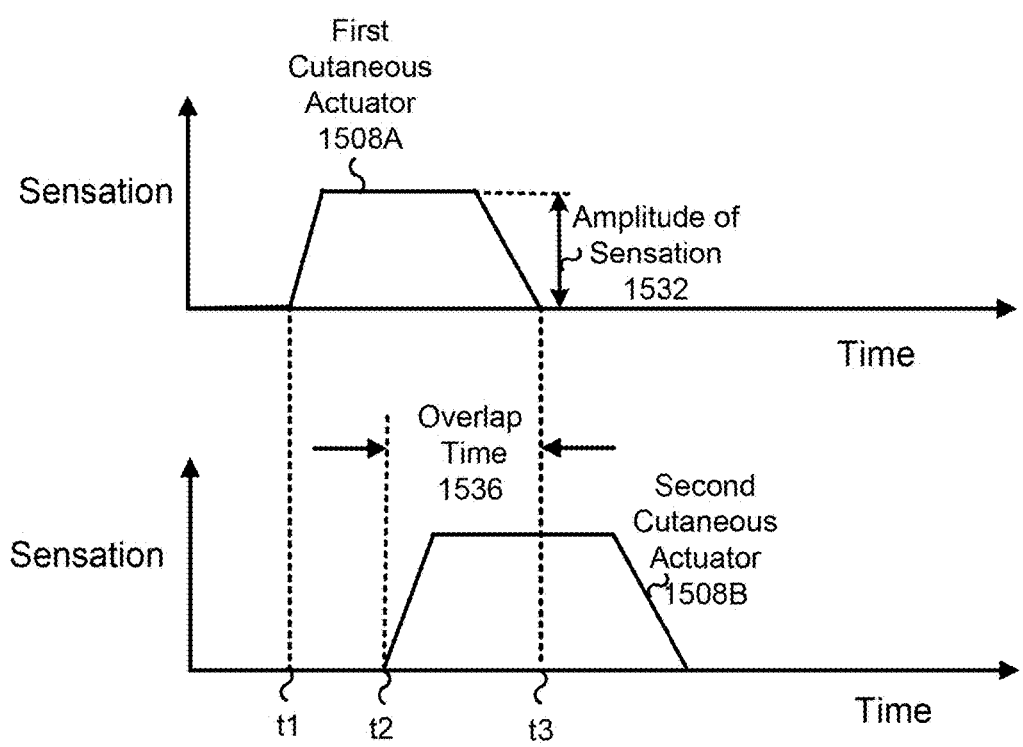
FIG. 15B is an illustration of example haptic sensations generated at different times, in accordance with an embodiment.

FIG. 15B is an illustration of example haptic sensations generated by the first cutaneous actuator 1508A and the second cutaneous actuator 1508B at different times, in accordance with an embodiment. The haptic sensations generated by the other cutaneous actuators mounted on the substrate 1504 are also similarly staggered in time and transmitted to other locations on the body 1500 of the user.

The haptic sensations may correspond to words of a social touch lexicon including words for greeting, parting, giving attention, helping, consoling, calming, pleasant, and reassuring touches. The haptic sensations may also correspond to spoken words from a user that are converted to haptic output, as illustrated and described in detail below with respect to FIGS. 17A-17E. The different haptic sensations, when staggered in time and distance, create continuous tactile motion along the body 1500 of the user from the first location (location of the first cutaneous actuator 1508A) to the last location (location of the last cutaneous actuator). The continuous tactile motion is intended to transmit the words to the body 1500 of the user, as described above with respect to FIGS. 2, 3, and 8A through 8F.

As illustrated in FIG. 15B, the first cutaneous actuator 1508A begins generating the first haptic sensation at a first location on the body 1500 of the user at a first time t1. In one embodiment, the haptic sensations may be haptic vibrations. The amplitude of the first haptic sensation enables the device to transmit sophisticated haptic communication effects. The information related to the words of the social touch lexicon described above are communicated by altering the amplitude (e.g., 1532) of the haptic sensations (e.g., vibrations). By changing the amplitude and patterns of vibration, a large number of combinations, rhythms or messages may be reproduced.

The second cutaneous actuator 1508B begins generating the second haptic sensation at the second location on the body 1500 of the user at a second time t2. The second time t2 is later than the first time t1 to stagger the haptic sensations in time to produce the continuous tactile touch motions. The first cutaneous actuator 1508A ends generating the first haptic sensation at a third time t3 after the second time t2. The overlap time 1536 between the beginning of the generating of the second haptic sensations by the second cutaneous actuator 1508B and the end of the generating of the first haptic sensation by the first cutaneous actuator 1508A provides the continuous tactile touch motions instead of the user experiencing isolated sensations at different locations on the user's body 1500.

The generating of the first haptic sensation overlaps with the generating of the second haptic sensation for a time interval indicating an overlap time 1536 of the haptic sensation. The second cutaneous actuator 1508B may transmit the second haptic sensation by altering this time interval (t3–t2) between the third time t3 and the second time t2. In one embodiment, when LRAs are used as the cutaneous actuators, the performance characteristics of the cutaneous actuators may allow for shorter start-stop times. Therefore, the times t1, t2 and t3 may be readily increased or decreased to determine a preferred overlap time that provides better communication of the haptic sensations and words of the social touch lexicon. Methods to determine a preferred overlap time are described in greater detail below with reference to FIG. 15E.

The first cutaneous actuator 1508A may end generating the first haptic sensation (at time t3) after a time interval indicating a duration time of the first haptic sensations. For example, the first cutaneous actuator 1508A may alter a time interval between the first time t1 and the third time t3. The time interval between the first time t1 and the third time t3 indicates the duration time t3–t1 of the first haptic sensation. The smooth continuous motions may be modeled as a function of the duration time t3–t1 of the haptic sensations for stroking motion. The duration time t3–t1 determines the speed of the stroke. The duration time t3–t1 of the first haptic sensation may be increased or decreased to determine which preferred duration time t3–t1 provides better communication of the haptic sensations and words of the social touch lexicon.

In one embodiment, the second cutaneous actuator 1508B may be turned on after the third time t3 has passed, in which case a pause may occur between speakers. Such a configuration may provide other types of haptic communication to the user's body 1500. Again, methods to determine a preferred pause time between the third time t3 and the second time t2 may be implemented similar to the methods described below with reference to FIG. 15E.

Figure 15C:
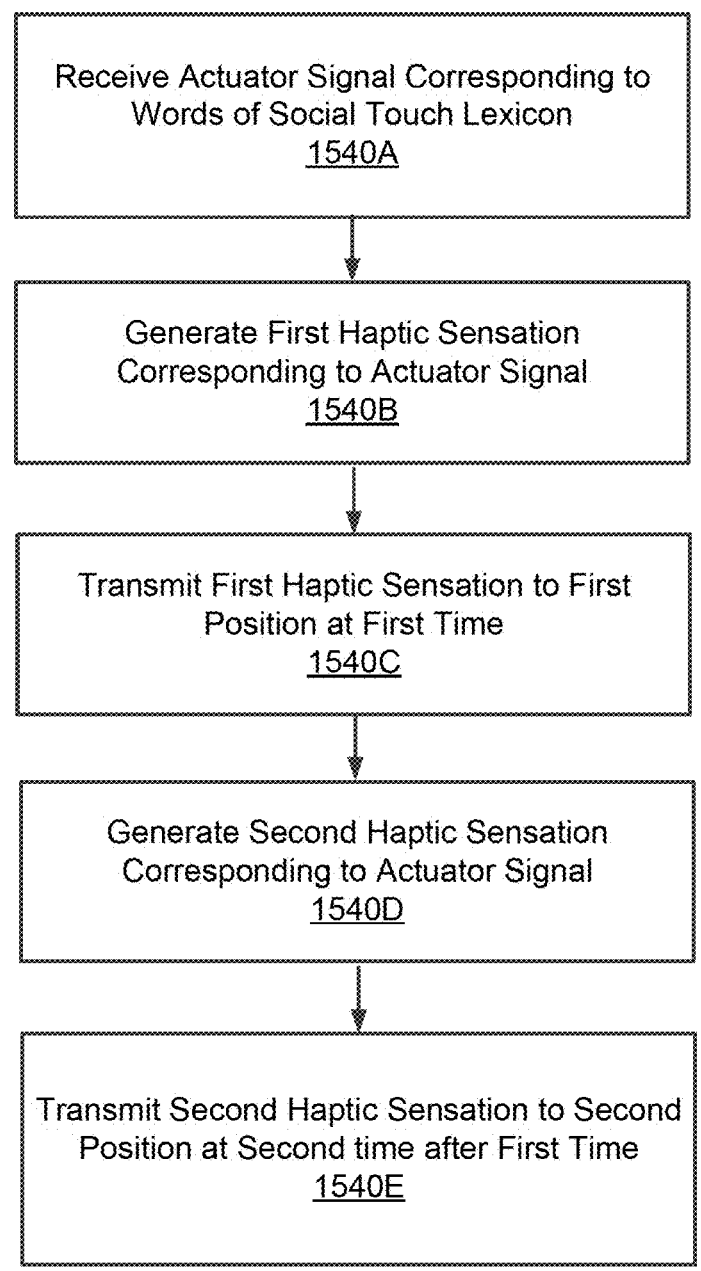
FIG. 15C is a flowchart illustrating an example process of generating haptic sensations to create continuous tactile motion along the body of a user, in accordance with an embodiment.

FIG. 15C is a flowchart illustrating an example process of generating haptic sensations to create continuous tactile motion along the body 1500 of a user, in accordance with an embodiment. In some embodiments, the process may have different and/or additional steps than those described in conjunction with FIG. 15C. Steps of the process may be performed in different orders than the order described in conjunction with FIG. 15C. Some steps may be executed in parallel. Alternatively, some of the steps may be executed in parallel and some steps executed sequentially. Alternatively, some steps may execute in a pipelined fashion such that execution of a step is started before the execution of a previous step.

An array 1502 of cutaneous actuators mounted on a substrate receives 1540A actuator signals corresponding to words of a social touch lexicon including greeting, parting, giving attention, helping, consoling, calming, pleasant, and reassuring touches. A signal generator coupled to the array 1502 may generate and transmit the actuator signals to the array 1502 to cause the array 1502 to create continuous tactile motion along a body 1500 of the user from a first location to the a location.

A first cutaneous actuator of the array of cutaneous actuators generates 1540B a first haptic sensation corresponding to the actuator signals. The first cutaneous actuator of the array of cutaneous actuators transmits 1540C the first haptic sensation to a first location on the body 1500 of the user. The generating of the first haptic sensation begins at a first time t1.

A second cutaneous actuator generates 1540D a second haptic sensation corresponding to the actuator signals. In one embodiment, different types of cutaneous actuators may be used to provide haptic illusions that vary in effect with the type and characteristics of the cutaneous actuators used. For example, LRAs may be used to provide shorter start-stop times to alter the haptic illusions perceived by the user, while microfluidic actuators may be used to create a variety of sensations including texture, size, shape, movement, etc.

The second cutaneous actuator transmits 1540E the second haptic sensation to a second location on the body 1500 of the user to create continuous tactile motion along the body 1500 of the user from the first location to the second location. The continuous tactile motion is intended to transmit the words of the social touch lexicon to the body 1500 of the user. The generating of the second haptic sensation begins at a second time t2, which is later than the first time t1. The generating of the first haptic sensation may end at a third time t3 after the second time t2. Therefore, the generating of the first haptic sensation overlaps with the generating of the second haptic sensation for a time interval indicating an overlap time of the haptic sensations.

Figure 15D:
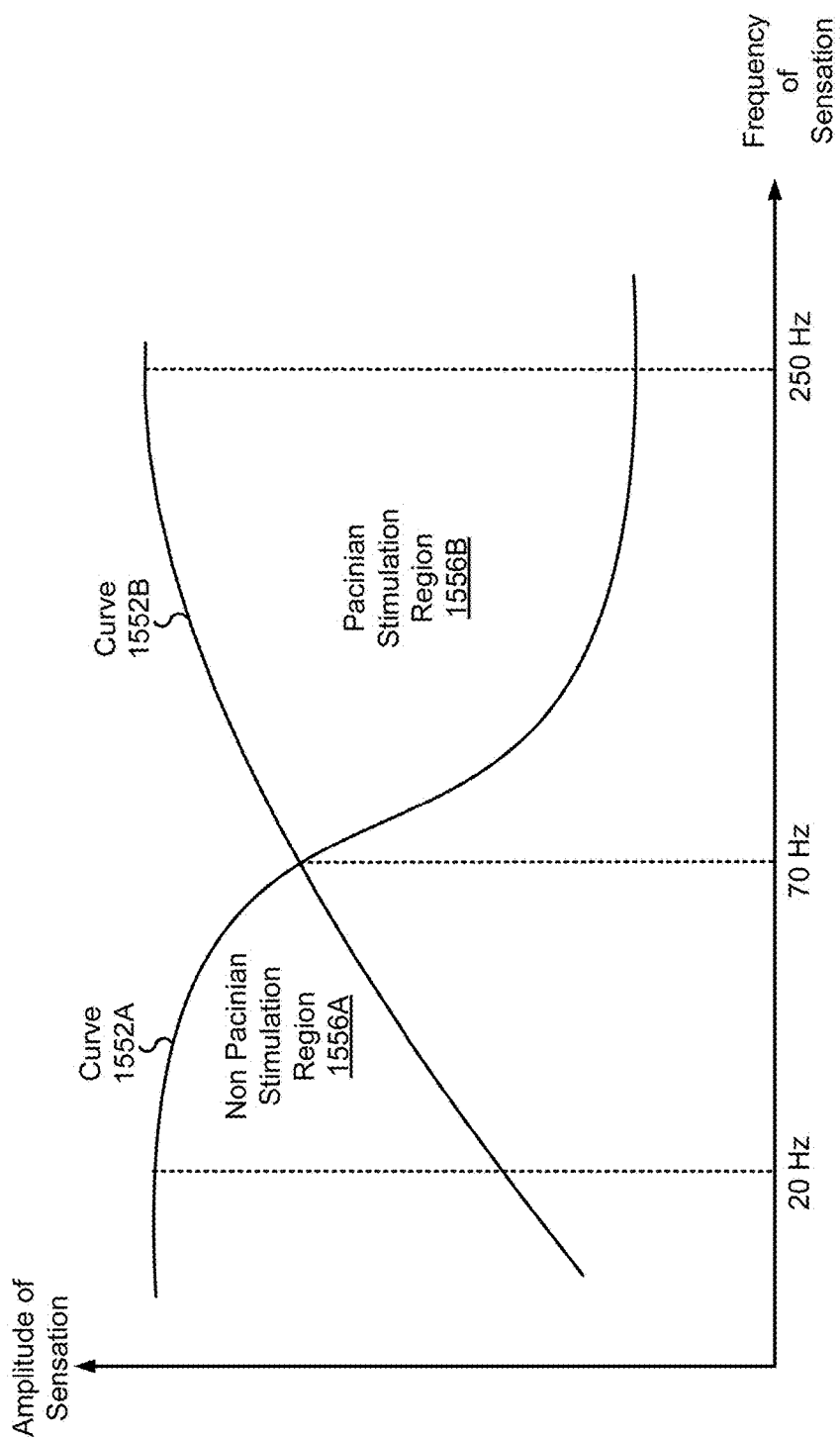
FIG. 15D is an illustration of example Pacinian and Non Pacinian stimulation, in accordance with an embodiment.

FIG. 15D is a graph illustrating example Pacinian and Non Pacinian stimulation, in accordance with an embodiment. In one embodiment, the haptic sensations may be haptic vibrations. The array 1502 of cutaneous actuators may generate the haptic sensations by altering an amplitude or a frequency of the haptic vibrations. FIG. 15D illustrates different types of haptic stimulation that may be transmitted to the body 1500 of a user by varying the amplitude and frequency of haptic vibrations.

The curve 1552A illustrates how Non Pacinian stimulation in the body 1500 may vary with the amplitude of sensations and the frequency of sensations. Pacinian and Non Pacinian stimulation in the body 1500 is caused by mechanoreceptors, which are sensory receptors that respond to haptic sensations, mechanical pressure, or distortion. Non-Pacinian mechanoreceptors (e.g., tactile corpuscles or Meissner's corpuscles) are a type of nerve ending in the skin that is responsible for sensitivity to light touch. In particular, they are sensitive when sensing haptic sensations between 10 and 50 Hertz. The curve 1552A illustrates that more Non Pacinian stimulation is achieved when the frequency of vibration is closer to 20 Hz. Less Non Pacinian stimulation is achieved when the frequency of vibration is closer to 70 Hz. Little Non Pacinian stimulation is achieved when the frequency of vibration is closer to 250 Hz.

The Non Pacinian stimulation region 1556A (depicted in FIG. 15D) generally lies below a 70 Hz frequency of haptic sensations, i.e., the body 1500 of the user may experience Non-Pacinian haptic stimulation when the cutaneous actuators produce haptic sensations below the 70 Hz frequency. For example, a preferred frequency region of operation may be when the cutaneous actuators 1508 produce haptic sensations above 20 Hz frequency and below 70 Hz frequency.

Pacinian mechanoreceptors (e.g., Lamellar corpuscles or Pacinian corpuscles) are nerve endings in the skin responsible for sensitivity to vibration and pressure. They respond to sudden disturbances and are especially sensitive to sensations. For example, Pacinian stimulation may be used to detect surface texture, e.g., rough vs. smooth. The curve 1552B illustrates that more Pacinian stimulation is achieved when the frequency of vibration is closer to 250 Hz. Less Pacinian stimulation is achieved when the frequency of vibration is closer to 70 Hz. Little Pacinian stimulation is achieved when the frequency of vibration is closer to 20 Hz.

The Pacinian stimulation region 1556B generally lies above the 70 Hz frequency of haptic sensations, i.e., the body 1500 of the user may experience Pacinian haptic stimulation when the cutaneous actuators produce haptic sensations above the 70 Hz frequency. For example, a preferred frequency region of operation for Pacinian stimulation may be when the cutaneous actuators 1508 produce haptic sensations above 70 Hz frequency and below 250 Hz frequency.

Figure 15E:
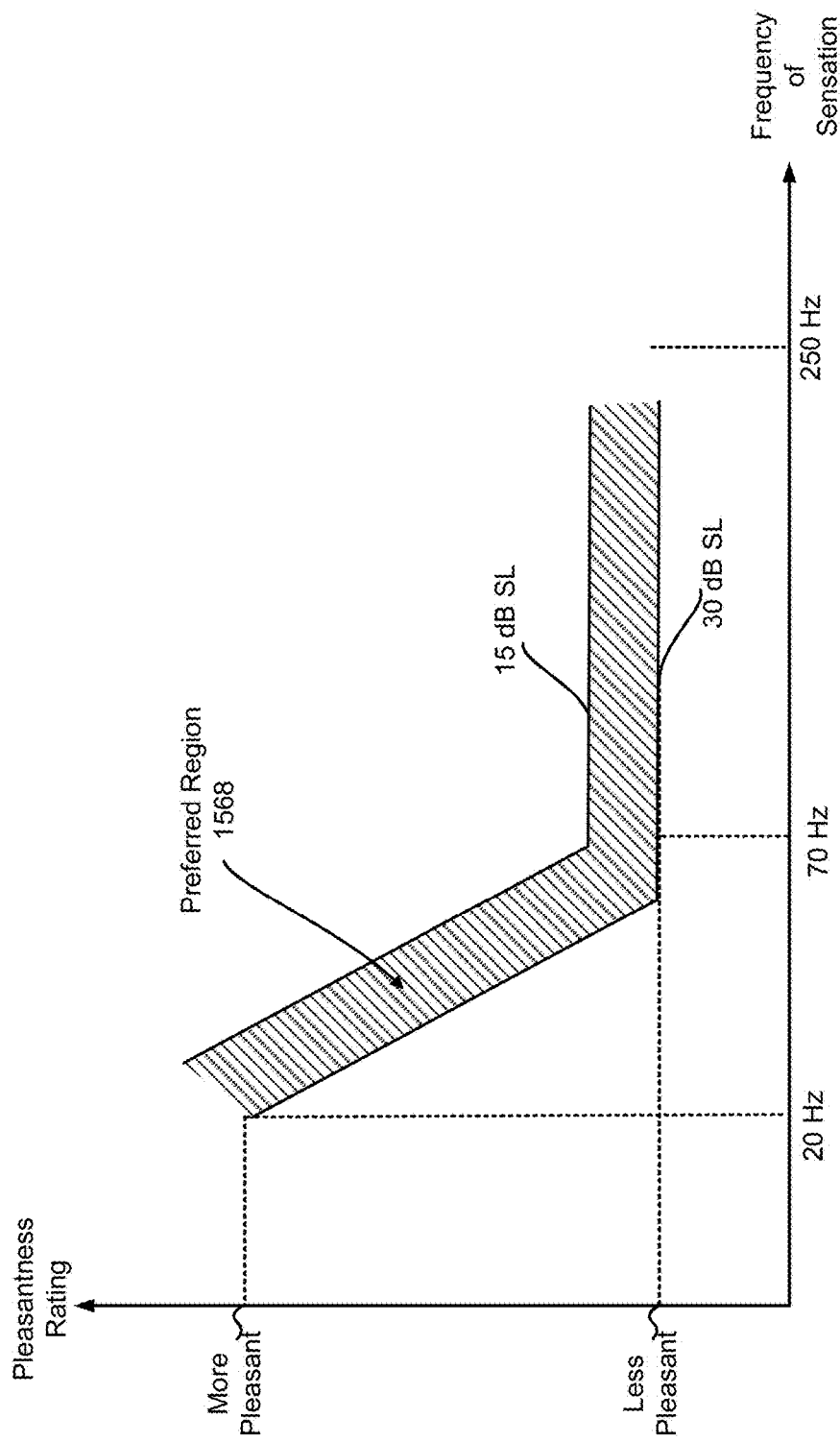
FIG. 15E is a graphical illustration of an example preferred region of operation for an array of cutaneous actuators, in accordance with an embodiment.

FIG. 15E is a graphical illustration of an example preferred region of operation 1568 for an array 1502 of cutaneous actuators, in accordance with an embodiment. Using the methods described below with respect to FIG. 15E, preferred parameters of the haptic sensations (e.g., frequency, amplitude, overlap time 1536, duration of sensations, etc.,) and preferred parameters of the array 1502 (e.g., spacing distance 1512A and 1512B, length of the device 1516, etc.,) may be determined that are more pleasant to human users. The preferred parameters may be used to associate social touch messages such as calming and consoling.

The parameters of the haptic sensations may be examined across a broad spectrum of frequency and amplitude. In some embodiments, frequencies of vibration in the 5-40 Hz range and amplitudes of up to 20 times that of the human sensitivity threshold evoke more pleasant touch. These parameters may be combined with the psychophysical models of moving illusions, social and consoling patterns to generate haptic sensations on the skin 1500 of a user, e.g., to reproduce effects of someone else touching the forearm 1500.

In one embodiment, several frequency sets may be constructed to determine the robustness and parameter range for pleasant touch at different amplitudes across a broad vibrotactile spectrum. Different frequencies trigger different receptive systems within the human body 1500 as described and illustrated above with respect to FIG. 15D. Each frequency set may include one or more frequencies of vibration at varying amplitudes. That is, actuator signals including more than one frequency may be transmitted to the cutaneous actuators to cause the cutaneous actuators to generate sensations that include more than one frequency. For example, piezoelectric actuators (precision ceramic actuators that convert electrical energy directly into linear motion with high speed and resolution) may be used to vary the amplitude and frequency of sensations to create different types of pleasant or calming touches and to determine a preferred region 1568 of frequencies and amplitudes.

In one experiment, ten frequency sets were constructed and evaluated. The frequency sets included (1) Frequency Set 1: 20 Hz at 15 dB sensation level (SL); (2) Frequency Set 2: 20 Hz at 30 dB SL; (3) Frequency Set 3: 70 Hz at 15 dB SL; (4) Frequency Set 4: 70 Hz at 30 dB SL; (5) Frequency Set 5: 250 Hz at 15 dB SL; (6) Frequency Set 6: 250 Hz at 30 dB SL; (7) Frequency Set 7: 20 Hz+70 Hz at 20 dB SL; (8) Frequency Set 8: 20 Hz+250 Hz at 20 dB SL; (9) Frequency Set 9: 70 Hz+250 Hz at 20 dB SL; and (10) Frequency Set 1: 20 Hz+70 Hz+250 Hz at 25 dB SL.

The amplitudes above are expressed in terms of dB SL, which refers to the number of dB that the haptic sensations are above the sensation threshold (i.e., the minimum dB required for perception of the haptic sensations). The 15 dB SL amplitude-at-detection-threshold (aDT) may be determined as: aDT×(20 log 15), or aDT×5.6, where the aDT is the lowest threshold a user can detect. Similarly, the 20 dB SL aDT may be determined as: aDT×(20 log 20), or aDT×31.6.

The haptic sensations may be transmitted to several participants of an experiment, where the first haptic sensations and the second haptic sensations correspond to the one or more frequencies in a frequency set. Each participant may wearing an array of the cutaneous actuators for the experiment. A rating (e.g., pleasantness) of the continuous tactile motion may be received from each participant of the experiment for each frequency set. In one experiment, each of the ten frequency sets described above were applied to participants at five different speeds of the haptic sensations, i.e., 5.7 cm/s, 7.1 cm/s, 9.2 cm/s, 13.2 cm/s, and 23.4 cm/s. The speed refers to the distance along the body 1500 that the haptic vibration strokes cover by unit of time. Therefore, for a speed of 5.7 cm/s, the stroke moves 5.7 cm along the body of the participant in one sec. The experiment included 50 patterns, i.e., 5 speeds×10 frequency sets. The experiment was performed on 21 participants (11 males, average age: 37 years old) who rated the 50 patterns on a pleasantness scale of between −7 (less pleasant) and +7 (more pleasant).

Similarly, for each amplitude of a set of amplitudes of vibration, the first haptic sensations and the second haptic sensations may be transmitted to each of several participants, where the first haptic sensations and the second haptic sensations correspond to the amplitude. A rating (e.g., pleasantness or continuity of the tactile motion) may be received from each participant for the amplitude. The received ratings may be aggregated to determine a preferred amplitude and frequency set corresponding to a highest rating.

In one experiment, a preferred frequency of the haptic sensations was determined to equal or be greater than 20 Hz. The preferred frequency of the haptic sensations was determined to equal or be less than 70 Hz. A preferred amplitude of the haptic sensations was determined to equal or be greater than 15 dB SL. The preferred amplitude of the haptic sensations was determined to equal or be less than 30 dB SL. In other embodiments, the amplitude of the haptic sensations may lie between 15 dB SL and 30 dB SL.

In one experiment, a preferred region of operation 1568 for the cutaneous actuators was determined from the ratings provided by the participants. The preferred region of operation 1568 included a frequency of 70 Hz and an amplitude of 15 db SL within a usable range of 20-70 Hz and 15-20 dB SL, as depicted in FIG. 15E. Higher amplitudes were determined to be less pleasant while lower amplitudes were more pleasant.

In one experiment, when the cutaneous actuators generated haptic sensations including more than one frequency, it was determined that combining equal components of low frequencies and high frequencies (e.g., 20 Hz+250 Hz) rendered the touch less pleasant. However, combining a larger low-frequency component with a smaller high-frequency component (e.g., 20 Hz+70 Hz+250 Hz) was determined to offset the high frequency component and render the touch more pleasant.

In one experiment, lower frequencies (e.g., 20 Hz) were rated positively on the pleasantness scale, i.e., less than 5% of users reported less pleasant sensations. Higher amplitudes were rated less pleasant, i.e., less than 5% of users reported pleasant sensations. Female participants tended to rate the haptic sensations higher on the pleasantness scale.

A preferred region of operation 1568 for the cutaneous actuators 1508 may therefore be constructed in terms of frequency range and amplitude range. In one experiment, frequencies of 20-70 Hz at 15-30 dB SL were determined to be a preferred range 1568 of the parameters.

Similarly, preferred spacing distances 1512A and 1512B between the cutaneous actuators may be determined. For each of a set of spacing distances between the first cutaneous actuator 1508A and the second cutaneous actuator 1508B, the first haptic sensations and the second haptic sensations may be transmitted to each of several participants. For each of a set of spacing distances between the cutaneous actuator 1508C and the cutaneous actuator 1508D, the haptic sensations may be transmitted to each of several participants. A rating of the continuous tactile motion may be received from each participant for the spacing distance 1512A or 1512B. The received ratings may be aggregated to determine a preferred spacing distance 1512A or 1512B corresponding to a highest rating.

Similarly, a preferred overlap time may be determined between the generating of the first haptic sensations and the generating of the second haptic sensations. The haptic sensations may be transmitted to each participant of a set of participants for each of several distinct overlap times between the generating of the first haptic sensations and the generating of the second haptic sensations. A rating (e.g., pleasantness or continuity) of the continuous tactile motion may be received from each participant for each overlap time 1536. The received ratings may be aggregated to determine a preferred overlap time corresponding to a highest rating.

In one experiment, a preferred overlap time between the generating of the first haptic sensations and the generating of the second haptic sensations was determined. Ratings of continuity of the tactile motion versus overlap time 1536 were aggregated. The number 1 was used by participants to rate the tactile motion between the cutaneous actuators as being more discontinuous, while the number 7 was used to rate the motion as being more continuous. A preferred overlap time was determined between successive vibration locations that generated smooth-continuous illusory strokes on the hairy skin of the forearm using a range of frequencies, amplitudes, and duration times (t3−t1). The duration time is the time period for which a cutaneous actuator is on. A longer duration time provides a longer touch. Six participants (five males) rated 120 different haptic vibration patterns on a scale of 1-7 for continuity. The stimulus used was (1) one frequency set: 20 Hz+70 Hz+250 Hz; (2) two different amplitudes (15 dB SL and 30 dB SL); (3) four different duration times (100 ms, 400 ms, 900 ms, and 1600 ms); and (4) five different overlap times expressed as a percentage of the duration time that each cutaneous actuator was turned on (20%, 35%, 50%, 65%, and 80% of duration time). In other a frequency of the haptic sensations may lie between 1 Hz and 300 Hz.

A psychophysical model including a preferred overlap time and preferred duration time (d) was determined for more continuous and pleasant touch. In one embodiment, the preferred overlap time of the haptic sensations generated by consecutive cutaneous actuators increases as a duration time of the haptic sensations generated by each cutaneous actuator increases. For example, the preferred overlap time of the first haptic sensations and the second haptic sensations may be a function of 0.169 times a duration time of the first haptic sensations. The overlap time may be determined as a function of the duration time (d): $0.169 \times d + k$, where k is a constant. In one example, k may equal 46.05. The preferred overlap time for more pleasant touches was determined to vary with duration time d, but not as much with frequency or amplitude.

In one embodiment, the arrangement of the cutaneous actuators 1508 and the algorithms that drive the cutaneous actuators may be varied. In one embodiment, a haptic illusion at a location E on the user's body 1500 may be provided by cutaneous actuators at other locations B and C on the user's body 1500. Separate spectral components of haptic sensations may thus be combined to create pleasing touch motion. In one embodiment, the frequency, size, timing, and voltage of a periodic signal used to drive each cutaneous actuator may be varied. In one experiment, a reaction time of less than 100 ms (from the time the actuator signals are sent to the array 1502 to the time the cutaneous actuators turn on) was determined to be pleasant. In one embodiment, the actuator signals may include information on pressure, temperature, texture, sheer stress, time, and space of the physical touch. The amplitude and frequency of the haptic sensations described above with respect to FIG. 15E may be related to the pressure, texture, and sheer stress experienced by the body 1500 of the user when receiving the haptic sensations.

Cutaneous Actuators with Dampening Layers and End Effectors to Increase Perceptibility of Haptic Signals Embodiments also relate to a wearable haptic communication device including cutaneous actuators and padding layers to dampen haptic vibrations generated by the cutaneous actuators. The haptic communication device includes cutaneous actuators to generate haptic vibrations corresponding to actuator signals received by the cutaneous actuators. A dampening member, proximate to a body of a user wearing the haptic communication device, focuses the haptic vibrations at distinct locations on the body. The dampening member has openings through which the cutaneous actuators transmit the haptic vibrations to the distinct locations. A spacing member contacts the dampening member and is separated from the body by the dampening member. The spacing member has openings dimensioned to receive and secure the cutaneous actuators.

Figure 16A:
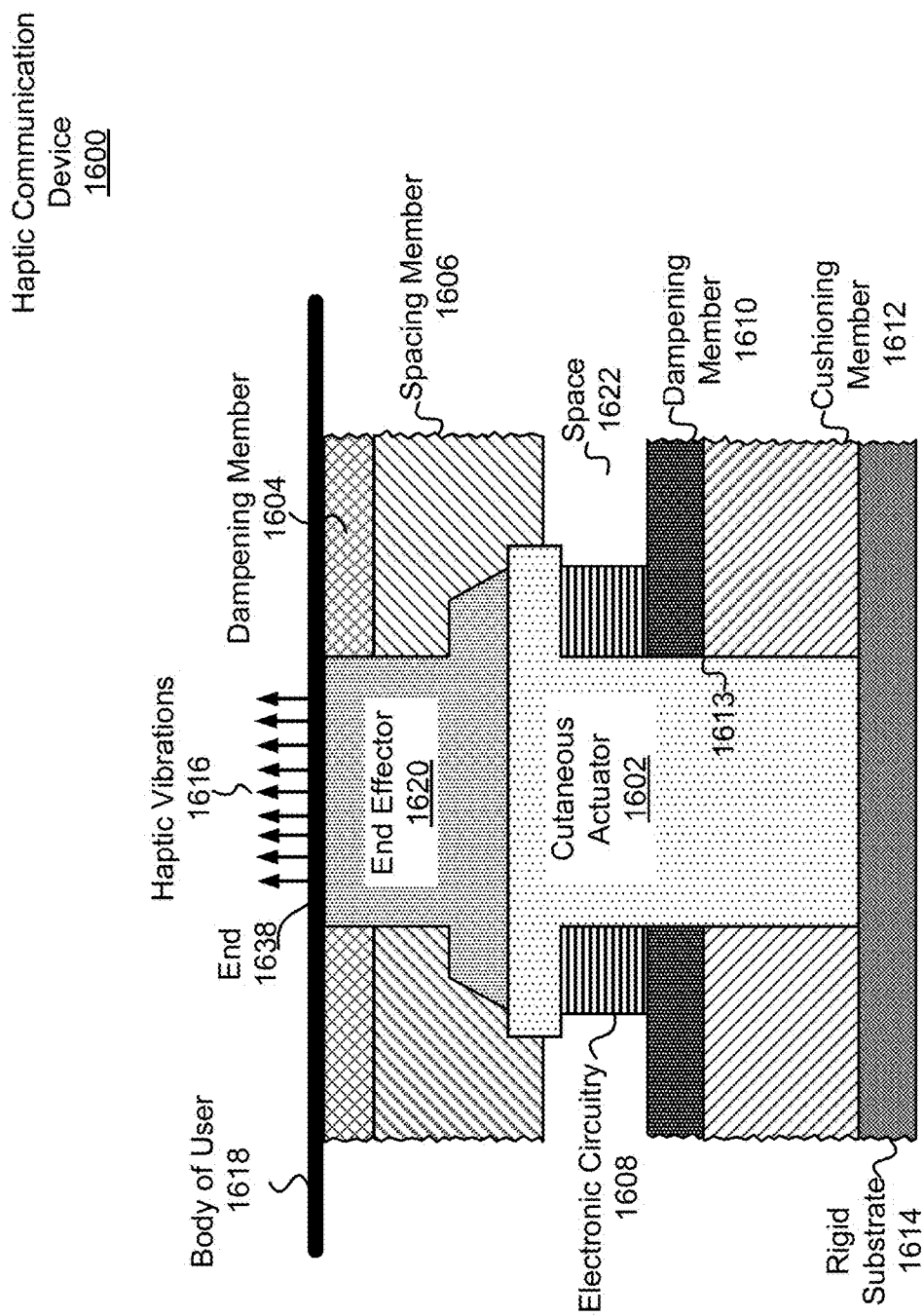
FIG. 16A is a cross sectional view of an example haptic communication device, in accordance with an embodiment.

FIG. 16A is a cross sectional view of an example haptic communication device 1600, in accordance with an embodiment. The haptic communication device 1600 includes an array of cutaneous actuators 1602, a dampening member 1604, a spacing member 1606, electronic circuitry 1608, a dampening member 1610, a cushioning member 1612, end effectors 1620, and a rigid substrate 1614. In other embodiments, the haptic communication device 1600 may include additional or fewer components than those described herein. Similarly, the functions can be distributed among the components and/or different entities in a different manner than is described here.

The array of cutaneous actuators 1602 generate haptic vibrations 1616 corresponding to actuator signals received by the cutaneous actuators 1602. The actuator signals may be voltage signals, current signals, some other transducer signals, or a combination thereof. The actuator signals may be generated by various methods as described with respect to FIGS. 9F, 14A, 14C, 17A, and 18A. The haptic vibrations 1616 communicate haptic output (e.g., words in a haptic lexicon) to a body 1618 of a user via the skin when the user is wearing the haptic communication device 1600. The communication of the haptic output may be performed by various methods as described with respect to FIGS. 8C, 9A,

10E, 15B, and 15C. As described above with respect to FIG. 1, the cutaneous actuators may be voice coils, linear resonant actuators (LRAs), eccentric rotating mass actuators, piezoelectric actuators, electroactive polymer actuators, shape memory alloy actuators, pneumatic actuators, microfluidic actuators, or acoustic metasurface actuators.

The dampening member 1604 shown in FIG. 16A is a portion of the haptic communication device 1600 that dampens the haptic vibrations 1616. The dampening member 1604 is proximate to the body 1618 of the user wearing the haptic communication device 1600. In one embodiment (illustrated and described with respect to FIG. 16D below), the dampening member 1604 may directly contact the body 1618 of the user wearing the haptic communication device 1600. In another embodiment (illustrated and described with respect to FIG. 16G below), the dampening member 1604 may be enclosed within a housing, which directly contacts the body 1618 of the user. In this embodiment, the dampening member is located between a roof of the housing and the cutaneous actuator, which is also enclosed by the housing.

By dampening the haptic vibrations 1616 generated by the cutaneous actuators 1602, the dampening member 1604 focuses the haptic vibrations 1616 at distinct locations on the body. In FIG. 16A, the dampening member 1604 focuses the haptic vibrations 1616 at the distinct location on the body 1618 contacting the end effector 1620. The dampening member 1604 contacts skin around the end effector 1620 to dampen the vibrations 1616 propagating down the skin for improved localization. "Durometer" is one of several measures of the hardness of a material. The dampening member 1604 is stiffer (e.g., durometer 20-50) than the cushioning member 1612 and serves as an interface between the stiff spacing member 1606 and the skin.

In embodiments, the dampening member 1604 may be a layer of soft rubber or polyurethane foam having a thickness of about one sixteenth inch. The dampening member 1604 provides comfort to the user wearing the haptic communication device 1600. The dampening member 1604 is firm, easy to clean, and does not propagate the haptic vibrations 1616. This makes it ideal for the layer that touches the body 1618.

Openings 1668 are formed in the dampening member 1604 (shown below in FIG. 16D). The cutaneous actuators 1602 transmit the haptic vibrations 1616 to the distinct locations on the body 1618 through the openings 1668.

In an embodiment, the haptic communication device 1600 may include a second dampening member 1610 to dampen vibrations of the cutaneous actuators 1602. The dampening member 1610 contacts the cushioning member 1612. The dampening member 1610 is stiffer (e.g., durometer 20-50) than the cushioning member 1612 and serves as an interface between the stiff spacing member 1606 and the compliant cushioning member 1612. In an embodiment, the dampening member 1610 may be a layer of soft rubber or polyurethane foam having a thickness of about one sixteenth inch. In an embodiment, the dampening member 1610 may be made of a quick recovery foam.

The spacing member 1606 shown in FIG. 16A supports and holds the cutaneous actuators 1602 in place within the haptic communication device 1600. The spacing member 1606 contacts the dampening member 1604 and is separated from the body 1618 by the dampening member 1604, as shown in FIG. 16A. The spacing member 1606 may be made of stiff rubber to create a solid stack between the cutaneous actuators 1602 and the user's body 1618 to ensure that the cutaneous actuator 1602 is able to move against the user's skin and is not overly compressed during mounting. The stack is also sometimes referred to as "tolerance stack" and holds the cutaneous actuators 1602 up at a certain distance above the skin so that the magnet and coils of the cutaneous actuators 1602 can go through their range of motion and are not being pressed such that they are stuck away from the magnet center.

In an embodiment, the cutaneous actuators 1602 may be attached to a rigid curved surface of the spacing member 1606 and pressed into the skin to ensure that all the cutaneous actuators 1602 make contact with the skin. The consistent stack spacing ensures that the cutaneous actuators 1602 have reduced load and are able to move through their range of motion, more efficiently converting electrical energy to mechanical energy.

The spacing member 1606 has openings (shown below in FIG. 16B) that are dimensioned to receive and secure the cutaneous actuators 1602. A portion of each cutaneous actuator 1602 is therefore embedded in the spacing member 1606. In embodiments, the spacing member is made of a layer of rigid rubber having a thickness of about one quarter inch and a durometer of less than 50. The durometer value of the spacing member 1606 is selected to enable the spacing member 1606 to support the cutaneous actuators 1602 in place within the haptic communication device 1600 and make the spacing member 1606 generally resistant to indentation.

The haptic communication device 1600 includes electronic circuitry 1608 coupled to the cutaneous actuators 1602 to drive the cutaneous actuators 1602. The electronic circuitry 1608 is located within a space 1622 between the cushioning member 1612 and the spacing member 1606. The space 1622 includes the wire routing and locating layers to locate the cutaneous actuators 1602. The electronic circuitry 1608 may be digital logic, analog circuitry, or circuitry implemented on a printed circuit board (PCB) that mechanically supports and electrically connects electronic components and the cutaneous actuators 1602 using wires, conductive tracks, pads, etc. The haptic communication device 1600 includes clearance to cover the electronic circuitry 1608 and improve aesthetics of the haptic communication device 1600. In one embodiment, the cutaneous actuator 1602 is attached to a PCB that has a sensor and a connector; the space 1622 between the spacing member 1606 and the dampening member 1610 gives the PCB room to be rigid and not bend with the other layers. The electronic circuitry 1608 transmits the actuator signals to the cutaneous actuators 1602. The electronic circuitry 1608 may also determine a temperature of the haptic communication device 1600 using a temperature sensor (e.g., a thermistor, a thermocouple, a resistance thermometer, or a silicon bandgap temperature sensor). The electronic circuitry 1608 may measure the temperature onboard the haptic communication device 1600 and transmit corresponding measurement signals to a main electronic system offboard. Responsive to the temperature exceeding a threshold, the electronic circuitry 1608 may terminate operation of the cutaneous actuators. For example, if the temperature increases to uncomfortable levels, the main electronic system may cut power to the cutaneous actuator 1602 via the electronic circuitry 1608.

The cushioning member 1612 shown in FIG. 16A is designed to provide physical comfort to the body 1618 of the user wearing the haptic communication device 1600. The compliant cushioning member 1612 adjusts to the arm shape of the user to ensure contact and comfort. The cushioning member 1612 enables the same haptic communication device 1600 to be used on different shaped arms of different users. The cushioning member 1612 has a low durometer (e.g., durometer 1-10) and deforms to adapt to the user's body 1618.

The cushioning member 1612 adjusts to the shape of the body of the user by compression when the user is wearing the haptic communication device 1600. The spacing member 1606 is therefore located between the dampening member 1604 and the cushioning member 1612. The cushioning member 1612 has openings 1613, and each cutaneous actuator 1602 is inserted into a corresponding one of the openings 1613. A portion of each cutaneous actuator 1602 is embedded in the cushioning member 1612 as shown in FIG. 16A. The cushioning member 1612 may be a layer of polyurethane foam having a thickness of about one quarter inch to enable compression of the cushioning member 1612.

The end effectors 1620 transmit the haptic vibrations 1616 to the body 1618 of the user wearing the haptic communication device 1600. The end effector 1620 touches the body 1618 of the user. Each end effector 1620 presses into the body 1618 and focuses the haptic vibrations 1616 at a distinct location on the body 1618 by directing the haptic vibrations 1616 along the end effector 1620 from the broader base of the end effector 1620 mounted on the cutaneous actuator 1602 to the narrower end 1638 of the end effector 1620. Each end effector 1620 is mounted on a corresponding one of the cutaneous actuators 1602 to provide comfort to the body 1618 of the user while generating the haptic vibrations 1616. In an embodiment, smaller end effectors 1620 are easier to localize on the body 1618. The end effector 1620 concentrates the energy from the cutaneous actuator 1602 into a small area on the user's body 1618. The end effectors 1620 may be made of rubber, silicone, or polycarbonate. In an embodiment, the end effector 1620 may have a deburred acrylic end 1638.

The haptic communication device 1600 includes a rigid substrate 1614 that is dimensioned to compress the cushioning member 1612 to the shape of the body 1618. The cushioning member 1612 is therefore located between the spacing member 1606 and the rigid substrate 1614. In one embodiment, the rigid substrate 1614 may be dimensioned similar to a shin guard and made of similar material. In one embodiment, the assembled dampening and cushioning members may be attached (e.g., double-sided taped) to an Acrylonitrile Butadiene Styrene (ABS) plastic curved sheet that serves as the rigid substrate 1614, to which straps and other electronics are also attached.

In some embodiments, the substrate 1614 may be made of molded plastic, machined plastic, or 3D-printed plastic. In some embodiments, the substrate 1614 may be made of VeroWhite, nylon, ABS, or polycarbonate. In some embodiments, the substrate 1614 may be machined out of polycarbonate or nylon, or 3-D printed ABS.

Figure 16B:
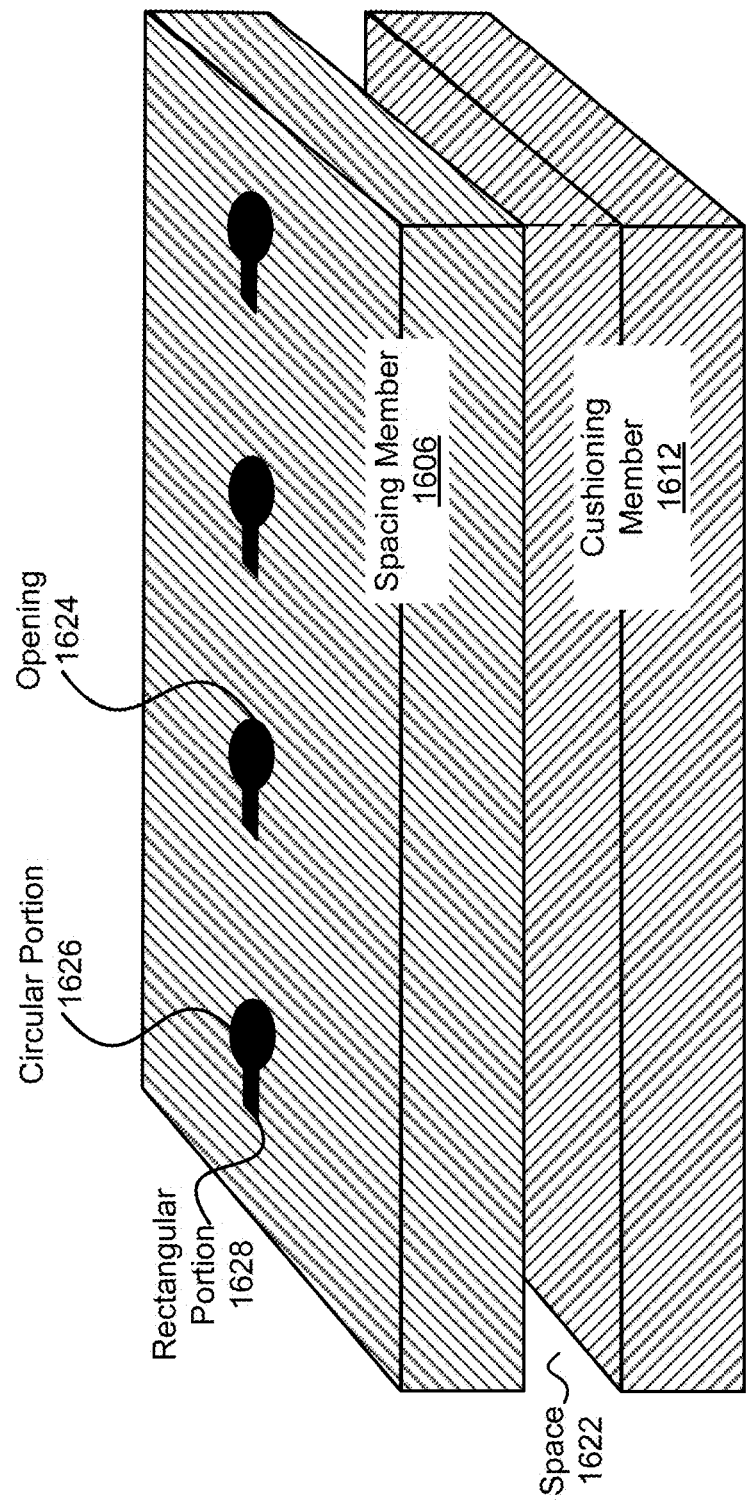
FIG. 16B is a perspective view of components of the example haptic communication device, in accordance with an embodiment.

FIG. 16B is a perspective view of components of the example haptic communication device 1600, in accordance with an embodiment. The haptic communication device 1600 shown in FIG. 16B includes the spacing member 1606 and the cushioning member 1612. The haptic communication device 1600 shown in FIG. 16B is shaped and dimensioned to support four cutaneous actuators 1602, as shown by the four openings 1624. In other embodiments, the haptic communication device 1600 may include additional or fewer components than those described herein. Similarly, the functions can be distributed among the components and/or different entities in a different manner than is described here.

The spacing member 1606 has openings 1624 that are dimensioned to receive and secure the cutaneous actuators 1602 and the electronic circuitry 1608. Each of the openings 1624 has a first portion 1626 having a first shape, and a second portion 1628 extending from the first portion and having a second shape. The cutaneous actuators 1602 are inserted into the one or more first portions 1626, and the electronic circuitry 1608 is inserted into the one or more second portions 1628. For example, each of the openings 1624 may have a key-hole shape having a circular portion 1626 and a rectangular portion 1628 extending from the circular portion 1626. The rectangular portion 1628 provides clearance for the electronic circuitry 1608 and wiring. The cutaneous actuators 1602 are inserted into the circular portions 1626 and the electronic circuitry 1608 is inserted into the rectangular portions 1628 of the openings 1624.

The cushioning member 1612 made of polyurethane foam having a thickness of about one quarter inch provides physical comfort to the body 1618 of the user wearing the haptic communication device 1600. The electronic circuitry 1608 is located within the space 1622 between the cushioning member 1612 and the spacing member 1606.

Figure 16C:
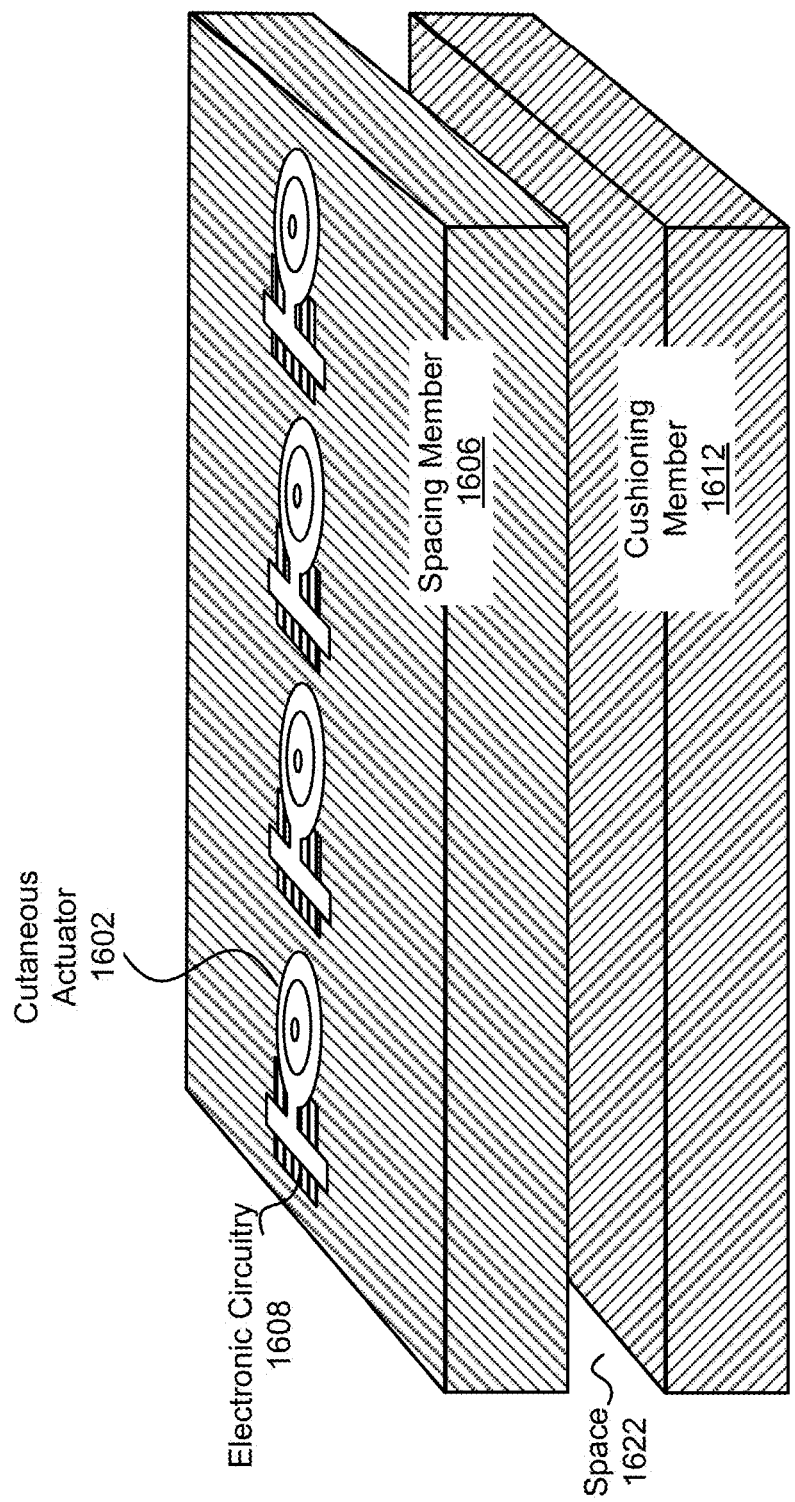
FIG. 16C is a perspective view of the example haptic communication device mounted with cutaneous actuators, in accordance with an embodiment.

FIG. 16C is a perspective view of the example haptic communication device 1600 mounted with cutaneous actuators 1602, in accordance with an embodiment. The haptic communication device 1600 shown in FIG. 16C includes the spacing member 1606 and the cushioning member 1612. In other embodiments, the haptic communication device 1600 may include additional or fewer components than those described herein. Similarly, the functions can be distributed among the components and/or different entities in a different manner than is described here.

The haptic communication device 1600 shown in FIG. 16C is shaped and dimensioned to support four cutaneous actuators 1602. The cutaneous actuators 1602 are shown inserted into the circular portions 1626 of the openings 1624. In FIG. 16C, the electronic circuitry 1608 is shown inserted into the rectangular portions 1628 of the openings 1624. The electronic circuitry 1608 is located within the space 1622 between the cushioning member 1612 and the spacing member 1606.

Figure 16D:
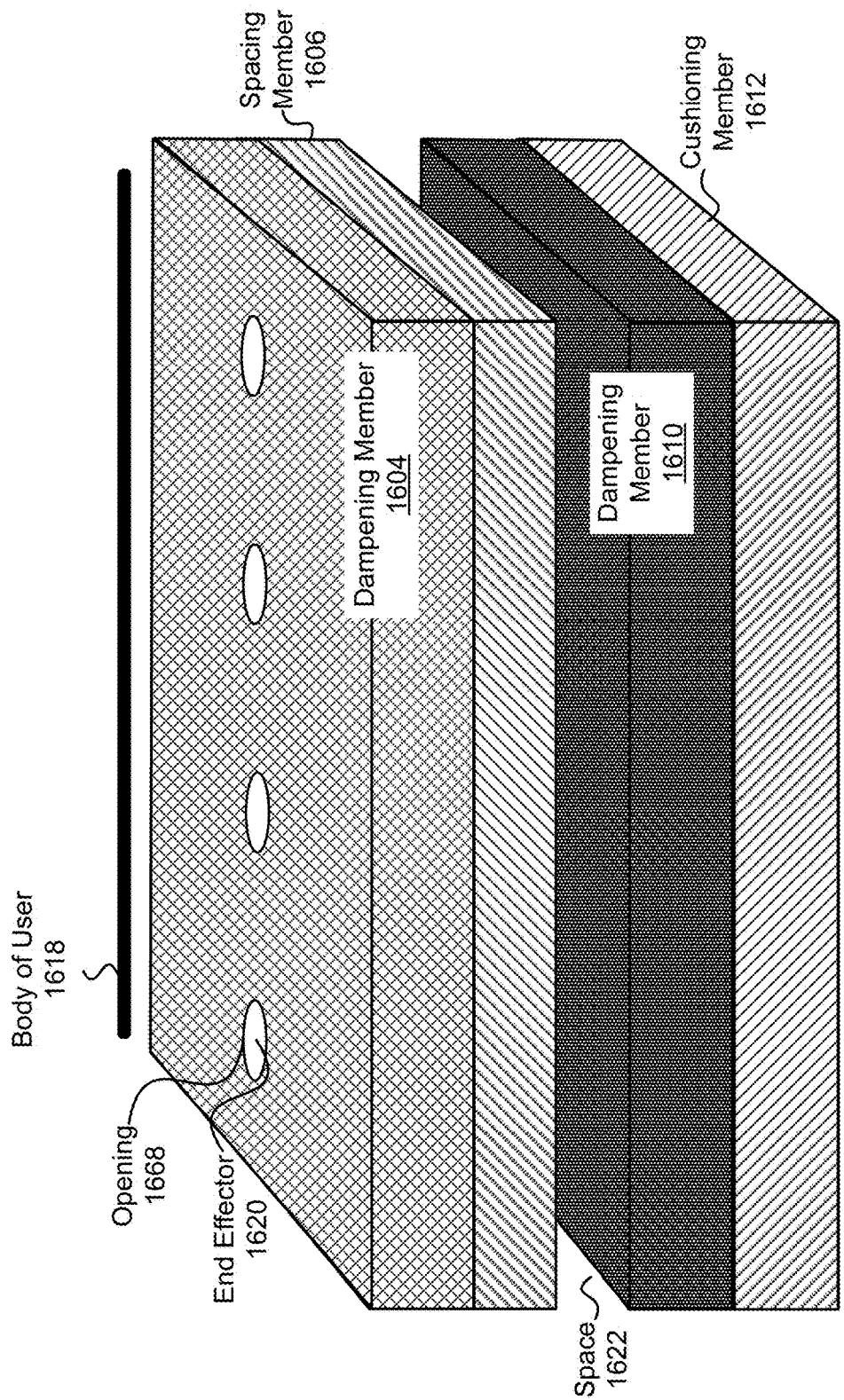
FIG. 16D is a perspective view of the example haptic communication device including a dampening member, in accordance with an embodiment.

FIG. 16D is a perspective view of a portion of the example haptic communication device 1600 including a dampening member 1604, in accordance with an embodiment. The haptic communication device 1600 shown in FIG. 16D includes the dampening member 1604, the spacing member 1606, the second dampening member 1610, the cushioning member 1612, and the end effectors 1620. The haptic communication device 1600 shown in FIG. 16D is shaped and dimensioned to support four cutaneous actuators 1602, as shown by the four end effectors 1620. In other embodiments, the haptic communication device 1600 may include additional or fewer components than those described herein. Similarly, the functions can be distributed among the components and/or different entities in a different manner than is described here.

The dampening member 1604 has four openings 1668 as shown in FIG. 16D. The cutaneous actuators 1602 transmit the haptic vibrations 1616 to the distinct locations on the body 1618 through the openings 1668. The size of the openings may be designed to surround the end effector 1620. In one embodiment, the openings may be around 1 inch in diameter. The benefit of the openings is that they restrict the haptic vibrations 1616 to stay within the localized area, and result in better localization and perceptibility. The electronic circuitry 1608 is located within the space 1622 between the cushioning member 1612 and the spacing member 1606.

Embodiments also relate to a haptic communication device 1630 (illustrated and described in detail below with respect to FIG. 16E) including housings mounted on a rigid substrate worn by a user and cutaneous actuators 1602 that are enclosed and separated from each other by each housing. The haptic communication device 1630 includes a cutaneous actuator 1602, at least a part of which is located within a housing to generate haptic vibrations 1616 corresponding to actuator signals received by the cutaneous actuator 1602. A dampening member is located within the housing and between the cutaneous actuator 1602 and a roof of the housing. The dampening member focuses the haptic vibrations 1616 at a distinct location on a body 1618 of a user wearing the haptic communication device 1630. The dampening member has a first opening, wherein the cutaneous actuator 1602 transmits the haptic vibrations to the distinct location through the first opening. A spacing member is located within the housing and contacts the dampening member. The spacing member is separated from the body 1618 by the dampening member and has a second opening dimensioned to receive and secure the cutaneous actuator 1602.

Figure 16E:
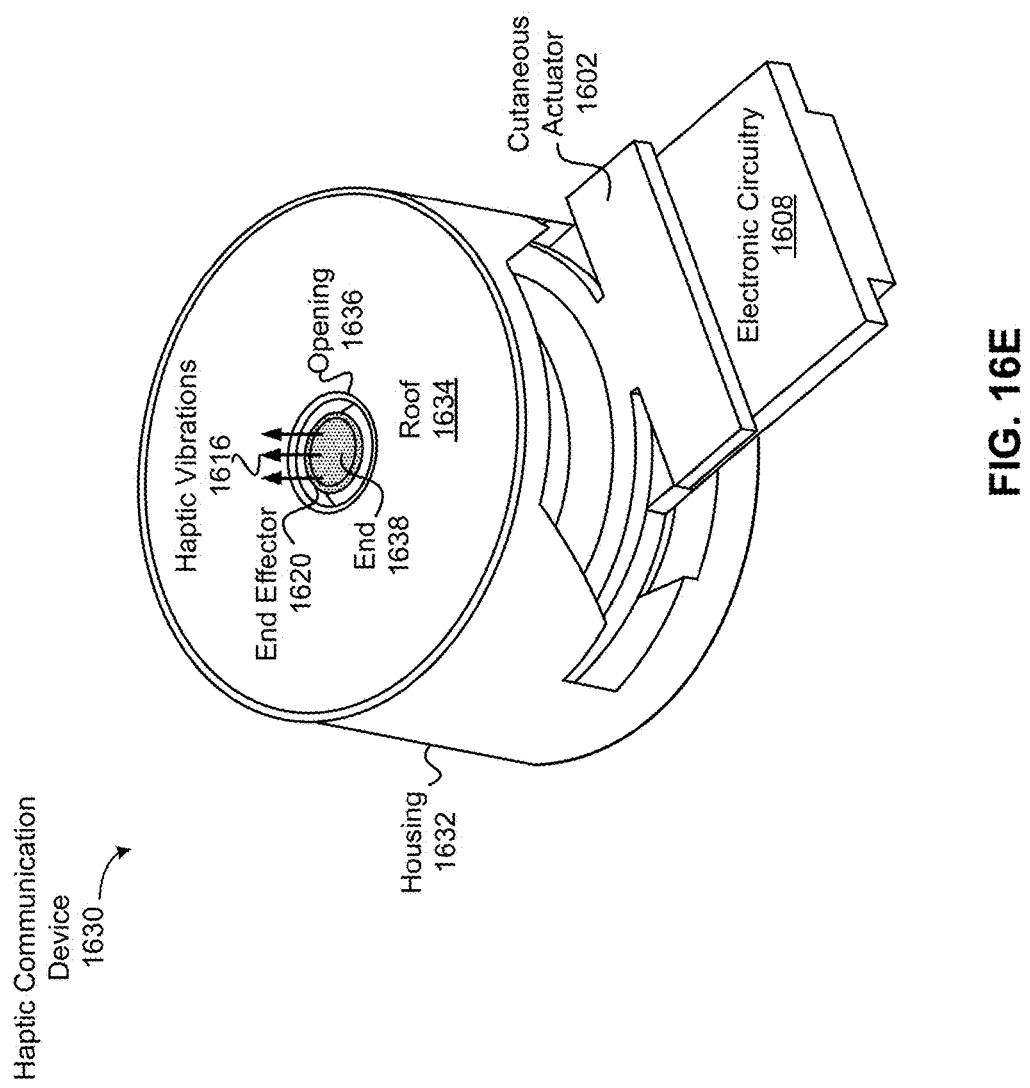
FIG. 16E is a perspective view of an example haptic communication device including a cutaneous actuator located within a housing, in accordance with an embodiment

FIG. 16E is a perspective view of an example haptic communication device 1630 including a cutaneous actuator 1602 partially located within a housing 1632, in accordance with an embodiment. The haptic communication device 1630 includes an array of cutaneous actuators 1602. Each cutaneous actuator 1602 is inserted into a housing 1632 on the array. The portion of the haptic communication device 1630 shown in FIG. 16E includes the housing 1632, the cutaneous actuator 1602, the electronic circuitry 1608, and the end effector 1620. In other embodiments, the haptic communication device 1600 may include additional or fewer components than those described herein. Similarly, the functions can be distributed among the components and/or different entities in a different manner than is described here.

The housing 1632 is a rigid casing that encloses and protects a portion of the cutaneous actuator 1602 and the electronic circuitry 1608 coupled to the cutaneous actuator 1602. The housing 1632 directly contacts the body 1618 of a user wearing the haptic communication device 1630. The housing 1632 may be in the shape of a cylinder, a cone, a cube, a prism, etc. The cutaneous actuator 1602 is partly located within the housing 1632 to generate haptic vibrations 1616 corresponding to actuator signals received by the cutaneous actuator 1602. The actuator signals may be generated by various methods as described with respect to FIGS. 9F, 14A, 14C, 17A, and 18A. The haptic vibrations 1616 communicate haptic output (e.g., words in a haptic lexicon) to a body 1618 of a user via the skin when the user is wearing the haptic communication device 1600. The communication of the haptic output may be performed by various methods as described with respect to FIGS. 8C, 9A, 10E, 15B, and 15C. As described above with respect to FIG. 1, the cutaneous actuator 1602 may be a voice coil, a linear resonant actuator (LRA), an eccentric rotating mass actuator, a piezoelectric actuator, an electroactive polymer actuator, a shape memory alloy actuator, a pneumatic actuator, a microfluidic actuator, or an acoustic metasurface actuator.

The housing 1632 for each cutaneous actuator 1602 in the array of cutaneous actuators may be mounted on a rigid substrate 1614 (shown below in FIG. 16H) to form the haptic communication device 1630. The housing 1632 increases localization of haptic effects on the body 1618 by focusing the haptic vibrations 1616 on the body 1618. In some embodiments, the housing 1632 may be made of molded plastic, machined plastic, or 3D-printed plastic. For example, the housing 1632 may be made by using a mold that is filled with pliable plastic material. The plastic hardens or sets inside the mold, adopting its shape. In another example, the housing 1632 may be made by taking a piece of plastic and cutting into a desired final shape and size by a controlled material-removal process (machining). In another example, the housing 1632 may be made by joining or solidifying plastic material under computer control to create the three-dimensional housing 1632 (3D printing).

In some embodiments, the housing 1632 may be made of VeroWhite, nylon, Acrylonitrile Butadiene Styrene (ABS), or polycarbonate. In some embodiments, the housing 1632 may be machined out of polycarbonate or nylon, or 3-D printed ABS for ease of manufacturing and biocompatibility with human skin. VeroWhite is an opaque Polyjet resin that is used when prototyping new designs and can also be used for creating end-use products. ABS is a two phase polymer blend having rigidity, hardness, and heat resistance. Polycarbonate is a synthetic resin in which the polymer units are linked through carbonate groups, and is used for molding materials and films.

A roof 1634 of the housing 1632 provides support to the haptic communication device 1630. A portion of the roof 1634 may rest against a body 1618 of the user when the haptic communication device 1630 is transmitting the haptic vibrations 1616 to the user. The roof 1634 has an opening 1636 for an end effector 1620 to contact the body of the user 1618.

The end effector 1620 presses into the body 1618 of the user and transmits the haptic vibrations 1616 to the user. The end effector 1620 extends out of the housing 1632 through the opening 1636 in the roof 1634. The end effector 1620 is mounted on the cutaneous actuator 1602 and focuses the haptic vibrations 1616 at a distinct location on the body 1618 while providing a comfortable experience to the user. For example, the end effector 1620 protects the user's body from coming into contact with parts of the cutaneous actuator 1602 or housing 1632 that may be rigid and hurt the user.

The end effector 1620 has one end (shown as end 1642 below in FIG. 16G) attached to the cutaneous actuator 1602. Another end 1638 of the end effector 1620 contacts the body 1618 of the user. The end 1642 has a surface area larger than a surface are of the end 1638, such that the end effector 1620 may increase pressure of the haptic vibrations 1616 on the body 1618. In embodiments, the end effector 1620 may be made of rubber, silicone, or polycarbonate. The end effector 1620 may have a disc-like shape, a cylindrical shape, a tapered shape, or a dome-like shape.

The electronic circuitry 1608 is inserted into the housing 1632 along with the cutaneous actuator 1602 to power the cutaneous actuator 1602 and transmit the actuator signals to the cutaneous actuator 1602 to cause the cutaneous actuator 1602 to generate the haptic vibrations 1616. The electronic circuitry 1608 is located within a space between the cutaneous actuator 1602 and an inner wall of the housing 1632 (e.g., inner wall 1658 shown below in FIG. 16G). In one embodiment, the electronic circuitry 1608 is a PCB and includes a temperature measurement sensor. The electronic circuitry 1608 may measure the onboard temperature of the haptic communication device 1630 and transmit corresponding measurement signals to a main electronic system offboard. Responsive to the temperature exceeding a threshold, the electronic circuitry 1608 may terminate operation of the cutaneous actuators. For example, if the temperature increases to uncomfortable levels, a main electronic system may cut power to the cutaneous actuator 1602 via the electronic circuitry 1608.

Figure 16F:
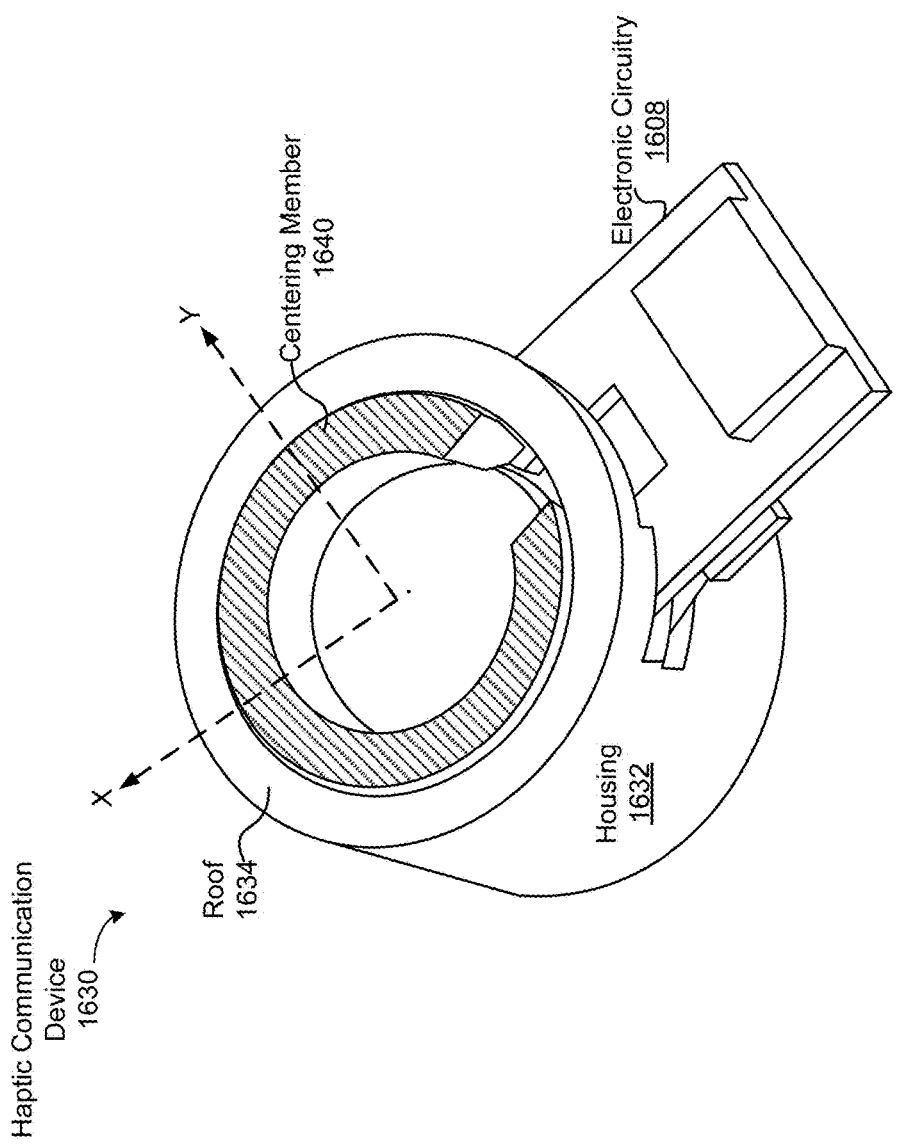
FIG. 16F is a perspective view of the example haptic communication device including a centering member, in accordance with an embodiment.

FIG. 16F is a perspective view of the example haptic communication device 1630 including a centering member 1640, in accordance with an embodiment. FIG. 16F includes the housing 1632, a portion of the roof 1634, electronic circuitry 1608, and the centering member 1640. In other embodiments, the haptic communication device 1600 may include additional or fewer components than those described herein. Similarly, the functions can be distributed among the components and/or different entities in a different manner than is described here.

Figure 16G:
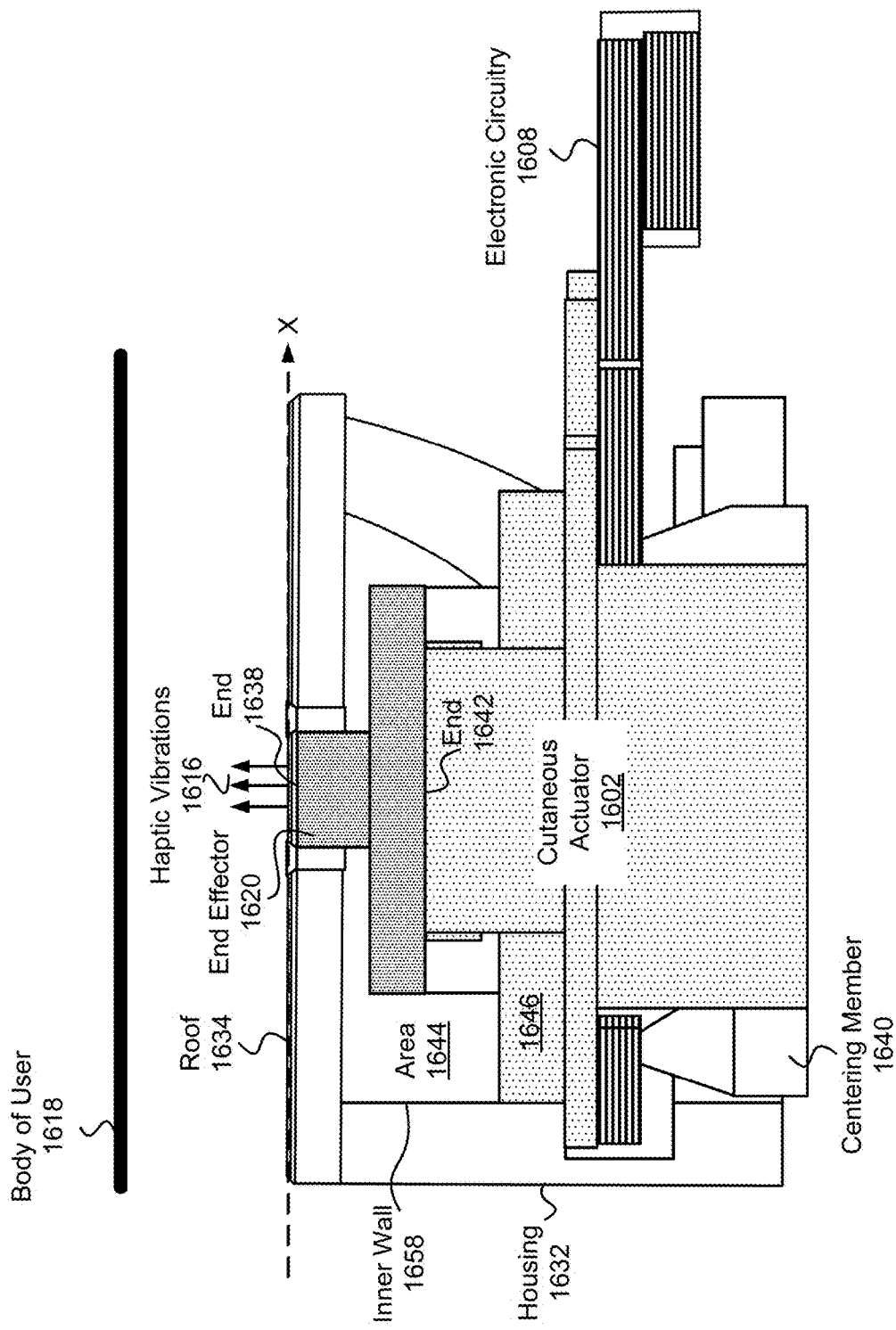
FIG. 16G is a cross sectional view of the example haptic communication device taken along the X axis of FIG. 16F, in accordance with an embodiment.

The haptic communication device 1630 shown in FIG. 16F includes the centering member 1640 to protect the cutaneous actuator 1602 and the end effector 1620 from rubbing against the inner walls of the housing 1632. The centering member 1640 locates the cutaneous actuator 1602 within the housing 1632. The centering member 1640 is located within the housing 1632 at the bottom of the housing 1632, as shown in FIG. 16G below. The centering member 1640 surrounds a portion of the cutaneous actuator 1602 and constrains the cutaneous actuator 1602 and the end effector 1620 in a plane parallel to the roof 1634.

The centering member 1640 constrains the cutaneous actuator 1602 and the end effector 1620 in the X-Y plane to ensure that the cutaneous actuator 1602 and the end effector 1620 are not off-center or rubbing against the walls of the housing 1632. The centering member 1640 thus prevents the cutaneous actuator 1602 and the end effector 1620 from contacting an inner wall of the housing 1632. Thus, the centering member 1640 prevents wastage of energy from the cutaneous actuator 1602 or the end effector 1620 in shaking the housing 1632 or causing friction by rubbing against the housing 1632. If the cutaneous actuator 1602 were biased off-center, there would be a significant non-Z axis force that would be wasted; this is prevented by the disclosed embodiments herein. The centering member 1640 may be made of materials similar to the materials of the housing 1632.

FIG. 16G is a cross sectional view of the example haptic communication device 1630 taken along the X axis of FIG. 16F, in accordance with an embodiment. FIG. 16G includes the housing 1632, a portion of the roof 1634, electronic circuitry 1608, the centering member 1640, the end effector 1620, and the cutaneous actuator 1602.

The housing 1632 is the rigid casing that encloses and protects the cutaneous actuator 1602 and the electronic circuitry 1608. An end 1642 of the end effector 1620 is mounted on the cutaneous actuator 1602 to transmit the haptic vibrations 1616 generated by the cutaneous actuator 1602 to the body 1618 of the user wearing the haptic communication device 1630. Another end 1638 of the end effector 1620 contacts or presses into the user's body 1618 to transmit the haptic vibrations 1616. The end 1642 has a surface area larger than a surface area of the end 1638, such that the end effector 1620 may increase pressure of the haptic vibrations 1616 on the body 1618. The end effector 1620 may extend outwards out of the housing 1632 through the opening 1636 to contact the user's body 1618.

The centering member 1640 surrounds and protects the cutaneous actuator 1602 and the end effector 1620 from rubbing against the inner walls 1646 of the housing 1632, as described above with respect to FIG. 16F. The electronic circuitry 1608 may be inserted along with the cutaneous actuator 1602 into the housing 1632 through an opening in the walls of the housing 1632 as shown in FIG. 16G.

The area 1644 within the housing 1632 to the side of the cutaneous actuator 1602 in FIG. 16G may be used to contain a dampening member 1604 (as described and shown above with respect to FIG. 16A) that is located within the housing 1632. The dampening member 1604 is located between the cutaneous actuator 1602 and the roof 1634 of the housing 1632. The dampening member 1604 dampens the haptic vibrations 1616 generated by the cutaneous actuator 1602 and focuses the haptic vibrations 1616 at a distinct location on the body 1618 of the user wearing the haptic communication device 1630.

The dampening member 1604 dampens the haptic vibrations 1616 generated by the cutaneous actuator 1602 to focus the haptic vibrations 1616 at a distinct location on the body 1618. In embodiments, the dampening member 1604 may be a layer of soft rubber or polyurethane foam having a predetermined thickness (e.g., about one sixteenth inch). The dampening member has an opening (as shown above in FIG. 16D); the cutaneous actuator 1602 transmits the haptic vibrations 1616 to the distinct location on the body 1618 through the opening.

The area 1644 in FIG. 16G may also be used to contain a spacing member 1606 (as illustrated and described above with respect to FIG. 16A) that is located within the housing 1632. The spacing member 1606 contacts the dampening member 1604. The spacing member 1606 is separated from the body 1618 of the user by the dampening member 1604 and has an opening 1624 (as illustrated and described above with respect to FIG. 16B) that is dimensioned to receive and secure the cutaneous actuator 1624. A portion of the spacing member 1606 is located between the dampening member 1604 and a section 1646 of the cutaneous actuator 1602 extending outward from a center of the cutaneous actuator 1602 to position the cutaneous actuator 1602 such that the cutaneous actuator 1602 does not rub against or contact the roof 1634.

In embodiments, the spacing member 1606 is made of a layer of rigid rubber having a predetermined thickness (e.g., about one quarter inch) and a durometer of less than 50. The durometer value of the spacing member 1606 is selected to enable the spacing member 1606 to support the cutaneous actuators 1602 in place within the housing 1632 and make the spacing member 1606 generally resistant to indentation.

The haptic communication device 1630 has similar Z-stack spacing and vibration dampening features to the haptic communication device 1600 shown above in FIG. 16A. The haptic communication device 1630 also has conical features to self-center the end effector 1620 during mounting to prevent the end effector from rubbing on the housing 1632.

Figure 16H:
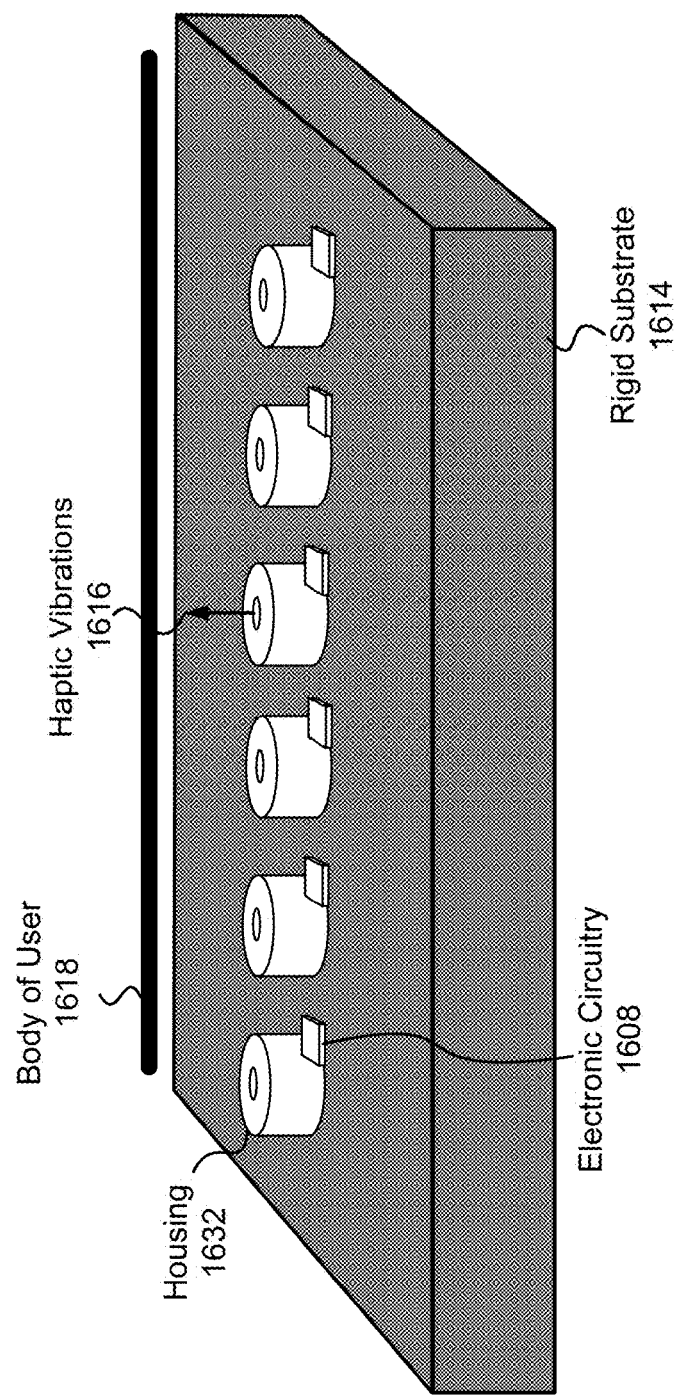
FIG. 16H is a perspective view of the example haptic communication device including a rigid substrate, in accordance with an embodiment.

FIG. 16H is a perspective view of the example haptic communication device 1630 including the rigid substrate 1614, in accordance with an embodiment. The haptic communication device 1630 (as shown in FIG. 16H) includes an array of six cutaneous actuators 1602. Each cutaneous actuator is enclosed within the housing 1632, such that it may generate and transmit the haptic vibrations 1616 to the body 1618 of the user. A portion of the electronic circuitry 1608 is also inserted within the housing 1632. The haptic communication device 1630 includes the rigid substrate 1614 on which each housing 1632 is mounted. The rigid substrate 1614 (also described above with respect to FIG. 16A) is dimensioned to secure the housing 1632 to a shape of the body 1618 of the user. In one embodiment, each housing 1632 may be double-sided taped to an ABS plastic curved sheet that serves as the rigid substrate 1614, to which straps and other electronics are also attached.

In one embodiment, a haptic communication system may be constructed, including a signal generator configured to receive a message from a sending user and generate actuator signals corresponding to the message. The system includes the haptic communication device 1630 communicative coupled to the signal generator. The haptic communication device 1630 includes a cutaneous actuators 160 configured to generate the haptic vibrations 1616 corresponding to the actuator signals to transmit the message to the body 1618 of a user wearing the haptic communication device 1630. The haptic communication device 1630 includes the housing 1632 in direct contact with the body 1618 of the user and at least partially enclosing the cutaneous actuator 1602. The dampening member 1604 is located within the housing 1632 and proximate to the body 1618 to focus the haptic vibrations 1616 at a distinct location on the body 1618. The dampening member 1604 has an opening, wherein the cutaneous actuator 1602 transmits the haptic vibrations 1616 to the distinct location through the opening. A spacing member 1606, also located within the housing 1632, contacts the dampening member 1604 and is separated from the body 1618 by the dampening member 1604. The spacing member 1606 has an opening dimensioned to receive and secure the cutaneous actuators 1602.

FIGS. 16I-16L are perspective views of different end effectors, in accordance with an embodiment. Each type of end effector may be mounted on the top of the cutaneous actuator 1602 as shown in FIG. 16A. The different types of end effectors have different dimensions and may be made of different materials to achieve different contact areas and/or stiffness. The end effectors have at least three benefits. First, they provide consistent contact between the cutaneous actuator 1602 and the body 1618 during use of the haptic communication device 1600 when the cutaneous actuator 1602 vibrates and when the user's body 1618 moves. Second, they may be made of soft rubber, silicone or polycarbonate padding material so they do not irritate and/or cut/hurt users. Third, they translate and focus the actuator energy to the skin.

FIG. 16I is a perspective view of a cylindrical end effector, in accordance with an embodiment. The cylindrical end effector shown in FIG. 16I has a cylindrical tip 1648 positioned on top of the disc 1650. The end 1638 on top of the cylindrical tip 1648 contacts the body 1618 of the user to transmit the haptic vibrations 1616 from the cutaneous actuator 1602 to the body 1618. The disc 1650 is positioned on top of the base 1652. The tip 1648, disc 1650, and base 1652 may be a single piece or three different pieces attached together to make the end effector. The end 1642 at the bottom of the base 1652 is mounted on the cutaneous actuator 1602 as shown in FIG. 16G. The end 1638 is smaller in surface area than the end 1642 to increase pressure on the body 1618 of the user. A benefit of the cylindrical end effector is that it extends the space between actuator 1602 and skin for packaging and mounting.

Figure 16J:
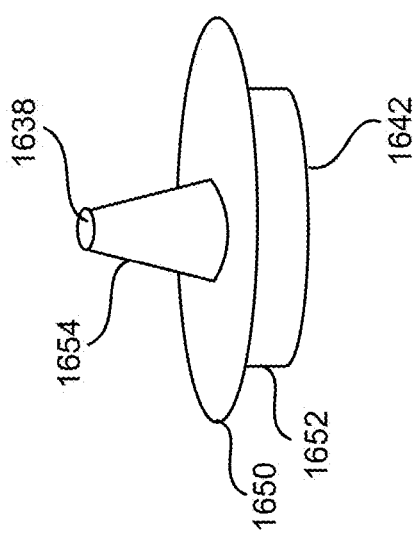
FIG. 16J is a perspective view of a tapered end effector, in accordance with an embodiment.

FIG. 16J is a perspective view of a tapered end effector, in accordance with an embodiment. The tapered end effector shown in FIG. 16J has a tapered tip 1654 positioned on top of the disc 1650. The end 1638 on top of the tapered tip 1654 contacts the body 1618 of the user to transmit the haptic vibrations 1616 from the cutaneous actuator 1602 to the body 1618. The disc 1650 is positioned on top of the base 1652. The tip 1648, disc 1650, and base 1652 may be a single piece or three different pieces attached together to make the end effector. The end 1642 at the bottom of the base 1652 is mounted on the cutaneous actuator 1602 as shown in FIG. 16G. The end 1638 is smaller in surface area than the end 1642 to increase pressure on the body 1618 of the user. A benefit of the tapered end effector is that it reduces the skin contact area and increases the pressure.

Figure 16K:
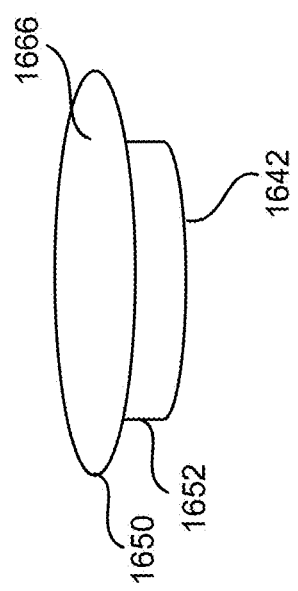
FIG. 16K is a perspective view of a disc end effector, in accordance with an embodiment.

FIG. 16K is a perspective view of a disc end effector, in accordance with an embodiment. The disc end effector shown in FIG. 16K has a larger upper surface 1666 on top of the disc 1650. The end 1666 contacts the body 1618 of the user to transmit the haptic vibrations 1616 from the cutaneous actuator 1602 to the body 1618. The disc 1650 is positioned on top of the base 1652. The disc 1650 and base 1652 may be a single piece or two different pieces attached together to make the end effector. The end 1642 at the bottom of the base 1652 is mounted on the cutaneous actuator 1602 as shown in FIG. 16G. A benefit of the disc end effector is that it locates the haptic vibrations 1616 in a controlled area.

Figure 16L:
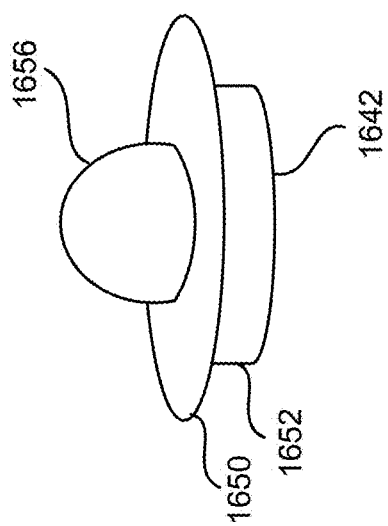
FIG. 16L is a perspective view of a dome end effector, in accordance with an embodiment.

FIG. 16L is a perspective view of a dome end effector, in accordance with an embodiment. The dome end effector shown in FIG. 16L has a dome tip 1656 positioned on top of the disc 1650. The dome tip 1656 contacts the body 1618 of the user to transmit the haptic vibrations 1616 from the cutaneous actuator 1602 to the body 1618. The disc 1650 is positioned on top of the base 1652. The tip 1656, disc 1650, and base 1652 may be a single piece or three different pieces attached together to make the end effector. The end 1642 at the bottom of the base 1652 is mounted on the cutaneous actuator 1602 as shown in FIG. 16G. The dome tip 1656 is smaller in surface area than the end 1642 to increase pressure on the body 1618 of the user. A benefit of the dome end effector 1664 is that it provides smooth penetration and an optimal contact point.

Figure 16M:
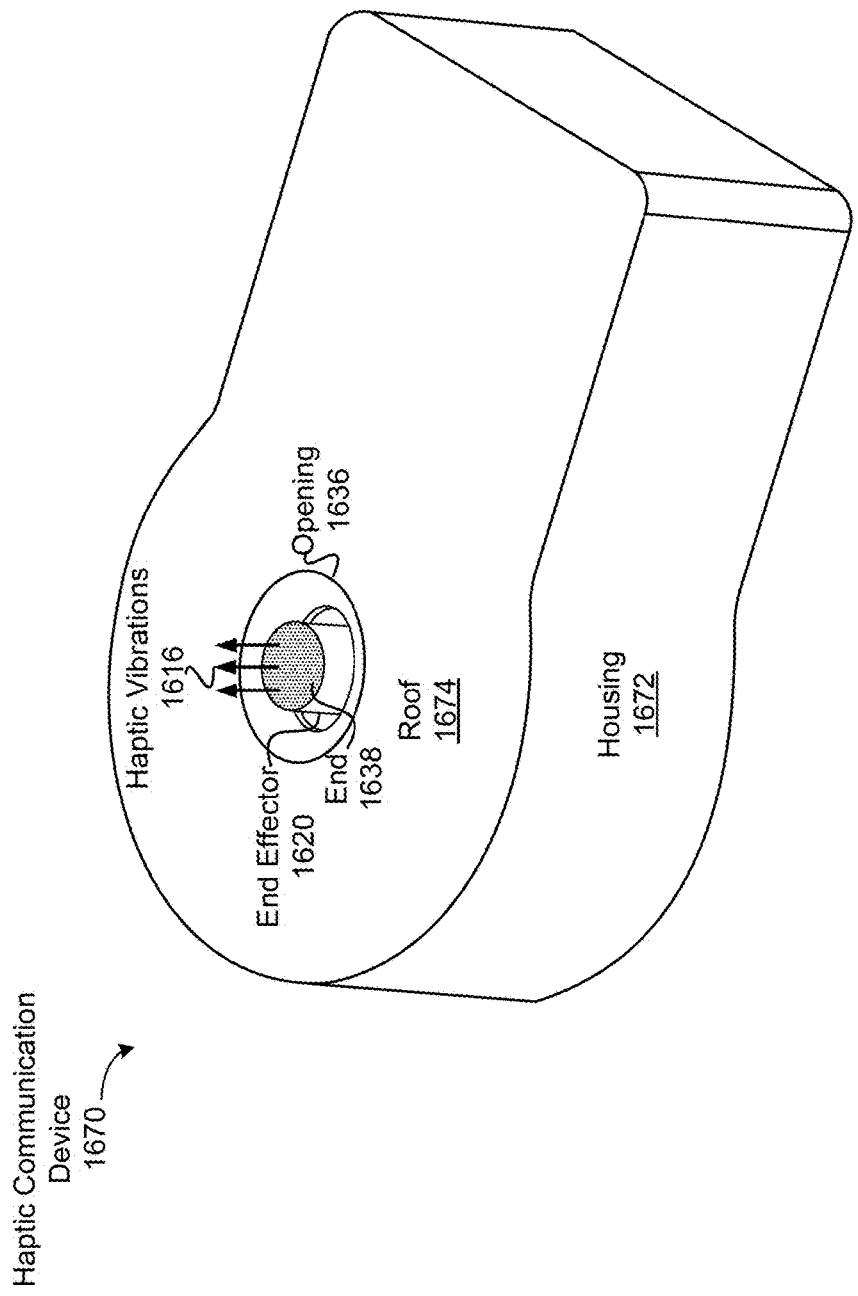
FIG. 16M is a perspective view of an example haptic communication device including a housing that completely encloses a cutaneous actuator, in accordance with an embodiment.

FIG. 16M is a perspective view of an example haptic communication device 1670 including a housing 1672 that completely encloses a cutaneous actuator 1602, in accordance with an embodiment. The cutaneous actuator 1602 (not shown in FIG. 16M) is completely located within the housing 1672. The haptic communication device 1670 may include an array of cutaneous actuators 1602. Each cutaneous actuator 1602 is completely inserted into a corresponding housing 1672 on the array. The portion of the haptic communication device 1670 shown in FIG. 16M includes the housing 1672 and an end effector 1620. In other embodiments, the haptic communication device 1670 may include additional or fewer components than those described herein. Similarly, the functions can be distributed among the components and/or different entities in a different manner than is described here.

The housing 1672 is a rigid casing that encloses and protects the cutaneous actuator 1602 and electronic circuitry 1608 (not shown in FIG. 16M) that is connected to and drives the cutaneous actuator 1602. The housing 1672 may be in the shape of a cylinder, a cone, a cube, a prism, etc. The cutaneous actuator 1602 is completely located within the housing 1672 to generate haptic vibrations 1616 corresponding to actuator signals received by the cutaneous actuator 1602. The actuator signals may be generated by various methods as described with respect to FIGS. 9F, 14A, 14C, 17A, and 18A. The haptic vibrations 1616 communicate haptic output (e.g., words in a haptic lexicon) to a body 1618 of a user via the skin when the user is wearing the haptic communication device 1670. The communication of the haptic output may be performed by various methods as described with respect to FIGS. 8C, 9A, 10E, 15B, and 15C. As described above with respect to FIG. 1, the cutaneous actuator 1602 may be a voice coil, a linear resonant actuator (LRA), an eccentric rotating mass actuator, a piezoelectric actuator, an electroactive polymer actuator, a shape memory alloy actuator, a pneumatic actuator, a microfluidic actuator, or an acoustic metasurface actuator.

The housing 1672 for each cutaneous actuator 1602 in the array of cutaneous actuators may be mounted on a rigid substrate 1614 (shown above in FIG. 16H) to form the haptic communication device 1670. The housing 1672 increases localization of haptic effects on the body 1618 by focusing the haptic vibrations 1616 on the body 1618. In some embodiments, the housing 1672 may be made of molded plastic, machined plastic, or 3D-printed plastic. In some embodiments, the housing 1672 may be made of VeroWhite, nylon, Acrylonitrile Butadiene Styrene (ABS), or polycarbonate. In some embodiments, the housing 1672 may be machined out of polycarbonate or nylon, or 3-D printed ABS for ease of manufacturing and biocompatibility with human skin.

A roof 1674 of the housing 1632 provides support to the haptic communication device 1630. A portion of the roof 1674 may rest against a body 1618 of the user when the haptic communication device 1670 is transmitting the haptic vibrations 1616 to the user. The roof 1674 has an opening 1636 for an end effector 1620 (mounted on the cutaneous actuator 1602) to contact the body of the user 1618.

The end effector 1620 presses into the body 1618 of the user and transmits the haptic vibrations 1616 to the user. The end effector 1620 extends out of the housing 1632 through the opening 1636 in the roof 1674. The end effector 1620 is mounted on the cutaneous actuator 1602 and focuses the haptic vibrations 1616 at a distinct location on the body 1618 while providing a comfortable experience to the user. For example, the end effector 1620 protects the user's body from coming into contact with parts of the cutaneous actuator 1602 or housing 1672 that may be rigid and hurt the user.

The end effector 1620 has one end (shown as end 1642 below in FIG. 16N) attached to the cutaneous actuator 1602. Another end 1638 of the end effector 1620 contacts the body 1618 of the user. The end 1642 has a surface area larger than a surface are of the end 1638, such that the end effector 1620 may increase pressure of the haptic vibrations 1616 on the body 1618.

The electronic circuitry 1608 (not shown in FIG. 16M) is inserted into the housing 1672 along with the cutaneous actuator 1602 to power the cutaneous actuator 1602. The electronic circuitry 1608 is located within a space between the cutaneous actuator 1602 and an inner wall of the housing 1672 (e.g., inner wall 1676 shown below in FIG. 16N).

Figure 16N:
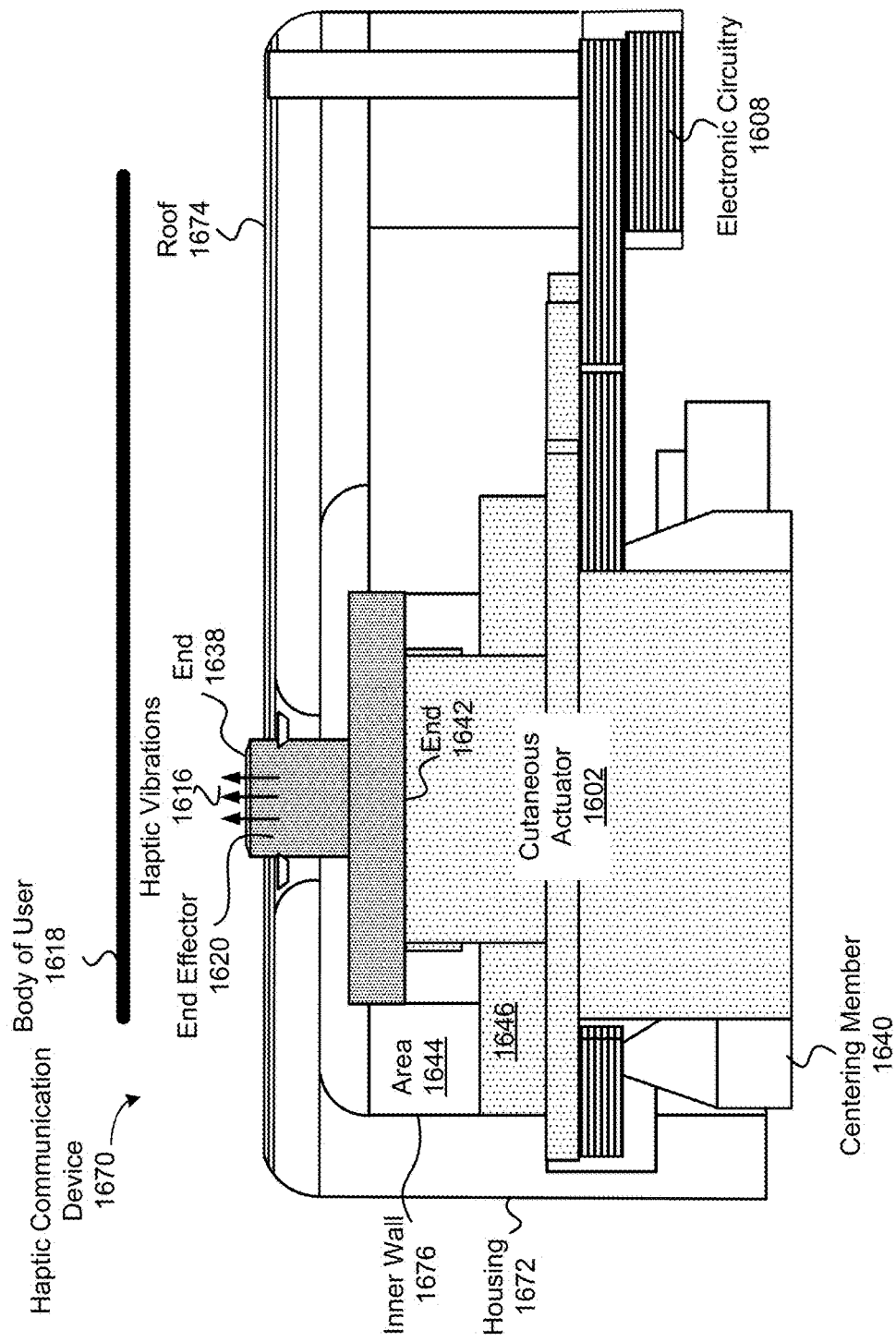
FIG. 16N is a cross sectional view of the example haptic communication device of FIG. 16M, in accordance with an embodiment.

FIG. 16N is a cross sectional view of the example haptic communication device 1670 of FIG. 16M, in accordance with an embodiment. FIG. 16N includes the housing 1672, a portion of the roof 1674, electronic circuitry 1608, a centering member 1640, the end effector 1620, and the cutaneous actuator 1602.

The housing 1672 is the rigid casing that completely encloses and protects the cutaneous actuator 1602 and the electronic circuitry 1608. An end 1642 of the end effector 1620 is mounted on the cutaneous actuator 1602 to transmit the haptic vibrations 1616 generated by the cutaneous actuator 1602 to the body 1618 of the user wearing the haptic communication device 1670. Another end 1638 of the end effector 1620 contacts or presses into the user's body 1618 to transmit the haptic vibrations 1616. The end 1642 has a surface area larger than a surface area of the end 1638, such that the end effector 1620 may increase pressure of the haptic vibrations 1616 on the body 1618. The end effector 1620 may extend outwards out of the housing 1672 through the opening 1636 to contact the user's body 1618. The centering member 1640 surrounds and protects the cutaneous actuator 1602 and the end effector 1620 from rubbing against the inner wall 1676 of the housing 1672, as described above with respect to FIG. 16F.

The area 1644 within the housing 1672 to the side of the cutaneous actuator 1602 in FIG. 16N may be used to contain a dampening member 1604 (as described and shown above with respect to FIG. 16A) that is located within the housing 1672. The dampening member 1604 is located between the cutaneous actuator 1602 and the roof 1674 of the housing 1672. The dampening member 1604 dampens the haptic vibrations 1616 generated by the cutaneous actuator 1602 and focuses the haptic vibrations 1616 at a distinct location on the body 1618 of the user wearing the haptic communication device 1670.

The area 1644 in FIG. 16N may also be used to contain a spacing member 1606 (as illustrated and described above with respect to FIG. 16A) that is located within the housing 1672. A portion of the spacing member 1606 is located between the dampening member 1604 and a section 1646 of the cutaneous actuator 1602 extending outward from a center of the cutaneous actuator 1602 to position the cutaneous actuator 1602 such that the cutaneous actuator 1602 does not rub against or contact the roof 1674.

Envelope Encoding of Speech Signals for Transmission to Cutaneous Actuators

Embodiments also relate to a haptic communication system to convey speech messages to a receiving user. A sending user may utter speech sounds or type in a text message into a speech signal generator that generates speech signals corresponding to the speech sounds or the textual message. A temporal envelope of the speech signals is used to convey the speech messages to the receiving user. The temporal envelope represents changes in amplitude of the speech signals. Carrier signals having a periodic waveform are generated and altered using the changes in amplitude of the speech signals to create actuator signals to convey a representation of the temporal envelope to cutaneous actuators. The cutaneous actuators generate haptic vibrations based on the actuator signals. The haptic vibrations represent the speech sounds or textual message that the receiving user is able to understand.

Figure 17A:
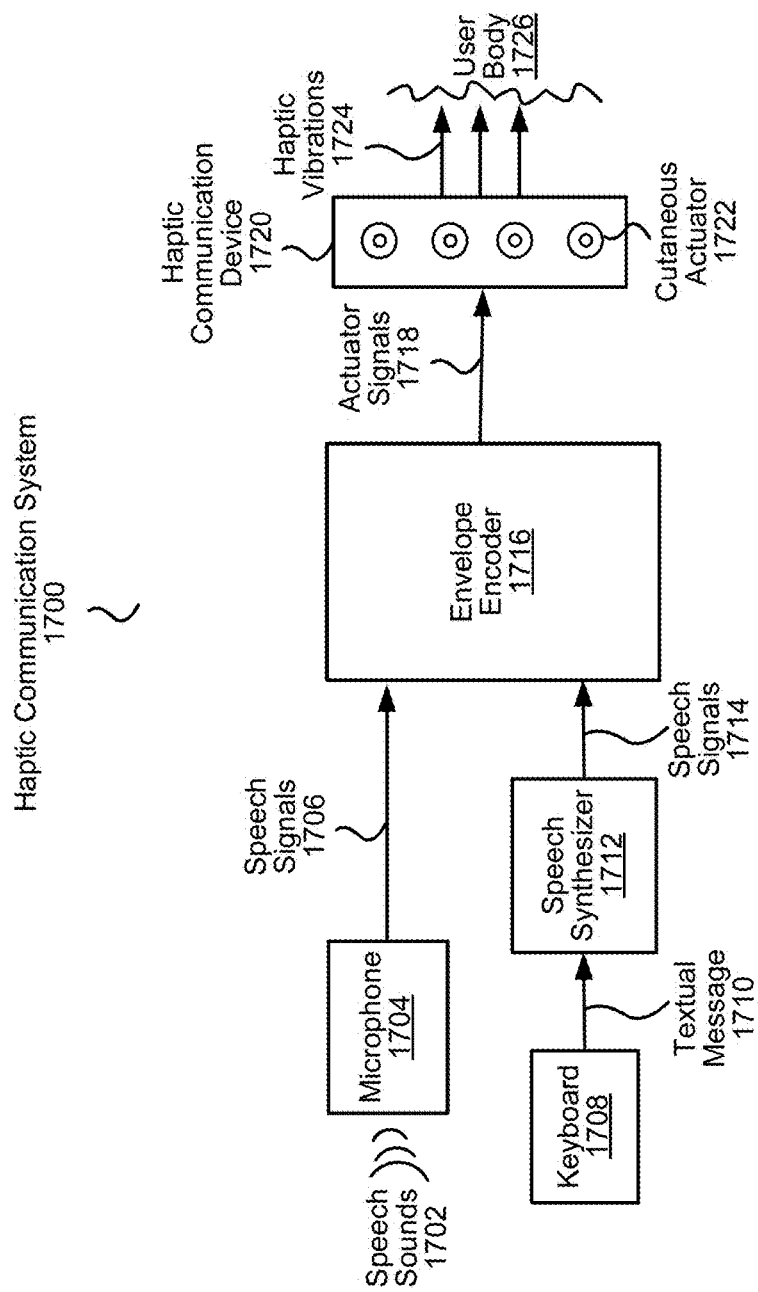
FIG. 17A is a block diagram illustrating an example haptic communication system for envelope encoding of speech signals and transmission to cutaneous actuators, in accordance with an embodiment.

FIG. 17A is an illustration of an example haptic communication system 1700 for envelope encoding of speech signals 1706 and transmission to one or more cutaneous actuators 1722, in accordance with an embodiment. The haptic communication system 1700 includes a microphone 1704, a keyboard 1708, a speech synthesizer 1712, an envelope encoder 1716, and a haptic communication device 1720. In other embodiments, the haptic communication system 1700 may include additional or fewer components than those described herein. Similarly, the functions can be distributed among the components and/or different entities in a different manner than is described here.

As shown in FIG. 17A, the haptic communication system 1700 includes a speech signal generator (e.g., microphone 1704 or speech synthesizer 1712) to receive speech sounds 1702 uttered by a user or a textual message 1710 typed out by the user and generate speech signals 1706 or 1714 corresponding to the speech sounds 1702 or the textual message 1710. For example, the microphone 1704 may generate the speech signals 1706 by digitizing the speech sounds 1702. The microphone 1704 is a transducer that converts the speech sounds 1702 into an electrical signal. The electrical signal may be an analog signal, a digital signal, or a combination thereof. The microphone 1704 may use any of several different methods (e.g., a coil of wire suspended in a magnetic field, a vibrating diaphragm, or a crystal of piezoelectric material, etc.,) to convert the air pressure variations of the speech sounds 1702 to the electrical signal. In addition, the microphone may include an analog-to-digital converter to digitize the electrical signal to the speech signals 1706. The microphone 1704 transmits the speech signals 1706 to the envelope encoder over a wired or a wireless connection.

The keyboard 1708 may be used by the user to type out the textual message 1710. The keyboard may be part of a personal computer, a smartphone, a laptop, a tablet, etc. The keyboard transmits the textual message 1710 to the speech synthesizer 1712 over a wired or a wireless connection.

The speech synthesizer 1712 artificially produces human speech. For example, a text-to-speech speech synthesizer may convert normal language text into speech; other embodiments of the speech synthesizer 1712 may render symbolic linguistic representations such as phonetic transcriptions into speech. As shown in FIG. 17A, the speech synthesizer 1712 generates the speech signals 1714 from the textual message 1710. The speech synthesizer 1712 may be implemented in software or hardware. For example, the speech synthesizer 1712 may be part of a personal computer (PC), a tablet PC, a set-top box (STB), a smartphone, an internet of things (IoT) appliance, or any machine capable of executing instructions that specify actions to be taken by that machine. In one embodiment, the speech synthesizer 1712 maps the textual message 1710 to stored sound signals. For example, the speech synthesizer 1712 may generate the speech signals 1714 by concatenating pieces of recorded speech signals (sound signals) that are stored in a database. In alternative embodiments, the speech synthesizer 1712 may incorporate a model of the vocal tract and other human voice characteristics to create a completely "synthetic" voice output.

The envelope encoder 1716 (illustrated and described in more detail below with respect to FIG. 17D) encodes characteristics of the speech signals (e.g., 1706) to generate the actuator signals 1718. In one embodiment, the envelope encoder 1716 extracts a temporal envelope from the speech signals 1706. The temporal envelope represents changes in amplitude of the speech signals 1706 over time. The envelope encoder 1716 generates carrier signals having a periodic waveform. The carrier signals may be sinusoidal or square wave pulse signals. The envelope encoder 1716 generates the actuator signals 1718 by encoding the changes in the amplitude of the speech signals 1706 from the temporal envelope into the carrier signals. The actuator signals 1718 thus carry information from the temporal envelope encoded within the carrier signals. The envelope encoder 1716 may be implemented in software or hardware. For example, the envelope encoder 1716 may be part of a PC, a tablet PC, an STB, a smartphone, an internet of things (IoT) appliance, or any machine capable of executing instructions that specify actions to be taken by that machine.

As shown in FIG. 17A, the haptic communication device 1720 receives the actuator signals 1718 and generates and transmits haptic vibrations 1724 to transmit information from the speech sounds 1702 or the textual message 1720 to the body 1726 of the user wearing the haptic communication device 1720. The haptic vibrations 1724 represent the speech sounds 1702 or the textual message 1720. The haptic communication device 1720 may include an array of cutaneous actuators 1722 that generates the haptic vibrations 1724. The cutaneous actuators 1722 are operably coupled over wired or wireless connections to the envelope encoder 1716 to generate the haptic vibrations 1724 based on the actuator signals 1718. The haptic communication device 1720 may include one or more processing units (e.g., a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these) and a memory.

In one embodiment, the cutaneous actuators 1722 may be voice coils that convert an analog AC-coupled signal (the actuator signals 1718) to proportional mechanical motion. The cutaneous actuators 1722 may be arranged on a semi-rigid backing that secures them in position against the body 1726 with enough pressure that the haptic vibrations 1724 can be perceived by the user. In other embodiments, the haptic communication device 1720 may include piezoelectric, electroactive polymer, eccentric rotating mass, and linear resonant actuators. Other embodiments of the haptic communication device 1720 are illustrated and described in detail with respect to FIGS. 1, 8B, 8E, 9A-9E, 11A, 11I, 12A-12B, 15A and 16A-16L among others.

Figure 17B:
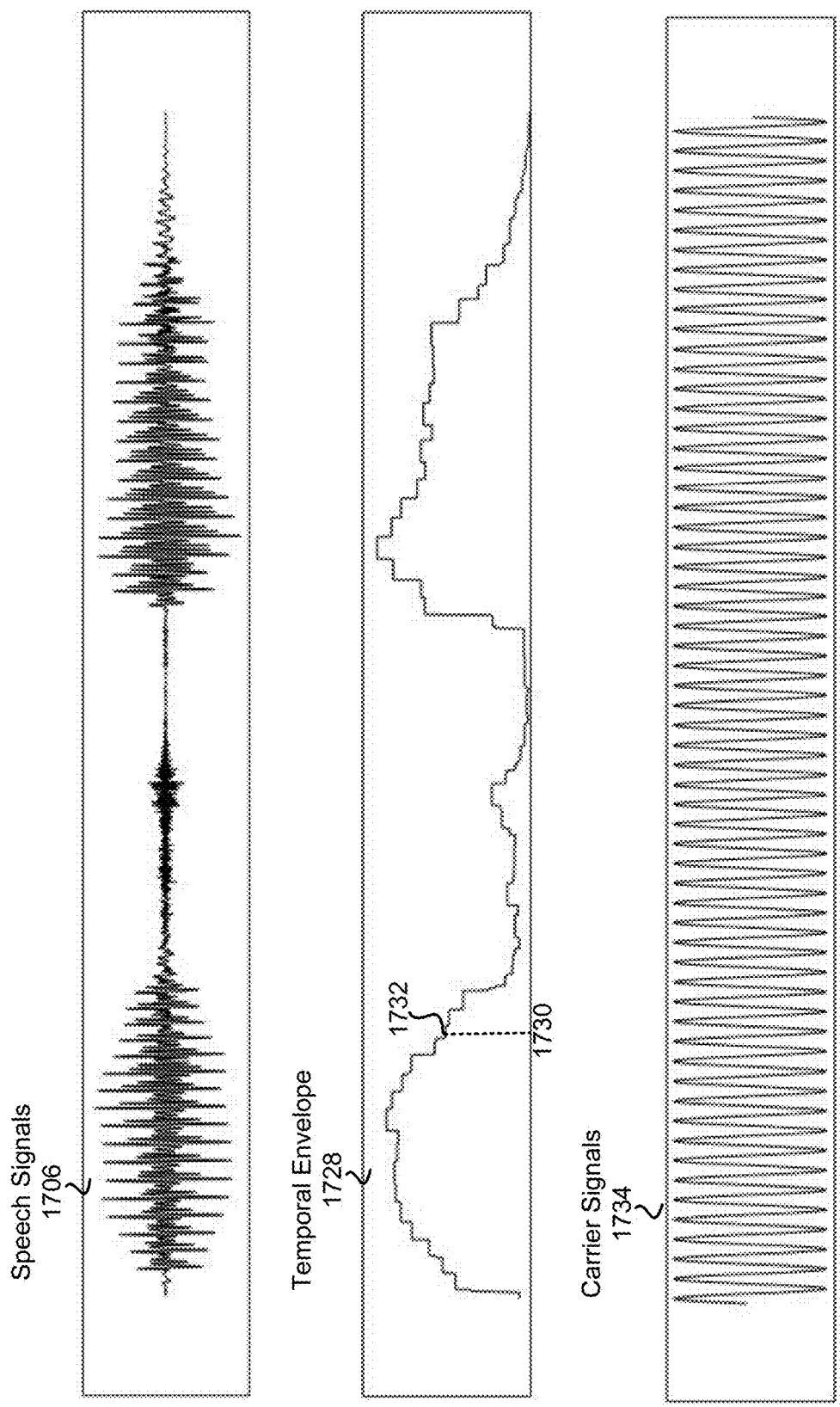
FIG. 17B illustrates waveform diagrams for an example temporal envelope for encoding of speech signals and transmission to cutaneous actuators, in accordance with an embodiment.

FIG. 17B is an illustration of an example temporal envelope 1728 for encoding of the speech signals 1706 and transmission to the cutaneous actuators 1722, in accordance with an embodiment. The signals shown in FIG. 17B include the speech signals 1706, the temporal envelope 1728, and carrier signals 1734.

As shown in FIG. 17B, the speech signals 1706 are represented as a continuously varying acoustic waveform that can be transmitted, recorded, and manipulated. In one embodiment, the speech signals 1706 may comprise acoustic samples, e.g., a discrete signal x[n], i.e., a sequence of real or integer numbers corresponding to the signal samples sampled uniformly at a sampling rate. In one embodiment, the sampling rate for the speech signals 1706 may be 16 kHz, while in other embodiments, the sampling rate (e.g., for "telephone speech" coding) may be 8 kHz. In one embodiment, the speech signals 1706 may be represented as a number of amplitude-altered signals representing the outputs of an array of narrow frequency bands ("Fi"). The speech signals 1706 include high-frequency components that are altered by a lower frequency, slowly evolving temporal envelope 1728 as shown in FIG. 17B.

The temporal envelope 1728 shown in FIG. 17B represents changes in the amplitude of the speech signals 1706. The temporal envelope 1728 is the slow variation in the amplitude (e.g., 1732) of the speech signals 1706 over time (e.g., 1730). Temporal information at the output of each frequency band Fi of the speech signals 1706 may be separated into temporal fine structure (the rapid oscillations close to the center frequency) and the temporal envelope 1728 (the slower amplitude changes) shown in FIG. 17B. The temporal envelope 1728 evolves more slowly in time than the temporal fine structure and requires a lower sampling rate to be represented. The temporal envelope 1728 is a one-dimensional signal and can be represented with a single time-varying waveform.

The temporal envelope 1728 may be sufficient for speech comprehension, therefore including sufficient information for transcutaneous speech transmission using the cutaneous actuators 1722. For example, comprehension suffers when the temporal envelope 1728 is degraded but not when the fine structure is. Words in speech may therefore be identified according to the temporal envelope 1728. When the speech signals 1706 are decomposed into frequency bands and the temporal patterns in each band are replaced by noise that is altered by the temporal envelope of each band, the speech remains comprehensible.

The extracted temporal envelope 1728 is used to activate the cutaneous actuators 1722 using the carrier signals 1734. The carrier signals 1734 have a periodic waveform (e.g., sinusoidal) that is altered using features of the temporal envelope 1728 for the purpose of conveying the speech information via the actuator signals 1718. Features of the temporal envelope 1728 may include amplitude, frequency, phase, periodicity, wavelength, etc. In one embodiment shown in FIG. 17B, the carrier signals 1734 may be sinusoidal signals describing a smooth repetitive oscillation. In other embodiments, the carrier signals 1734 may be a pulse wave or pulse train, any non-sinusoidal periodic waveform, or a square wave train having a regular duty cycle. The carrier signals 1734 typically have a higher frequency than the temporal envelope 1728. In one embodiment, the cutaneous actuators 1722 are oscillated using carrier signals 1734 having a periodic (e.g., sinusoidal or pulse wave train waveform) whose frequency is advantageous for human perception, e.g., between 10 Hz to 300 Hz. The carrier signals 1734 may be altered using frequency modulation (FM) or amplitude modulation (AM) to generate the actuator signals 1718.

Figure 17C:
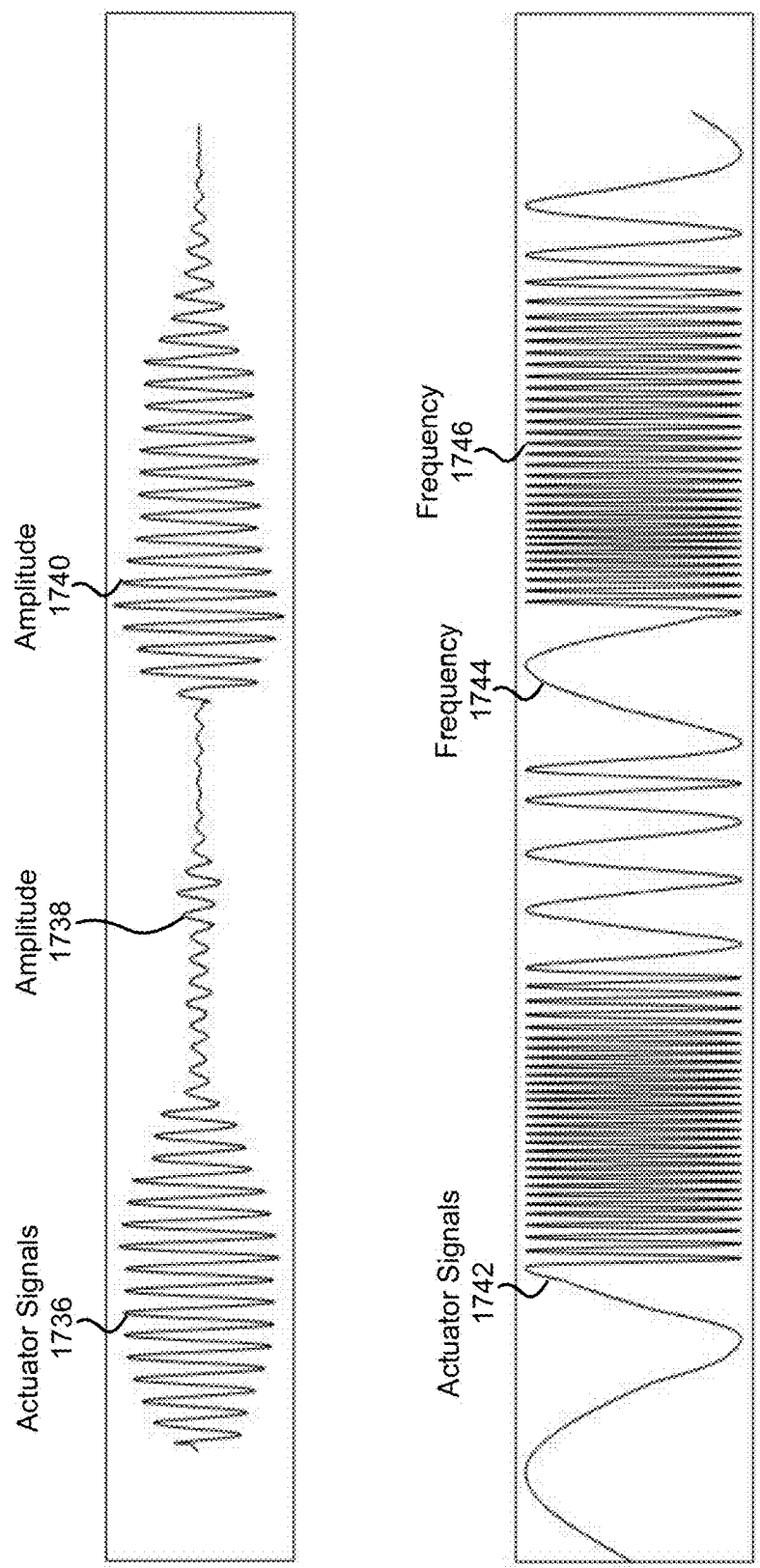
FIG. 17C illustrates waveform diagrams for example encoded speech signals for transmission to cutaneous actuators, in accordance with an embodiment.

FIG. 17C is an illustration of example encoded speech signals 1706 for transmission to the cutaneous actuators 1722, in accordance with an embodiment. The signals shown in FIG. 17C include the actuator signals 1736 having varying amplitude (e.g., 1738 and 1740) and actuator signals 1742 having varying frequency (e.g., 1744 and 1746). The actuator signals 1736 may be generated using amplitude changing methods to transmit information related to the temporal envelope 1728 over the continuous-wave carrier signals 1734. The amplitude (signal strength) of the carrier signals 1734 is varied in proportion to the waveform of the temporal envelope 1728 being transmitted to generate the actuator signals 1736.

The actuator signals 1742 may be generated using frequency altering methods to transmit information related to the temporal envelope 1728 over the continuous-wave carrier signals 1734. As shown in FIG. 17C, The actuator signals 1742 may be generated by encoding information from the temporal envelope 1728 in the carrier signals 1734 by varying the frequency of the carrier signals 1734. The frequency deviation (the difference between the frequency of the carrier signals 1734 and the center frequency of the actuator signals 1742 may be proportional to the temporal envelope 1728.

Figure 17D:
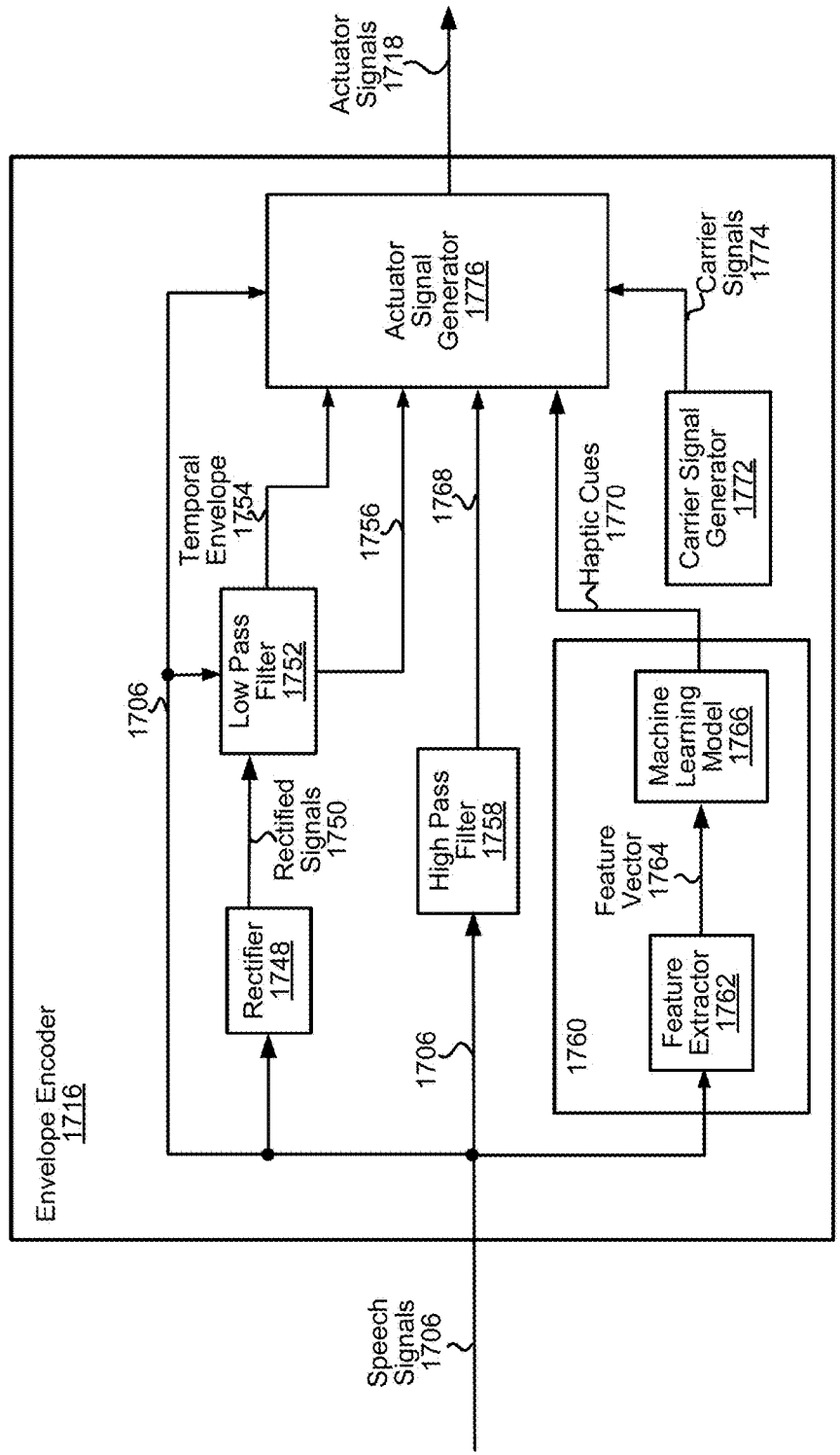
FIG. 17D is a block diagram of an example envelope encoder for encoding of speech signals and transmission to cutaneous actuators, in accordance with an embodiment.

FIG. 17D is a block diagram of an example envelope encoder 1716 for encoding of speech signals 1706 and transmission to cutaneous actuators 1722, in accordance with an embodiment. FIG. 17D includes a rectifier 1748, a low pass filter 1752, a high pass filter 1758, a machine learning engine 1760, a carrier signal generator 1772, and an actuator signal generator 1776. In other embodiments, the envelope encoder 1716 may include additional or fewer components than those described herein. Similarly, the functions can be distributed among the components and/or different entities in a different manner than is described here.

The envelope encoder 1716 may be implemented in software, hardware, or a combination thereof. For example, the envelope encoder 1716 may be part of a PC, a tablet PC, an STB, a smartphone, an IoT appliance, or any machine capable of executing instructions that specify actions to be taken by that machine. The envelope encoder 1716 may include one or more processing units (e.g., a CPU, a GPU, a DSP, a controller, a state machine, one or more ASICs, one or more RFICs, or any combination of these) and a memory.

The rectifier 1748 converts alternating signals, such as the speech signals 1706 shown in FIG. 17B, which periodically reverse direction, to direct signals that flow in only one direction. In one embodiment, the rectifier 1748 may be made of semiconductor diodes, silicon-controlled rectifiers, or other silicon-based semiconductor switches. In one embodiment, the rectifier 1748 may be implemented as part of a DSP or in software. The rectifier 1748 generates the rectified signals 1750 by rectifying the speech signals 1706. Because of the alternating nature of the input speech signals 1706, the rectifier 1748 may produce DC rectified signals 1750 that, though unidirectional, include pulses. The rectified signals 1750 may be smoothed by an electronic filter, which may be a set of capacitors or chokes, followed by a voltage regulator.

As shown in FIG. 17D, the low pass filter 1752 transmits the low frequency components 1756 (components with a frequency lower than a certain threshold frequency) of the rectified signals 1750 to the actuator signal generator 1776 and attenuates (filters out) high frequency components of the rectified signals 1750 with frequencies higher than the threshold frequency. The low pass filter 1752 may be implemented in the form of a hiss filter, an anti-aliasing filter for conditioning signals prior to analog-to-digital conversion, or a digital filter. In one embodiment, the low pass filter 1752 generates the temporal envelope 1754 of the speech signals 1706 by filtering out filtering out frequency components of the rectified signals 1750 that are higher than a threshold frequency. By filtering out these high frequency components, the remaining signals consist of slowly varying components that track the temporal envelope 1754 of the rectified signals 1750. As shown in FIG. 17D, the low pass filter 1752 may also directly receive the speech signals 1706 and transmit low frequency components 1756 of the speech signals 1706 to the actuator signal generator 1776 by filtering out filtering out frequency components of the speech signals 1706 that are higher than a threshold frequency. These low frequency components 1756 of the speech signals 1706 are used by the actuator signal generator 1776 to determine a low frequency signal power of the low frequency components 1756 of the speech signals 1706 and generate the actuator signals 1718, as described below with respect to the actuator signal generator 1776.

As shown in FIG. 17D, the high pass filter 1758 receives the speech signals 1706 and transmits the high frequency components 1768 (components with a frequency higher than a certain threshold frequency) of the speech signals 1706 to the actuator signal generator 1776 and attenuates (filters out) the frequency components of the speech signals 1706 with frequencies lower than the threshold frequency. The high pass filter 1752 may be implemented in the form of a first-order electronic high-pass filter by placing the input speech signals 1706 across a series combination of a capacitor and a resistor for conditioning signals prior to analog-to-digital conversion, or as a discrete-time washout filter, or a digital filter. The high frequency components 1768 of the speech signals 1706 are used by the actuator signal generator 1776 to determine a high frequency signal power of the high frequency components 1768 of the speech signals 1706 and generate the actuator signals 1718, as described below with respect to the actuator signal generator 1776.

The carrier signal generator 1772 generates and transmits periodic pulses or waveform carrier signals 1774 at a steady base frequency of alternation to the actuator signal generator 1776 on which information from the temporal envelope 1754 can be imposed by the actuator signal generator 1776 by increasing signal strength, varying the base frequency, varying the wave phase, or other means. In one embodiment, the carrier signal generator 1772 may include a reference oscillator to supply a periodic wave with a known frequency to a phase-locked loop (PLL), which generates the carrier signals 1774 at a desired frequency (e.g., 10-300 Hz) and a level controller to determine the amplitude range of the carrier signals 1774.

As shown in FIG. 17D, the machine learning engine 1760 receives the speech signals 1706 and generates haptic cues 1770, which are used by the actuator signal generator 1776 to generate the actuator signals 1718. The machine learning engine 1760 may be implemented in software, hardware, or a combination thereof. For example, the machine learning engine 1760 may include software modules, one or more processing units (e.g., a CPU, a GPU, a DSP, a controller, a state machine, one or more ASICs, or any combination of these) and a memory. The operation of machine learning engine 1760 is illustrated and described in detail above with reference to FIGS. 4 and 13A-13D.

The machine learning engine 1760 includes a feature extractor 1762 and a machine learning model 1766. The feature extractor 1762 extracts a feature vector 1764 from the speech signals 1706 and transmits the feature vector 1764 to the machine learning model 1766 as shown in FIG. 17D. The feature extractor 1762 may be implemented in software, hardware, or a combination thereof. The feature vector 1764 may represent amplitudes of frequency bands of the speech signals 1706. These frequency bands may be obtained by decomposing the speech signals 1706 into the frequency bands by the feature extractor 1762, the machine learning engine 1760, or another component of the envelope encoder 1716. For example, an array of band-pass filters that span the speech spectrum may be used to decompose the speech signals 1706 into the frequency bands. The operation of the feature extractor 1762 and the feature vector 1764 are illustrated and described in detail above with reference to FIGS. 4 and 13A-13D.

The machine learning engine 1760 may use supervised machine learning to train the machine learning model 1766 with feature vectors from a positive training set and a negative training set serving as the inputs. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments.

The machine learning model 1766 generates haptic cues 1770 using the feature vector 1764. Each of these haptic cues 1770 may indicate the haptic output for a cutaneous actuator 1722 and may be represented by one or more nodes in a final layer of the machine learning model 1766. For example, each node of the machine learning model 1766 may indicate for each cutaneous actuator 1722, a percentage value that may be used to determine whether or not to activate a particular state of the cutaneous actuator 1722.

The machine learning model 1766 may use a cost function based on a reconstruction error and constraints. The cost function is an evaluation function that measures how well the machine learning model 1766 maps the target haptic cues 1770. In addition, the cost function may determine how well the machine learning model 1766 performs in supervised prediction or unsupervised optimization. The constraints cause the sequence of haptic cues 1770 that are output to have high compressibility, low entropy, low ordinality (i.e., fewer number of possible haptic outputs), sparsity, temporal stability, and spatial stability. The actuator signal generator 1776 generates the actuator signals 1718 by encoding the haptic cues 1770 into the carrier signals 1774 as described below with respect to the actuator signal generator 1776. The operation of the machine learning model 1766, haptic cues 1770, cost function, reconstruction error, and constraints are illustrated and described in detail above with reference to FIGS. 4 and 13A-13D.

The actuator signal generator 1776 generates the actuator signals 1718 by encoding features of the temporal envelope 1754 of the speech signals 1706, low frequency components 1756 of the speech signals 1706, high frequency components 1758 of the speech signals 1706, and the haptic cues 1770 into the carrier signals 1774. The actuator signal generator 1776 may be implemented in software, hardware, or a combination thereof. For example, the actuator signal generator 1776 may include one or more processing units (e.g., a CPU, a GPU, a DSP, a controller, a state machine, one or more ASICs, one or more RFICs, or any combination of these) and a memory.

In one embodiment, the actuator signal generator 1776 extracts the temporal envelope 1754 directly from the speech signals 1706 by performing a Hilbert transformation on the speech signals. The Hilbert transform is a specific linear operator that takes the speech signals 1706 and produces the analytic representation of the speech signals 1706. The actuator signal generator 1776 extracts the temporal envelope 1754 from the magnitude (modulus) of the analytic representation of the speech signals 1706.

In one embodiment, the actuator signal generator 1776 decomposes the speech signals 1706 into frequency bands. For example, an array of band-pass filters that span the speech spectrum may be used to decompose the speech signals 1706 into the frequency bands. The actuator signal generator 1776 extracts a corresponding temporal envelope ("ENVi") from each frequency band Fi. Each corresponding temporal envelope ENVi represents changes in amplitude (e.g., 1732) of the frequency band Fi. The actuator signal generator 1776 generates the actuator signals 1718 by encoding changes in the amplitude of the frequency band Fi from each corresponding temporal envelope ENVi into the carrier signals 1774.

In one embodiment, the actuator signal generator 1776 generates the actuator signals (e.g., signals 1736 in FIG. 17C) by determining the amplitude (e.g., 1732) of the speech signals from the temporal envelope 1728. For example, the actuator signal generator 1776 may determine the amplitude by determining the magnitude of the analytic signal associated with the temporal envelope 1728. To encode features of the temporal envelope 1728 into the carrier signals 1774, actuator signal generator 1776 increases or decreases the amplitude of the carrier signals 1774 proportional to the amplitude of the speech signals 1706. In one example, features of the temporal envelope 1728 are superimposed onto the amplitude of the carrier signals 1774. The carrier signals 1774 are altered such that the amplitude of the carrier signals 1774 varies in line with the variations in intensity of the speech signals 1706. In this way, the amplitude of the carrier signals 1774 carry the features of the temporal envelope 1728. The altered carrier signals 1774 are transmitted as the actuator signals 1736 to the cutaneous actuators 1722.

In one embodiment, the actuator signal generator 1776 encodes features of the temporal envelope 1728 into the carrier signals 1774 by increasing or decreases the frequency of the carrier signals 1774 proportional to the amplitude (e.g., 1732) of the speech signals 1706. The carrier signals 1774 are altered such that the frequency of the carrier signals 1774 varies in line with the variations in intensity of the speech signals 1706. When features of the temporal envelope 1728 are encoded into the carrier signals 1774 to generate the actuator signals (e.g., signals 1743 in FIG. 17C), the actuator signals 1743 increase and decrease in frequency proportional to the amplitude of the speech signals 1706. The amount by which the actuator signals 1743 increase and decrease in frequency is known as the deviation. In this way, the frequencies of the carrier signals 1774 carry the features of the temporal envelope 1728. The altered carrier signals 1774 are transmitted as actuator signals (e.g., signals 1743 in FIG. 17C) to the cutaneous actuators 1722.

In one embodiment, the actuator signal generator 1776 encodes features of the temporal envelope 1728 into the carrier signals 1774 by increasing or decreasing a number of the cutaneous actuators 1722 activated proportional to the amplitude (e.g., 1732) of the speech signals. For example, as the amplitude 1732 according to the temporal envelope 1728 increases, the carrier signals 1774 are altered such that the actuator signals (e.g., 1718) activate (turn on) a larger number of the cutaneous actuators 1722 on the haptic communication device 1720. This may result in a larger area of the user's body 1726 receiving stimulation from the haptic vibrations 1724. This may also create a sense of continuous tactile motion (e.g., stroking or moving touch) on the body 1726 rather than discrete actuation points, as described above with reference to FIG. 15B. As the amplitude 1732 according to the temporal envelope 1728 decreases, the carrier signals 1774 are altered such that the actuator signals 1718 activate a smaller number of the cutaneous actuators 1722 on the haptic communication device 1720. Altering the number of cutaneous actuators 1722 activated results in more sophisticated haptic communication effects. The information related to the words of a social touch lexicon described above with reference to FIG. 15B may thus communicated by altering the number of the cutaneous actuators 1722 activated proportional to the amplitude 1732 of the speech signals. By changing the amplitude and patterns of vibration, a large number of combinations, rhythms or messages may be reproduced.

In one embodiment, the actuator signal generator 1776 encodes the amount of high-frequency signal power (which is present in fricatives such as /s/, /f/, and /sh/) into the carrier signals 1774 to generate the actuator signals 1718. The distribution of signal power may be determined using the low-pass filter 1752 and the high-pass filter 1758. The cutoff frequencies of the filters may be set to an intermediate region useful for distinguishing the presence or absence of high-frequency speech, e.g., 4 kHz. The ratio of the power output of each filter may be used to alter the carrier signals 1774 to generate the actuator signals 1718 to change the activity of cutaneous actuators 1722. Similarly, the presence or the absence of formant structure in the speech signals 1706 may be encoded into the carrier signals 1774 to generate the actuator signals 1718. Similarly, the particular formants that are present in the speech signals 1706 may be encoded into the carrier signals 1774 to generate the actuator signals 1718.

In one embodiment, the compressed spectrum of the speech signals 1706 may be divided among the cutaneous actuators 1722. For example, vowels correspond to low frequency energy and the localization of the energy in multiple discrete energy bands ('formants') as illustrated above in FIG. 7. As can be seen from the spectrogram the vowels 'A' and 'oo' have multiple bands of relatively high energy in the low frequency region. In contrast 'f', 'c', 'b', and 'k' are brief, low energy, and lack the localized energy band structure that vowels have. The actuator signal generator 1776 may use the detection of low energy signals that lack the frequency structure of vowels to generate the actuator signals 1718, allowing the user more time to appreciate the subtler pattern of the consonant. In one embodiment, the actuator signals 1718 may be generated to transmit the haptic vibrations 1724 corresponding to vowels of the received speech signals 1706 at a first speed. The cutaneous actuators 1722 may transmit haptic vibrations 1724 corresponding to consonants at a second speed lower than the first speed.

In one embodiment, the actuator signal generator 1776 determines a low frequency signal power of the low frequency components 1756 of the speech signals 1706. The actuator signal generator 1776 may determine the low frequency signal power as a sum of the absolute squares of time-domain samples divided by the signal length. The actuator signal generator 1776 similarly determines a high frequency signal power of the high frequency components 1768 of the speech signals 1706. The actuator signal generator 1776 determines a ratio of the high frequency signal power to the low frequency signal power. The actuator signal generator 1776 generates the actuator signals 1718 by encoding the ratio of the high frequency signal power to the low frequency signal power into the carrier signals 1774 as described above. For example, the actuator signal generator 1776 may perform the encoding of the carrier signals 1774 by increasing or decreases the amplitude or frequency of the carrier signals 1774 proportional to the ratio of the high frequency signal power to the low frequency signal power. Encoding the power characteristics of the spectral bands of the speech signals 1706 enables the actuator signals 1718 to capture a more complete description of the linguistic units.

In one embodiment, the actuator signal generator 1776 encodes the haptic cues 1770 into the carrier signals 1774 by altering the frequency of the carrier signals 1774 or altering a number of the cutaneous actuators 1722 activated based on the haptic cues 1770. The actuator signal generator 1776 may encode the haptic cues 1770 into the carrier signals 1774 using any of the methods described above with respect to FIGS. 13A-13D and 17D.

In alternative embodiments of the envelope encoder 1716, the carrier signal generator 1772 may be located within the actuator signal generator 1776. In these embodiments, the temporal envelope 1754 may be transmitted by the actuator signal generator 1776 to the PLL section of the carrier signal generator 1772 to alter the frequency values of the generated carrier signals 1774 to generate the actuator signals 1718. The temporal envelope 1754 may be transmitted by the actuator signal generator 1776 to the level controller section of the carrier signal generator 1772 to alter the amplitude values of the generated carrier signals 1774 to generate the actuator signals 1718.

The benefits and advantages of the embodiments disclosed herein are as follows. The temporal envelope is a one-dimensional signal and may be represented as a single time-varying waveform to reduce memory and processing requirements and increase efficiency of transmission. Therefore, the disclosed embodiments lead to efficiency in memory, processing, and transmission over frequency decomposition methods. The disclosed embodiments further lead to a low-dimensional approach to haptic encoding. The processing power needed is reduced due to the smaller number of channels that are processed and because temporal envelope extraction is performed with less computational complexity than frequency decomposition. Additional advantages and benefits of the disclosed embodiments (especially related to using the ratio of the high frequency signal power to the low frequency signal power to drive actuator activity) are that vowels are relatively easy to recognize using automated techniques and by humans in a haptic representation of speech. Consonants are shorter in duration and have ambiguous spectral signatures. By slowing the dynamics of the haptic presentation during consonants, relative to the speed at which vowels are displayed, the accuracy of perception will increase with less degradation of speed compared to uniform slowing.

Figure 17E:
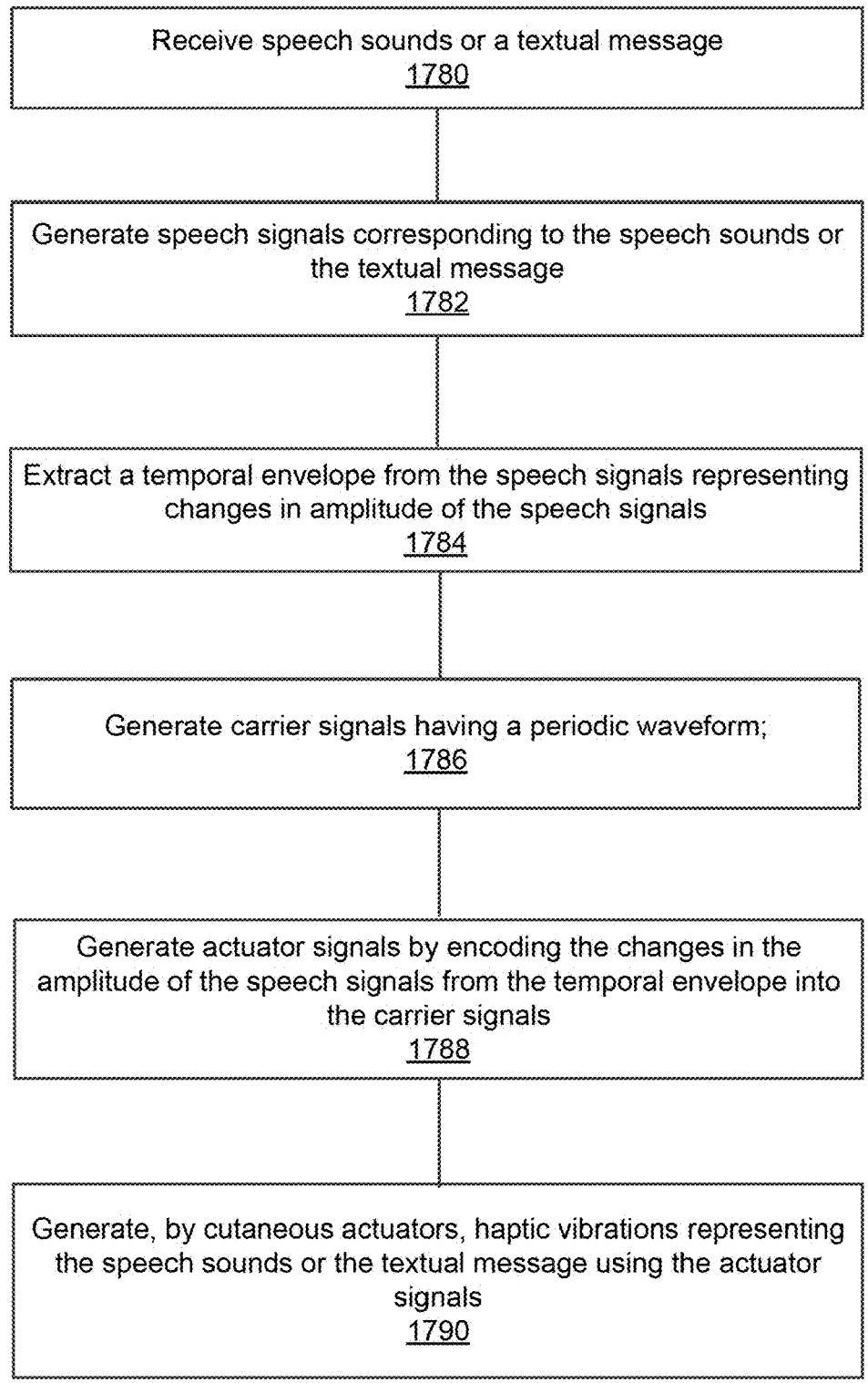
FIG. 17E is an illustration of an example process for envelope encoding of speech signals and transmission to cutaneous actuators, in accordance with an embodiment.

FIG. 17E is an illustration of an example process for envelope encoding of speech signals 1706 and transmission to cutaneous actuators 1722, in accordance with an embodiment. In one embodiment, the process of FIG. 17E is performed by the haptic communication system 1700. Other entities (e.g., a remote console or computer) may perform some or all of the steps of the process in other embodiments. Likewise, embodiments may include different and/or additional steps, or perform the steps in different orders.

The haptic communication system 1700 receives 1780 speech sounds 1702 or a textual message 1710. The speech sounds 1702 may be received by the microphone 1704. The textual message 1710 may be received by the speech synthesizer 1712.

The haptic communication system 1700 generates 1782 speech signals (e.g., 1706 or 1714) corresponding to the speech sounds 1702 or the textual message 1710. The microphone 1704 may generate the speech signals 1706 by digitizing the speech sounds 1702. The speech synthesizer 1712 may generate the speech signals 1706 by mapping the textual message 1710 to stored sound signals.

The haptic communication system 1700 extracts 1784 a temporal envelope 1754 from the speech signals 1706. The temporal envelope 1754 represents changes in amplitude of the speech signals 1706.

The haptic communication system 1700 generates 1786 carrier signals 1774 having a periodic waveform. The carrier signal generator 1772 may generate periodic pulses or waveform carrier signals 1774 at a steady base frequency of alternation on which information from the temporal envelope 1754 can be imposed.

The haptic communication system 1700 generates 1788 the actuator signals 1718 by encoding features of the temporal envelope 1728 and the speech signals 1706 into the carrier signals 1774. For example, the actuator signal generator 1776 may encode features of the temporal envelope 1728 into the carrier signals 1774 by increasing or decreases the frequency or amplitude of the carrier signals 1774 proportional to the amplitude (e.g., 1732) of the speech signals 1706.

The haptic communication system 1700 generates 1790, by the cutaneous actuators 1722, haptic vibrations 1724 representing the speech sounds 1702 or the textual message 1710 using the actuator signals 1718. Speech messages may therefore be transmitted from one user to another user and converted to haptic messages for greeting, parting, giving attention, helping, consoling, calming, pleasant, and reassuring touches.

Haptic Communication System Using Broadband Actuator Signals for Transmission to Cutaneous Actuators Embodiments also relate to a haptic communication system including a broadband signal generator. The broadband signal generator receives sensor signals from a sensor signal generator such as a haptic sensor or a microphone. The sensor signals describe a message, such as a haptic social touch or speech for transmission to a user. Parameters describing the message are extracted from the sensor signals. In one embodiment, broadband carrier signals having a large number of frequencies may be generated by aggregating frequency components. Actuator signals meant for transmission to a haptic communication device are generated by encoding the parameters from the sensor signals into the broadband carrier signals. Cutaneous actuators are embedded in the haptic communication device, which is communicatively coupled to the broadband signal generator to receive the actuator signals. Haptic vibrations are generated by the cutaneous actuators corresponding to the actuator signals on a body of the user to communicate the message to the user.

Figure 18A:
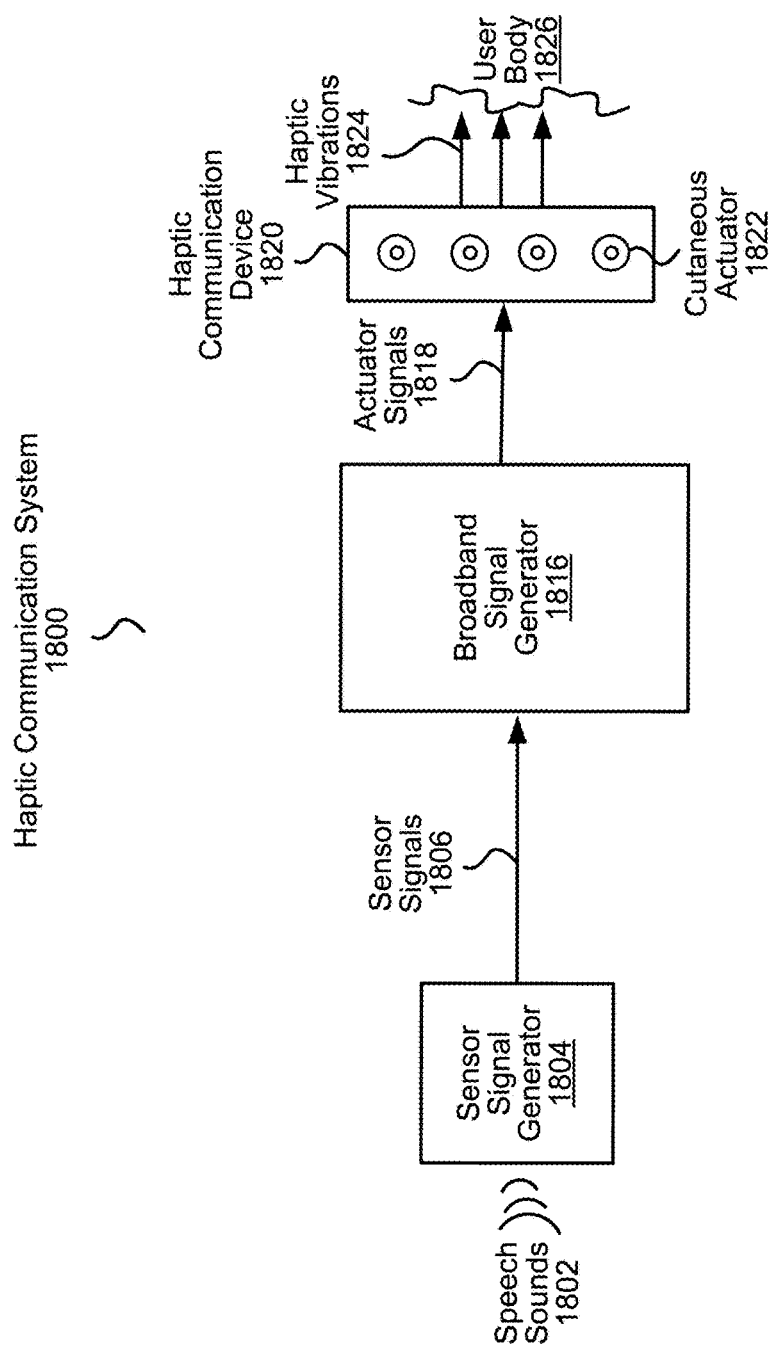
FIG. 18A is a block diagram illustrating an example haptic communication system using broadband actuator signals for transmission to cutaneous actuators, in accordance with an embodiment.

FIG. 18A is a block diagram illustrating an example haptic communication system 1800 using broadband actuator signals 1818 for transmission to cutaneous actuators 1822, in accordance with an embodiment. The haptic communication system 1800 includes a sensor signal generator 1804, a broadband signal generator 1816, and a haptic communication device 1820. In other embodiments, the haptic communication system 1800 may include additional or fewer components than those described herein. Similarly, the functions can be distributed among the components and/or different entities in a different manner than is described here.

As shown in FIG. 18A, the haptic communication system 1800 includes a sensor signal generator 1804 that receives a message from a sending user and generates sensor signals 1806 corresponding to the message. In one embodiment, the sensor signal generator 1804 may be a microphone that receives speech sounds 1802 uttered by the sending user and generates speech signals corresponding to the speech sounds. In another embodiment, the sensor signal generator 1804 may be a speech synthesizer that receives a textual message typed out by the sending user and generates speech signals corresponding to the textual message. In another embodiment, the sensor signal generator 1804 may be a haptic sensor that receives haptic input (e.g., a social touch) from the sending user and generates sensor signals 1806 corresponding to the haptic input. The sensor signals 1806 may be analog signals, digital signals, or a combination thereof. In addition, the sensor signal generator 1804 may include an analog-to-digital converter to digitize the message to the sensor signals 1806. The sensor signal generator 1804 is communicatively coupled to and transmits the sensor signals 1806 to the broadband signal generator 1816 over a wired or a wireless connection. Portions of the sensor signal generator 1804 may be implemented in software or hardware. For example, the sensor signal generator 1804 may be part of a smartphone, an internet of things (IoT) appliance, or any machine capable of executing instructions that specify actions to be taken by that machine.

The broadband signal generator 1816 (illustrated and described in more detail below with respect to FIG. 18C) encodes parameters of the sensor signals 1806 to generate the actuator signals 1818. In one embodiment, the broadband signal generator 1816 extracts parameters from the sensor signals 1806 describing the message for transmission to a body 1826 of a user. The parameters may include changes in amplitude or frequency of the sensor signals 1806 over time or parameters of haptic input, such as pressure, temperature, sheer stress, duration, and space dimensions of a haptic touch.

The broadband signal generator 1816 generates broadband carrier signals (e.g., the broadband carrier signals 1828 shown below in FIG. 18B) by aggregating frequency components. The broadband signal generator 1816 generates the actuator signals 1818 by encoding the parameters from the sensor signals 1806 into the broadband carrier signals 1828. The bandwidth of the actuator signals 1818 is limited to the range of the responsiveness of the mechanical receptors of the body 1826, between 10 and 300 Hz. The actuator signals 1818 thus carry information from the sensor signals 1806 encoded within the broadband carrier signals 1828. Portions of the broadband signal generator 1816 may be implemented in software or hardware. For example, the broadband signal generator 1816 may be part of a PC, a tablet PC, an STB, a smartphone, an internet of things (IoT) appliance, or any machine capable of executing instructions that specify actions to be taken by that machine.

As shown in FIG. 18A, the haptic communication device 1820 receives the actuator signals 1818 and generates and transmits haptic vibrations 1824 to transmit the message to the body 1826 of the user wearing the haptic communication device 1820. The haptic communication device 1820 may include an array of cutaneous actuators 1822 that generates the haptic vibrations 1824. The cutaneous actuators 1822 are communicatively coupled over wired or wireless connections to the broadband signal generator 1816 to generate the haptic vibrations 1824 based on the actuator signals 1818. The haptic communication device 1820 may include one or more processing units (e.g., a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these) and a memory.

In one embodiment, the cutaneous actuators 1822 may be voice coils that convert an analog AC-coupled signal (the actuator signals 1818) to proportional mechanical motion. The cutaneous actuators 1822 may be arranged on a semi-rigid backing that secures them in position against the body 1826 with enough pressure that the haptic vibrations 1824 can be perceived by the user. In other embodiments, the haptic communication device 1820 may include piezoelectric, electroactive polymer, eccentric rotating mass, and linear resonant actuators. Other embodiments of the haptic communication device 1820 are illustrated and described in detail above with respect to FIGS. 1, 8B, 8E, 9A-9E, 11A, 11I, 12A-12B, 15A and 16A-16L among others.

Figure 18B:
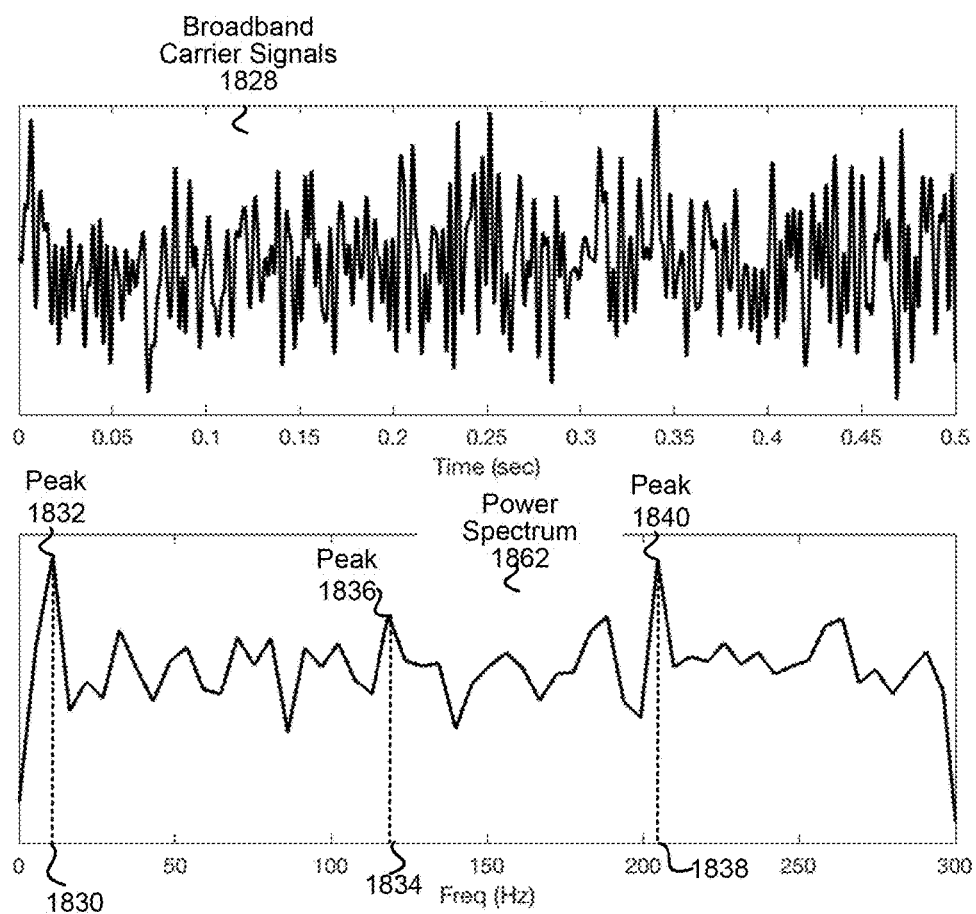
FIG. 18B is waveform diagrams illustrating example broadband carrier signals, in accordance with an embodiment.

FIG. 18B is waveform diagrams illustrating example broadband carrier signals 1828, in accordance with an embodiment. The waveforms shown in FIG. 18B include the broadband carrier signals 1828 and a power spectrum 1862 of the broadband carrier signals 1828.

As shown in FIG. 18B, the broadband carrier signals 1828 contain many frequency components including a wide range of frequencies that can be transmitted, recorded, and manipulated. In one embodiment, the broadband carrier signals 1828 may include a number of frequency components having nearly equal power or amplitude at different frequencies, thus giving the broadband carrier signals 1828 a uniform power spectrum 1862. In one embodiment, the broadband carrier signals 1828 may be constructed from a number of discrete samples that are a sequence of serially uncorrelated random variables with zero mean and finite variance. The samples may also be independent and have identical probability distributions. In one embodiment, the broadband carrier signals 1828 may contain many frequency components having a power spectrum 1862 such that the power spectral density (energy or power per frequency interval) is inversely proportional to frequency of the frequency component.

The power spectrum 1862 of the broadband carrier signals 1828 illustrates the distribution of signal power among the different frequency components composing the broadband carrier signals 1828. For a sinusoid, the signal power is usually concentrated at the frequency of the sinusoid. For the broadband carrier signals 1828, however, the signal power is spread over a range of frequencies. The power spectrum 1862 of the broadband carrier signals 1828 is wide compared to that of a single sinusoid or sums of a few sinusoids.

The peaks (e.g., 1832) of the power spectrum 1862 of the broadband carrier signals 1828 are more uniform. For example, the difference between peak 1832 at frequency 1830 and peak 1836 at frequency 1834 is less than a threshold power value. Similarly, the difference between peak 1832 at frequency 1830 and peak 1840 at frequency 1838 is less than the threshold power value.

The broadband carrier signals 1828 may be generated in a variety of ways, as described in detail below with respect to FIG. 18C. In one embodiment, a desired spectrum of frequencies (e.g., 10 Hz to 300 Hz) is defined. The frequency components are transformed from the frequency domain representation of a flat power spectrum to the time domain by taking the inverse Fourier transform. In another embodiment, a noise process is simulated by aggregating a large number of sinusoids (e.g., 10-1000 sinusoids). A continuum of frequencies is approximated by adding successive frequencies with a small step size, e.g., 1-10 Hz. In another embodiment, a smaller number of sinusoids (e.g., 3-10) are aggregated that span the frequency range of responsiveness of the skin. In another embodiment, the broadband carrier signals 1828 may be constructed in the time domain by taking each time sample of the broadband carrier signals 1828 as being a realization of a random number, e.g., a Gaussian distributed random variable that is generated independently of the values that preceded it. Such a method would result in a white Gaussian noise process. In another embodiment, periodic, low-frequency, non-sinusoidal signals may be used to generate the broadband carrier signals 1828, since such signals have frequency spectra that are comprised of a fundamental frequency and harmonic frequencies.

The broadband signal generator 1816 may generate the actuator signals 1818 by encoding the parameters from the sensor signals 1806 into the broadband carrier signals 1828 in a number of ways. In one embodiment, the physical location on the body 1826 of the user that is being actuated may be encoded into the broadband carrier signals 1828. For example, the location of the particular one or more actuators that are driven by the actuator signals 1818 convey information (e.g., identifying a particular phoneme) to the body 1826 of the user. In another embodiment, the amplitude of each frequency component of speech signals or the sensor signals 1806 can be used to encode information. In another embodiment, sequences of activation of different actuators can be used to encode information. In another embodiment, features of the power spectrum 1862 can be used. For example, actuator signals 1818 whose power is concentrated in the lower frequencies can convey different information than signals whose power is concentrated at higher frequencies. Non-linguistic applications are possible as well. For example, in simulated social touch using the haptic communication device 1820, broadband actuator signals 1818 convey a stimulus that is more natural than sinusoidal stimuli, which have an intense, artificial, mechanical sensation.

Figure 18C:
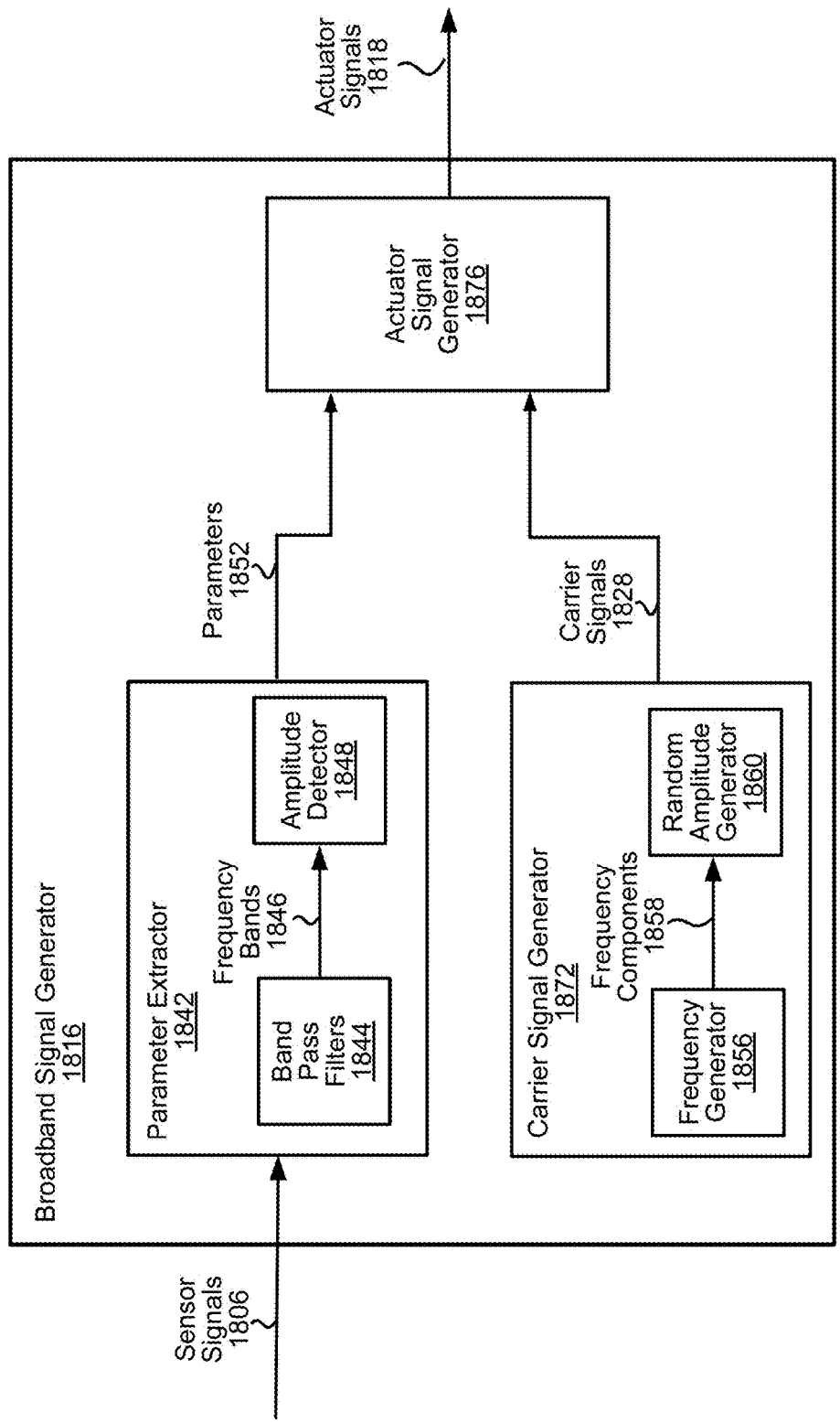
FIG. 18C is a block diagram of an example broadband signal generator, in accordance with an embodiment.

FIG. 18C is a block diagram of an example broadband signal generator 1816, in accordance with an embodiment. FIG. 18C includes a parameter extractor 1842, a carrier signal generator 1872 and an actuator signal generator 1876. In other embodiments, the broadband signal generator 1816 may include additional or fewer components than those described herein. Similarly, the functions can be distributed among the components and/or different entities in a different manner than is described here.

Portions of the broadband signal generator 1816 may be implemented in software, hardware, or a combination thereof. For example, the broadband signal generator 1816 may be part of a PC, a tablet PC, an STB, a smartphone, an IoT appliance, or any machine capable of executing instructions that specify actions to be taken by that machine. The broadband signal generator 1816 may include one or more processing units (e.g., a CPU, a GPU, a DSP, a controller, a state machine, one or more ASICs, one or more RFICs, or any combination of these) and a memory.

The parameter extractor 1842 extracts parameters 1852 from the sensor signals 1806 describing the message for transmission to the body 1826 of the user. The parameter extractor 1842 includes band pass filters 1844 and an amplitude detector 1848. In other embodiments, the parameter extractor 1842 may include additional or fewer components than those described herein. Similarly, the functions can be distributed among the components and/or different entities in a different manner than is described here.

The parameter extractor 1842 may extract parameters 1852 related to social touch, such as forces, vibrations, or motions. The parameters 1852 may be represented in dimensions of pressure, temperature, texture, sheer stress, time, and space or a subset thereof. These parameters 1852 (e.g., pressure) may be used by the haptic communication device 1820 to generate haptic vibrations 1824 using the parameters 1852. For example, the parameters 1852 may be translated into a duration time, frequency, or amplitude of the haptic vibrations 1824.

In one embodiment, the parameter extractor 1842 may determine, from the sensor signals 1806, which of the cutaneous actuators 1822 should be turned ON (i.e., activated) or OFF at different times to create different haptic illusions or convey different messages to the body 1826 of the user, as described and illustrated above with respect to FIG. 15B.

In one embodiment, the parameter extractor 1842 may split the sensor signals 1806 into speech subcomponents, as described and illustrated above with respect to FIG. 3. The speech subcomponents may include one or more of phonemes of the received sensor (speech) signals 1806, frequencies of the received sensor signals 1806, formants of the received sensor signals 1806, and semantics of the received sensor signals 1806. A phoneme is any of the perceptually distinct units of sound in a specified language that distinguish one word from another, for example p, b, d, and tin the English words pad, pat, bad, and bat. A formant refers to each of several prominent bands of frequency that determine the phonetic quality of vowels in the sensor signals 1806. Semantics may include logical aspects of meaning, such as sense, reference, implication, and logical form, lexical semantics (word relations), or conceptual semantics (the cognitive structure of meaning). The parameters related to speech phonemes extracted from the sensor signals 1806 may be used to create different arrangements of activated cutaneous actuators 1822 and different haptic patterns on the body 1826, wherein each pattern may be associated with a particular phoneme.

The band pass filters 1844 decompose the sensor signals 1806 into frequency bands 1846. For example, an array of band-pass filters 1844 that span the speech spectrum may be used to decompose the sensor signals 1806 into the frequency bands 1846. Each band-pass filter passes frequencies within a certain range and rejects (attenuates) frequencies outside that range. The band pass filters 1844 may be constructed using an analog resistor-inductor-capacitor circuit or digital filters that perform mathematical operations on the sampled sensor signals 1806. For example, an analog-to-digital converter may be used to sample the sensor signals 1806, followed by a microprocessor and peripheral components such as memory to store data and filter coefficients, etc. Finally a digital-to-analog converter completes the output stage.

The amplitude detector 1848 detects an amplitude of each frequency band 1846. The amplitude detector 1848 may be an electronic circuit that takes the frequency bands 1846 as input and provides an output which is the envelope of each frequency band 1846. For example, the amplitude detector 1848 may include a level controller to determine the amplitude range of each frequency band. The amplitude detector 1848 may include a capacitor to store up charge on the rising edges of each frequency band signal, and release it through a resistor when the signal falls. The amplitudes and frequency bands 1846 make up the parameters 1852 used to generate the actuator signals 1818.

The carrier signal generator 1872 generates the broadband carrier signals 1828 by aggregating a plurality of frequency components. The carrier signal generator 1872 includes a frequency generator 1856 and a random amplitude generator 1860. In other embodiments, the carrier signal generator 1872 may include additional or fewer components than those described herein. Similarly, the functions can be distributed among the components and/or different entities in a different manner than is described here.

The frequency generator 1856 generates the frequency components 1858 for use by the actuator signal generator 1876. The frequency generator 1856 may generate periodic pulses or waveforms at different frequencies of alternation. In one embodiment, the frequency generator 1856 may include a reference oscillator to supply a periodic wave with a known frequency to a phase-locked loop (PLL), which generates each frequency component 1858 at a desired frequency (e.g., 10-300 Hz). In one embodiment, each of the frequency components (e.g., fi) has a sinusoidal waveform and a difference in frequency (fj–fi) between each pair fi, fj of adjacent frequency components is less than a threshold frequency ft. For example, the frequency components may be sinusoidal signals having frequencies 10 Hz, 10.2 Hz, 10.4 Hz, . . . , 300 Hz. Here the difference in frequency (e.g., 10.4 Hz-10.2 Hz) between each pair fi, fj of adjacent frequency components is less than a threshold frequency (e.g., 0.29 Hz). In one embodiment, a number of the frequency components is between 10 and 1000 and each of the frequency components has a frequency between 10 Hz and 300 Hz. For example, if there are 1000 evenly spaced frequency components between 10 Hz and 300 Hz, the difference in frequency between adjacent frequency components will be (300−10)=290/1000=0.29 Hz.

In one embodiment, a difference (a2−a1) between an amplitude a1 of a first frequency component having a highest amplitude and an amplitude a2 of a second frequency component having a lowest amplitude is less than a threshold amplitude aT. Similar to the power spectrum 1862 illustrated and described above with respect to FIG. 18B, the amplitude of the carrier signals 1828 generated is a random signal having nearly equal amplitude at different frequencies, giving it a nearly flat amplitude spectrum.

In one embodiment, an amplitude of each frequency component fi having a frequency less than (fi<ft) a threshold frequency ft is greater than an amplitude of each frequency component fj having a frequency greater than (fj>ft) the threshold frequency ft. For example, the broadband carrier signals 1828 generated by aggregating such frequency components will have a power spectrum 1862 such that the power spectral density that may be inversely proportional to frequency of the frequency component fi.

In one embodiment, an amplitude of each frequency component fi decreases as a frequency of the frequency component fi increases and the amplitude of the frequency component fi increases as the frequency of the frequency component fi decreases. For example, the power per Hz for such frequency components decreases as the frequency increases. In another example, the power per octave may be equal. An octave is a frequency component whose highest frequency is twice its lowest frequency. For example, the band from 20 Hz to 40 Hz is an octave, as is the band from 40 to 80 Hz. Thus, although the power per Hz decreases with increasing frequency, the width of successive octaves increases (they contain more frequencies), giving the frequency components equal power per octave.

In one embodiment, the frequency components have periodic, low-frequency, non-sinusoidal waveforms. Each of the frequency components has a fundamental frequency fi less than a threshold frequency ft. The frequency component also has harmonic frequencies of the fundamental frequency fi. For example, the fundamental frequency fi may be kept low (e.g., 10 Hz) and the harmonic frequencies included to generate the broadband carrier signals 1828. Each harmonic of the fundamental frequency fi has a waveform with a frequency that is a positive integer multiple of the fundamental frequency fi. The harmonics are periodic at the fundamental frequency; the sum of harmonics is also periodic at that frequency. For example, if the fundamental frequency is 10 Hz, the frequencies of the first three higher harmonics are 20 Hz (2nd harmonic), 30 Hz (3rd harmonic), and 30 Hz (4th harmonic).

In one embodiment, the random amplitude generator 1860 may generate the broadband carrier signals 1828 by randomly assigning an amplitude to each of the frequency components. For example, the random amplitude generator 1860 may generate broadband carrier signals 1828 that are T seconds in duration and use a sampling rate of Fs samples/second. The random amplitude generator 1860 forms a sequence x[n] from N random numbers for the frequency components, where N=T×Fs. The random amplitude generator 1860 determines the average value of the sequence, mu=ave(x). The random amplitude generator 1860 subtracts the average value from the sequence, y=x−mu. The random amplitude generator 1860 identifies the maximum excursion, m=max(|y|) (i.e., the maximum of the absolute value of y). The random amplitude generator 1860 scales the sequence by the maximum excursion to generate the broadband carrier signals 1828, such that the scaled sequence z has a maximum excursion of 1, z=y/m. The resulting broadband carrier signals 1828 may be transmitted to a digital-to-analog converter using a sample rate of Fs. The analog output may be transmitted to an audio amplifier to generate the actuator signals 1818. In still other embodiments the broadband carrier signals 1828 may be pre-generated and stored in read-only memory in the carrier signal generator 1872, and may be read from memory when the carrier signals 1828 are used by the broadband signal generator 1816.

In one embodiment, the carrier signal generator 1872 generates the broadband carrier signals 1828 by randomly assigning a phase to each of the frequency components. A phase of a frequency component is the position of a point in time (an instant) on a waveform cycle of the frequency component. For example, the carrier signal generator 1872 may randomly assign a phase to each of the frequency components by randomly selecting a relative displacement between two corresponding features (for example, peaks or zero crossings) of two frequency components. The carrier signal generator 1872 may randomly assign a phase to each of the frequency components by randomly selecting an initial angle (phase offset or phase difference) of a frequency component at its origin. In another example, the carrier signal generator 1872 may randomly assign a phase to each of the frequency components by randomly selecting a fraction of a wave cycle of a frequency component that has elapsed relative to the origin.

The actuator signal generator 1876 generates the actuator signals 1818 by encoding the parameters 1852 from the sensor signals 1806 into the broadband carrier signals 1828. The actuator signal generator 1876 may be implemented in software, hardware, or a combination thereof. For example, the actuator signal generator 1876 may include one or more processing units (e.g., a CPU, a GPU, a DSP, a controller, a state machine, one or more ASICs, one or more RFICs, or any combination of these) and a memory.

In one embodiment, the actuator signal generator 1876 generates the actuator signals 1818 by modulating the frequency components using the amplitude of each frequency band 1846. For example, the actuator signal generator 1876 may increase or decrease the instantaneous frequency of the broadband carrier signals 1828 proportional to the amplitude of each frequency band 1846. The broadband carrier signals 1828 are altered such that the frequency of the broadband carrier signals 1828 varies in line with the variations in amplitude of each frequency band 1846. When parameters of the sensor signals 1806 are encoded into the broadband carrier signals 1828 to generate the actuator signals 1818, the actuator signals 1818 increase and decrease in frequency proportional to amplitude of each frequency band 1846. In this way, the frequencies of the broadband carrier signals 1828 carry the features of the sensor signals 1806. The altered broadband carrier signals 1828 are transmitted as actuator signals 1818 to the cutaneous actuators 1822.

In one embodiment, the actuator signal generator 1876 generates the actuator signals 1818 by increasing or decreasing the instantaneous amplitude of the broadband carrier signals 1828 proportional to the amplitude of each frequency band 1846. In one example, parameters of the sensor signals 1806 are superimposed onto the amplitude of the broadband carrier signals 1828. The broadband carrier signals 1828 are altered such that the amplitude of the broadband carrier signals 1828 varies in line with the variations in amplitude of each frequency band 1846. In this way, the amplitudes of the broadband carrier signals 1828 carry the features of the sensor signals 1806. The altered broadband carrier signals 1828 are transmitted as the actuator signals 1818 to the cutaneous actuators 1822.

In one embodiment, the actuator signal generator 1876 generates the actuator signals 1818 by increasing or decreasing a number of the cutaneous actuators 1822 activated by the actuator signals 1818 based on the extracted parameters 1852. For example, the actuator signal generator 1876 encodes parameters of the sensor signals 1806 into the broadband carrier signals 1828 by increasing or decreasing a number of the cutaneous actuators 1822 activated proportional to the amplitude of the sensor signals 1806. As the instantaneous amplitude of the sensor signals 1806 increases, the broadband carrier signals 1828 are altered such that the actuator signals 1818 activate (turn on) a larger number of the cutaneous actuators 1822 on the haptic communication device 1820. This may result in a larger area of the user's body 1826 receiving stimulation from the haptic vibrations 1824. This may also create a sense of continuous tactile motion (e.g., stroking or moving touch) on the body 1826 rather than discrete actuation points, as described above with reference to FIG. 15B. As the instantaneous amplitude decreases, the broadband carrier signals 1828 are altered such that the actuator signals 1818 activate a smaller number of the cutaneous actuators 1822 on the haptic communication device 1820. Altering the number of cutaneous actuators 1822 activated results in more sophisticated haptic communication effects. The information related to the words of a social touch lexicon described above with reference to FIG. 15B may thus communicated by altering the number of the cutaneous actuators 1822 activated proportional to the instantaneous amplitude of the sensor signals 1806. By changing the amplitude and patterns of vibration, a large number of combinations, rhythms or messages may be reproduced.

In one embodiment, the actuator signal generator 1876 generates the actuator signals 1818 by increasing or decreasing an overlap time between haptic vibrations generated by each cutaneous actuator of a pair of the cutaneous actuators 1822 based on the extracted parameters 1852. The overlap time between the beginning of the transmitting of second haptic vibrations by a second cutaneous actuator and the end of the transmitting of first haptic vibrations by a first cutaneous actuator provides continuous tactile touch motions instead of the user experiencing isolated vibrations at different locations on the user's body 1826. By changing the overlap time between haptic vibrations, a large number of combinations, rhythms or messages may be reproduced.

In one embodiment, the actuator signal generator 1876 generates the actuator signals 1818 by increasing or decreasing a duration of the haptic vibrations 1824 corresponding to the actuator signals 1818 based on the extracted parameters 1852. A cutaneous actuator 1822 may begin transmitting haptic vibrations 1824 at time t1 and end at time t2 after a time interval indicating a duration time of the haptic vibrations 1824. The smooth continuous motions may be modeled as a function of the duration time t2–t1 of the haptic vibrations 1824 for stroking motion. The duration time t2–t1 determines the speed of the stroke. The duration time t2–t1 of the haptic vibrations 1824 may be increased or decreased to provide better communication of the haptic sensations in a message and words of a social touch lexicon.

In alternative embodiments of the broadband signal generator 1816, the carrier signal generator 1872 may be located within the actuator signal generator 1876. In these embodiments, the sensor signals 1806 may be transmitted by the actuator signal generator 1876 to a PLL section of the carrier signal generator 1872 to alter the instantaneous frequency values of the generated broadband carrier signals 1828 to generate the actuator signals 1818. The sensor signals or parameters 1852 may be transmitted by the actuator signal generator 1876 to a level controller section of the carrier signal generator 1872 to alter the instantaneous amplitude values of the generated broadband carrier signals 1828 to generate the actuator signals 1818.

The benefits and advantages of the embodiments disclosed herein are as follows. In general, human evolution has imposed limitations on the spatial and temporal density of transcutaneous information transfer. A human user's skin is optimized to convey information that is transient in nature and requires immediate response, while filtering out stable, nonthreatening stimuli. Precise localization is less important than quickly drawing attention to the general area of stimulation, so that there is not a selective advantage for an organism to develop high spatial resolution. In nature, sustained stimuli are uninformative and distracting, so the well-known phenomenon of sensory adaptation is beneficial, but limits the duration that engineered information conveying stimuli can be delivered without becoming irritating or filtered out by sensory adaptation. The embodiments disclosed herein use this knowledge of the skin's response characteristics to generate the actuator signals 1818 for better transmission of the message.

The embodiments disclosed herein filter out the signal features that are outside the frequency range of skin sensitivity, and focus on the range of sensitivity of the skin. The embodiments disclosed herein may further pre-filter actuator signals 1818, such that the power is scaled according to the frequency-dependence of skin sensitivity, such that frequencies with poor responsiveness are amplified and those with good responsiveness are attenuated. Because the same signal power is delivered with lower peak spectral energy, the stimulus is less irritating and less likely to induce fatigue and sensory adaptation. In addition, low spatial resolution results in part from mechanical waves that propagate through the tissue. By limiting the peak spectral amplitude, the broadband actuator signals 1818 will have less propagation radially from the source compared to narrow-band signals with equivalent power, thereby improving spatial resolution. The disclosed embodiments using broadband actuator signals 1818 therefore make the artificial and mechanical stimulus feel more natural and physiologic.

The embodiments disclosed herein also improve the dimensionality of the haptic communication device 1820. The dimensionality refers to the different independent parameters for encoding information. For example, location, duration, and intensity of stimulation are different parameters that can be used to encode information. As more dimensions (parameters) are added, more distinct haptic "symbols" are possible, which increases the information transfer. Since broadband signals induce a different quality of perception than narrow-band, they can be used as another dimension of information encoding. For example, the following three states can be used to encode information: sinusoidal waveform with 150 Hz frequency, broadband signals with signal power evenly distributed between 150 and 350 Hz, and broadband signals with signal power evenly distributed between 25 and 150 Hz.

Figure 18D:
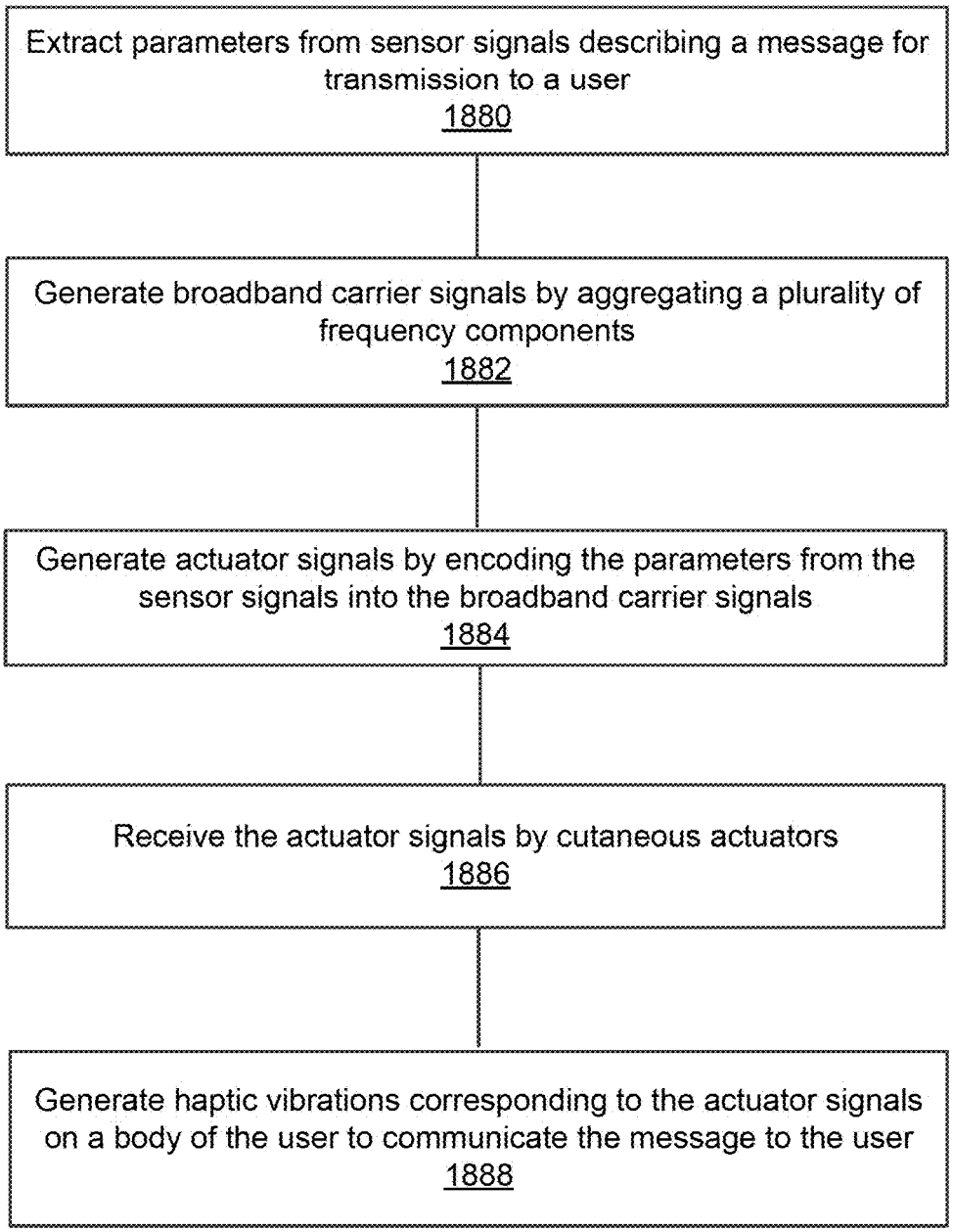
FIG. 18D is an illustration of an example process for haptic communication using broadband actuator signals, in accordance with an embodiment.

FIG. 18D is an illustration of an example process for haptic communication using broadband actuator signals 1818, in accordance with an embodiment. In one embodiment, the process of FIG. 18D is performed by the haptic communication system 1800. Other entities (e.g., a remote console or computer) may perform some or all of the steps of the process in other embodiments. Likewise, embodiments may include different and/or additional steps, or perform the steps in different orders.

The haptic communication system 1800 extracts 1880 parameters 1852 from sensor signals 1806 describing a message for transmission to a user. The parameters 1852 may be extracted using the parameter extractor 1842 described above. In one embodiment, the parameter extractor 1842 may decompose the sensor signals 1806 into frequency bands 1846 using an array of band-pass filters 1844 that span the speech spectrum.

The haptic communication system 1800 generates 1882 broadband carrier signals 1828 by aggregating frequency components. The broadband carrier signals 1828 may include many frequency components including a wide range of frequencies that can be transmitted, recorded, and manipulated. In one embodiment, the broadband carrier signals 1828 may include a number of frequency components having nearly equal power or amplitude at different frequencies, thus giving the broadband carrier signals 1828 a uniform power spectrum 1862.

The haptic communication system 1800 generates 1884 actuator signals 1818 by encoding the parameters 1852 from the sensor signals 1806 into the broadband carrier signals 1828. In one embodiment, the physical location on the body 1826 of the user that is being actuated may be encoded into the broadband carrier signals 1828. For example, the location of the particular one or more actuators that are driven by the actuator signals 1818 convey information (e.g., identifying a particular phoneme) to the body 1826 of the user. In another embodiment, the amplitude of each frequency component can be used to encode information. In another embodiment, sequences of activation of different actuators can be used to encode information. In another embodiment, features of the power spectrum 1862 can be used.

The haptic communication system 1800 receives 1886 the actuator signals 1818 by cutaneous actuators 1822 communicatively coupled to the broadband signal generator 1816. In one embodiment, the cutaneous actuators 1822 may be voice coils that convert an analog AC-coupled signal (the actuator signals 1818) to proportional mechanical motion. The cutaneous actuators 1822 may be arranged on a semi-rigid backing that secures them in position against the body 1826 with enough pressure that the haptic vibrations 1824 can be perceived by the user.

The haptic communication system 1800 generates 1888 haptic vibrations 1824 corresponding to the actuator signals 1818 on a body 1826 of the user to communicate the message to the user. A speech message, textual message, or a haptic message corresponding to a social touch lexicon may therefore be transmitted from one user to another user, including haptic messages for greeting, parting, giving attention, helping, consoling, calming, pleasant, and reassuring touches.

The foregoing description of the embodiments has been presented for the purpose of illustration; it is not intended to be exhaustive or to limit the embodiments to the precise forms disclosed. Many modifications and variations are possible in light of the above disclosure.

Finally, the language used in the specification has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the embodiments is intended to be illustrative, but not limiting, of the scope, which is set forth in the following claims.

What is claimed is:

1. A haptic communication device, comprising:
   one or more cutaneous actuators configured to generate haptic vibrations corresponding to actuator signals received by the one or more cutaneous actuators;
   a dampening member configured to be proximate to a body of a user wearing the haptic communication device and focus the haptic vibrations at one or more distinct locations on the body, the dampening member having one or more first openings, wherein the one or more cutaneous actuators transmit the haptic vibrations to the one or more distinct locations through the one or more first openings; and
   a spacing member contacting the dampening member and separated from the body by the dampening member, the spacing member having one or more second openings dimensioned to receive and secure the one or more cutaneous actuators.

2. The haptic communication device of claim 1, wherein the dampening member is a layer of foam of a predetermined thickness.

3. The haptic communication device of claim 1, wherein the dampening member is in direct contact with the body of the user.

4. The haptic communication device of claim 3, wherein the one or more cutaneous actuators comprise a plurality of cutaneous actuators, each of the plurality of cutaneous actuators corresponding to a respective one of the one or more first openings and a respective one of the one or more second openings.

5. The haptic communication device of claim 1, wherein a portion of each of the one or more cutaneous actuator is embedded in the spacing member.

6. The haptic communication device of claim 1, wherein the spacing member is a layer of rubber of a predetermined thickness and a predetermined durometer.

7. The haptic communication device of claim 1, further comprising a cushioning member configured to adjust to a shape of the body by compression, the spacing member located between the dampening member and the cushioning member.

8. The haptic communication device of claim 7, further comprising a rigid substrate dimensioned to compress the cushioning member to the shape of the body, the cushioning member located between the spacing member and the rigid substrate.

9. The haptic communication device of claim 7, wherein:
   the cushioning member has one or more third openings, each of the one or more cutaneous actuators inserted into a corresponding one of the one or more third openings; and
   a portion of each of the one or more cutaneous actuators is embedded in the cushioning member.

10. The haptic communication device of claim 7, further comprising electronic circuitry coupled to the one or more cutaneous actuators and located within a space between the cushioning member and the spacing member.

11. The haptic communication device of claim 7, wherein the cushioning member is a layer of foam having a predetermined thickness.

12. The haptic communication device of claim 1, further comprising electronic circuitry coupled to the one or more cutaneous actuators and configured to:
   transmit the actuator signals to the one or more cutaneous actuators;
   determine a temperature of the haptic communication device; and
   responsive to the temperature exceeding a threshold, terminate operation of the one or more cutaneous actuators.

13. The haptic communication device of claim 12, wherein:
   each of the one or more second openings has a first portion having a first shape, and a second portion extending from the first portion and having a second shape;
   the cutaneous actuators are inserted into the one or more first portions; and
   the electronic circuitry is inserted into the one or more second portions.

14. The haptic communication device of claim 1, further comprising one or more end effectors configured to press into the body and focus the haptic vibrations at the one or more distinct locations on the body, each of the one or more end effectors mounted on a corresponding one of the one or more cutaneous actuators.

15. The haptic communication device of claim 14, wherein each of the one or more end effectors is made of rubber, silicone, or polycarbonate.

16. The haptic communication device of claim 1, wherein the one or more cutaneous actuators comprise a single cutaneous actuator, the haptic communication device further comprising a housing in direct contact with the body of the user and at least partially enclosing the cutaneous actuator.

17. The haptic communication device of claim 16, wherein the dampening member is located between the single cutaneous actuator and a roof of the housing.

18. The haptic communication device of claim 16, further comprising a rigid substrate dimensioned to secure the housing to a shape of the body of the user, the housing mounted on the rigid substrate.

19. The haptic communication device of claim 16, further comprising an end effector mounted on the single cutaneous actuator and configured to extend out of the housing through a third opening in a roof of the housing.

20. The haptic communication device of claim 19, wherein the end effector has one end attached to the single cutaneous actuator and another end configured to contact the body, the one end having a surface larger than a surface of the other end, the end effector further configured to increase pressure of the haptic vibrations on the body.

21. The haptic communication device of claim 19, wherein the end effector has a disc shape, a cylindrical shape, a tapered shape, or a dome shape.

22. The haptic communication device of claim 19, further comprising a centering member located within the housing and surrounding a portion of the single cutaneous actuator, and configured to:
    constrain the single cutaneous actuator and the end effector in a plane parallel to a roof of the housing; and
    prevent the single cutaneous actuator and the end effector from contacting an inner wall of the housing.

23. The haptic communication device of claim 16, wherein the housing is made of molded plastic, machined plastic, 3D-printed plastic, VeroWhite, nylon, Acrylonitrile Butadiene Styrene (ABS), or polycarbonate.

24. The haptic communication device of claim 16, further comprising electronic circuitry coupled to the single cutaneous actuator and located within a space between the cutaneous actuator and an inner wall of the housing.

25. A method, comprising:
    receiving one or more actuator signals;
    generating haptic vibrations corresponding to the actuator signals using one or more cutaneous actuators of a haptic communication device, wherein a dampening member of the haptic communication device is configured to be proximate to a body of a user wearing the haptic communication device, and the one or more cutaneous actuators are secured in one or more first openings of a spacing member that contacts the dampening member and is separated from the body by the dampening member; and
    transmitting the haptic vibrations to one or more distinct locations on the body through one or more second openings in the dampening member.

26. The method of claim 25, further comprising by electronic circuitry:
    transmitting the actuator signals to the one or more cutaneous actuators;
    determining a temperature of the haptic communication device; and
    responsive to the temperature exceeding a threshold, terminating operation of the one or more cutaneous actuators.

27. The haptic communication device of claim 25, further comprising:
    pressing into the body using one or more end effectors, each of the one or more end effectors mounted on a corresponding one of the one or more cutaneous actuators; and
    focusing the haptic vibrations at the one or more distinct locations on the body using the one or more end effectors.

28. A haptic communication system, comprising:
    a signal generator configured to receive a message and generate actuator signals corresponding to the message; and
    a haptic communication device communicative coupled to the signal generator and comprising:
        one or more cutaneous actuators configured to generate haptic vibrations corresponding to the actuator signals to transmit the message to a body of a user wearing the haptic communication device;
        a dampening member proximate to the body and configured to focus the haptic vibrations at one or more distinct locations on the body, the dampening member having one or more first openings, wherein the one or more cutaneous actuators transmit the haptic vibrations to the one or more distinct locations through the one or more first openings; and
        a spacing member contacting the dampening member and separated from the body by the dampening member, the spacing member having one or more second openings dimensioned to receive and secure the one or more cutaneous actuators.

29. The haptic communication system of claim 28, further comprising a cushioning member configured to adjust to a shape of the body by compression, the spacing member located between the dampening member and the cushioning member.

30. The haptic communication system of claim 28, further comprising one or more end effectors configured to press into the body and focus the haptic vibrations at the one or more distinct locations, each of the one or more end effectors mounted on a corresponding one of the one or more cutaneous actuators.

31. The haptic communication system of claim 28, wherein each of the one or more second openings has a first portion having a first shape and a second portion extending from the first portion and having a second shape, the one or more cutaneous actuators inserted into the one or more first portions, the haptic communication system further comprising electronic circuitry coupled to the one or more cutaneous actuators and inserted into the one or more second portions.

32. The haptic communication system of claim 28, wherein the one or more cutaneous actuators comprise a single cutaneous actuator, the haptic communication device further comprising a housing in direct contact with the body of the user and at least partially enclosing the single cutaneous actuator.

33. The haptic communication system of claim 32, further comprising an end effector mounted on the single cutaneous actuator and configured to extend out of the housing through a third opening in a roof of the housing.

34. The haptic communication system of claim 32, wherein the end effector has one end attached to the single cutaneous actuator and another end configured to contact the body, the one end having a surface larger than a surface of the other end, the end effector further configured to increase pressure of the haptic vibrations on the body.

35. The haptic communication system of claim 32, further comprising a centering member located within the housing and surrounding a portion of the single cutaneous actuator, and configured to:
   constrain the single cutaneous actuator and the end effector in a plane parallel to a roof of the housing; and
   prevent the single cutaneous actuator and the end effector from contacting an inner wall of the housing.

* * * * *